US 12,535,046 B2

(12) United States Patent
Novek

(10) Patent No.: US 12,535,046 B2
(45) Date of Patent: Jan. 27, 2026

(54) FLUID DISPLACEMENT ENERGY STORAGE SYSTEMS AND PROCESSES TO ENABLE PRESSURE EQUILIBRIZED SUBSEA TANK

(71) Applicant: INNOVATOR ENERGY LLC, Houston, TX (US)

(72) Inventor: Ethan Novek, Houston, TX (US)

(73) Assignee: INNOVATOR ENERGY LLC, Houston, TX (US)

( * ) Notice: Subject to any disclaimer, the term of this patent is extended or adjusted under 35 U.S.C. 154(b) by 0 days.

(21) Appl. No.: 18/585,981

(22) Filed: Feb. 23, 2024

(65) Prior Publication Data
US 2024/0287957 A1 Aug. 29, 2024

Related U.S. Application Data

(63) Continuation-in-part of application No. 17/665,472, filed on Feb. 4, 2022, now Pat. No. 11,981,586, which (Continued)

(51) Int. Cl.
 *F03B 13/06* (2006.01)
(52) U.S. Cl.
 CPC .................... *F03B 13/06* (2013.01)
(58) Field of Classification Search
 CPC ......... F03B 13/06; Y02E 60/16; H02J 15/003
 See application file for complete search history.

(56) References Cited

U.S. PATENT DOCUMENTS

| | | | | |
|---|---|---|---|---|
| 4,691,524 A | * | 9/1987 | Holscher | F03B 13/00 60/398 |
| 7,743,609 B1 | * | 6/2010 | Brostmeyer | F02C 6/16 60/398 |

(Continued)

FOREIGN PATENT DOCUMENTS

| | | | | |
|---|---|---|---|---|
| CN | 114458517 A | | 5/2022 | |
| DE | 102015002654 A1 | * | 12/2015 | ............. F03B 13/06 |

(Continued)

OTHER PUBLICATIONS

Marcel Escudier and Tony Atkins, "A Dictionary of Mechanical Engineering (2 ed.)" https://www.oxfordreference.com/display/10.1093/acref/9780198832102.001.0001/acref-9780198832102-e-9261 (Year: 2019).*

(Continued)

*Primary Examiner* — Mark A Laurenzi
*Assistant Examiner* — Xiaoting Hu
(74) *Attorney, Agent, or Firm* — HUNTON ANDREWS KURTH LLP

(57) ABSTRACT

The present application pertains to processes and systems for storing or generating power. A representative method stores energy by pumping a first fluid having a first density from a first reservoir at a first elevation to a second reservoir at a second elevation using a first fluid pump and pumping a second fluid having a second density from the second reservoir to the first reservoir using a second fluid pump. Power is generated by allowing the second fluid to transfer from the first reservoir to the second reservoir using a second fluid turbine and allowing the first fluid to transfer from the second reservoir to the first reservoir using a first fluid turbine. Generally, the first elevation is above the second elevation; the first fluid density is less than the second fluid density; the first fluid displaces the second fluid in the second reservoir during the storing of energy; and the second fluid displaces the first fluid in the second reservoir during the generating of power.

26 Claims, 19 Drawing Sheets

Related U.S. Application Data is a continuation-in-part of application No. PCT/US2021/041931, filed on Jul. 21, 2021, which is a continuation-in-part of application No. 17/214,100, filed on Mar. 26, 2021, now Pat. No. 11,286,898, which is a continuation-in-part of application No. 16/932,429, filed on Jul. 17, 2020, now Pat. No. 10,961,975.

(60) Provisional application No. 63/461,801, filed on Apr. 25, 2023, provisional application No. 63/459,827, filed on Apr. 17, 2023, provisional application No. 63/448,144, filed on Feb. 24, 2023, provisional application No. 63/272,760, filed on Oct. 28, 2021, provisional application No. 63/249,100, filed on Sep. 28, 2021, provisional application No. 63/139,157, filed on Jan. 19, 2021, provisional application No. 63/132,778, filed on Dec. 31, 2020, provisional application No. 63/117,355, filed on Nov. 23, 2020.

(56) References Cited

U.S. PATENT DOCUMENTS

| | | | | |
|---|---|---|---|---|
| 2014/0091574 A1* | 4/2014 | Favy | ............... | F02C 6/16 |
| | | | | 137/209 |
| 2015/0091301 A1* | 4/2015 | Littmann | ............... | H02P 9/04 |
| | | | | 290/52 |
| 2015/0091302 A1 | 4/2015 | Littmann et al. | | |
| 2016/0348637 A1 | 12/2016 | Bächli | | |
| 2021/0363959 A1* | 11/2021 | Bustamante | ............... | F03B 3/103 |
| 2022/0282697 A1 | 9/2022 | Novek | | |

FOREIGN PATENT DOCUMENTS

| | | | | |
|---|---|---|---|---|
| EP | 3444427 A1 * | 2/2019 | | |
| WO | WO-9306367 A1 * | 4/1993 | ............... | F02C 1/02 |
| WO | WO-2016040731 A1 * | 3/2016 | ............... | F03B 13/06 |

OTHER PUBLICATIONS

Illinois Department of Public Health, "Gasoline Fact Sheet" http://www.idph.state.il.us/cancer/factsheets/gasoline.htm (Year: 2024).*

International Search Report and Written Opinion dated Jun. 21, 2024 issued in PCT/US2024/017100 filed Feb. 23, 2024.

International Search Report and Written Opinion dated Mar. 13, 2025 issued in PCT/US2025/016803, 16 pages.

Notification Concerning Transmittal of International Preliminary Report on Patentability issued in PCT/US2024/017100, mailed Sep. 4, 2025, 6 pages.

* cited by examiner

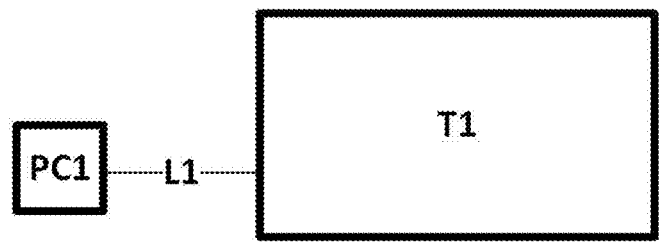
Figure 1 (Above)

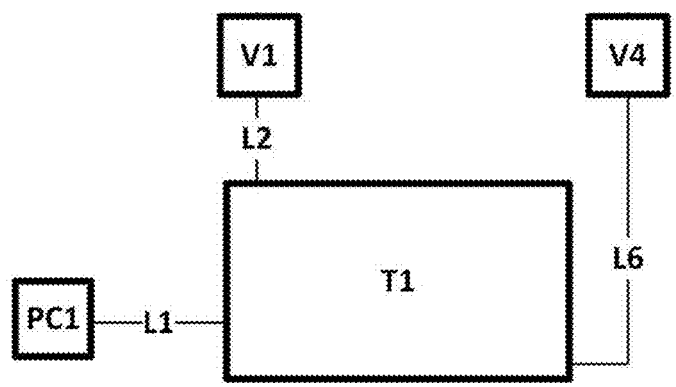
Figure 2 (Above)

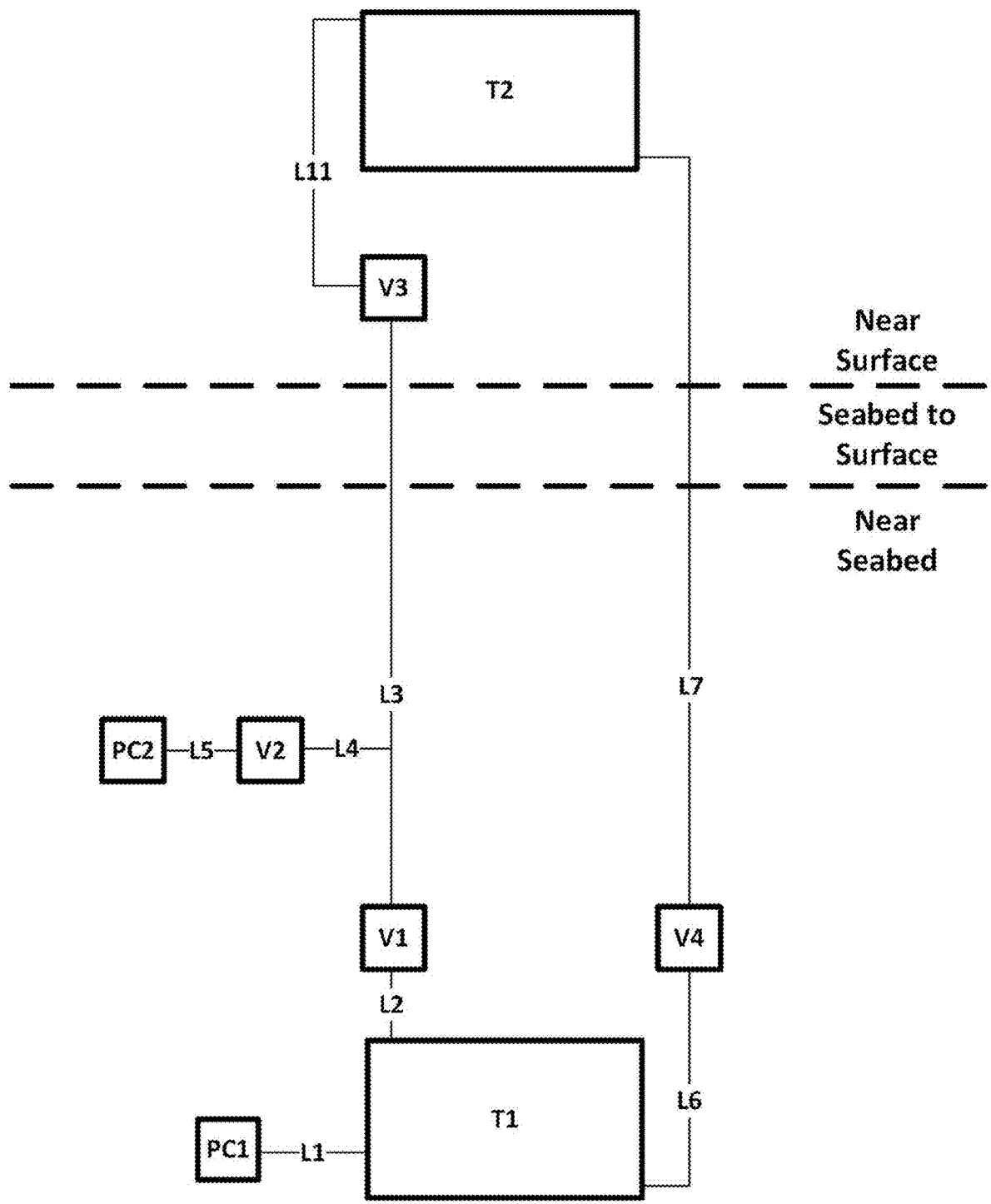
Figure 3 (Above)

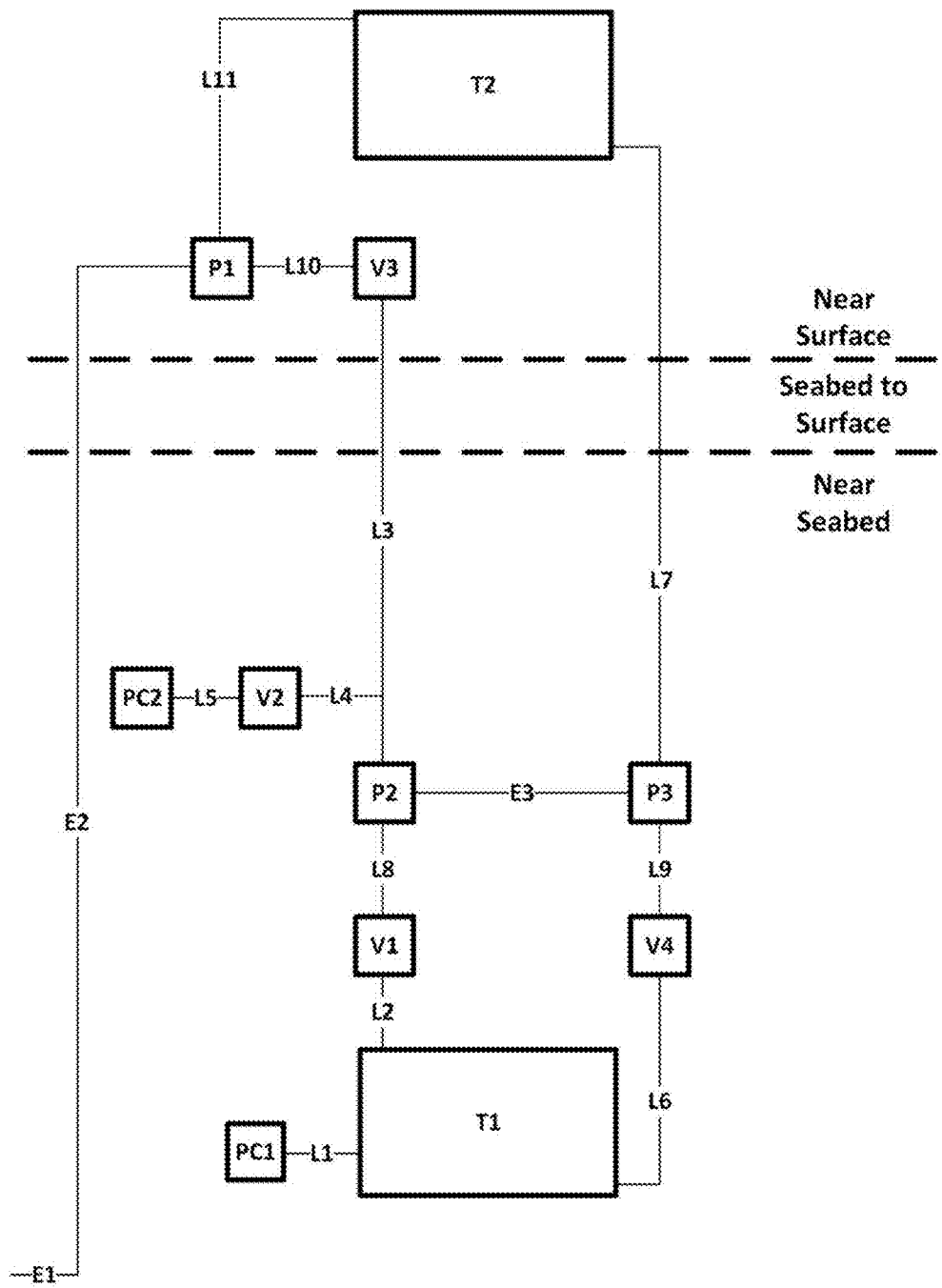
Figure 4A (Above)

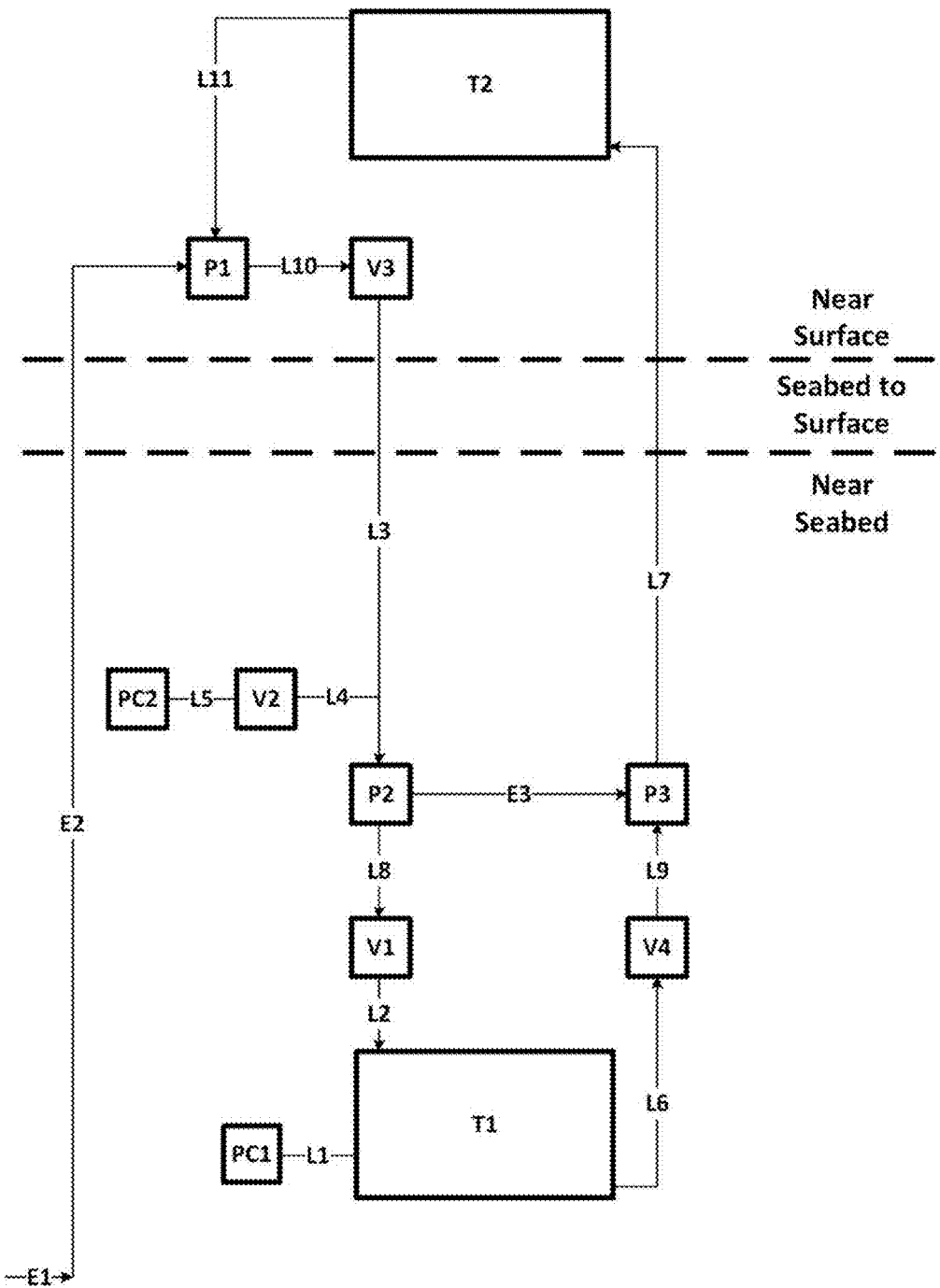
Figure 4B (Above)

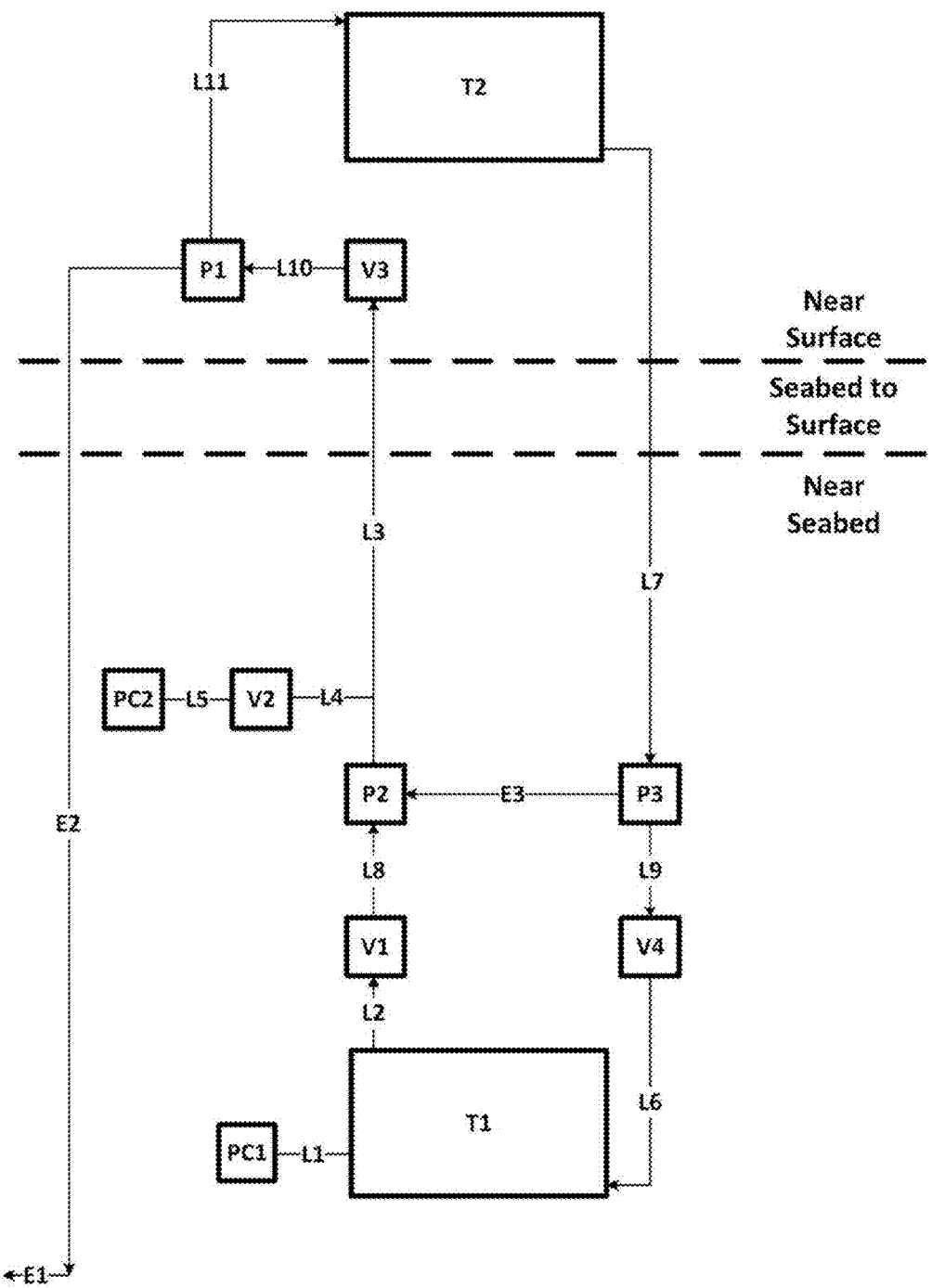
Figure 4C (Above)

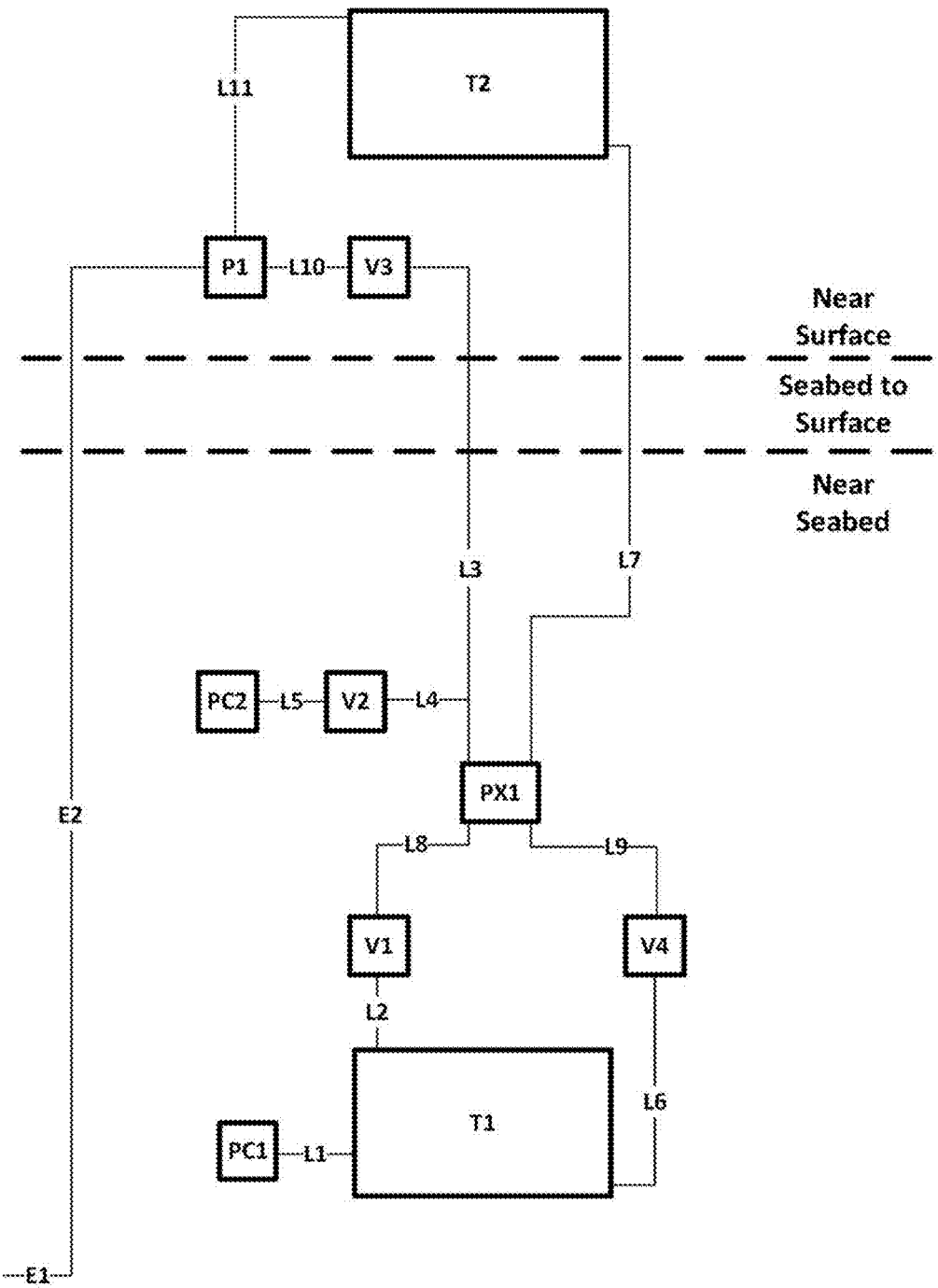
Figure 5A (Above)

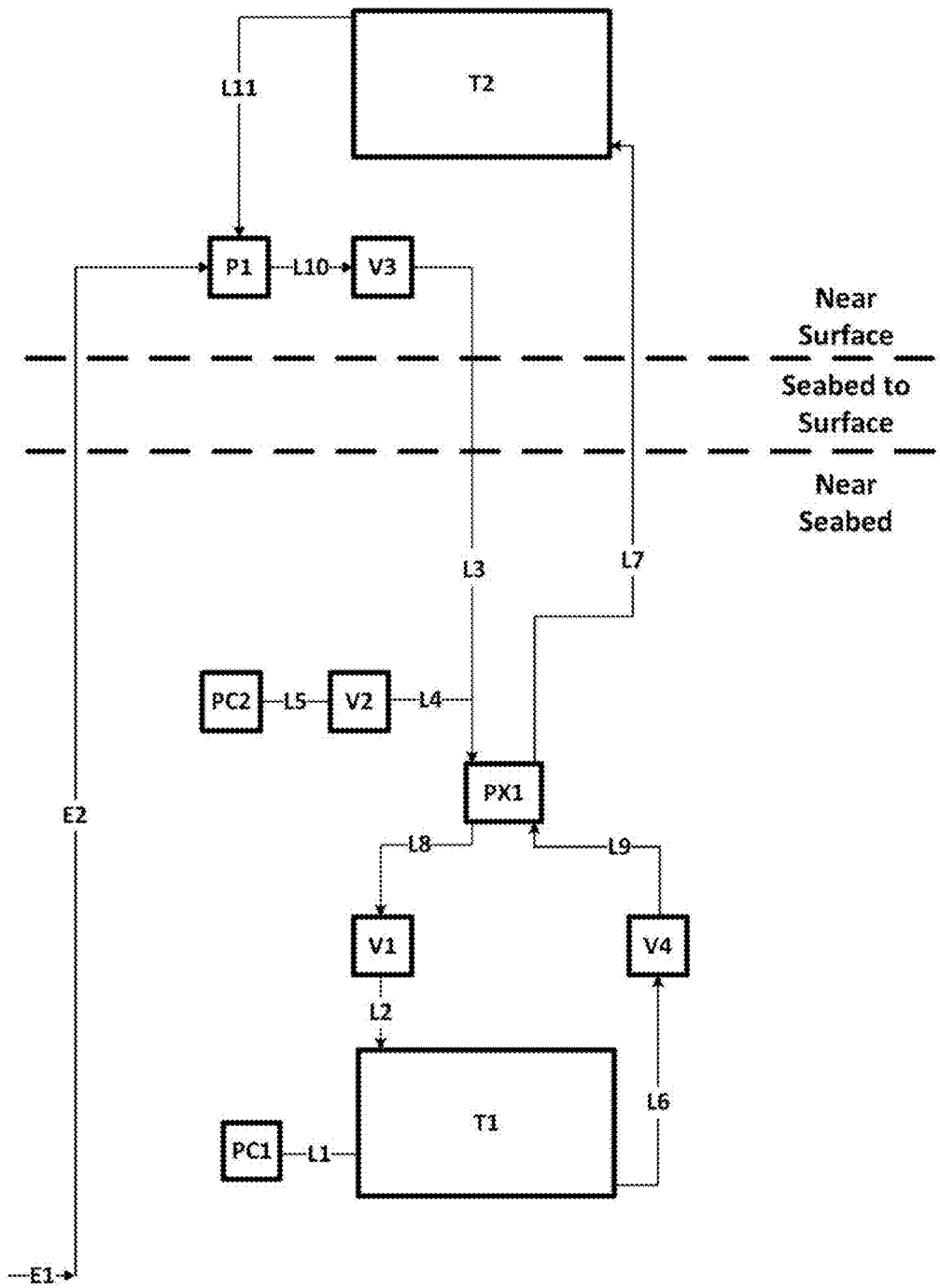
Figure 5B (Above)

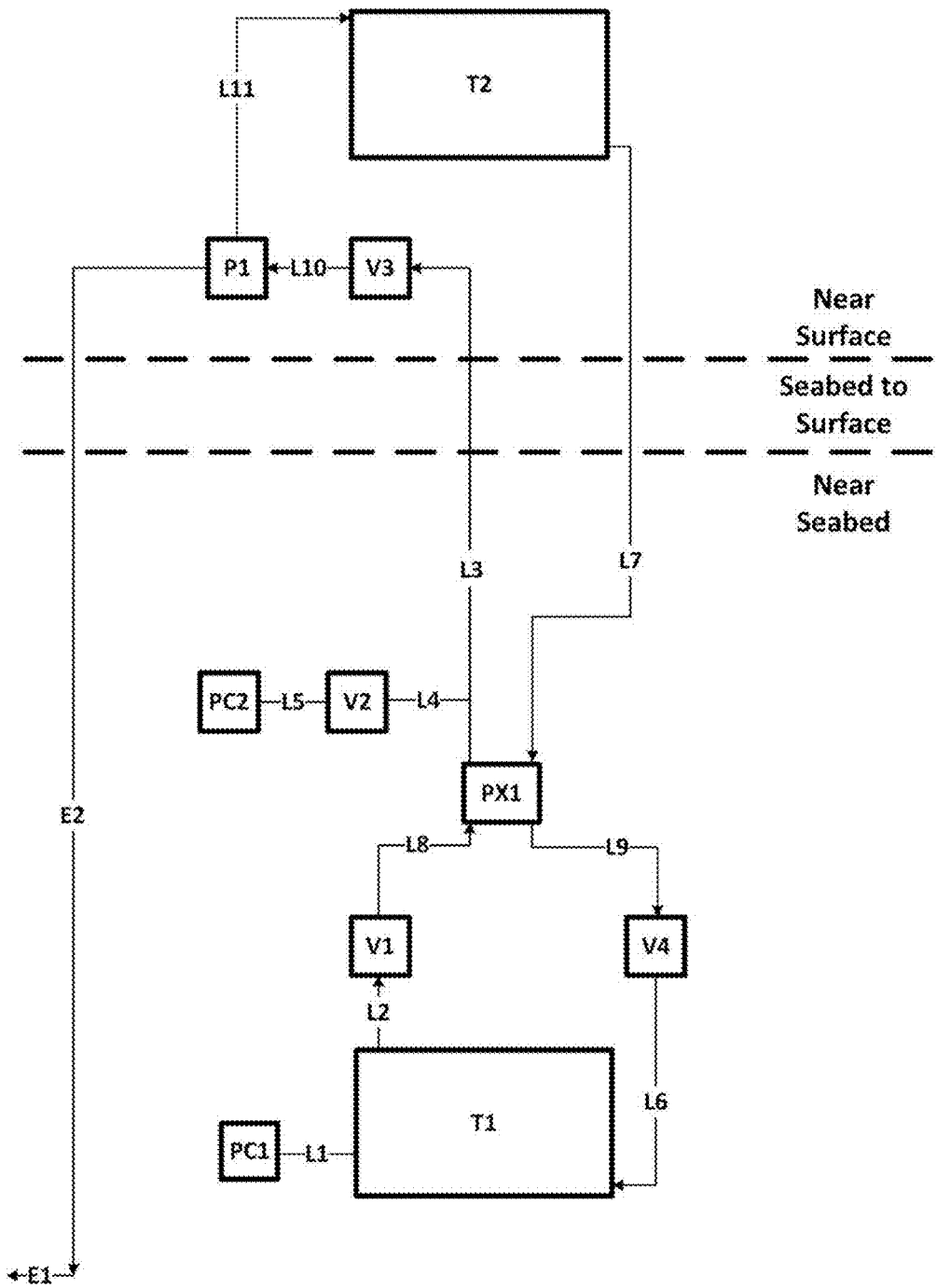
Figure 5C (Above)

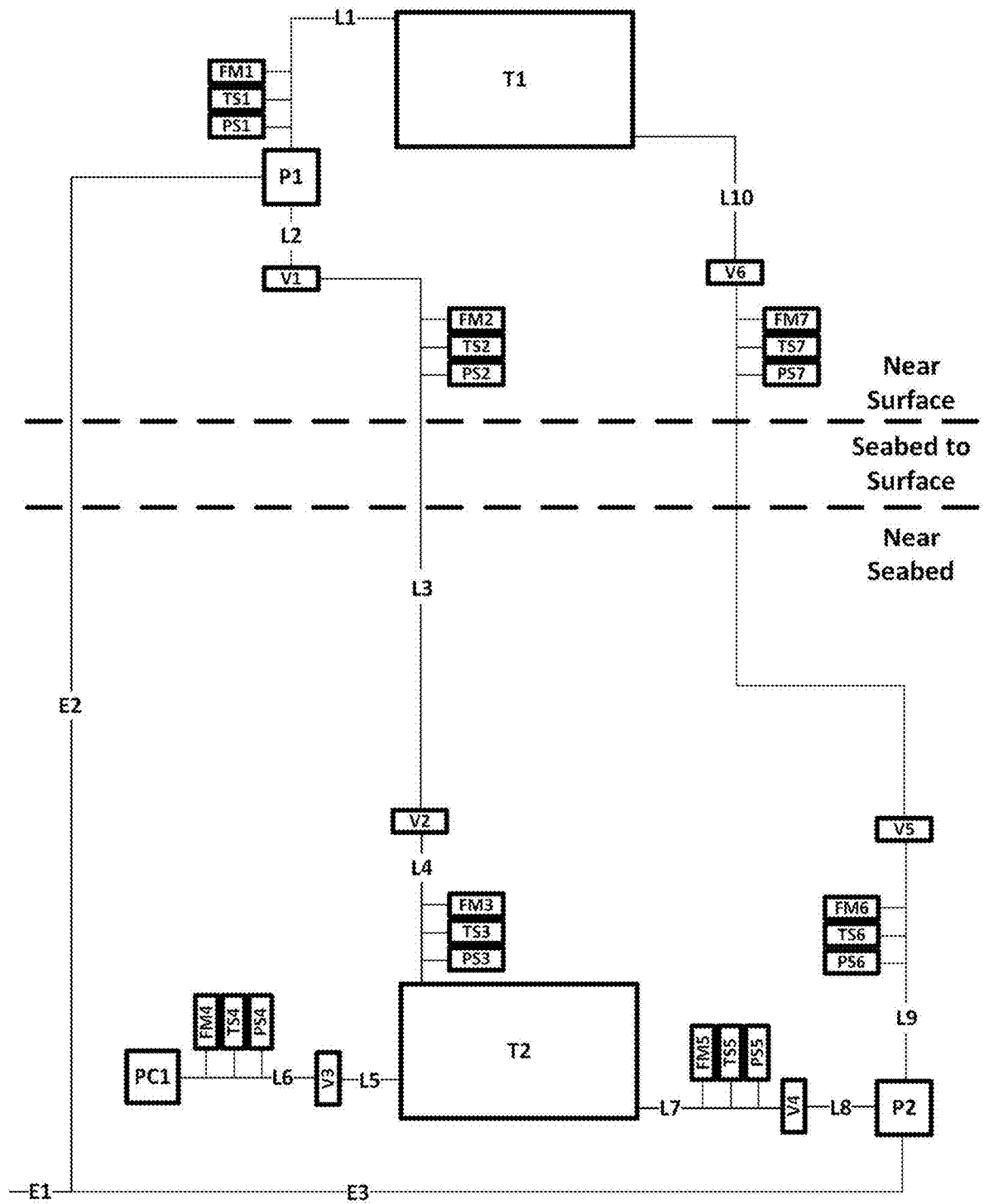
Figure 6A (Above)

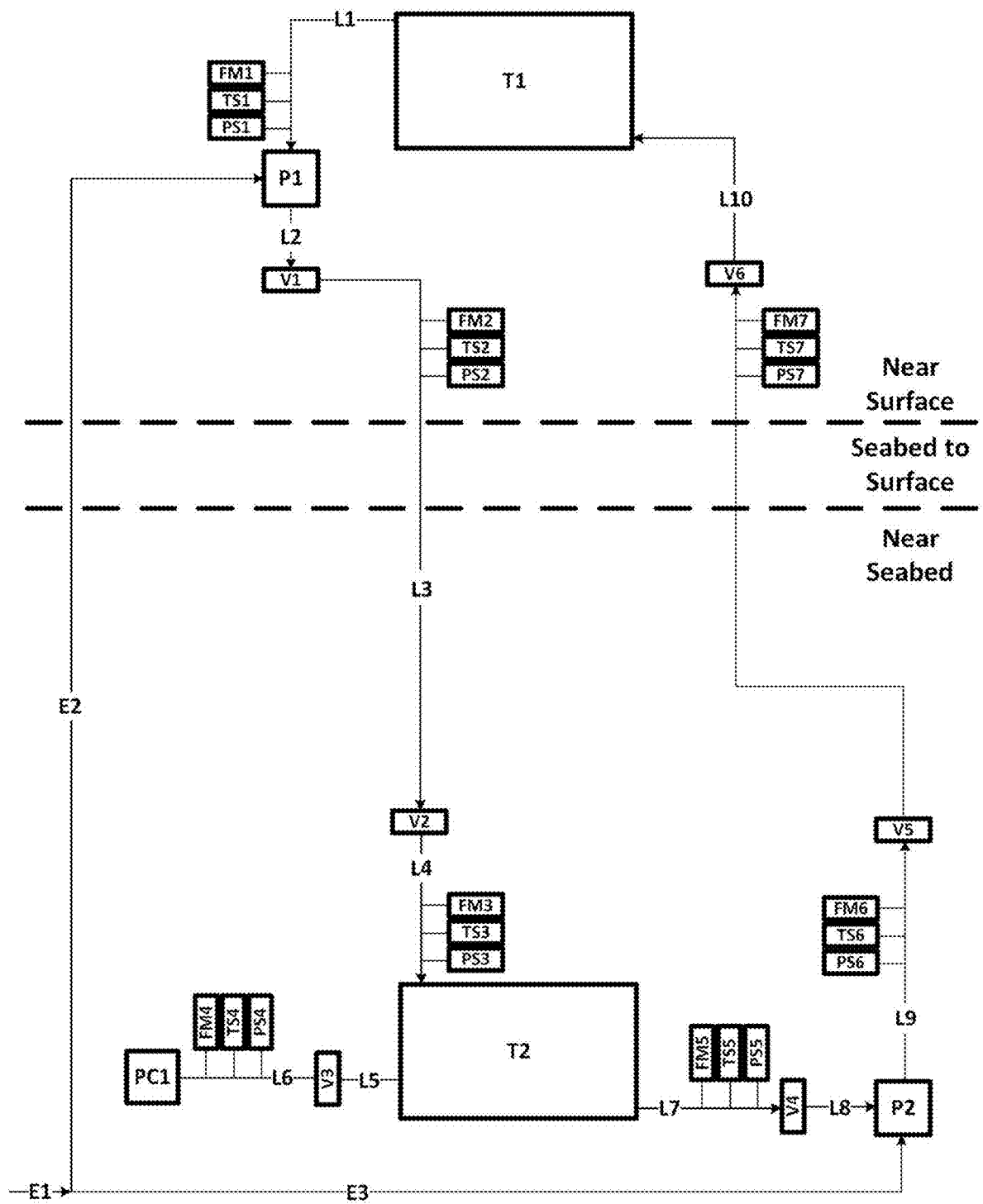
Figure 6B (Above)

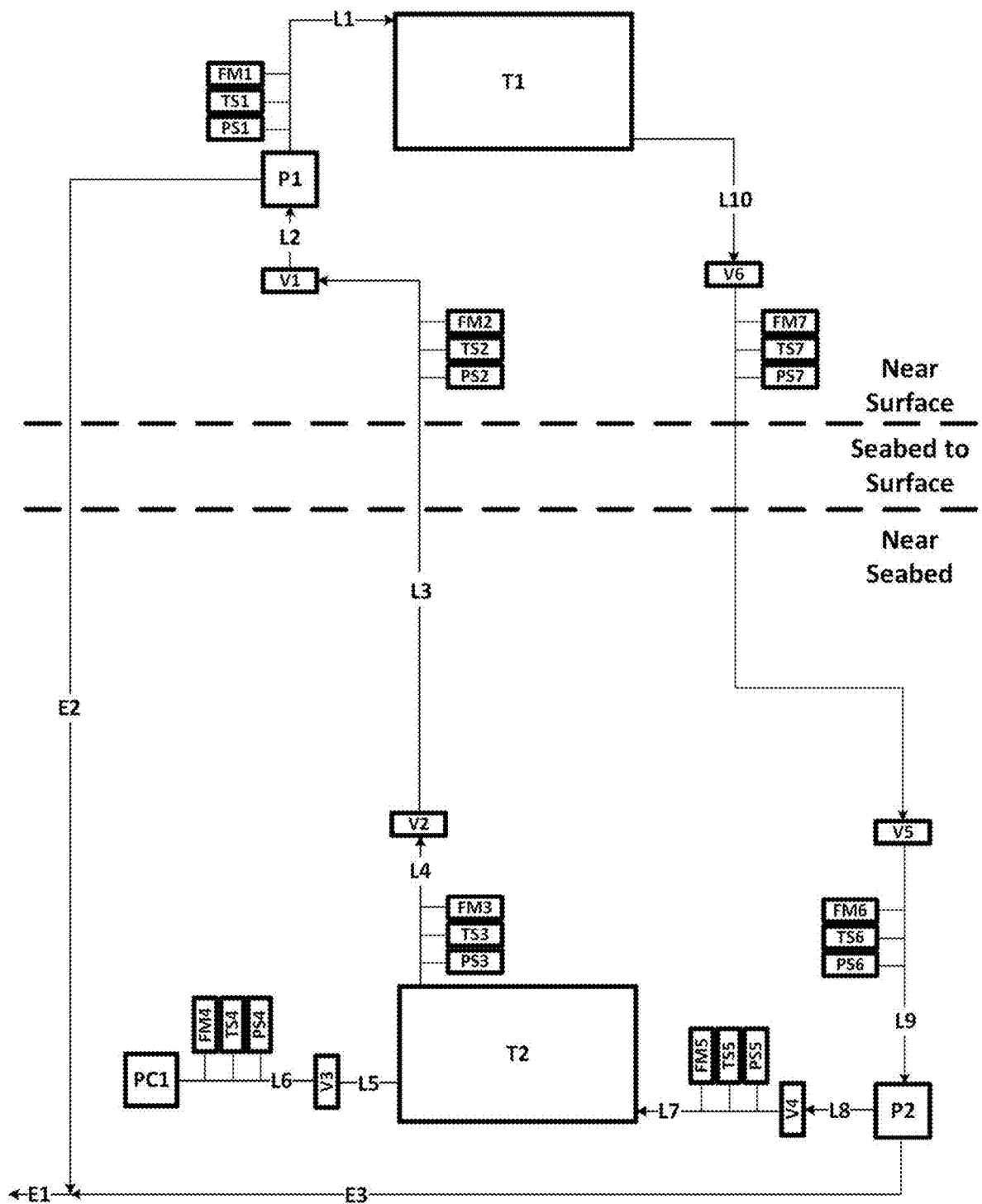
Figure 6C (Above)

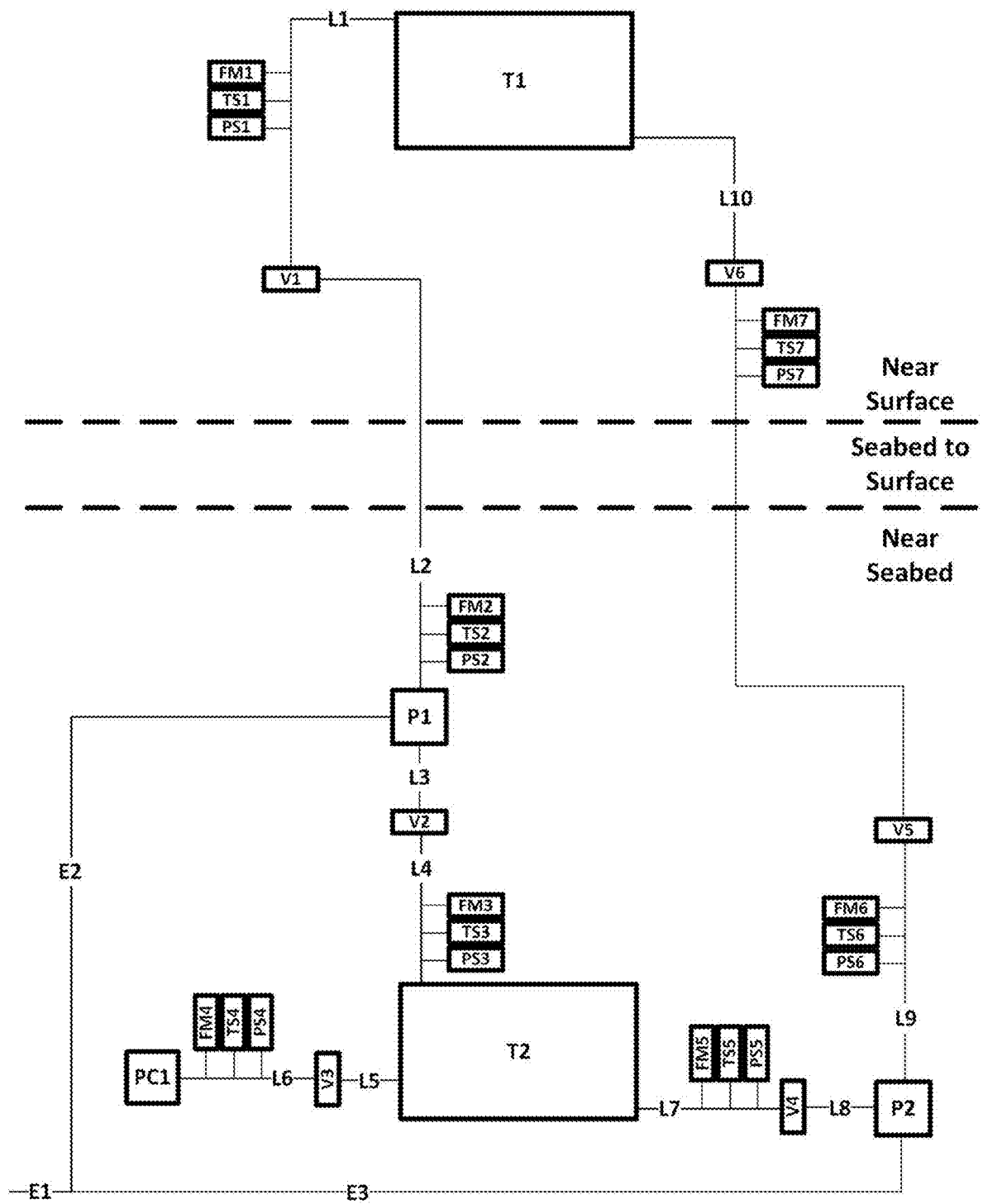
Figure 7A (Above)

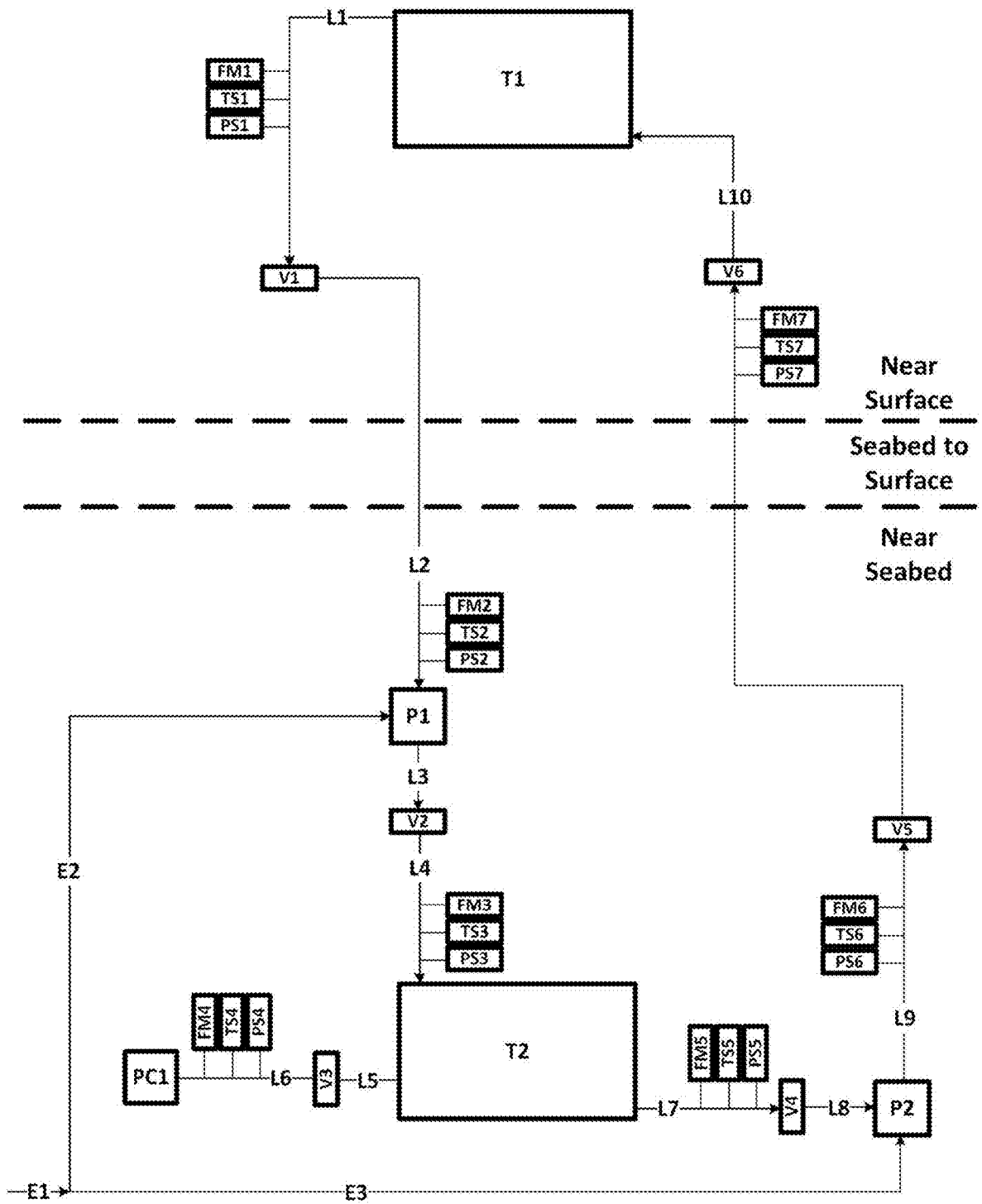
Figure 7B (Above)

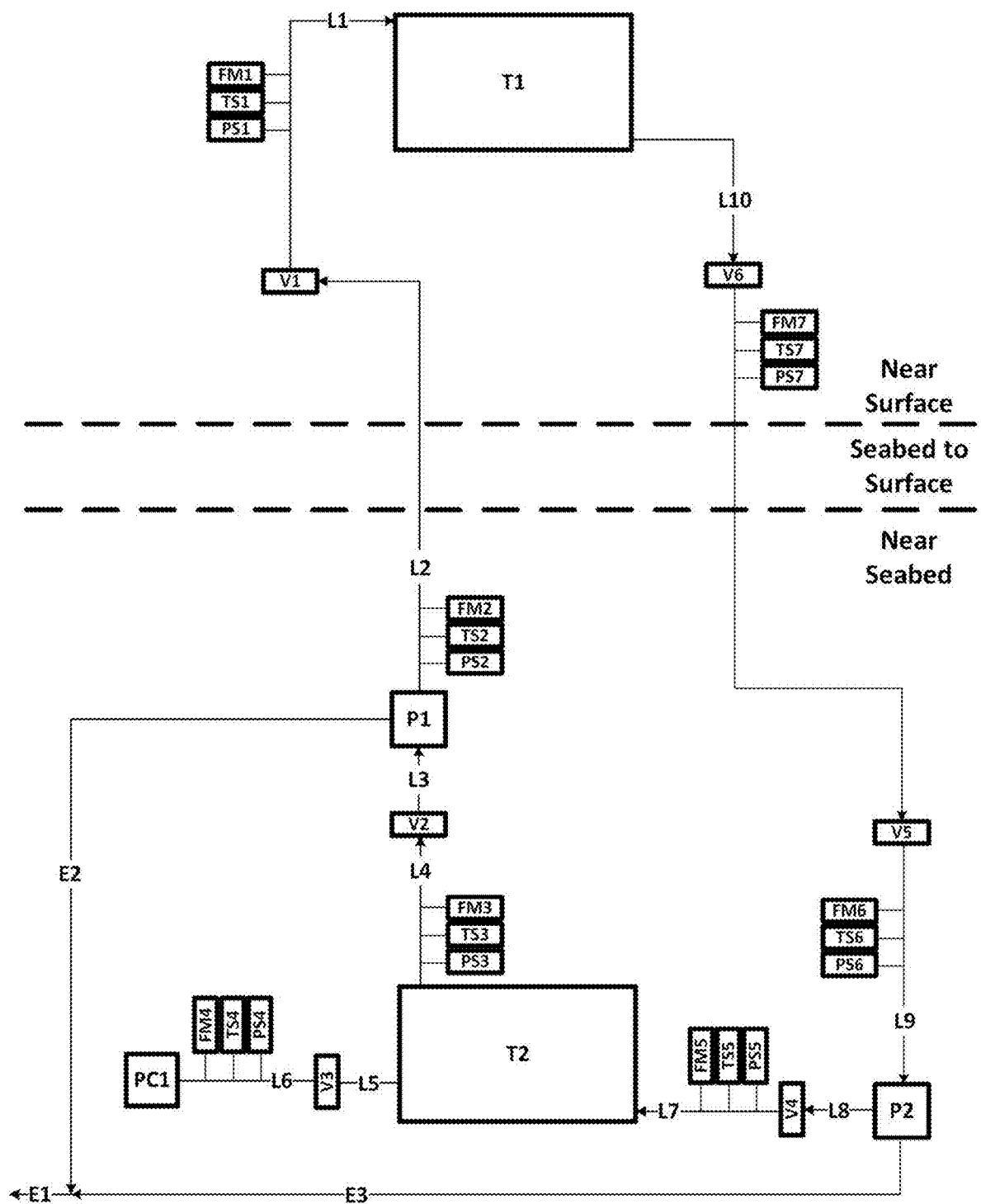
Figure 7C (Above)

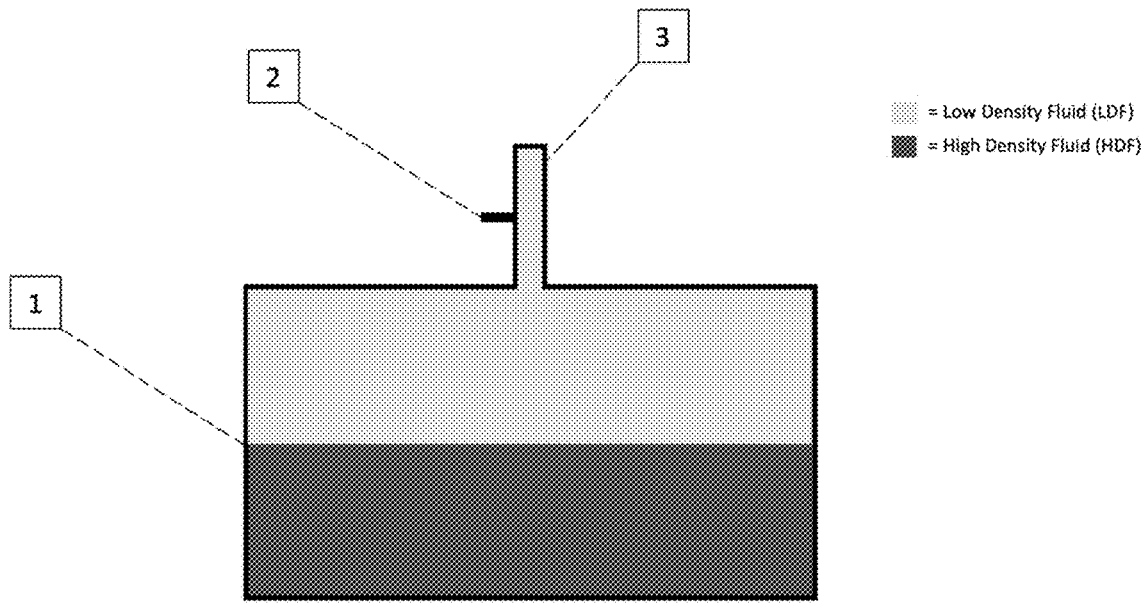
Figure 8 (Above)
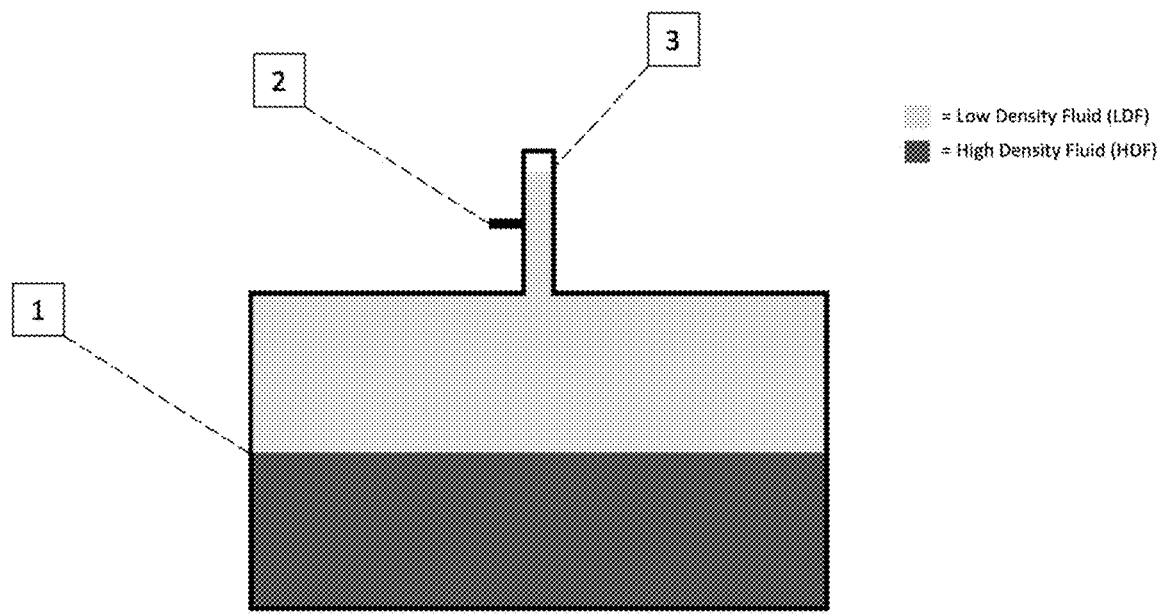
Figure 9 (Above)

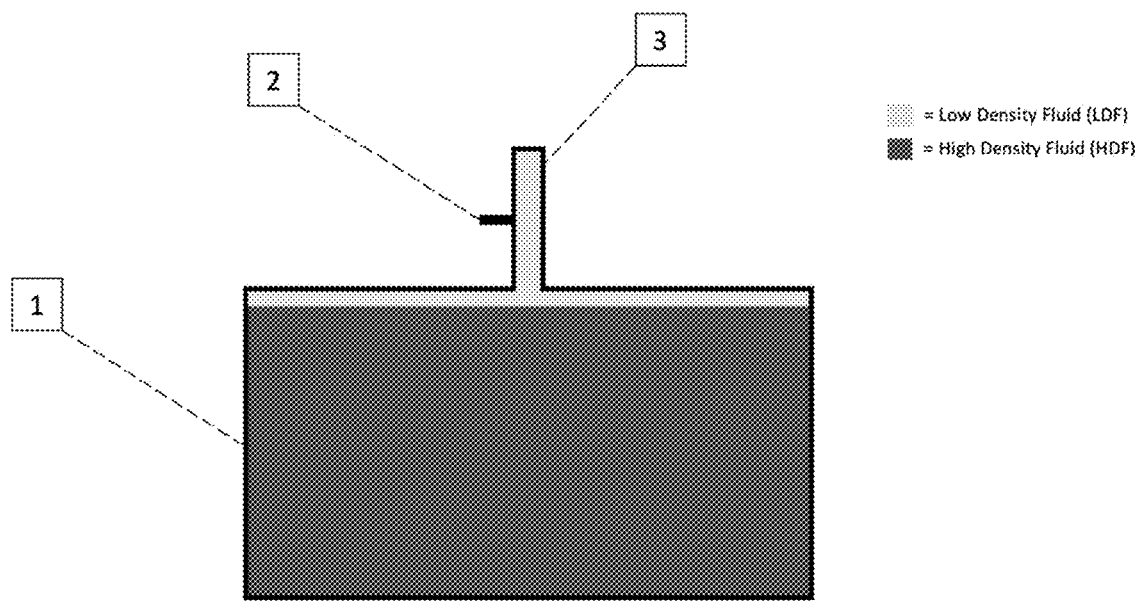
Figure 10 (Above)
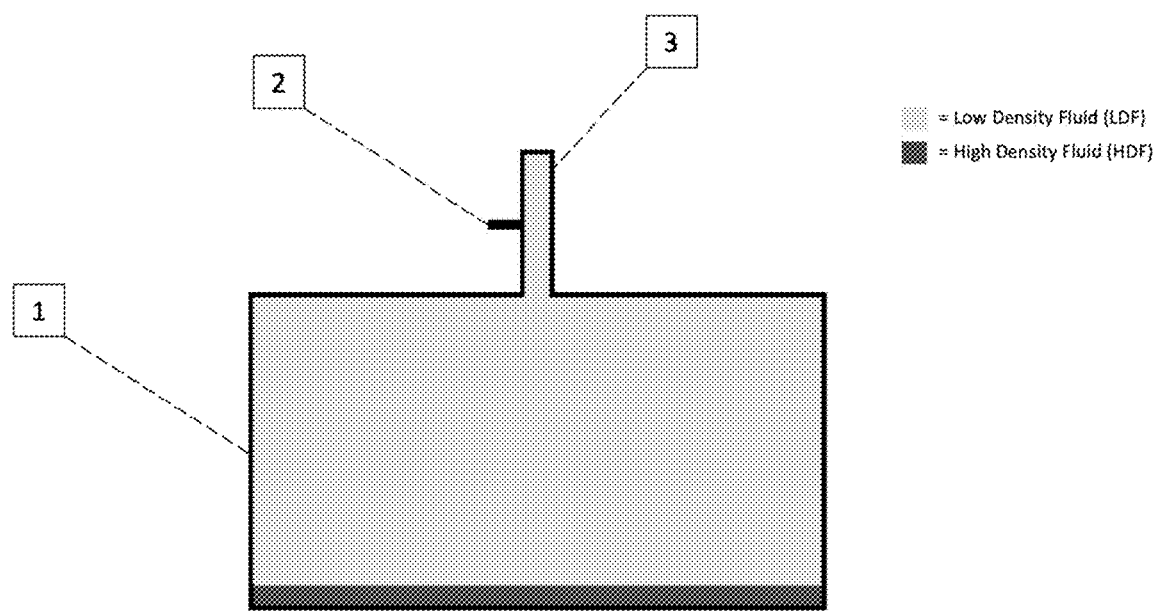
Figure 11 (Above)

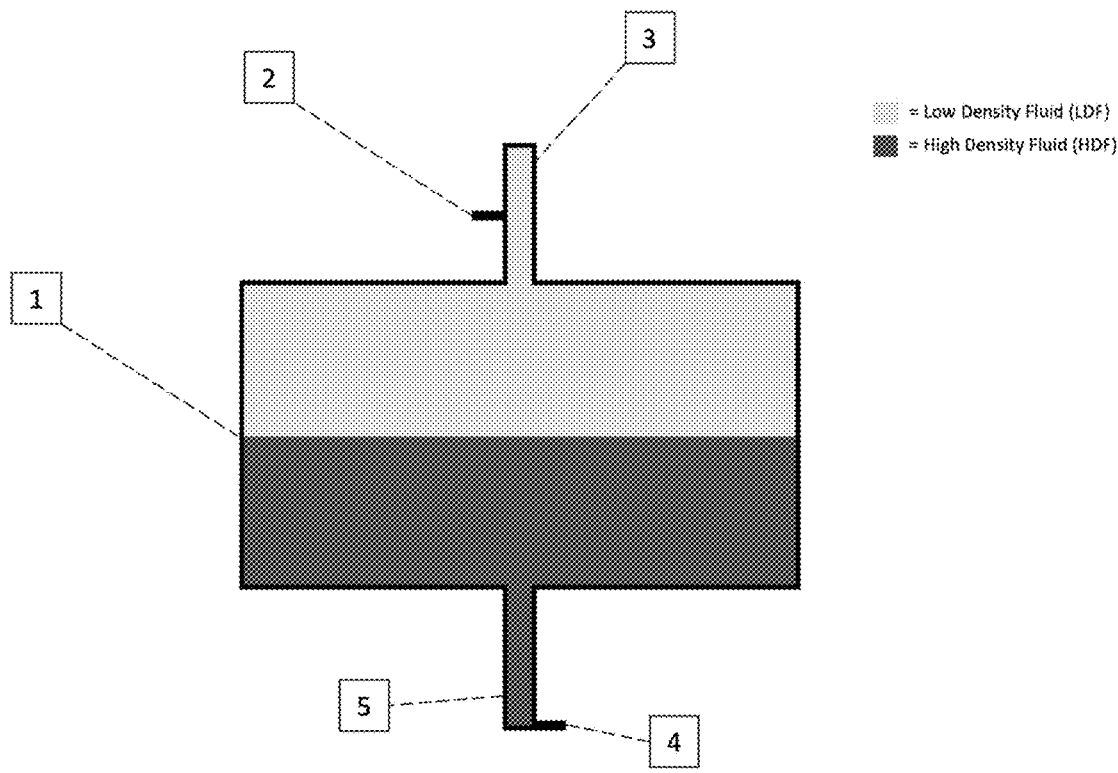
Figure 12 (Above)
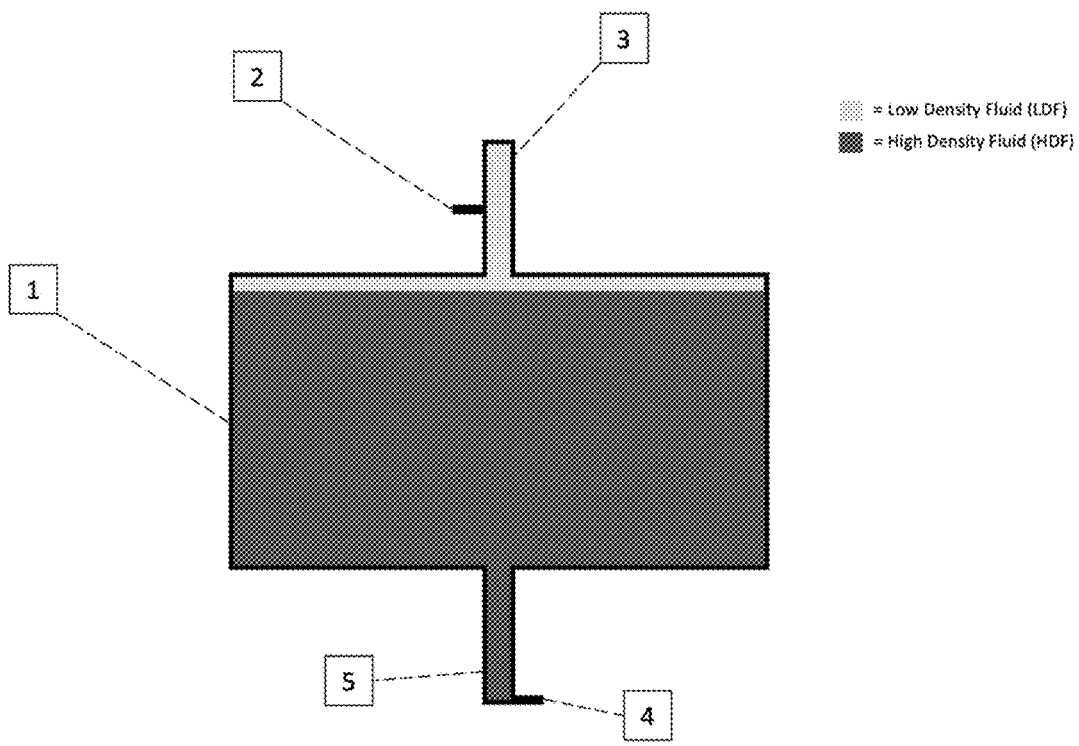
Figure 13 (Above)

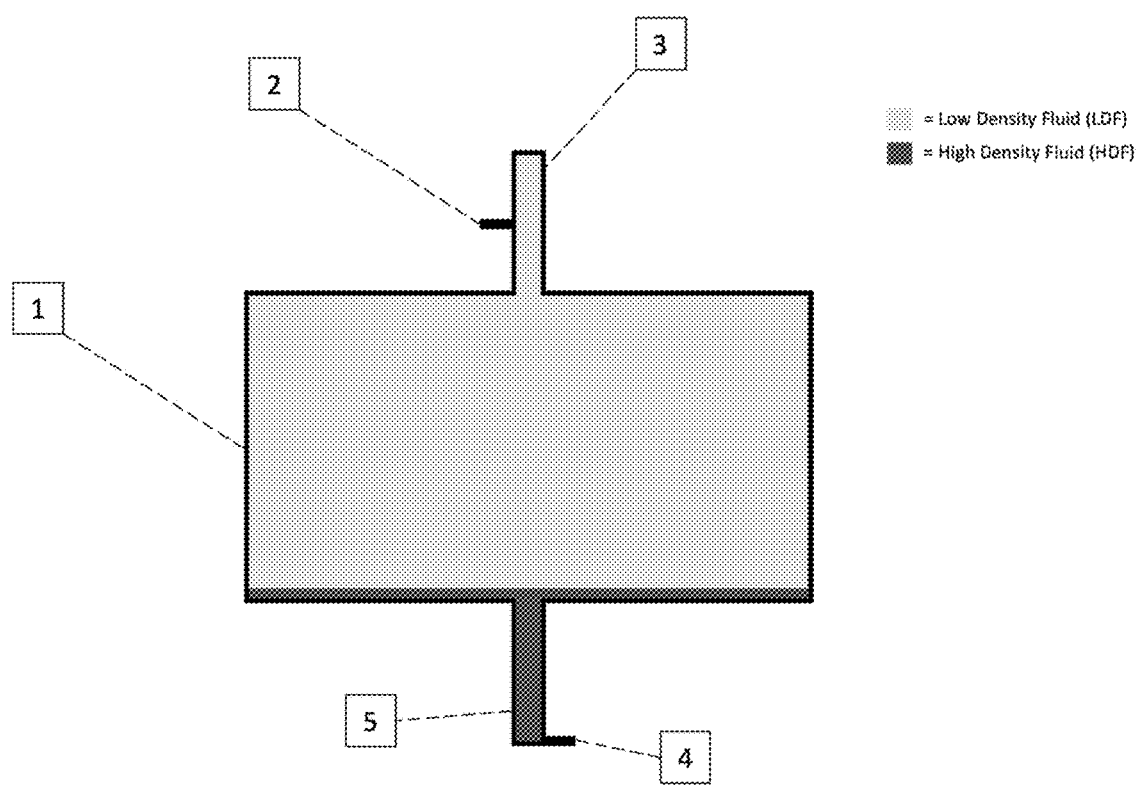
Figure 14 (Above)

FLUID DISPLACEMENT ENERGY STORAGE SYSTEMS AND PROCESSES TO ENABLE PRESSURE EQUILIBRIZED SUBSEA TANK

CROSS-REFERENCE TO RELATED APPLICATIONS

For U.S. purposes the instant application is a continuation-in-part of Ser. No. 17/665,472 filed Feb. 4, 2022 which application was allowed on Jan. 10, 2024. Application Ser. No. 17/665,472 is a continuation-in-part of PCT/US21/41931 filed Jul. 21, 2021 published as WO2022/016034 which PCT application claims priority to U.S. application Ser. No. 17/214,100 filed on Mar. 26, 2021 which is a continuation-in-part application of U.S. application Ser. No. 16/932,429 filed Jul. 17, 2020. The application also claims priority to U.S. application No. 63/117,355 filed Nov. 23, 2020; U.S. application No. 63/132,778 filed Dec. 31, 2020 and U.S. application. No. 63/139,157 filed Jan. 19, 2021. The application also claims priority to U.S. application No. 63/249,100 filed Sep. 28, 2021 titled FLUID DISPLACEMENT ENERGY STORAGE FOR DESALINATION APPLICATION AND FLOW BATTERY APPLICATION. The application also claims priority to U.S. application No. 63/272,760 filed Oct. 28, 2021 titled FLUID DISPLACEMENT ENERGY STORAGE. All of the aforementioned applications are hereby incorporated by reference in their entirety.

For PCT purposes the instant application claims priority to U.S. provisional application 63/448,144 filed Feb. 24, 2023 which application is incorporated herein by reference.

BACKGROUND AND SUMMARY OF THE DISCLOSURE

The world is in continuing need of new systems and methods for energy storage that may be alternatives to fossil fuels. Advantageously, the present invention relates to systems and methods for energy storage, or energy generation, or combinations thereof.

BRIEF DESCRIPTION OF THE DRAWINGS

FIG. 1: Example Embodiment Comprising Steady State of the Subsea Tank in the Absence of Other System Components FIG. 2: Example Embodiment Comprising Steady State of the Subsea Tank and Flow Control and Shut-off Valves in the Absence of Other System Components or When Isolated/Shut-off From Other System Components FIG. 3: Example Embodiment Comprising an Integrated System without Power Generating or Pressure Exchanging Equipment, such as Pumps and/or Turbines and Pressure Exchangers FIG. 4A: Embodiment with a pressure equilibrized tank and power storing/generating equipment, wherein the pressure equilibration may be achieved using a subsea electric pump/generator on each the LDF and HDF fluid streams wherein the LDF pump/turbine operates with the opposing unit operation of the HDF pump/turbine simultaneously.

FIG. 4B: Embodiment storing power.

FIG. 4C: Embodiment generating power.

FIG. 5A: Embodiment with a pressure equilibrized tank and power storing/generating equipment, wherein the pressure equilibration may be achieved using a subsea pressure exchanger.

FIG. 5B: Embodiment storing power.

FIG. 5C: Embodiment generating power.

FIG. 6A: Embodiment with a pressure equilibrized tank and power storing/generating equipment, wherein the pressure equilibration may be achieved by a pump/turbine fluidly connected to the LDF and a pump/turbine fluidly connected to the HDF and wherein the LDF pump/turbine operates with the same unit operation as the HDF pump/turbine simultaneously.

FIG. 6B: Embodiment storing power.

FIG. 6C: Embodiment generating power.

FIG. 7A: Embodiment with a pressure equilibrized tank and power storing/generating equipment, wherein the pressure equilibration may be achieved by a pump/turbine fluidly connected to the LDF and a pump/turbine fluidly connected to the HDF and wherein the LDF pump/turbine operates with the same unit operation as the HDF pump/turbine simultaneously.

FIG. 7B: Embodiment storing power.

FIG. 7C: Embodiment generating power.

FIG. 8: Embodiment of a storage tank with a raised subsection and a liquid headspace.

FIG. 9: Embodiment of a storage tank with a raised subsection and a portion of gas or vapor in the headspace.

FIG. 10: Embodiment of a storage tank with a raised subsection nearly full of HDF.

FIG. 11: Embodiment of a storage tank with a raised subsection nearly full of LDF.

FIG. 12: Embodiment of a storage tank with a raised subsection and a lowered subsection.

FIG. 13: Embodiment of a storage tank with a raised subsection and a lowered subsection nearly full of HDF.

FIG. 14: Embodiment of a storage tank with a raised subsection and a lowered subsection nearly full of LDF.

DETAILED DESCRIPTION

Example Definitions about the same as: "About the same as" may compare a property of two or more objects or things. "About the same as" may indicate a property of a first object is within +/−0.1%, or +/−0.5%, or +/−1%, or +/−1.5%, or +/−2%, or +/−3%, or +/−4%, or +/−5%, or +/−6%, or +/−7%, or +/−8%, or +/−9%, or +/−10%, or +/−20%, or +/−30%, or +/−40%, or +/50% of said property of a second object. "About the same as" may indicate a property of a second object is within +/−0.10%, or +/−0.5%, or +/−1%, or +/−1.5%, or +/−2%, or +/−3%, or +/−4%, or +/−5%, or +/−6%, or +/−7%, or +/−8%, or +/−9%, or +/−10%, or +/−20%, or +/−30%, or +/−40%, or +/50% of said property of a first object. In some embodiments, said +/− percentages may be percentages or portions of the maximum difference in the property within the system. For example, in some embodiments, if the elevation difference between a first reservoir and a second reservoir is 1,000 meters, and the elevation of a pump is at about the same elevation as the second reservoir, said pump may be at an elevation within +/−0 to 50% of 1,000 meters of the elevation of the second reservoir, or +/−0 to 500 meters from the second reservoir. In some embodiments, "about the same as" may refer to a property differing by less than or equal to a tolerance amount or value. For example, in some embodiments, if the internal pressure of the second reservoir is about the same as the pressure of seawater adjacent to the second reservoir, the internal pressure of the second reservoir may differ from the pressure of seawater adjacent to the second reservoir by less than or equal to the tolerance pressure of the second reservoir. For example, in some embodiments, if the tolerance pressure of the second reservoir is +/−10 Bar, then internal pressure of the second reservoir may differ from the pressure of seawater adjacent to the second reservoir by less than or equal to 10 Bar. In some embodiments, a tolerance may be specified. In some embodiments, a tolerance may be implied. In some embodiments, "about the same as" may be refer to quantifiable or qualifiable properties. For example, "About the same as" may compare for example, including, but not limited to, one or more or any combination of the following: amounts, or quantities, or elevations, or proportions, or percentages, or temperatures, or pressures, or densities.

tolerance amount or value or tolerance: "Tolerance amount or value" may refer to the maximum difference in a property or the maximum amount or value of a property which an object may be capable of performing its function or operating. In some embodiments, "tolerance amount or value or tolerance" may be described as "tolerance [property]". For example, "tolerance pressure", or "tolerance elevation difference", or "tolerance volumetric flow rate".

pressure equilibrized subsea tank: A "pressure equilibrized subsea tank" or pressure equilibrized tank" may comprise a tank or reservoir with an internal pressure about the same as the external pressure or pressure adjacent to the tank or reservoir. In some embodiments, a "pressure equilibrized subsea tank" may refer to a tank wherein if the pressure inside the subsea tank differs from the pressure adjacent from the subsea tank, fluid or liquid passive or actively enters or exits the subsea tank to counteract or neutralize the pressure difference or potential pressure difference.

at least partially synchronize: "At least partially synchronize" may refer to a property if two or more objects or things which may at a given instant may be different, although over time or cycles may synchronize or may be about the same. For example, in some embodiments, the volumetric flow rate of LDF entering the second reservoir may be at least partially synchronized with the volumetric flow rate of HDF exiting the second reservoir, which may mean, at a given instant, the volumetric flow rate of LDF entering may be different from the volumetric flow rate of HDF exiting, however over time, the system may attempt to make the total volumetric flow of LDF entering be about the same as the total volumetric flow of HDF.

located near the second reservoir or lower elevation reservoir: May mean an object may be at an elevation about the same as the second reservoir or lower elevation reservoir.

located near the first reservoir or higher elevation reservoir: May mean an object may be at an elevation about the same as the first reservoir or higher elevation reservoir.

rigid tank: In some embodiments, a "rigid tank" may comprise a "constant volume tank". In some embodiments, a "rigid tank" may comprise a tank which may maintain form or structure if desired. In some embodiments, a "rigid tank" may comprise a tank which may maintain form or structure if a force below a tolerance force is applied.

constant volume tank: For example, a storage tank in which the total stored fluid inside the tank at changes by less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%. For example, a storage tank in which the total stored liquid inside the tank at changes by less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%. For example, a storage tank in which the total stored fluid inside the tank at changes less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%, during the storing of power, or generating of power, or any combination thereof. For example, a storage tank in which the total stored fluid inside the tank changes by less than the total volume of fluid entering and/or exiting the tank when the energy storage system is charged from 10% to 90% energy storage capacity, or when the energy storage system is discharged from 90% to 10% energy storage capacity.

Substantial storing of power or substantial charging: May comprise storing power in an energy storage system or method such that increase in the amount of energy stored during storing or charging may be greater than or equal to one or more or a combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%, of the total energy storage capacity of the energy storage system or method.

Substantial generating of power or substantial discharging: May comprise generating power in an energy storage system or method such that decrease in the amount of energy stored during generating or discharging may be greater than or equal to one or more or a combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%, of the total energy storage capacity of the energy storage system or method.

Some embodiments may comprise systems and methods for enabling or maintaining a second reservoir or lower elevation reservoir with an internal pressure about the same as the hydrostatic pressure of the adjacent body of water at the same elevation, despite the transfer and storage of fluids or liquids with a density and/or gravitational hydrostatic pressure different from the density and/or hydrostatic pressure of the water or seawater in the body of water.

Some embodiments may enable a lower elevation reservoir or second reservoir or a subsea tank to possess or maintain an internal pressure about the same as the hydrostatic pressure of the adjacent body of water during the transfer of LDF into the lower elevation reservoir or second reservoir or a subsea tank and the transfer of HDF from the lower elevation reservoir or second reservoir or a subsea tank, which may occur during, for example, the storing of power. In some embodiments, the density and/or gravitational hydrostatic pressure of the LDF and HDF may be different from the density and/or gravitational hydrostatic pressure of the water or seawater in the body of water.

Some embodiments may enable a lower elevation reservoir or second reservoir or a subsea tank to possess or maintain an internal pressure about the same as the hydrostatic pressure of the adjacent body of water during the transfer of HDF into the lower elevation reservoir or second reservoir or a subsea tank and the transfer of LDF from the lower elevation reservoir or second reservoir or a subsea tank, which may occur during, for example, the generating of power. In some embodiments, the density and/or gravitational hydrostatic pressure of the LDF and HDF may be different from the density and/or gravitational hydrostatic pressure of the water or seawater in the body of water.

In some embodiments, due to the difference in compressibility properties between the LDF and HDF, a subsea tank may be maintained at about the same pressure as the adjacent body of water or at a controlled pressure by transferring LDF into an LDF pump at a greater volumetric flow rate than the volumetric flow rate of HDF being transferred into an HDF pump.

Some embodiments may store power using a first pump fluidly connected to LDF comprising an LDF pump and a second pump fluidly connected to HDF comprising an HDF pump. The LDF pump and HDF pump may be fluidly connected to the lower elevation reservoir or second reservoir. During the storing of power, the LDF pump may pump LDF into the lower elevation reservoir or second reservoir and the HDF pump may pump HDF out of or from the lower elevation reservoir or second reservoir. During the storing of power, the LDF pump may be configured to increase the pressure of LDF from a pressure about the same as the gravitational hydrostatic pressure of LDF to a pressure about the same as the internal pressure of the second reservoir or lower elevation reservoir or a pressure about the same as the pressure in the body of water adjacent to the lower elevation reservoir or second reservoir. During the storing of power, the HDF pump may be configured to increase the pressure of HDF from a pressure about the same as the internal pressure of the second reservoir or lower elevation reservoir or a pressure about the same as the pressure in the body of water adjacent to the lower elevation reservoir or second reservoir to a pressure about the same as the gravitational hydrostatic pressure of HDF or to a pressure about the same as the gravitational hydrostatic pressure of HDF plus any pressure to overcome any fluid flow pressure drop or frictional losses. In some embodiments, pumping of LDF into the lower elevation reservoir or second reservoir may be conducted simultaneously to the pumping of HDF out of or from the lower elevation reservoir or second reservoir. In some embodiments, it may be desirable to maintain the pressure of the lower elevation reservoir or second reservoir by ensuring the volumetric flow rate of LDF entering the lower elevation reservoir or second reservoir is about the same as the volumetric flow rate of HDF exiting the lower elevation reservoir or second reservoir, which may enable to the total volume of fluid stored in the lower elevation reservoir or second reservoir to remain relatively constant. In some embodiments, to, for example, enable the use of a separate LDF pump and HDF pump, the volumetric flow rate of LDF into the input or inlet of the LDF pump may need to be different from the volumetric flow rate of HDF into input or inlet of the HDF pump, due to, for example, the difference in compressibility and/or pressures of the LDF and HDF. In some embodiments, for example, to ensure the volumetric flow rate of LDF entering the lower elevation reservoir or second reservoir is about the same as the volumetric flow rate of HDF exiting the lower elevation reservoir or second reservoir, the volumetric flow rate of LDF entering the LDF pump may need to be greater than the volumetric flow rate of HDF entering the HDF pump due to the greater compressibility or lower bulk modulus of the LDF than the HDF and/or the lower total pressure, or hydrostatic pressure, or any combination thereof experienced by the LDF than the HDF. In some embodiments, the volumetric flow rate of LDF entering and/or exiting the LDF pump to be may be monitored and/or controlled by, for example, a flow meter and/or flow controller, and/or the information transferred or utilized in the operation of the HDF pump to, for example, maximize energy efficiency and/or prevent an overpressure or under pressure event in the lower elevation reservoir or second reservoir or subsea tank. In some embodiments, predicting and controlling the relative inlet and/outlet volumetric flow rates of the LDF pump and/or HDF pump may be complex. Some embodiments may employ machine learning models to predict or control the applied pumping power in the LDF pump and HDF pump to, for example, including, but not limited to, one or more or any combination of the following: maximize energy efficiency, or minimize changes in the total volume of fluid stored in the lower elevation reservoir or second reservoir, or prevent over-pressure or under-pressure in the lower elevation reservoir or second reservoir. In some embodiments, a subsea pressure compensator, or buffer tank, or bladder tank, or expansion tank, or piston tank, or subsea compensator, or any combination thereof may be connected to the lower elevation reservoir or second reservoir to, for example, including, but limited to, one or more or any combination of the following: compensate for changes into volume or flow rates, or to prevent overpressure or under-pressure events from occurring, or to prevent overpressure or under-pressure events from occurring due to potential slight changes in the total fluid volume stored in the subsea tank, or any combination thereof. In some embodiments, a subsea pressure compensator, or bladder tank, or buffer tank, or expansion tank fluidly connected to the lower elevation reservoir or second reservoir may be employed to provide buffer or flexibility for potential mismatches or irregularities in volumetric flow rates of LDF and HDF entering or exiting the lower elevation reservoir, or second reservoir and/or changes in volume or density due to changes in stored fluid temperature. In some embodiments, if the subsea pressure compensator, or bladder tank, or buffer tank, or expansion tank is storing an amount of fluid near, at, or above a desired amount, it may be desirable to operate the system in a manner such that the volumetric flow rate of fluid entering the lower elevation reservoir, or second reservoir is less than the volumetric flow rate of fluid exiting the lower elevation reservoir or second reservoir, which may result in a net removal of stored fluid from the subsea pressure compensator, or bladder tank, or buffer tank, or expansion tank connected to the lower elevation reservoir, or second reservoir. In some embodiments, if the subsea pressure compensator, or bladder tank, or buffer tank, or expansion tank is storing an amount of fluid less than a desired amount, it may be desirable to operate the system in a manner such that the volumetric flow rate of fluid entering the lower elevation reservoir, or second reservoir is greater than the volumetric flow rate of fluid exiting the lower elevation reservoir or second reservoir, which may result in a net addition of stored fluid into the subsea pressure compensator, or bladder tank, or buffer tank, or expansion tank connected to the lower elevation reservoir, or second reservoir.

Some embodiments may generate power using a first turbine fluidly connected to LDF comprising an LDF turbine and a second turbine fluidly connected to HDF comprising an HDF turbine. The LDF turbine and HDF turbine may be fluidly connected to the lower elevation reservoir or the second reservoir. During, for example, the generating of power, the HDF may be allowed to transfer from the higher elevation reservoir, through the HDF turbine, generating power, and into the lower elevation reservoir or second reservoir; and/or the LDF may be allowed to transfer out of or from the lower elevation reservoir or second reservoir and through the LDF turbine, generating power, and into the higher elevation reservoir. During the generating of power, the HDF turbine may be configured to generate power by decreasing the pressure of HDF from a pressure about the same as the gravitational hydrostatic pressure of HDF to a pressure about the same as the internal pressure of the second reservoir or lower elevation reservoir or a pressure about the same as the pressure in the body of water adjacent to the lower elevation reservoir or second reservoir. During the generating of power, the LDF turbine may be configured to generate power by decreasing the pressure of LDF from a pressure about the same as the internal pressure of the second reservoir or lower elevation reservoir or a pressure about the same as the pressure in the body of water adjacent to the lower elevation reservoir or second reservoir to a pressure about the same as the gravitational hydrostatic pressure of LDF. The generating of power from the transfer of HDF into the lower elevation reservoir or second reservoir may be conducted simultaneously to the generating of power from the transfer of LDF out of or from the lower elevation reservoir or second reservoir. In some embodiments, it may be desirable to maintain the pressure of the lower elevation reservoir or second reservoir by ensuring the volumetric flow rate of HDF entering the lower elevation reservoir or second reservoir is about the same as the volumetric flow rate of LDF exiting the lower elevation reservoir or second reservoir, which may enable to the total volume of fluid stored in the lower elevation reservoir or second reservoir to remain relatively constant. In some embodiments, for example, to enable the use of a separate LDF turbine and HDF turbine, the input or inlet volumetric flow rate of LDF into the LDF turbine may need to be different from the input or inlet volumetric flow rate of HDF into the HDF turbine, due to, for example, the difference in compressibility and/or pressures experienced by the LDF and HDF. In some embodiments, for example, to ensure the volumetric flow rate of HDF entering the lower elevation reservoir or second reservoir is about the same as the volumetric flow rate of LDF exiting the lower elevation reservoir or second reservoir, the volumetric flow rate of LDF entering the LDF turbine may need to be greater than the volumetric flow rate of HDF entering the HDF turbine due to the greater compressibility, or lower bulk modulus, or lower total pressure, or lower hydrostatic pressure, or any combination thereof of the LDF than the HDF. In some embodiments, the volumetric flow rate of HDF entering and/or exiting the HDF turbine to be may be monitored and/or controlled by, for example, a flow meter and/or flow controller, and/or the information transferred or utilized in the operation of the LDF turbine to, for example, maximize energy efficiency and/or prevent an overpressure or under pressure event in the lower elevation reservoir or second reservoir or subsea tank. In some embodiments, predicting and controlling the relative inlet and/outlet volumetric flow rates of the HDF turbine and/or HDF turbine may be complex. Some embodiments may employ machine learning models to predict or control the flow rates or power extracted in the HDF turbine and HDF turbine to, for example, including, but not limited to, one or more or any combination of the following: maximize energy efficiency, or minimize changes in the total volume of fluid stored in the lower elevation reservoir or second reservoir, or prevent overpressure or under-pressure in the lower elevation reservoir or second reservoir. In some embodiments, a subsea pressure compensator, or buffer tank, or bladder tank, or expansion tank may be connected to the lower elevation reservoir or second reservoir. In some embodiments, a subsea pressure compensator, or buffer tank, or bladder tank, or expansion tank may be connected to the lower elevation reservoir or second reservoir, to, for example, including, but not limited to, one or more or any combination of the following: to enable or allow for mismatches in flow or volume of fluids, or to enable temporary mismatches in flow of volume of fluids, or to enable or allow for fluid flow irregularities, or to enable safe operation in the event of a fluid irregularities or mismatches or disruptions, or to prevent overpressure or under-pressure events from occurring, or to prevent over-pressure or under-pressure events from occurring due to potential slight changes in the total fluid volume stored in the subsea tank. In some embodiments, a subsea pressure compensator, or bladder tank, or buffer tank, or expansion tank fluidly connected to the lower elevation reservoir or second reservoir may be employed to provide buffer or flexibility for potential mismatches in volumetric flow rates of LDF and HDF entering or exiting the lower elevation reservoir, or second reservoir and/or changes in volume or density due to changes in stored fluid temperature. In some embodiments, if the subsea pressure compensator, or bladder tank, or buffer tank, or expansion tank is storing an amount of fluid near, at, or above a desired amount, it may be desirable to operate the system in a manner such that the volumetric flow rate of fluid entering the lower elevation reservoir, or second reservoir is less than the volumetric flow rate of fluid exiting the lower elevation reservoir or second reservoir, which may result in a net removal of stored fluid from the subsea pressure compensator, or bladder tank, or buffer tank, or expansion tank connected to the lower elevation reservoir, or second reservoir. In some embodiments, if the subsea pressure compensator, or bladder tank, or buffer tank, or expansion tank is storing an amount of fluid less than a desired amount, it may be desirable to operate the system in a manner such that the volumetric flow rate of fluid entering the lower elevation reservoir, or second reservoir is greater than the volumetric flow rate of fluid exiting the lower elevation reservoir or second reservoir, which may result in a net addition of stored fluid into the subsea pressure compensator, or bladder tank, or buffer tank, or expansion tank connected to the lower elevation reservoir, or second reservoir.

During charging or storing power, the LDF pump may increase the pressure of the LDF by a pressure amount about the same as the difference in pressure between the hydrostatic pressure of LDF at the elevation or depth of the second reservoir or lower elevation reservoir and the hydrostatic pressure of the body of water at the elevation or depth of the second reservoir or lower elevation reservoir; and the HDF pump may increase the pressure of the HDF by a pressure amount about the same as the difference in pressure between the hydrostatic pressure of the body of water at the elevation or depth of the second reservoir or lower elevation reservoir and the hydrostatic pressure of HDF at the elevation or depth of the second reservoir or lower elevation reservoir.

In some embodiments, a pump fluidly connected to the LDF separate from the pump fluidly connected to the HDF may enable a second reservoir or subsea reservoir or subsea tank to be at pressure equilibrium with the adjacent body of water or at about the same pressure as the adjacent body of water by enabling the LDF pump to overcome the pressure difference between the hydrostatic pressure of the LDF (minus any pressure drop or frictional losses) and the hydrostatic pressure of the adjacent body of water; and enabling the HDF pump to overcome the pressure difference between the hydrostatic pressure of the adjacent body of water and the hydrostatic pressure of the HDF (plus any pressure drop or frictional losses). In some embodiments, a turbine fluidly connected to the LDF separate from the turbine fluidly connected to the HDF may enable a second reservoir or subsea reservoir or subsea tank to be at pressure equilibrium with the adjacent body of water or at about the same pressure as the adjacent body of water by enabling the LDF turbine to generate power from the pressure difference between the hydrostatic pressure of the adjacent body of water and the hydrostatic pressure of the LDF (plus any pressure drop or frictional losses); and enabling the HDF turbine to generate power from the pressure difference between the hydrostatic pressure of the HDF (minus any pressure drop or frictional losses) and the hydrostatic pressure of the adjacent body of water. In some embodiments, by at least partially isolating the LDF pump from the HDF pump, the pressure of LDF exiting the LDF pump and/or transferred into the lower elevation reservoir can be controlled or can be at about the same pressure as the internal pressure of the lower elevation reservoir or at about the same pressure as the adjacent body of water at the depth of the second reservoir. In some embodiments, by at least partially isolating the LDF turbine from the HDF turbine, the pressure of HDF exiting the HDF turbine and/or transferred into the lower elevation reservoir can be controlled or can be at about the same pressure as the internal pressure of the lower elevation reservoir or at about the same pressure as the adjacent body of water at the depth of the second reservoir.

The following are example equations for calculating the pressure difference created by the LDF pump and HDF pump. It is important to note the practical pumping pressure difference may be greater due to frictional losses, pressure drop, and other potential losses.

$$LDF \text{ Pump Pressure Difference} = ((\rho \text{ Seawater}) * (G) * (h)) - ((\rho LDF) * (G) * (h)) + \Delta P_{LDF}$$

$$HDF \text{ Pump Pressure Difference} = ((\rho HDF) * (G) * (h)) - ((\rho \text{ Seawater}) * (G) * (h)) + \Delta P_{HDF}$$

Wherein:

$LDF$ Pump Pressure Difference = Pressure Difference Provided by LDF Pump (Pa)

$HDF$ Pump Pressure Difference = Pressure Difference Provided by HDF Pump (Pa)

($\rho$ Seawater) = Density of Seawater (kg/m$^3$)

($\rho LDF$) = Density of LDF (kg/m$^3$)

($\rho HDF$) = Density of LDF (kg/m$^3$)

($G$) = Gravitational Acceleration (9.81 m/s$^2$)

-continued ($h$) = Elevation Difference between Higher and Lower Reservoirs (m)

$\Delta P_{LDF}$ = Pressure Drop from LDF Transfer through Pipe between Elevations (Pa)

$\Delta P_{HDF}$ = Pressure Drop from HDF Transfer through Pipe between Elevations (Pa)

In some embodiments, the density of seawater may be employed in the calculation to represent, for example, the internal pressure of the subsea tank or the second reservoir or the lower elevation reservoir because, for example, in some embodiments, it may be desirable for the internal pressure of the subsea tank or the second reservoir or the lower elevation reservoir to be about the same as the hydrostatic pressure of the seawater adjacent to or at about the same elevation as the subsea tank or the second reservoir or the lower elevation reservoir.

For example, an example system may have an LDF comprising liquid n-Butane with a density of 590 kg/m$^3$ at atmospheric pressure, an HDL comprising magnesium chloride brine with a density of 1,320 kg/m$^3$ at atmospheric pressure, an elevation difference between the higher elevation reservoir or first reservoir and the lower elevation reservoir or second reservoir of 2,000 meters, a pressure drop of 1.5 Bar in the LDF 'riser' pipe due to frictional losses, a pressure drop of 1.5 Bar in the HDF 'riser' pipe due to frictional losses, and a density of seawater of 1,025 kg/m$^3$ at a depth of 2,000 meters. For example, in the present example, the LDF pump and HDF pump may be located subsea at about the same elevation as the lower elevation reservoir or second reservoir. For example, in the present example, during storing of power or 'charging', the estimated calculated pressures may be:

LDF Pressure entering the LDF Pump: 114.26 Bar
  Note: The pressure of LDF entering the LDF pump may be about the same as the gravitational hydrostatic pressure of LDF at the elevation difference between the higher elevation reservoir or first reservoir and the lower elevation reservoir, or second reservoir, minus any pressure drop in the LDF pipe(s) transferring LDF from the higher elevation reservoir or first reservoir to the LDF pump or lower elevation reservoir or second reservoir.

LDF Pressure exiting the LDF Pump to the Lower Elevation Reservoir: 202.10 Bar
  Note: The pressure of LDF exiting the LDF pump may be about the same as the internal pressure of the lower elevation reservoir or second reservoir or about the same as the gravitational hydrostatic pressure of the adjacent body of water at a depth or elevation about the same as the lower elevation reservoir or second reservoir, plus any pressure required to transfer LDF into the lower elevation reservoir or second reservoir at a desired flow rated and/or displace HDF from the lower elevation reservoir or second reservoir at a desired flow rate— which (which may be, for example, 1 Bar).

Pressure Difference Provided by the LDF Pump: 87.84 Bar
  Note: The pressure difference provided by the LDF Pump during charging may be about the same as the pressure difference between the LDF Pressure exiting the LDF Pump to the Lower Elevation Reservoir and the LDF Pressure entering the LDF Pump.

HDF Pressure entering the HDF Pump from the Lower Elevation Reservoir: 201.10 Bar
  Note: The pressure of HDF entering the HDF pump may be about the same as the internal pressure of the lower elevation reservoir or second reservoir or about the same as the gravitational hydrostatic pressure of the adjacent body of water at about the same elevation or depth, plus any pressure due to gravity and location or elevation of the HDF inlet within the lower elevation reservoir or second reservoir or plus or minus any pressure difference required to transfer HDF from the lower elevation reservoir or second reservoir to the HDF pump at a desired flow rate.
HDF Pressure exiting the HDF Pump to the Higher Elevation Reservoir: 261.49 Bar
  Note: The pressure of HDF exiting the HDF pump may be about the same as the gravitational hydrostatic pressure of HDF at the elevation difference between the higher elevation reservoir or first reservoir and the lower elevation reservoir or second reservoir, plus any pressure drop in the HDF pipe(s) transferring HDF from the lower elevation reservoir or second reservoir or HDF pump to the higher elevation reservoir or first reservoir.
Pressure Difference Provided by the HDF Pump: 60.39 Bar
  Note: The pressure difference provided by the HDF Pump during charging may be about the same as the pressure difference between the HDF Pressure entering the HDF Pump to the Lower Elevation Reservoir and the HDF Pressure exiting the HDF Pump.

For example, an example system may have an LDF comprising ethanol with a density of 789 kg/m³ at atmospheric pressure, an HDL comprising potassium carbonate brine with a density of 1,520 kg/m³ at atmospheric pressure, an elevation difference between the higher elevation reservoir or first reservoir and the lower elevation reservoir or second reservoir of 2,000 meters, and the density of seawater of 1,025 kg/m³ at a depth of 2,000 meters. For example, in the present example, the LDF pump and HDF pump may be located subsea at about the same elevation as the lower elevation reservoir or second reservoir. For example, in the present example, during storing of power or 'charging', the estimated calculated pressures may be:
  LDF Pressure entering the LDF Pump: 153.30 Bar
  LDF Pressure exiting the LDF Pump to the Lower Elevation Reservoir: 202.10 Bar
  Pressure Difference Provided by the LDF Pump: 48.8 Bar
  HDF Pressure entering the HDF Pump from the Lower Elevation Reservoir: 201.10 Bar
  HDF Pressure exiting the HDF Pump to the Higher Elevation Reservoir: 299.72 Bar
  Pressure Difference Provided by the HDF: 98.62 Bar During discharging or generating power, the HDF turbine may decrease the pressure of the HDF by a pressure amount about the same as the difference in pressure between the hydrostatic pressure of HDF at the elevation or depth of the second reservoir or lower elevation reservoir and the hydrostatic pressure of the body of water at the elevation or depth of the second reservoir or lower elevation reservoir; and the LDF turbine decrease the pressure of the LDF by a pressure amount the same as the difference in pressure between the hydrostatic pressure of the body of water at the elevation or depth of the second reservoir or lower elevation reservoir and the hydrostatic pressure of LDF at the elevation or depth of the second reservoir or lower elevation reservoir.

The following are example equations for calculating the power generating pressure difference generated by the LDF turbine and HDF turbine. It is important to note the practical turbine generating pressure difference may be less due to frictional losses and other potential efficiency losses.

$$LDF \text{ Turbine Power Generating Pressure Difference} =$$
$$HDF \text{ Turbine Power Generating Pressure Difference} =$$
$$LDF \text{ Turbine Power Generating Pressure Difference} =$$
$$((\rho \text{ Seawater}) * (G) * (h)) - ((\rho LDF) * (G) * (h)) - \Delta P_{LDF}$$
$$HDF \text{ Turbine Power Generating Pressure Difference} =$$
$$((\rho HDF) * (G) * (h)) - ((\rho \text{ Seawater}) * (G) * (h)) - \Delta P_{HDF}$$

Wherein:

$LDF$ Turbine Power Generating Pressure Difference = Pressure Difference Available to the $LDF$ Turbine to Generate Power (Pa)

$HDF$ Turbine Power Generating Pressure Difference = Pressure Difference Available to the $HDF$ Turbine to Generate Power (Pa)

$(\rho \text{ Seawater}) = \text{Density of Seawater } (\text{kg/m}^3)$ $(\rho LDF) = \text{Density of } LDF \ (\text{kg/m}^3)$ $(\rho HDF) = \text{Density of } LDF \ (\text{kg/m}^3)$ $(G) = \text{Gravitational Acceleration } (9.81 \text{ m/s}^2)$ $(h) = \text{Elevation Difference between Higher and Lower Reservoirs (m)}$ $\Delta P_{LDF} = \text{Pressure Drop from } LDF$
  Transfer through Pipe between Elevations (Pa)

$\Delta P_{HDF} = \text{Pressure Drop from } HDF$
  Transfer through Pipe between Elevations (Pa)

In some embodiments, during charging or storing of power, LDF pump and HDF pump may operate in a manner such that the volumetric flow rate of LDF transferred into the LDF pump may be greater than the volumetric flow rate of HDF transferred into the HDF pump.

In some embodiments, LDF and HDF may possess different compressibility properties. For example, in some embodiments, LDF may experience greater liquid compressibility vs. pressure compared to HDF. For example, the bulk modulus of n-Butane may be 0.36 GPa and the bulk modulus of magnesium chloride brine may be 3.7 GPa. For example, the bulk modulus of ethanol may be 0.36 GPa and the bulk modulus of magnesium chloride brine may be 3.7 GPa. Additionally, the expansion coefficients or change in volume or density with temperature may also be substantially different between the LDF and the HDF.

To enable a lower elevation reservoir or second reservoir or subsea tank with a controlled pressure, or a stable pressure, or a pressure about the same as the adjacent body of water at about the same depth, or any combination thereof, the volumetric flow rates of LDF and HDF in the 'Near Seabed' region may need to be different and/or controlled.

For example, an estimate of the change in density and/or volumetric flow rate of LDF and HDF may be calculated using the bulk modulus of LDF and HDF and the calculated pressures. Other properties, which may include, but are not limited to, for example, temperature, or density gradients, or changes in bulk modulus, may result in different densities than the density values provided in the provided examples.

The following are example equations for calculating the density of liquid LDF and liquid HDF using the bulk modulus and pressure. It is important to note that actual densities may be different in an operating system, due to, for example, additional factors not included in or fully addressed by the following equation.

$$\rho_2 LDF = \frac{(P*\rho_1 LDF)+(K*\rho_1 LDF)}{K}$$

$$\rho_2 HDF = \frac{(P*\rho_1 HDF)+(K*\rho_1 HDF)}{K}$$

Wherein:

$\rho_2 LDF$ = Density of LDF at Pressure, "P" (kg/m$^3$)

$\rho_2 HDF$ = Density of HDF at Pressure, "P" (kg/m$^3$)

$\rho_1 LDF$ = Density of LDF at atmospheric pressure (kg/m$^3$)

$\rho_1 HDF$ = Density of LDF at atmospheric pressure (kg/m$^3$)

P = Pressure (Pa)

K = Bulk Modulus (Pa)

Example calculated density values for LDF comprising n-Butane and HDF comprising Magnesium Chloride brine at each calculated pressure:
 LDF Pump Inlet Calculated Density: 608.73 kg/m$^3$
 LDF Pump Outlet Calculated Density: 623.12 kg/m$^3$
 HDF Pump Inlet Calculated Density: 1327.17 kg/m$^3$
 HDF Pump Outlet Calculated Density: 1329.33 kg/m$^3$
Example calculated entering and exiting volumetric flow rates for LDF and HDF, for example if 40,000 m$^3$/hour of LDF comprising n-Butane is transferred into the LDF pump—
 LDF Pump Inlet Volumetric Flow Rate: 40,000 m$^3$/hour
 LDF Pump Outlet Volumetric Flow Rate: 39,075.88 m$^3$/hour
 HDF Pump Inlet Volumetric Flow Rate: 39,075.88 m$^3$/hour
 HDF Pump Outlet Volumetric Flow Rate: 39,012.55 m$^3$/hour In some embodiments, bulk modulus calculations may provide an estimate for the difference in volumetric flow rate between volumetric flow rate of LDF entering the LDF pump and the volumetric flow rate of HDF entering the HDF pump. In an operating system, other factors may be employed to improve the accuracy of predictions the relative volumetric flows of LDF and HDF due to, for example, including, but not limited to, one or more or any combination of the following: differences in temperature, or differences in pressure, or applied power, or mass flow rates, or volumetric flow rates, or differences in pump design or configuration, or differences in turbine design or configuration, or differences in mass flow rates, or differences in enthalpy of compression, or density gradients, or changes in bulk modulus, or differences in heat generated, or differences in temperature rise from pressurization, or differences in heat transfer characteristics, or differences in heat transfer coefficient, or differences in specific heat capacity, or differences in changes in viscosity, or flow characteristics, or mixing phenomena. In some embodiments, a machine learning or AI model may be employed to control and/or predict volumetric flow rates of HDF and LDF entering and/or exiting pumps, or turbines, or a lower elevation reservoir, or any combination thereof.

In some embodiments, a volumetric flow meter and/or pressure sensor and/or temperature sensor may be fluidly connected to the LDF exiting the LDF pump to, for example, provide information to control the pumping power, or flow rate, or other parameter, or any combination thereof of the HDF pump. In some embodiments, a subsea pressure compensator, or a bladder tank, or buffer tank, or subsea compensator, or piston tank, or expansion tank, or any combination thereof may be connected to subsea tank. For example, if there is any mismatch in the volumetric flow rate of LDF entering the subsea tank and the volumetric flow rate of HDF exiting the subsea tank, a fluidly connected subsea pressure compensator, or bladder tank, or buffer tank, or subsea compensator, or piston tank, or expansion tank, or any combination thereof may, for example, compensate for the change in total tank volume, or may provide information to a control system to change flow conditions or pumping or turbine conditions, or any combination thereof.

In some embodiments, during charging or storing of power, LDF pump and HDF pump may operate in a manner such that the volumetric flow rate of LDF exiting the LDF pump may be greater than the volumetric flow rate of HDF exiting the HDF pump.

In some embodiments, during discharging or generating power, the LDF turbine and HDF turbine may operate in a manner such that the volumetric flow rate of LDF transferred into the LDF turbine may be greater than the volumetric flow rate of HDF transferred into the HDF turbine.

In some embodiments, a volumetric flow meter and/or pressure sensor and/or temperature sensor may be fluidly connected to the LDF, or the HDF, or any combination thereof to, for example, provide information to control the pumping power, or generating power, or flow rate, or other parameter, or any combination thereof of the LDF pump, or LDF turbine, or HDF pump, or HDF turbine, or valves, or tanks, or any combination thereof. In some embodiments, subsea pressure compensator, or bladder tank, or buffer tank, or subsea compensator, or piston tank, or expansion tank, or any combination thereof may be connected to subsea tank. For example, if volumetric flow rates or fluid volume changes, a fluidly connected subsea pressure compensator, or bladder tank, or buffer tank, or subsea compensator, or piston tank, or expansion tank, or any combination thereof may, for example, compensate for any change in total tank volume, or may provide information to a control system to change flow conditions or pumping or turbine conditions, or any combination thereof.

In some embodiments, during discharging or generating power, the LDF turbine and HDF turbine may operate in a manner such that the volumetric flow rate of LDF exiting the LDF turbine may be greater than the volumetric flow rate of HDF exiting the HDF turbine.

In some embodiments, an LDF pump and LDF turbine may comprise the same unit. For example, in some embodiments, the LDF turbine may comprise a 'pump-as-a-turbine' and/or the LDF pump may comprise a 'turbine-as-a-pump-pump.'

In some embodiments, the LDF pump and LDF turbine may comprise separate units. For example, in some embodiments, the LDF pump may comprise a unit optimized for pumping and the LDF turbine may comprise a unit optimized for generating power. For example, in some embodiments, the LDF pump may be located at about the same elevation as the LDF turbine.

For example, in some embodiments, the LDF pump may be located at a different elevation than the LDF turbine. For example, in some embodiments, the LDF pump may be located subsea or at an elevation about the same as the second reservoir or lower elevation reservoir, and/or the LDF turbine may be located near the surface or at an elevation about the same as the first reservoir or higher elevation reservoir. For example, in some embodiments, by placing the LDF turbine at an elevation near the higher elevation reservoir, a system may reduce the required power capacity of a dynamic power cable and/or may reduce or eliminate the need for a dynamic power cable. For example, in some embodiments, the LDF turbine may comprise a pressure exchanger, or turbocharger, or power exchanger, wherein, for example, during discharging, the LDF provides the hydraulic pressure to power pressure based desalination, such as reverse osmosis desalination.

More specifically, the required power capacity of a dynamic power cable may be dependent on the application/use of the energy storage system and the location of the power end use. In some embodiments, reducing the required power capacity of the dynamic power cable may be accomplished by placing the LDF turbine subsea, such as at an elevation about the same as the second reservoir, if, for example, electricity needs to be exported by a submarine or subsea power cable. In some embodiments, reducing the required power capacity of the dynamic power cable may be accomplished by placing the LDF turbine at an elevation about the same as the first reservoir if power may be consumed near the first elevation, such as in applications, which may include, but are not limited to, FPSOs, or desalination, or any combination thereof.

In some embodiments, an HDF pump and HDF turbine may comprise the same unit. For example, in some embodiments, the HDF turbine may comprise a 'pump-as-a-turbine' and/or the HDF pump may comprise a 'turbine-as-a-pump-pump.'

In some embodiments, the HDF pump and HDF turbine may comprise separate units.

In some embodiments, the LDF pump and/or LDF turbine may be located at an elevation near the higher elevation reservoir or first reservoir. In some embodiments, the LDF pump and/or LDF turbine may be located subsea and/or the LDF pump and/or LDF turbine at about the same elevation as the lower elevation reservoir.

In some embodiments, an LDF turbine may be located at an elevation about the same as the higher elevation reservoir or may be located at a higher elevation and/or the LDF pump may be located at an elevation about the same as the lower elevation reservoir or may be located subsea. In some embodiments, an LDF pump may be located at an elevation about the same as the higher elevation reservoir or may be located at a higher elevation and/or the LDF turbine may be located at an elevation about the same as the lower elevation reservoir or may be located subsea. In some embodiments, for example, the LDF turbine may comprise a pressure exchanger which may pressure exchange with a desalination feed, or other hydraulic fluid, or other fluid, or any combination thereof to power or facilitate at least a portion of desalination, or other mechanical application, or other hydraulic application, or other fluid pressure application, or other pressure driven application, or other application, or any combination thereof. In some embodiments, pressure exchanging may eliminate or greatly reduce the need for, or the amount of required power supplied by or power capacity of, for example, a dynamic power cable. In some embodiments, an LDF pump may be separate from the LDF turbine and/or an LDF pump may be located at a different elevation than the LDF turbine. In some embodiments, an HDF pump may be separate from the HDF turbine and/or an HDF pump may be located at a different elevation than the HDF turbine.

In some embodiments, the volume of LDF stored in the first reservoir or higher elevation reservoir may be greater than the volume of HDF stored in the first reservoir or higher elevation reservoir. In some embodiments, the volume of LDF stored in the first reservoir or higher elevation reservoir may be greater than the volume of HDF stored in the first reservoir or higher elevation reservoir because, for example, the LDF may have a greater compressibility with pressure than the HDF, or the bulk modulus of the LDF may be lower than the bulk modulus of the HDF. For example, an LDF comprising ethanol may have a greater compressibility or lower bulk modulus than an LDF comprising potassium carbonate brine.

In some embodiments, a tank or vessel may be fluidly connected to the second reservoir or lower elevation reservoir to, for example, enable the second reservoir or lower elevation reservoir to be at a pressure about the same as the pressure of the body of water adjacent to the second reservoir or lower elevation reservoir (plus or minus a tolerance pressure) and/or may comprise, for example, including, but not limited to, one or more or any combination of the following: subsea pressure compensator, or an open tank, or a piston tank, or a floating separator tank, or a bladder tank, or a pressure compensator, or an expansion tank. In some embodiments, if an open tank is employed, it may be desirable for the LDF to be practically insoluble in water or in seawater, or to be of a similar composition to the seawater or water, or any combination thereof.

In some embodiments, the LDF may be practically insoluble in the HDF.

In some embodiments, the LDF may be practically soluble, or miscible, or any combination thereof in the HDF, or the HDF may be practically soluble, or miscible, or any combination thereof in the LDF, or any combination thereof. For example, in some embodiments, the HDF may comprise a salt water brine and the LDF may comprise freshwater or seawater. For example, in some embodiments, the HDF may comprise a brine comprising sodium chloride or seawater with a density in the range of 1,150 kg/m$^3$-1,250 kg/m$^3$ and the LDF may comprise freshwater or seawater or lower salinity water with a density in the range of 990 kg/m$^3$-1,050 kg/m$^3$. For example, in some embodiments, the HDF may comprise a brine comprising magnesium chloride or seawater with a density in the range of 1,250 kg/m$^3$-1,350 kg/m$^3$ and the LDF may comprise freshwater or seawater or lower salinity water with a density in the range of 990 kg/m$^3$-1,050 kg/m$^3$. For example, in some embodiments, the HDF may comprise a brine comprising calcium chloride with a density in the range of 1,250 kg/m$^3$-1,400 kg/m$^3$ and the LDF may comprise freshwater or seawater or lower salinity water with a density in the range of 990 kg/m$^3$-1,050 kg/m$^3$. For example, in some embodiments, the HDF may comprise a brine or solution with a density in the range of 1,250 kg/m$^3$-1,600 kg/m$^3$ and the LDF may comprise freshwater or seawater or lower salinity water with a density in the range of 990 kg/m$^3$-1,050 kg/m$^3$. For example, in some embodiments, the HDF may comprise an emulsion or suspension with a density in the range of 1,250 kg/m$^3$-2,300 kg/m³ and the LDF may comprise freshwater or seawater or salinity water with a density in the range of 990 kg/m³-1,350 kg/m³.

In some embodiments, a pump fluidly connected to the LDF separate from a pump fluidly connected to the HDF may enable a second reservoir or subsea reservoir or subsea tank to use an LDF which may be the soluble in an HDF, or an HDF which may be soluble in the LDF, or any combination thereof, while, for example, minimizing or preventing mixing of the LDF and HDF. For example, in some embodiments, an LDF pump and an HDF pump wherein the LDF and HDF may be non-contiguously separate may enable storing of power while preventing mixing of the HDF and LDF, yet while also enable control of the internal pressure of the lower elevation reservoir and/or enabling the lower elevation reservoir to be at about pressure equilibrium or at about the same pressure as the adjacent body water at about the same depth as the lower elevation reservoir. For example, in some embodiments, the lower elevation reservoir may be relatively kinetically stable, or may experience little uncontrolled motion, or any combination thereof, which may prevent or avoid potentially undesirable motion which could lead to mixing. For example, in some embodiments, the LDF and HDF may be stored in the same tank. For example, in some embodiments, the LDF and HDF may be stored in the same tank, wherein said tank may employ systems or methods to prevent, or minimize, or reduce, or eliminate, or avoid, or any combination thereof the potential mixing of the LDF and the HDF. For example, in some embodiments, a said tank may employ, one or more or any combination of the following: diffusers to prevent mixing, or diffusers to facilitate laminar flow, or diffusers to promote stratification, or a floating barrier, or a barrier at least partially separating the LDF from the HDF, or a barrier at least partially occupying any liquid-liquid interface between the LDF and the HDF, or a floating barrier wherein the density of the floating barrier is less than the HDF and greater than the LDF, or a floating barrier wherein the floating barrier floats on top of the HDF in the second reservoir and sinks below the LDF in the second reservoir, or a bladder, or bladder tank, or a bladder tank inside a rigid tank, or a mutually at least partially immisible liquid with a density greater than the LDF and less than the HDF, or a solid barrier, or a flexible barrier, or a rigid barrier, or a barrier which is rigid with semi-rigid or flexible or elastic edges to prevent jamming or getting stuck, or any combination thereof.

In some embodiments, a turbine fluidly connected to the LDF separate from a turbine fluidly connected to the HDF may enable a second reservoir or subsea reservoir or subsea tank to use an LDF which may be the soluble in an HDF, or an HDF which may be soluble in the LDF, or any combination thereof, while, for example, minimizing or preventing mixing of the LDF and HDF. For example, in some embodiments, an LDF turbine and an HDF turbine wherein the LDF and HDF may be non-contiguously separate may enable generating of power while preventing mixing of the HDF and LDF, yet while also enable control of the internal pressure of the lower elevation reservoir and/or enabling the lower elevation reservoir to be at about pressure equilibrium or at about the same pressure as the adjacent body water at about the same depth as the lower elevation reservoir. For example, in some embodiments, the lower elevation reservoir may be relatively kinetically stable, or may experience little uncontrolled motion, or any combination thereof, which may prevent or avoid potentially undesirable motion which could lead to mixing. For example, in some embodiments, the LDF and HDF may be stored in the same tank. For example, in some embodiments, the LDF and HDF may be stored in the same tank, wherein said tank may employ systems or methods to prevent, or minimize, or reduce, or eliminate, or avoid, or any combination thereof the potential mixing of the LDF and the HDF. For example, in some embodiments, a said tank may employ, one or more or any combination of the following: diffusers to prevent mixing, or diffusers to facilitate laminar flow, or diffusers to promote stratification, or a floating barrier, or a barrier at least partially separating the LDF from the HDF, or a barrier at least partially occupying any liquid-liquid interface between the LDF and the HDF, or a floating barrier wherein the density of the floating barrier is less than the HDF and greater than the LDF, or a floating barrier wherein the floating barrier floats on top of the HDF in the second reservoir and sinks below the LDF in the second reservoir, or a bladder, or bladder tank, or a bladder tank inside a rigid tank, or a mutually at least partially immisible liquid with a density greater than the LDF and less than the HDF, or a solid barrier, or a flexible barrier, or a rigid barrier, or a barrier which is rigid with semi-rigid or flexible or elastic edges to prevent jamming or getting stuck, or any combination thereof.

In some embodiments, systems and/or methods may be employed to separate or remove at least a portion of any LDF from at least a portion HDF, or at least a portion of HDF from at least a portion of LDF, or any combination thereof. In some embodiments, systems and/or methods may be employed to separate or remove at least a portion of any LDF from at least a portion HDF, or at least a portion of HDF from at least a portion of LDF, or any combination thereof, which may be needed or useful if any LDF mixes or dissolves in HDF, or any HDF mixes or dissolves in LDF, or any combination thereof. For example, in some embodiments, at least a portion of any LDF may be separated or removed from at least a portion HDF, or at least a portion of HDF may be separated or removed from at least a portion of LDF, or any combination thereof by using, including, but not limited to, one or more or any combination of the following: liquid-liquid separation, or centrifuge, or decanting, or coalescer, or clarifier, or filter, or solid-liquid separation, or desalination, or reverse osmosis, or membrane based process, or nanofiltration, or ultrafiltration, or microfiltration, or forward osmosis, or osmotically assisted reverse osmosis, or membrane distillation, or distillation, or heat recovery distillation, or mechanical vapor compression (MVC) distillation, or mechanical vapor recompression (MVR) distillation, or multistage flash distillation, or simple distillation, or multi-effect distillation, or crystallizer, or crystallizer, or falling film evaporator, or evaporator, or evaporation, or cryodesalination, or freeze desalination, or freeze concentrating, or salting-out, or anti-solvent, or solventing out, or anti-solvent separation, or anti-solvent distillation, or extractive distillation, or azeotrope distillation, or organic solvent nanofiltration, or electrodialysis, or electrodialysis reversal, or electrochemical separation, or chemical separation, or ion exchange, or precipitation reaction, or cooling precipitation, or heating precipitation, or heating, or cooling, or changing conditions, or recovery, or separation.

For example, in some embodiments, the LDF and HDF may be stored in the same tank or tanks in the higher elevation reservoir or in separate tanks in the higher elevation reservoir. For example, in some embodiments, the LDF and HDF may be stored in separate tanks in the higher elevation reservoir. For example, if there is significant potential for uncontrollable kinetics or vessel motion in the higher elevation reservoir and/or the LDF may be soluble or may emulsify in the HDF or vise versa, it may be desirable for the LDF and the HDF to be stored separately in the higher elevation reservoir. For example, in some embodiments, the LDF and HDF may be stored in the same tank or tanks in the higher elevation reservoir.

For example, in some embodiments, the LDF and HDF may be stored in the same tank or tanks in the lower elevation reservoir or in separate tanks in the lower elevation reservoir.

In some embodiments, a pump fluidly connected to the LDF separate from a pump fluidly connected to the HDF may enable a second reservoir or subsea reservoir or subsea tank to be at pressure equilibrium with the adjacent body of water or at about the same pressure as the adjacent body of water by enabling the LDF pump to overcome the pressure difference between the hydrostatic pressure of the LDF (minus any pressure drop or frictional losses) and the hydrostatic pressure of the adjacent body of water; and enabling the HDF pump to overcome the pressure difference between the hydrostatic pressure of the adjacent body of water and the hydrostatic pressure of the HDF (plus any pressure drop or frictional losses). In some embodiments, a turbine fluidly connected to the LDF separate from the turbine fluidly connected to the HDF may enable a second reservoir or subsea reservoir or subsea tank to be at pressure equilibrium with the adjacent body of water or at about the same pressure as the adjacent body of water by enabling the LDF turbine to generate power from the pressure difference between the hydrostatic pressure of the adjacent body of water and the hydrostatic pressure of the LDF (plus any pressure drop or frictional losses); and enabling the HDF turbine to generate power from the pressure difference between the hydrostatic pressure of the HDF (minus any pressure drop or frictional losses) and the hydrostatic pressure of the adjacent body of water. In some embodiments, by at least partially isolating the LDF pump from the HDF pump, the pressure of LDF exiting the LDF pump and/or transferred into the lower elevation reservoir can be controlled or can be at about the same pressure as the internal pressure of the lower elevation reservoir or at about the same pressure as the adjacent body of water at the depth of the second reservoir. In some embodiments, by at least partially isolating the LDF turbine from the HDF turbine, the pressure of HDF exiting the HDF turbine and/or transferred into the lower elevation reservoir can be controlled or can be at about the same pressure as the internal pressure of the lower elevation reservoir or at about the same pressure as the adjacent body of water at the depth of the second reservoir.

Some embodiments may enable a subsea tank at or near pressure equilibration with the adjacent body of water by transferring LDF into the LDF pump at a different volumetric flow rate than the flow rate of HDF into the HDF pump.

Some embodiments of the present invention may pertain to systems and methods for storing and/or generating power. Some embodiments may store power by transferring a high-density fluid (HDF) from a second reservoir at a second elevation to a first reservoir at a first elevation and transferring a low-density fluid (LDF) from a first reservoir at a first elevation to a second reservoir at a second elevation, wherein the first elevation comprises a higher elevation than the second elevation. In some embodiments, power may be stored due to the gravitational hydrostatic pressure difference between the HDF and the LDF due to the density difference between the HDF and the LDF, and the elevation difference between the first reservoir and second reservoir. In some embodiments, the second reservoir may comprise an at least partially rigid tank or a rigid tank. In some embodiments, the second reservoir may comprise an at least partially rigid tank or a rigid tank, such that, during the storing of power, the volume of HDF transferred from or exiting the second reservoir may be at least partially displaced or replaced by the volume of LDF transferred into or entering the second reservoir. For example, in some embodiments, during storing of power, it may be desirable for the total volume of HDF transferred from the second reservoir to the first reservoir to be about the same as the total volume of LDF transferred from the first reservoir to the second reservoir. For example, in some embodiments, during the storing of power, the combined volume of HDF and LDF stored in the second reservoir may change by less than the volume of HDF transferred from the second reservoir and/or the volume of LDF transferred to the second reservoir. For example, in some embodiments, during the storing of power, the combined volume or total volume of HDF and LDF stored in the second reservoir may change by less than, or equal to, one or more or any combination of the following: +/−0.1%, or +/−1%, or +/−2%, or +/−3%, or +/−4%, or +/−5%, or +/−6%, or +/−7%, or +/−8%, or +/−9%, or +/−10%, or +/−11%, or +/−12%, or +/−130%, or +/−14%, or +/−15%, or +/−16%, or +/−17%, or +/−18%, or +/−19%, or +/−20%, or +/−21%, or +/−22%, or +/−23%, or +/−24%, or +/−25%, or +/−30%, or +/−35%, or +/−40%, or +/−45%, or +/−50%.

Some embodiments may generate power by transferring a high-density fluid (HDF) from a first reservoir at a first elevation to a second reservoir at a second elevation and transferring a low density fluid (LDF) from a second reservoir at a second elevation to a first reservoir at a first elevation, wherein the first elevation comprises a higher elevation than the second elevation. In some embodiments, power may be generated due to the gravitational hydrostatic pressure difference between the HDF and the LDF due to the density difference between the HDF and the LDF, and the elevation difference between the first reservoir and second reservoir. In some embodiments, the second reservoir may comprise an at least partially rigid tank or a rigid tank. In some embodiments, the second reservoir may comprise an at least partially rigid tank or a rigid tank, such that, during the generating of power, the volume of LDF transferred from or exiting the second reservoir may be at least partially displaced or replaced by the volume of HDF transferred into or entering the second reservoir. For example, in some embodiments, during generating of power, it may be desirable for the total volume of LDF transferred from the second reservoir to the first reservoir to be about the same as the total volume of HDF transferred from the first reservoir to the second reservoir. For example, in some embodiments, during the generating of power, the combined volume of HDF and LDF stored in the second reservoir may change by less than the volume of LDF transferred from the second reservoir and/or the volume of HDF transferred to the second reservoir. For example, in some embodiments, during the storing of power, the combined volume or total volume of HDF and LDF stored in the second reservoir may change by less than, or equal to, one or more or any combination of the following: +/−0.1%, or +/−1%, or +/−2%, or +/−3%, or +/−4%, or +/−5%, or +/−6%, or +/−7%, or +/−8%, or +/−9%, or +/−10%, or +/−11%, or +/−12%, or +/−130%, or +/−14%, or +/−15%, or +/−16%, or +/−17%, or +/−18%, or +/−19%, or +/−20%, or +/−21%, or +/−22%, or +/−23%, or +/−24%, or +/−25%, or +/−30%, or +/−35%, or +/−40%, or +/−45%, or +/−50%.

In some embodiments, it may be desirable for the first reservoir to be configured to possess at least a portion of fluid head pressure or other pressure greater than atmospheric pressure to enable LDF to flow into the LDF pump under sufficient pressure or pressure driving force to minimize or prevent cavitation or vacuum formation, or to ensure the desired flow rate of LDF into the pump. For example, in some embodiments, a first reservoir may have a pressure at least partially greater than atmospheric pressure due to, for example, in some embodiments or with some LDFs, the partial pressure of the LDF may be greater than atmospheric pressure. For example, an example LDF may be n-Butane and/or n-Butane may have a partial pressure greater than atmospheric pressure at temperatures greater than −0.5° C., and/or, in some embodiments, the temperature of the stored LDF may be greater than −0.5° C. For example, in some embodiments, the first reservoir may possess an inert gas system to provide additional pressure. For example, in some embodiments, the first reservoir may possess a raised subsection or pipe which may be fluidly connected to the first reservoir and/or may be at an elevation above or greater than most of the stored LDF volume in the reservoir and/or may be at an elevation above the rest of or most of the first reservoir. For example, in some embodiments, said raised subsection of the first reservoir may be at an elevation greater than one or more or any combination of the following stored volume of LDF in the first reservoir: 85%, or 86%, or 87%, or 88%, or 89%, or 90%, or 91%, or 92%, or 93%, or 94%, or 95%, or 96%, or 97%, or 98%, or 99%, or 99.5%. For example, in some embodiments, said raised subsection of the first reservoir may comprise less than or equal to one or more or any combination of the following percentages of total volume of LDF stored in the first reservoir: 15%, or 14%, or 13%, or 12%, or 11%, or 10%, or 9%, or 8%, or 7%, or 6%, or 5%, or 4%, or 3%, or 2%, or 1%, or 0.5%. In some embodiments, a first reservoir configured with a raised subsection may comprise an LDF liquid level or liquid surface in the raised subsection and an LDF port located at an elevation lower than the LDF liquid level or liquid surface, which may, for example, enable the LDF at the LDF port to possess a hydrostatic head pressure which may be greater than atmospheric pressure and/or may provide sufficient pressure driving force to enable LDF to flow into an LDF pump at a desired flow rate during, for example, storing of power or charging.

In some embodiments, the LDF port in the first reservoir may be located within or on the raised subsection. For example, in some embodiments, the LDF port may be located at an elevation below the LDF liquid surface level and in the raise subsection. In some embodiments, the raised subsection may enable the removal of LDF during, for example, charging or storing of power, including during dynamic conditions. In some embodiments, the raised subsection may prevent or minimize HDF from transfer into the LDF port and/or LDF pump, including, for example, during dynamic vessel conditions, such as high sea state. For example, if the first reservoir or the first reservoir comprising a floating vessel may be experiencing dynamic conditions, or high sea state, which may result in fluid motion or sloshing, the raised subsection may prevent or minimize HDF from entering the LDF port. In some embodiments, a gravity separator, or a decanter, or a centrifuge, or a coalescer, or other liquid-liquid separator, or any combination thereof may be fluidly connected to the pipe or conduit transferring LDF between the first reservoir and the pump, which may, for example, separate HDF from LDF, if desired or applicable. In some embodiments, a gravity separator, or a decanter, or a centrifuge, or a coalescer, or other liquid-liquid separator, or any combination thereof may be fluidly connected to the pipe or conduit transferring LDF between the first reservoir and the pump, which may, for example, separate HDF from LDF, if desired or applicable, before or during the transfer of LDF.

In some embodiments, the first reservoir may be configured to possess a lowered subsection. For example, in some embodiments, said lowered subsection of the first reservoir may be at an elevation lower than one or more or any combination of the following stored volume of HDF in the first reservoir: 85%, or 86%, or 87%, or 88%, or 89%, or 90%, or 91%, or 92%, or 93%, or 94%, or 95%, or 96%, or 97%, or 98%, or 99%, or 99.5%. For example, in some embodiments, said lowered subsection of the first reservoir may comprise less than or equal to one or more or any combination of the following percentages of total volume of HDF stored in the first reservoir: 15%, or 14%, or 13%, or 12%, or 11%, or 10%, or 9%, or 8%, or 7%, or 6%, or 5%, or 4%, or 3%, or 2%, or 1%, or 0.5%.

In some embodiments, the HDF port in the first reservoir may be located within or on the lowered subsection. In some embodiments, the lowered subsection may enable the removal of HDF during, for example, generating of power or discharging, including during dynamic conditions. In some embodiments, the raised subsection may prevent or minimize LDF from transfer into the HDF port, including, for example, during dynamic vessel conditions, such as high sea state. For example, if the first reservoir or the first reservoir comprising a floating vessel may be experiencing dynamic conditions, or high sea state, which may result in fluid motion or sloshing, the lowered subsection may prevent or minimize LDF from entering the HDF port. In some embodiments, a gravity separator, or a decanter, or a centrifuge, or a coalescer, or other liquid-liquid separator, or any combination thereof may be fluidly connected to the pipe or conduit transferring HDF, which may, for example, separate LDF from HDF, if desired or applicable. In some embodiments, a gravity separator, or a decanter, or a centrifuge, or a coalescer, or other liquid-liquid separator, or any combination thereof may be fluidly connected to the pipe or conduit transferring HDF, which may, for example, separate LDF from HDF, if desired or applicable, before or during the transfer of HDF.

In some embodiments, the first reservoir may be configured to possess a lowered subsection and raised subsection. For example, in some embodiments, a lowered subsection and raised subsection may enable the LDF and HDF to be stored together in the same tank or tanks in the first reservoir. For example, in some embodiments, a lowered subsection and raised subsection may enable the LDF and HDF to be stored together in the same tank or tanks in a first reservoir comprising a dynamic or mobile structure, for example, by minimizing or preventing HDF from entering the LDF port, or LDF from entering the HDF port, or any combination thereof during, for example, storing or generating power. For example, in some embodiments, a lowered subsection and a raised subsection may enable the LDF and HDF to be stored together in the same tank or tanks in a first reservoir comprising a dynamic or mobile structure, for example, by minimizing or preventing HDF from entering the LDF port, or LDF from entering the HDF port, or any combination thereof during, for example, high sea state, or sea conditions which may promote sloshing, or other events which may result in the first reservoir moving dynamically, or any combination thereof. For example, in some embodiments, a lowered subsection and a raised subsection may enable the HDF and LDF to be stored together on a floating or dynamic or moving structure, while reducing the impact of sloshing on access to HDF and LDF during, for example, the storing or generating of power. For example, in some embodiments, a lowered subsection and a raised subsection may enable LDF to be transferred from or exit the first reservoir at a positive pressure, which may comprise a pressure greater than atmospheric pressure, for example, to facilitate the transfer or flow of LDF during the storing of power or charging and/or preventing or minimizing pump cavitation during charging or storing of power. In some embodiments, it may be desirable for the raised subsection and/or lowered subsection to be located near the center of the vessel or other structure comprising the first reservoir to, for example, further reduce the impact of sloshing on access to HDF and LDF during, for example, the storing or generating of power.

In some embodiments, a gravity separator, or a decanter, or a centrifuge, or a coalescer, or other liquid-liquid separator, or any combination thereof may be fluidly connected to the pipe or conduit transferring HDF, or the pipe or conduit transferring LDF, or any combination thereof. In some embodiments, a gravity separator, or a decanter, or a centrifuge, or a coalescer, or other liquid-liquid separator, or any combination thereof may, for example, may separate LDF from HDF, if desired or applicable, before or during the transfer of HDF, or, for example, may separate HDF from LDF, if desired or applicable, before or during transfer of LDF, or any combination thereof.

In some embodiments, a first reservoir may store LDF and HDF in non-contiguously separate tanks or storage regions. In some embodiments, an inert gas system or vapor recompression system may be desired, for example, to ensure desired pressure and fluid occupancy in the volume of each tank unoccupied by LDF and HDF and the changes in volume unoccupied by LDF or HDF during the storage of power and/or generation of power. In some embodiments, an inert gas system may suppress the concentration of oxygen in the headspace gases, which may prevent a fire if, for example, LDF or HDF comprise a potentially flammable fluid. In some embodiments, the inert gas system may add or remove inert gas and/or LDF vapors and/or HDF vapors from a tank during the filling or emptying of LDF or HDF from a tank. An inert gas may comprise a gas that may not readily undergo chemical reactions with other chemical substances. Inert gases may include, but are not limited to, one or more or any combination of the following: noble gases, or nitrogen gas, or helium, or argon, or neon, or xenon, or some fluorocarbon gases, or some fire suppressant gases, or carbon dioxide, or some halogenated gases. In some embodiments, an LDF or HDF may possess sufficient vapor pressure wherein a vapor recompression system may be desired. For example, the vapor pressure of an LDF may be greater than atmospheric pressure. For example, an LDF comprising n-Butane may possess a vapor pressure which may be greater than atmospheric pressure. For example, in some embodiments, the headspace gas of some tanks storing n-Butane liquid may comprise n-Butane vapor. In some embodiments, when n-Butane is added to the storage tank, it may be desirable to compress and/condense at least a portion of the n-Butane vapor.

In some embodiments, the second reservoir may be located subsea or beneath the surface of a body of water. In some embodiments, the HDF may comprise a fluid with a density greater than the density of the LDF. In some embodiments, it may be desirable for the HDF and/or LDF to comprise liquids, or solid-liquid mixtures, or any combination thereof due to, for example, the relatively low compressibility of liquids, or solid-liquid mixtures, or any combination thereof among fluids. In some embodiments, it may be desirable for the HDF and/or LDF to comprise liquids due to, for example, the relatively low compressibility of liquids among fluids. In some embodiments, the first reservoir may comprise a floating vessel, or on a fixed structure, or a structure near or on or above the surface of a body of water, or a land-based structure, or a water-based structure, or any combination thereof.

In some embodiments, the first reservoir may comprise a structure at least partially beneath the surface of a body of water at an elevation greater than the elevation of the second reservoir, and/or the first reservoir may be located at a subsea depth less than the depth of the second reservoir. In some embodiments, the first reservoir may comprise a structure at least partially above the surface of a body of water at an elevation greater than the elevation of the second reservoir, and/or the first reservoir may be located at a subsea depth less than the depth of the second reservoir.

In some embodiments, it may be desirable to employ an HDF with a significantly greater density than an LDF. In some embodiments, it may be desirable to employ an HDF and an LDF such that there is a large density difference between the HDF and LDF to, for example, enable the energy storage system to have a high energy density, or high power density, or any combination thereof because, for example, the energy density and/or power density may relate to the density difference between the HDF and LDF and the elevation difference between the first reservoir and second reservoir. In some embodiments, the density of LDF may be less than the density of the adjacent body of water. In some embodiments, employing an LDF with a density less than the density of an adjacent body of water may result in a hydrostatic pressure of LDF being less than the hydrostatic pressure of the body of water at the same elevation or depth, which may result in a second reservoir or lower elevation reservoir with an internal pressure less than the pressure of the body of water adjacent to or at the same elevation as the second reservoir or lower elevation reservoir. In some embodiments, the density of HDF may be greater than the density of the adjacent body of water. In some embodiments, employing an HDF with a density less than the density of an adjacent body of water may result in a hydrostatic pressure of HDF being greater than the hydrostatic pressure of the body of water at the same elevation or depth, which may result in a second reservoir or lower elevation reservoir with an internal pressure greater than the pressure of the body of water adjacent to or at the same elevation as the second reservoir or lower elevation reservoir. In some embodiments, if a second reservoir or lower elevation reservoir comprising a subsea tank is designed to resist or withstand the pressure difference between the hydrostatic pressure of an adjacent body of water and the hydrostatic pressure of an HDF or LDF at the same elevation, the subsea tank may be expensive and/or not economically viable. For example, in some embodiments, if the first reservoir is located at an elevation of 0 meters and the second reservoir is located at an elevation of −2,000 meters (or 2,000 meter subsea depth), and the HDF is potassium carbonate brine with a density of about 1,520 kg/m$^3$ and the LDF is ethanol with a density of about 790 kg/m$^3$, the hydrostatic pressure difference between the HDF and LDF may be 143.08 Bar, which, if a subsea tank was designed to resist this full pressure difference, may comprise multiple 1 m3 subsea spheres with a wall thickness of 2-3 inches if made of steel, which may likely be expensive and/or potentially uneconomical.

Some embodiments may comprise systems and methods for a second reservoir, or lower elevation reservoir, or subsea tank, or any combination thereof with an internal pressure about the same as the adjacent body of water at the same elevation or depth, while enabling the HDF to be at a density greater than the density of the adjacent body of water and/or while enabling the LDF to be at a density less than the density of the adjacent body of water.

For example, in some embodiments, a pressure exchanger or a subsea pressure exchange may be employed to enable a subsea tank or lower elevation reservoir or a second reservoir with an internal pressure about the same as the pressure of the adjacent body of water or an internal pressure at about pressure equilibration with adjacent body of water plus or minus a tolerance pressure, which may significant reduce subsea tank cost, or enable a larger subsea tank, or enable the placement of the subsea tank at deeper water depths, or any combination thereof. In some embodiments, a pressure exchanger or a subsea pressure exchanger may be employed to enable the use of an LDF with a density and hydrostatic pressure less than the adjacent body of water and the use of a HDF with a density and hydrostatic pressure greater than the adjacent body of water, and/or achieve the energy density benefits associated with the aforementioned LDF and HDF properties, while enabling a subsea tank or lower elevation reservoir or a second reservoir with an internal pressure about the same as the pressure of the adjacent body of water or an internal pressure at about pressure equilibration with adjacent body of water plus or minus a tolerance pressure.

For example, some embodiments may employ an LDF pump/turbine and an HDF pump/turbine such that the volumetric flow rate of the LDF may be at least partially synchronized with the volumetric flow rate of the HDF, and/or the applied pressure change of the LDF may be at least partially synchronized with the applied pressure change of the HDF.

Storing Power (Charging): For example, in some embodiments, a pressure equilibrized subsea tank or second reservoir may be accomplished by employing an LDF pump and an HDF pump, wherein the pumping volumetric flow rates and/or hydraulic pressures are at least partially synchronized. In some embodiments, a pressure equilibrized subsea tank or second reservoir may be accomplished by pumping LDF and HDF separately, wherein the pumping volumetric flow rates of LDF and HDF are at least partially synchronized and/or the hydraulic pressures are at least partially synchronized. For example, in some embodiments, during the storing of power:

LDF Pumping Pressures: The LDF pump may increase the hydraulic pressure of LDF from a pressure about the same as the hydrostatic pressure of LDF near the second reservoir or lower elevation reservoir, to a pressure about the same as the internal pressure of the second reservoir or lower elevation reservoir, or about the same as the hydrostatic pressure of the adjacent body of water at the same elevation or depth as the second reservoir or lower elevation reservoir. For example, in some embodiments, the LDF may have a density less than the density of the adjacent body of water or the liquid comprising the adjacent body of water, which may mean the hydrostatic pressure of LDF may be less than the hydrostatic pressure of the adjacent body of water at the same depth or elevation. For example, in some embodiments, the LDF pump may increase the pressure of LDF near the second reservoir or lower elevation reservoir from a pressure about the same as the hydrostatic pressure of LDF to a pressure about the same as the internal pressure of the second reservoir or lower elevation reservoir, or about the same as the hydrostatic pressure of the adjacent body of water at the same elevation or depth as the second reservoir or lower elevation reservoir.

LDF Pumping Volumetric Flow Rate: For example, in some embodiments, during the storing of power, it may be desirable for the total volume of LDF which may enter the second reservoir or lower elevation reservoir to be about the same as the total volume of HDF which may exit the second reservoir or lower elevation reservoir. In some embodiments, the volumetric flow rate of LDF entering the second reservoir may be measured using an LDF flow meter. In some embodiments, the volumetric flow rate of LDF entering the second reservoir may be measured using an LDF flow meter, which may be located near the second reservoir or lower elevation reservoir. In some embodiments, the volumetric flow rate of LDF entering the second reservoir may be measured using an LDF flow meter, in which said measurements may interface with a computer which may algorithmically adjust, control, and/or monitor an HDF pump and/or an HDF flow controller to at least partially synchronize or match the volumetric flow rate of HDF exiting the second reservoir with the volumetric flow rate of LDF entering the second reservoir, or at least partially synchronize or match the total volume of HDF to exit the second reservoir with the total volume of LDF to enter the second reservoir. In some embodiments, the volumetric flow rate of LDF entering the second reservoir may be measured using an LDF flow meter, in which said measurements may interface with a computer which may algorithmically adjust, control, and/or monitor an HDF pump and/or an HDF flow controller to adjust the volumetric flow rate of HDF exiting the second reservoir to be about the same as the volumetric flow rate of LDF entering the second reservoir, or to adjust the flow of HDF such that the total volume of HDF to exit the second reservoir may be about the same as the total volume of LDF to enter the second reservoir.

HDF Pumping Pressures: The HDF pump may increase the hydraulic pressure of HDF from a pressure about the same as the internal pressure of the second reservoir or lower elevation reservoir, or about the same as the hydrostatic pressure of the adjacent body of water at the same elevation or depth as the second reservoir or lower elevation reservoir, to a pressure about the same as or greater than the hydrostatic pressure of HDF at a depth or elevation near the second reservoir, or lower elevation reservoir. For example, in some embodiments, the HDF may have a density greater than the density of the adjacent body of water or the liquid comprising the adjacent body of water, which may mean the hydrostatic pressure of HDF may be greater than the hydrostatic pressure of the adjacent body of water at the same depth or elevation.

HDF Pumping Volumetric Flow Rate: For example, in some embodiments, during the storing of power, it may be desirable for the total volume of HDF which may exit the second reservoir or lower elevation reservoir to be about the same as the total volume of LDF which may enter the second reservoir or lower elevation reservoir. In some embodiments, the volumetric flow rate of HDF exiting the second reservoir may be measured using an HDF flow meter. In some embodiments, the volumetric flow rate of HDF exiting the second reservoir may be measured using an HDF flow meter, which may be located near the second reservoir or lower elevation reservoir. In some embodiments, the volumetric flow rate of HDF exiting the second reservoir may be measured using an HDF flow meter, in which said measurements may interface with a computer which may algorithmically adjust, control, and/or monitor an LDF pump and/or an LDF flow controller to at least partially synchronize or match the volumetric flow rate of LDF entering the second reservoir with the volumetric flow rate of HDF exiting the second reservoir, or at least partially synchronize or match the total volume of LDF to enter the second reservoir with the total volume of HDF to exit the second reservoir. In some embodiments, the volumetric flow rate of HDF exiting the second reservoir may be measured using an HDF flow meter, in which said measurements may interface with a computer which may algorithmically adjust, control, and/or monitor an LDF pump and/or an LDF flow controller to adjust the volumetric flow rate of LDF entering the second reservoir to be about the same as the volumetric flow rate of HDF exiting the second reservoir, or to adjust the flow of LDF such that the total volume of LDF to enter the second reservoir may be about the same as the total volume of HDF to exit the second reservoir.

Generating Power (Discharging): For example, in some embodiments, a pressure equilibrized subsea tank or second reservoir may be accomplished by employing an LDF turbine or generator and an HDF turbine or generator, wherein the volumetric flow rates and/or hydraulic pressures during hydraulic power generation are at least partially synchronized. In some embodiments, a pressure equilibrized subsea tank or second reservoir may be accomplished by generating hydraulic power from LDF and HDF separately, wherein the volumetric flow rates of LDF and HDF are at least partially synchronized and/or the hydraulic pressures are at least partially synchronized. For example, in some embodiments, during the generating of power:

LDF Generating or Turbine Pressures: The LDF turbine or generator may decrease the hydraulic pressure of LDF from a pressure about the same as the internal pressure of the second reservoir or lower elevation reservoir, or about the same as the hydrostatic pressure of the adjacent body of water at the same elevation or depth as the second reservoir or lower elevation reservoir, to a pressure about the same as the hydrostatic pressure of LDF near the second reservoir or lower elevation reservoir. For example, in some embodiments, the LDF may have a density less than the density of the adjacent body of water or the liquid comprising the adjacent body of water, which may mean the hydrostatic pressure of LDF may be less than the hydrostatic pressure of the adjacent body of water at the same depth or elevation.

LDF Generating or Turbine Volumetric Flow Rate: For example, in some embodiments, during the generating of power, it may be desirable for the total volume of LDF which may exit the second reservoir or lower elevation reservoir to be about the same as the total volume of HDF which may enter the second reservoir or lower elevation reservoir. In some embodiments, the volumetric flow rate of LDF exiting the second reservoir may be measured using an LDF flow meter. In some embodiments, the volumetric flow rate of LDF exiting the second reservoir may be measured using an LDF flow meter, which may be located near the second reservoir or lower elevation reservoir. In some embodiments, the volumetric flow rate of LDF exiting the second reservoir may be measured using an LDF flow meter, in which said measurements may interface with a computer which may algorithmically adjust, control, and/or monitor an HDF turbine or generator and/or an HDF flow controller to at least partially synchronize or match the volumetric flow rate of HDF entering the second reservoir with the volumetric flow rate of LDF exiting the second reservoir, or at least partially synchronize or match the total volume of HDF to enter the second reservoir with the total volume of LDF to exit the second reservoir. In some embodiments, the volumetric flow rate of LDF exiting the second reservoir may be measured using an LDF flow meter, in which said measurements may interface with a computer which may algorithmically adjust, control, and/or monitor an HDF turbine or generator and/or an HDF flow controller to adjust the volumetric flow rate of HDF entering the second reservoir to be about the same as the volumetric flow rate of LDF exiting the second reservoir, or to adjust the flow of HDF such that the total volume of HDF to enter the second reservoir may be about the same as the total volume of LDF to exit the second reservoir.

HDF Generating or Turbine Pressures: The HDF turbine or generator may decrease the hydraulic pressure of HDF from a pressure about the same as or greater than the hydrostatic pressure of HDF at a depth or elevation near the second reservoir or lower elevation reservoir, to a pressure about the same as the internal pressure of the second reservoir or lower elevation reservoir, or about the same as the hydrostatic pressure of the adjacent body of water at the same elevation or depth as the second reservoir or lower elevation reservoir. For example, in some embodiments, the HDF may have a density greater than the density of the adjacent body of water or the liquid comprising the adjacent body of water, which may mean the hydrostatic pressure of HDF may be greater than the hydrostatic pressure of the adjacent body of water at the same depth or elevation.

HDF Generating or Turbine Volumetric Flow Rate: For example, in some embodiments, during the generating of power, it may be desirable for the total volume of HDF which may enter the second reservoir or lower elevation reservoir to be about the same as the total volume of LDF which may exit the second reservoir or lower elevation reservoir. In some embodiments, the volumetric flow rate of HDF entering the second reservoir may be measured using an HDF flow meter. In some embodiments, the volumetric flow rate of HDF entering the second reservoir may be measured using an HDF flow meter, which may be located near the second reservoir or lower elevation reservoir. In some embodiments, the volumetric flow rate of HDF entering the second reservoir may be measured using an HDF flow meter, in which said measurements may interface with a computer which may algorithmically adjust, control, and/or monitor an LDF turbine or generator and/or an LDF flow controller to at least partially synchronize or match the volumetric flow rate of LDF exiting the second reservoir with the volumetric flow rate of HDF entering the second reservoir, or at least partially synchronize or match the total volume of LDF to exit the second reservoir with the total volume of HDF to enter the second reservoir. In some embodiments, the volumetric flow rate of HDF entering the second reservoir may be measured using an HDF flow meter, in which said measurements may interface with a computer which may algorithmically adjust, control, and/or monitor an LDF turbine or generator and/or an LDF flow controller to adjust the volumetric flow rate of LDF exiting the second reservoir to be about the same as the volumetric flow rate of HDF entering the second reservoir, or to adjust the flow of LDF such that the total volume of LDF to exit the second reservoir may be about the same as the total volume of HDF to enter the second reservoir.

For example, in some embodiments, an LDF pump and an HDF pump may be employed:
  Wherein the LDF pump may:
    Pressure: May increase the pressure of the LDF to bridge the difference in hydrostatic pressure between the hydrostatic pressure of LDF near the second reservoir or lower elevation reservoir and the internal pressure of the second reservoir or lower elevation reservoir, which may be about the same as in the hydrostatic pressure of an adjacent body of water at the same depth or elevation as the second reservoir or lower elevation reservoir.
    Volumetric Flow: May transfer LDF into the second reservoir or lower elevation reservoir at a volumetric flow rate, or may transfer a volume of LDF into the second reservoir or lower elevation reservoir.
  Wherein the HDF pump may:
    Pressure: May increase the pressure of the HDF to bridge the difference in pressure between the internal pressure of the second reservoir or lower elevation reservoir, which may be about the same as in the hydrostatic pressure of an adjacent body of water at the same depth or elevation as the second reservoir or lower elevation reservoir, and the hydrostatic pressure of HDF near the second reservoir or lower elevation reservoir. In some embodiments, the HDF may possess a density greater than the density of the adjacent body of water or the density of the liquid in the adjacent body of water, which may mean the HDF may possess a hydrostatic pressure greater than the hydrostatic pressure of the adjacent body of water at the same depth or elevation.
    Volumetric Flow: May transfer HDF from the second reservoir or lower elevation reservoir at a volumetric flow rate which may be about the same as the volumetric flow rate of LDF entering the second reservoir or lower elevation reservoir, or may transfer a volume of HDF from the second reservoir or lower elevation reservoir which may be about the same as the volume of LDF transferred into the second reservoir or lower elevation reservoir.

For example, in some embodiments, an LDF turbine or generator and an HDF turbine or generator may be employed:
  Wherein the LDF turbine or generator may:
    Pressure: May decrease the pressure of the LDF to bridge the difference in hydrostatic pressure between the hydrostatic pressure of LDF near the second reservoir or lower elevation reservoir and the internal pressure of the second reservoir or lower elevation reservoir, which may be about the same as in the hydrostatic pressure of an adjacent body of water at the same depth or elevation as the second reservoir or lower elevation reservoir.
    Volumetric Flow: May transfer LDF from the second reservoir or lower elevation reservoir at a volumetric flow rate, or may transfer a volume of LDF from the second reservoir or lower elevation reservoir.
  Wherein the HDF pump may:
    Pressure: May decrease the pressure of the HDF to bridge the difference in pressure between the internal pressure of the second reservoir or lower elevation reservoir, which may be about the same as in the hydrostatic pressure of an adjacent body of water at the same depth or elevation as the second reservoir or lower elevation reservoir, and the hydrostatic pressure of HDF near the second reservoir or lower elevation reservoir. In some embodiments, the HDF may possess a density greater than the density of the adjacent body of water or the density of the liquid in the adjacent body of water, which may mean the HDF may possess a hydrostatic pressure greater than the hydrostatic pressure of the adjacent body of water at the same depth or elevation.
    Volumetric Flow: May transfer HDF into the second reservoir or lower elevation reservoir at a volumetric flow rate which may be about the same as the volumetric flow rate of LDF exiting the second reservoir or lower elevation reservoir, or may transfer a volume of HDF into the second reservoir or lower elevation reservoir which may be about the same as the volume of LDF transferred from the second reservoir or lower elevation reservoir.

In some embodiments, the LDF pump may be the same unit or device as the LDF turbine or generator. For example, an LDF pump/turbine may operate in 'pumping mode' when storing power, and/or may operate in 'generating mode' when generating power. In some embodiments, the LDF pump may be a different unit or device than the LDF turbine or generator. In some embodiments, the HDF pump may be the same unit or device as the HDF turbine or generator. For example, an HDF pump/turbine may operate in 'pumping mode' when storing power, and/or may operate in 'generating mode' when generating power. In some embodiments, the HDF pump may be a different unit or device than the HDF turbine or generator.

For example, during storing of power, an LDF pump may transfer LDF from a first reservoir or higher elevation reservoir to a second reservoir or lower elevation reservoir, such that the pressure of the LDF entering the second reservoir may be about the same pressure as the internal pressure of the second reservoir, or the about the same pressure as the hydrostatic pressure of adjacent body of water at the same elevation, and/or the volume of LDF entering the second reservoir or lower elevation reservoir may be about the same as the volume of HDF exiting the second reservoir or lower elevation reservoir. For example, during storing of power, an HDF pump may transfer HDF from the a second reservoir or a lower elevation reservoir to a first reservoir or higher elevation reservoir such than the volume of HDF exiting the second reservoir or lower elevation reservoir may be about the same as the volume of LDF entering the second reservoir and/or the pressure of HDF exiting the second reservoir before entering into the HDF pump may be about the same pressure as the internal pressure of the second reservoir, or the about the same pressure as the hydrostatic pressure of adjacent body of water at the same elevation, and/or the pressure of HDF exiting the HDF pump may be about the same as or greater than the hydrostatic pressure of HDF at the elevation difference between the first reservoir and second reservoir or at the depth of the HDF pump or at the depth of the second reservoir.

In some embodiments, the HDF pump may be located near the second reservoir or lower elevation reservoir. In some embodiments, the LDF pump may be located near the second reservoir or lower elevation reservoir. In some embodiments, the LDF pump may be located between the first reservoir, or higher elevation reservoir, and the second reservoir, or lower elevation reservoir. In some embodiments, the LDF pump may be located near the first reservoir or higher elevation reservoir.

For example, in some embodiments, during generating of power, an HDF valve may open, allowing the transfer of HDF from a first reservoir or higher elevation reservoir through an HDF turbine or generator and into a second reservoir or lower elevation reservoir. For example, in some embodiments, during generating of power, an HDF valve may open, allowing the transfer of HDF from a first reservoir or higher elevation reservoir to an HDF turbine or generator, which may be near the second reservoir or lower elevation reservoir, wherein the HDF turbine or generator may generate power by decreasing the pressure of the HDF from a higher pressure, such as a pressure near or about the same as the hydrostatic pressure of HDF at the depth or elevation of the HDF turbine or generator, to a lower pressure, such as a pressure about the same as the internal pressure of the second reservoir, or a pressure about the same as the hydrostatic pressure of adjacent body of water at the same elevation. In some embodiments, the volume of HDF entering the second reservoir or lower elevation reservoir may be about the same as the volume of LDF exiting the second reservoir or lower elevation reservoir.

For example, in some embodiments, during generating of power, an LDF valve may open, allowing the transfer of LDF from the second reservoir or a lower elevation reservoir through an LDF turbine or generator to a first reservoir or higher elevation reservoir. For example, in some embodiments, during generating of power, an LDF valve may open, allowing the transfer of LDF from the second reservoir or a lower elevation reservoir to an LDF turbine or generator, which may be near the second reservoir or lower elevation reservoir, wherein the LDF turbine or generator may generate power by decreasing the pressure of the LDF from a high pressure, such as a pressure about the same pressure as the internal pressure of the second reservoir, or a pressure about the same as the hydrostatic pressure of adjacent body of water at the same elevation, to a lower pressure, such as a pressure near or about the same as the hydrostatic pressure of LDF at the depth or elevation of the LDF turbine or generator. For example, in some embodiments, during generating of power, an LDF valve may open, allowing the transfer of LDF from the second reservoir or a lower elevation reservoir to an LDF turbine or generator, which may be near the first reservoir or higher elevation reservoir, wherein the LDF turbine or generator may generate power by decreasing the pressure of the LDF from a high pressure, such as a pressure about the same pressure as the internal pressure of the second reservoir minus the hydrostatic head pressure of the LDF below the turbine or generator, to a lower pressure, such as a pressure near or about the same as the hydrostatic pressure of LDF at the depth or elevation of the LDF turbine or generator. In some embodiments, the volume of LDF exiting the second reservoir or lower elevation reservoir may be about the same as the volume of HDF entering the second reservoir.

In some embodiments, the HDF turbine or generator may be located near the second reservoir or lower elevation reservoir. In some embodiments, the LDF turbine or generator may be located near the second reservoir or lower elevation reservoir. In some embodiments, the LDF turbine or generator may be located between the first reservoir, or higher elevation reservoir, and the second reservoir, or lower elevation reservoir. In some embodiments, the LDF turbine or generator may be located near the first reservoir or higher elevation reservoir.

In some embodiments, the HDF turbine or generator may comprise the same unit or same device as the HDF pump. In some embodiments, the HDF turbine or generator may comprise a different unit or different device than the HDF pump. In some embodiments, the HDF turbine or generator may be located at the same elevation or location as the HDF pump. In some embodiments, the HDF turbine or generator may be located at a different elevation or location than the HDF pump.

In some embodiments, the LDF turbine or generator may comprise the same unit or same device as the LDF pump. In some embodiments, the LDF turbine or generator may comprise a different unit or different device than the LDF pump. In some embodiments, the LDF turbine or generator may be located at the same elevation or location as the LDF pump. In some embodiments, the LDF turbine or generator may be located at a different elevation or location than the LDF pump.

For example, some embodiments may employ an LDF pump/turbine and an HDF pump/turbine such that the volumetric flow rate of the LDF may be at least partially synchronized with the volumetric flow rate of the HDF, and the applied pressure change of the LDF may be at least partially synchronized with the applied pressure change of the HDF. For example, during storing of power, an LDF pump may transfer LDF from a first reservoir or higher elevation reservoir to a second reservoir or lower elevation reservoir, such that the pressure of the LDF entering the second reservoir may be about the same pressure as the internal pressure of the second reservoir, or the about the same pressure as the hydrostatic pressure of adjacent body of water at the same elevation, and/or volume of LDF entering the second reservoir or lower elevation reservoir may be about the same as the volume of HDF exiting the second reservoir or lower elevation reservoir. For example, during storing of power, an HDF pump may transfer HDF from a second reservoir or lower elevation reservoir to a first reservoir or higher elevation reservoir, such that the pressure of the HDF exiting the second reservoir may be about the same pressure as the internal pressure of the second reservoir, or the about the same pressure as the hydrostatic pressure of adjacent body of water at the same elevation, and/or volume of HDF exiting the second reservoir or lower elevation reservoir may be about the same as the volume of LDF entering the second reservoir or lower elevation reservoir. For example, during generating of power, an LDF turbine or generator may allow the transfer of LDF from a second reservoir or lower elevation reservoir to a first reservoir or higher elevation reservoir, such that the pressure of the LDF exiting the second reservoir may be about the same pressure as the internal pressure of the second reservoir, or the about the same pressure as the hydrostatic pressure of adjacent body of water at the same elevation, and/or volume of LDF exiting the second reservoir or lower elevation reservoir may be about the same as the volume of HDF entering the second reservoir or lower elevation reservoir. For example, during generating of power, an HDF turbine or generator may allow the transfer of HDF from a first reservoir or higher elevation reservoir to a second reservoir or lower elevation reservoir, such that the pressure of the HDF entering the second reservoir may be about the same pressure as the internal pressure of the second reservoir, or the about the same pressure as the hydrostatic pressure of adjacent body of water at the same elevation, and/or volume of HDF entering the second reservoir or lower elevation reservoir may be about the same as the volume of LDF exiting the second reservoir or lower elevation reservoir.

For example, an example embodiment may have a first reservoir floating on the surface of a body of water, a second reservoir located on or near the seabed of a body of water, an LDF riser pipe to transfer LDF between the first reservoir and the second reservoir, and an HDF riser pipe to transfer HDF between the first reservoir and the second reservoir. An HDF pump and/or turbine may be fluidly connected to the HDF riser and/or may be located between the first reservoir and the second reservoir. For example, in some embodiments, the HDF pump and/or turbine may be located subsea at an elevation about the same as the second reservoir. An LDF pump and/or turbine may be fluidly connected to the LDF riser and/or may be located between the first reservoir and the second reservoir. For example, in some embodiments, the LDF pump and/or turbine may be located subsea at an elevation about the same as the second reservoir. For example, in some embodiments, the LDF pump and/or turbine may be located at an elevation between the elevation of the second reservoir and the elevation of the first reservoir. For example, in some embodiments, the LDF pump and/or turbine may be located at an elevation about the same as the first reservoir. The LDF may be a fluid, such as a liquid or solid-liquid mixture, with a density less than the density of the HDF. The HDF may be a fluid, such as a liquid or solid-liquid mixture, with a density greater than the density of the LDF.

In some embodiments, it may be desirable for the second reservoir, or the lower elevation reservoir to store at least a portion of LDF and HDF in the same subsea tanks or vessels. For example, in some embodiments, by storing LDF and HDF in the same subsea tanks or vessels, the total volumetric storage capacity required to store LDF and HDF in the second reservoir may be significantly less than if LDF and HDF were stored separately. For example, in some embodiments, by storing LDF and HDF in the same subsea tanks or vessels, the total volumetric storage capacity required to store LDF and HDF in the second reservoir may be up to 50% lower or up to one half the required volumetric storage capacity of storing LDF and HDF separately. In some embodiments, by storing LDF and HDF in the same tank, the volume of HDF exiting the second reservoir during the storing of power or charging may be displaced or offset by the volume of LDF entering the second reservoir, which may enable the use of an at least partially rigid or at least partially constant volume subsea tank because, for example, the total volume of the subsea tank or second reservoir may remain consistent or change by an amount less than the total volume of HDG exiting the second reservoir during the storing of power or charging. In some embodiments, by storing LDF and HDF in the same tank, the volume of LDF exiting the second reservoir during the generating of power or discharging may be displaced or offset by the volume of HDF entering the second reservoir, which may enable the use of an at least partially rigid or at least partially constant volume tank, such as a constant volume subsea tank, because, for example, the total volume of the subsea tank or second reservoir may remain consistent or change by an amount less than the total volume of LDF exiting the second reservoir during the generating of power or discharging. In some embodiments, to enable the use of an at least partially constant volume subsea tank, it may be desirable for the flow rates of LDF and HDF to be at least partially synchronized during substantial charging or discharging. For example, some embodiments, to enable the use of an at least partially constant volume subsea tank, it may be desirable for the flow rates of LDF and HDF to be at least partially synchronized during substantial charging or discharging, such that, for example, at least a portion of HDF is transferred out of the subsea tank while at least a portion of LDF is transferred into the subsea tank during storing power or charging, and/or at least a portion of LDF is transferred out of the subsea tank while at least a portion of HDF is transferred into the subsea tank during generating power or discharging. It may be important for at least a portion of LDF to exit the second reservoir when a portion of HDF enters the second reservoir during substantial storing of power or charging to, for example, employ a relatively constant volume tank or a rigid tank. It may be important for at least a portion of HDF to exit the second reservoir when a portion of LDF enters the second reservoir during substantial generating of power or discharging to, for example, employ a relatively constant volume tank or a rigid tank.

In some embodiments, volumetric flow rates and/or densities of the LDF and/or HDF may vary at various points in the system. For example, although liquids may be considered practically incompressible, especially compared to gases, liquids do experience a potential change in volume and/or density under significant pressures, generally in accordance with their bulk modulus, and changes in temperature. For example, in some embodiments, the volumetric flow rate of HDF or LDF near the first reservoir may be different from the volumetric flow rate near the second reservoir, even if the mass flow rates of HDF or LDF are the same. For example, in some embodiments, the volumetric flow rate of HDF or LDF near the first reservoir may be different from the volumetric flow rate near the second reservoir, even if the mass flow rates of HDF or LDF are the same, due to, for example, the change in density of HDF or LDF due to the potentially significant difference in pressure experienced by the HDF or LDF between the first reservoir, or higher elevation reservoir, and the second reservoir, or lower elevation reservoir. Additionally, in some embodiments, the resulting change in density and/or volume during the pressurization of LDF or HDF may increase the temperature of the LDF or HDF, which may have some influence on the density or volume of the LDF or HDF and/or the energy efficiency of the system. Additionally, in some embodiments, the resulting change in density and/or volume during the depressurization of LDF or HDF may decrease the temperature of the LDF or HDF, which may have some influence on the density or volume of the LDF or HDF and/or the energy efficiency of the system. In some embodiments, the change in volume of LDF with changes in pressure and temperature may be different from the change in volume of HDF with changes in pressure and temperature. For example, the bulk modulus of an LDF comprising n-Butane may be 0.5 GPa and the bulk modulus of an HDF comprising 20 wt % sodium chloride brine may be 3.4 GPa. In some embodiments, it may be desirable to measure volumetric flow rates, temperatures, and pressures at various points in the system, such before and after pumps and/or generators and/or near the first reservoir and second reservoir and/or within the first reservoir and/or second reservoir. It may be desirable to interface or provide volumetric flow rates, or temperatures, or pressures, or other data to a computer and algorithmically or using machine learning models to predict changes in flow rates, temperatures, or pressures and/or adjust system operations, such as flow rates, or applied power, or extracted power, or valves, or flow controllers, or pressure compensators, or bladder tanks or expansion tanks or buffer tanks or subsea compensators, or any combination thereof to approach or better achieve desired results, which may include, but are not limited to, one or more or any combination of the following: second reservoir or lower elevation reservoir with an internal pressure about the same as the pressure of the body of water adjacent to or at the same depth as the second reservoir or lower elevation reservoir, or the synchronization of the volume of HDF entering or exiting the second reservoir with the volume of LDF entering or exiting the second reservoir, or minimizing the required volume of expansion tanks, or bladder tanks, or buffer tanks, or subsea compensators connected to the second reservoir or lower elevation reservoir.

In some embodiments, the LDF pump and/or turbine may be located at about the same elevation as the first reservoir, or higher elevation reservoir, or may be located at about the same elevation as the second reservoir, or lower elevation reservoir. In some embodiments, there may be considerations in comparing locating the LDF pump and/or turbine at about the same elevation as the first reservoir, or higher elevation reservoir, or locating the LDF pump and/or turbine at about the same elevation as the second reservoir, or lower elevation reservoir.

In some embodiments, the LDF pump and/or LDF turbine may be located near the first reservoir or at an elevation about the same as the first reservoir. In some embodiments, some considerations may include, but are not limited to, one or more or any combination of the following:

In some embodiments, locating the LDF pump and/or LDF turbine near the first reservoir may enable potentially simpler or lower cost accessibility for installation and maintenance, and/or potentially the availability on the market of a wider range of types and sizes of pumps and turbines compared to a subsea LDF pump and/or LDF turbine.

The volumetric flow rate of LDF exiting an LDF pump at an elevation near the first reservoir may be different from the resulting volumetric flow rate of LDF entering the second reservoir due to, for example, the reduction in volume and/or increase in density of the LDF due to the increase in pressure due to, for example, the hydrostatic pressure of the LDF at a lower elevation or an elevation about the same as the second reservoir and/or the bulk modulus of the LDF and/or any potential temperature changes of the LDF. For example, the volumetric flow rate of LDF exiting an LDF pump at an elevation near the first reservoir may be greater than the volumetric flow rate of LDF entering the second reservoir. For example, the volumetric flow rate of LDF exiting an LDF pump at an elevation near the first reservoir may be greater than the volumetric flow rate of LDF entering the second reservoir, even if the LDF mass flow rates are about the same.

The volumetric flow rate of LDF exiting a second reservoir may be different from the resulting volumetric flow rate of LDF entering the LDF turbine, if, for example, the LDF turbine is located at a higher elevation or an elevation about the same as the first reservoir due to, for example, the increase in volume and/or decrease in density of the LDF due to the decrease in pressure due to, for example, the change in hydrostatic pressure of the LDF at a higher elevation or an elevation about the same as the first reservoir and/or the bulk modulus of the LDF and/or any potential temperature changes of the LDF. For example, the volumetric flow rate of LDF exiting a second reservoir may be less than the volumetric flow rate of LDF entering an LDF turbine at an elevation about the same as the first reservoir. For example, the volumetric flow rate of LDF exiting a second reservoir may be less than the volumetric flow rate of LDF entering an LDF turbine at an elevation about the same as the first reservoir, even if the LDF mass flow rates are about the same.

In some embodiments, it may be desirable to increase energy storage efficiency, and/or power output and/or round-trip efficiency by cooling LDF before, or during, or after, or any combination thereof pumping, and/or heating LDF before, or during, or after, or any combination thereof generating power or passing through a turbine. For example, in some embodiments, by cooling the LDF before, or during, or after, or any combination thereof pumping, the volume of LDF being pumped may be lower for a given mass flow rate of LDF due to the generally greater density of most fluids, including most liquids, with lower temperature. In some embodiments, because pressure multiplied by volume may equal energy, cooling a given mass of LDF before or during pumping or transferring of the LDF to the second reservoir may reduce the energy consumed or required to transfer LDF from the first reservoir to the second reservoir by reducing the required volume for a given mass flow rate of LDF. For example, in some embodiments, by heating the LDF before, or during, or after, or any combination thereof generating power or passing through a turbine, the volume of LDF being employed to generate power may be greater for a given mass flow rate of LDF due to the generally lower density of most fluids, including liquids, with greater temperature. For example, in some embodiments, by heating the LDF before, or during, or after, or any combination thereof generating power or passing through a turbine, the volume of LDF may increase for the same mass flow rate and/or because pressure multiplied by volume equals energy, increasing the volume of LDF may increase power output and/or round trip energy efficiency.

In some embodiments, a dynamic power cable may be employed to transfer electric power to or from a pump and/or turbine generator. In some embodiments, if the LDF pump and/or turbine is located on a floating structure or floating structure comprising the first reservoir, a dynamic power cable may be required to transfer power between a subsea power cable or a power source and the LDF pump and/or turbine. In some embodiments, a Dynamic Power Cable may be required for other potential power needs near the first reservoir for example, which may include, but are not limited to, one or more or any combination of the following: electrical substations, or electrical switchgear, or desalination, or utilities, or power for crew or personnel, or power for crew quarters, or communication equipment, or gas processing, or oil & gas processing, or hydrogen production, or chemical production, or ammonia production, or chemical storage, or methanol production, or e-fuel production, or e-chemical production, or storage systems, or vapor recompression systems, or inert gas systems, or cooling systems, or heating systems, or maintenance systems, or monitoring systems.

In some embodiments, the pressure and/or volumetric flow rate of LDF exiting the LDF pump may be different from the pressure and/or volumetric flow rate of LDF entering the second reservoir. In some embodiments, the pressure and/or volumetric flow rate of LDF exiting the LDF pump may be different from the pressure and/or volumetric flow rate of LDF entering the second reservoir, even if the mass flow rates of LDF are the same. For example, in some embodiments, the pressure of LDF exiting an LDF pump near the first reservoir may be about the same as a pressure comprising the internal pressure of the second reservoir, minus the hydrostatic pressure of LDF due to the elevation difference between the LDF pump and the second reservoir, plus pressure required to overcome frictional losses or pressure drop in the pipe or other transfer equipment. The pressure of the LDF entering the second reservoir and/or other parts of the system may be influenced by other complex factors, which may include, but are not limited to, one or more or any combination of the following: the change in volumetric flow rate with depth due to the change in pressure and bulk modulus of the LDF as it is transferred from the pump to the second reservoir, or the change in frictional losses or pressure drop due to the change in volumetric flow rate, or the potential change in temperature of the LDF, or the potential change in density of the LDF, or the potential change in viscosity of the LDF. To ensure relatively accurate measurement and/or control or adjustment of the pressures and/or volumetric flow rates of LDF and/or HDF, it may be desirable to employ temperature sensors, or pressure sensors, or flow meters, or flow controllers, or any combination thereof at multiple points in the system, which may include, but are not limited to, connected to or interfacing with the pipe or conduit transferring LDF between the first reservoir and the pump and/or turbine, or connected to or interfacing with the pipe or conduit transferring LDF between the pump and/or turbine and the second reservoir, or connected to or interfacing with the second reservoir, or connected to or interfacing with the first reservoir, or any combination thereof. To ensure relatively accurate real-time or near-real-time prediction and/or control or adjustment of the pressures and/or volumetric flow rates of LDF and/or HDF, it may be desirable to interface or gather data generated by sensors or other equipment with a computer and/or create and/or utilize a computer model, such as a machine learning model or Artificial Intelligence model, to predict, or adjust, or control, or any combination thereof the volumetric flow rates, or pressures, or mass flow rates, or other system parameter, or any combination thereof, for example, in accordance with the desired demands or objectives of the system. In some embodiments, said desired demands or objectives may be human generated, or computer generated, or any combination thereof.

In some embodiments, if the LDF pump and/or turbine may be located at about the same elevation as the first reservoir, the pipe or riser pipe between the LDF pump and/or turbine and the second reservoir may possess the greatest pressure difference between the LDF and adjacent body of water or fluid at an elevation about the same as the elevation of the LDF pump and/or turbine and/or the least pressure difference between the LDF and adjacent body of water or fluid at the same elevation at an elevation about the same as the elevation of the second reservoir. In some embodiments, the pressure difference between the pressure of LDF in the LDF pipe or riser pipe and the adjacent body of water at about the same elevation may decrease with greater water depth, or decreasing elevation. In some embodiments, the pressure of the LDF may be greater than the pressure of the adjacent body of water or fluid at the point of greatest pressure difference between the pressure of the LDF and the pressure of adjacent body of water or fluid at about the same elevation.

In some embodiments, the LDF pump and/or LDF turbine may be located near second reservoir or at an elevation about the same as the second reservoir. In some embodiments, some considerations may include, but are not limited to, one or more or any combination of the following:

In some embodiments, locating the LDF pump and/or LDF turbine near the second reservoir may enable the pressure of LDF near the surface or near the first reservoir to be about the same as atmospheric pressure. In some embodiments, locating the LDF pump and/or LDF turbine near the second reservoir may enable the pressure of LDF near the surface or near the first reservoir to be about the same as atmospheric pressure, which may be desirable due to, for example, safety and maintenance.

In some embodiments, if the LDF pump and/or turbine may be located at about the same elevation as the second reservoir, the pipe or riser pipe between the LDF pump and/or turbine and the second reservoir may possess the greatest pressure difference between the LDF and adjacent body of water or fluid at an elevation about the same as the elevation of the LDF pump and/or turbine or the elevation of the second reservoir and/or the least pressure difference between the LDF and adjacent body of water or fluid at the same elevation at an elevation about the same as the elevation of the first reservoir. In some embodiments, the pressure difference between the pressure of LDF in the LDF pipe or riser pipe and the adjacent body of water at about the same elevation may increase with greater water depth, or decreasing elevation. In some embodiments, the pressure of the LDF may be less than the pressure of the adjacent body of water or fluid at the point of greatest pressure difference between the pressure of the LDF and the pressure of adjacent body of water or fluid at about the same elevation.

In some embodiments, locating the LDF pump and/or LDF turbine near the second reservoir may enable the volumetric flow rate of LDF exiting the LDF pump to be about the same as the volumetric flow rate of LDF entering the second reservoir. In some embodiments, locating the LDF pump and/or LDF turbine near the second reservoir may enable the volumetric flow rate of LDF exiting the second reservoir to be about the same as the volumetric flow rate of LDF entering the LDF turbine.

In some embodiments, locating the LDF pump and/or LDF turbine near the second reservoir may enable large power producing or power consuming electrical components to be located subsea or on or near the seafloor. In some embodiments, locating at least a portion of large power producing or power consuming electrical components on or near the seafloor may be desirable because it may reduce or prevent the need for a high power dynamic power cable, or may reduce the required power capacity of a dynamic power cable. In some embodiments, by locating at least a portion of large power producing or power consuming electrical components, such as a pump or turbine or generator, on or near the seafloor, power may be supplied by a subsea or submarine power cable. In some embodiments, a dynamic power cable may be required due to, for example, a requirement for at least a portion of an electrical substation to be located above the surface of the water or to comprise a floating substation, or a significant power consuming or producing process floating on a floating structure, such as, for example, including, but not limited to, one or more or any combination of the following: a desalination system, or a chemical or fuel production process, or an oil & gas processing process, or an FPSO, or a floating wind turbine, or an ocean or sea current generator, or a wave generator.

In some embodiments, a dynamic power cable may be employed In some embodiments, a Dynamic Power Cable may be required for potential power needs or power sources, for example, which may include, but are not limited to, one or more or any combination of the following: electrical substations, or electrical switchgear, or desalination, or utilities, or power for crew or personnel, or power for crew quarters, or communication equipment, or gas processing, or oil & gas processing, or hydrogen production, or chemical production, or ammonia production, or chemical storage, or methanol production, or e-fuel production, or e-chemical production, or storage systems, or vapor recompression systems, or inert gas systems, or cooling systems, or heating systems, or maintenance systems, or monitoring systems, a desalination system, or a chemical or fuel production process, or an oil & gas processing process, or an FPSO, or a floating wind turbine, or an ocean or sea current generator, or a wave generator.

The pressure or volume of the LDF or HDF entering or exiting the second reservoir and/or other parts of the system may be influenced by some complex factors, which may include, but are not limited to, one or more or any combination of the following: pressure drop, or frictional losses, or thermal losses, or the change in volumetric flow rate with depth due to the change in pressure and bulk modulus of the LDF as it is transferred from the pump to the second reservoir, or the change in frictional losses or pressure drop due to the change in volumetric flow rate, or the potential change in temperature of the LDF, or the potential change in density of the LDF, or the potential change in viscosity of the LDF. To ensure relatively accurate measurement and/or control or adjustment of the pressures and/or volumetric flow rates of LDF and/or HDF, it may be desirable to employ temperature sensors, or pressure sensors, or flow meters, or flow controllers, or any combination thereof at multiple points in the system, which may include, but are not limited to, connected to or interfacing with the pipe or conduit transferring LDF between the first reservoir and the pump and/or turbine, or connected to or interfacing with the pipe or conduit transferring LDF between the pump and/or turbine and the second reservoir, or connected to or interfacing with the second reservoir, or connected to or interfacing with the first reservoir, or any combination thereof. To ensure relatively accurate real-time or near-real-time prediction and/or control or adjustment of the pressures and/or volumetric flow rates of LDF and/or HDF, it may be desirable to interface or gather data generated by sensors or other equipment with a computer and/or create and/or utilize a computer model, such as a machine learning model or Artificial Intelligence model, to predict, or adjust, or control, or any combination thereof the volumetric flow rates, or pressures, or mass flow rates, or other system parameter, or any combination thereof, for example, in accordance with the desired demands or objectives of the system. In some embodiments, said desired demands or objectives may be human generated, or computer generated, or any combination thereof.

In some embodiments, it may be desirable to increase energy storage efficiency, and/or power output and/or round-trip efficiency by cooling LDF or HDF before, or during, or after, or any combination thereof pumping, and/or heating LDF or HDF before, or during, or after, or any combination thereof generating power or passing through a turbine. For example, in some embodiments, by cooling an LDF or HDF before, or during, or after, or any combination thereof pumping, the volume of LDF or HDF being pumped may be lower for a given mass flow rate of LDF due to the generally greater density of most fluids, including most liquids, with lower temperature. In some embodiments, because pressure multiplied by volume may equal energy, cooling a given mass of LDF or HDF before or during pumping or transferring of the LDF or HDF may reduce the energy consumed or required to transfer LDF or HDF. In some embodiments, because pressure multiplied by volume may equal energy, cooling a given mass of LDF or HDF before or during pumping or transferring of the LDF or HDF may reduce the energy consumed or required to transfer LDF or HDF by, for example, reducing the required volume for a given mass flow rate of LDF or HDF. For example, in some embodiments, by heating the LDF or HDF before, or during, or after, or any combination thereof generating power or passing through a turbine, the volume of LDF or HDF being employed to generate power may be greater for a given mass flow rate of LDF or HDF due to the generally lower density of most fluids, including liquids, with greater temperature. For example, in some embodiments, by heating an LDF or HDF before, or during, or after, or any combination thereof generating power or passing through a turbine, the volume of LDF or HDF may increase for the same mass flow rate and/or because pressure multiplied by volume equals energy, increasing the volume of LDF may increase power output and/or round trip energy efficiency and/or total energy output.

In some embodiments, the pressure and/or volumetric flow rate of LDF in one part of the system may be different from the pressure and/or volumetric flow rate of LDF in another part of the system. In some embodiments, the pressure and/or volumetric flow rate of LDF in one part of the system may be different from the pressure and/or volumetric flow rate of LDF in another part of the system, even if the mass flow rates of LDF are the same. In some embodiments, the pressure and/or volumetric flow rate of HDF in one part of the system may be different from the pressure and/or volumetric flow rate of HDF in another part of the system. In some embodiments, the pressure and/or volumetric flow rate of HDF in one part of the system may be different from the pressure and/or volumetric flow rate of HDF in another part of the system, even if the mass flow rates of HDF are the same. The pressure of the LDF and/or HDF at a given point in the system may be influenced by complex factors, which may include, but are not limited to, one or more or any combination of the following: the change in fluid pressure due to friction factors or pressure drop, or the change in volumetric flow rate with depth due to the change in pressure and bulk modulus, or the change in volumetric flow rate with a change in pressure due to the bulk modulus or temperature, or the change in frictional losses or pressure drop due to the change in volumetric flow rate, or the difference in bulk modulus between HDF and LDF, or the difference in the influence of temperature on the density of HDF and LDF, or the difference in flow rate between LDF and HDF if any, or latencies or delays in flow rate changes between HDF and LDF, or differences in equipment specification or performance between LDF equipment and HDF equipment, or the difference in pressure between HDF and LDF at various points in the system, or the potential change in temperature of the LDF or HDF, or the potential change in density of the LDF or HDF, or the potential change in viscosity of the LDF or HDF. To ensure relatively accurate measurement and/or control or adjustment of the pressures and/or volumetric flow rates of LDF and/or HDF, it may be desirable to employ temperature sensors, or pressure sensors, or flow meters, or flow controllers, or any combination thereof at multiple points in the system, which may include, but are not limited to, connected to or interfacing with the pipe or conduit transferring LDF between the first reservoir and the pump and/or turbine, or connected to or interfacing with the pipe or conduit transferring LDF between the pump and/or turbine and the second reservoir, or connected to or interfacing with the second reservoir, or connected to or interfacing with the first reservoir, connected to or interfacing with the pipe or conduit transferring HDF between the second reservoir and the pump and/or turbine, or connected to or interfacing with the pipe or conduit transferring HDF between the pump and/or turbine and the first reservoir, or connected to or interfacing with the first reservoir, or connected to or interfacing with the second reservoir, or any combination thereof. To ensure relatively accurate real-time or near-real-time prediction and/or control or adjustment of the pressures and/or volumetric flow rates of LDF and/or HDF, it may be desirable to interface or gather data generated by sensors or other equipment with a computer and/or create and/or utilize a computer model, such as a machine learning model or Artificial Intelligence model, to predict, or adjust, or control, or any combination thereof the volumetric flow rates, or pressures, or mass flow rates, or other system parameter, or any combination thereof, for example, in accordance with the desired demands or objectives of the system. In some embodiments, said desired demands or objectives may be human generated, or computer generated, or any combination thereof.

In some embodiments, the LDF pump, turbine, or generator may have different properties or specifications from the HDF pump, turbine, or generator, which may include, but are not limited to, one or more or any combination of the following: different ramp-up rates, or different ramp down rates, or different energy efficiency curves, or different variable flow rate, or different full load efficiency, or different partial load efficiency, or response time, or number of units, or size of units, or rotating inertia, or location, or pressure rating, or number of stages. In some embodiments, latencies may exist between one or more points in the system. For example, during ramping up or ramping down, it may take time, such as, for example, time in seconds, for changes in volumetric flow rate and/or pressure in one point of the system to travel or transfer to other points in the system. For example, in some embodiments, it may require 1-3 seconds for changes in flow rate or pressure in system components or LDF or HDF at about the same elevation as the first reservoir to transfer or travel to the system components or LDF or HDF at about the same elevation as the second reservoir. In some embodiments, the time required for changes in volumetric flow rate or pressure in one point of the system to another point in the system may be dependent on, for example, including but not limited to, one or more or any combination of the following: the speed of sound, or the speed of sound in the LDF or HDF or a system component, or the response time of a pump or turbine or flow controller or valve, or the ramp up rate of a pump or turbine or flow controller or valve, or the ramp down rate of a pump or turbine or flow controller or valve. For example, volumetric flow rates and/or pressures may be at least partially desynchronized during at least a portion of ramping up or ramping down storing power or generating power. For example, volumetric flow rates and/or pressures may be difficult to synchronize during steady state charging or discharging, which may be at least partially corrected by switching between volumetric flow rates greater than the desired volumetric flow rate and volumetric flow rates less than the desired volumetric flow rate, such that the cumulative volumetric flow or average volumetric flow rate is about the same as the desired volumetric flow rate. For example, in some embodiments, the volume of HDF or LDF or both in the second reservoir may change. For example, in some embodiments, the volume of HDF or LDF or both in the second reservoir may change, even when mass flows of LDF or HDF into or out of the second reservoir may be paused. For example, the volume of fluid, such as LDF or HDF, in the second reservoir may change from changes in temperature. For example, in some embodiments, LDF or HDF may cool while in the second reservoir tank, which may result in the total volume of LDF or HDF decreasing. For example, the density of water may increase by about 0.5% if cooled from 30° C. to 4° C. while remaining at the same pressure. For example, the density of ethanol may increase by about 2.8% if cooled from 30° C. to 4° C. while remaining at the same pressure. Some of the aforementioned factors and/or other factors may result in imperfect or inexact synchronization of volumetric flow rates or volumes of LDF or HDF at various points in the system, or during a stage of operation, or any combination thereof. For example, in some embodiments, buffer tanks, or subsea compensators, or bladder tanks, which may be interconnected or fluidly connected to the second reservoir, or the first reservoir, or one or more pipes or conduits or equipment, may be employed. For example, in some embodiments, a buffer tank, or a subsea compensator, or a bladder tank, or any combination thereof, which may be interconnected or fluidly connected to the second reservoir, or the first reservoir, or one or more pipes or conduits or equipment, may be employed for example, to compensate for inexact synchronization of volumetric flow rates or volumes and/or pressures, or deviations in volumetric flow rates or volumes and/or pressures, or changes in volumetric flow rates or volumes and/or pressures.

In some embodiments, multivariable or multivariate models may be employed to predict, or adjust, or control the relationships between the power, or mass flow rate, or volumetric flow rate, or pressure, or temperature, or other parameter, or any combination thereof at a first point in the system and the power, or mass flow rate, or volumetric flow rate, or pressure, or temperature, or other parameter or any combination thereof at a second point in the system. In some embodiments, multivariable or multivariate models may be employed to predict, or adjust, or control the relationships between adjusting the power, or mass flow rate, or volumetric flow rate, or pressure, or temperature, or other parameter, or any combination thereof at a first point in the system and the power, or mass flow rate, or volumetric flow rate, or pressure, or temperature, or other parameter or any combination thereof at a second point in the system. In some embodiments, a machine learning model may be trained using sensor data and/or may improve accuracy of predictions, or adjustments, or controls due to, for example, the potential complexity in achieving high accuracy. In some embodiments, multivariable or multivariate models may be combined or interfaced with machine learning models.

In some embodiments, data from one or more sensors or equipment may be transferred to a network or computer using communication cables, or fiber optic cables, or using electromagnetic transmission, or acoustic transmission, or any combination thereof. In some embodiments, computation and/or computer communication may be conducted on-site, or using on-site computers. For example, in some embodiments, computational servers or computers may be located on a floating vessel, or on a floating vessel comprising the first reservoir, or on land, or subsea, or on the seafloor, or any combination thereof. In some embodiments, a dynamic fiber optic cable, or a dynamic communication cable may transfer subsea data collection with computational servers or computers, or long distance communication equipment, such as satellite communication devices, which may be located on a floating vessel comprising the first reservoir. In some embodiments, or submarine fiber optic cables may transfer collected data to an offsite and/or onsite control room, or cloud network interface, or any combination thereof. In some embodiments, computation and/or computer communication may interface with or be conducted on a cloud or an offsite computer network. In some embodiments, machine learning model training and/or other computationally intensive tasks may be conducted in the cloud or on an offsite computer network, and/or controls or automated controls or operational computations may be conducted on-site. In some embodiments, updated machine learning models, or multivariable or multivariate models, or any combination thereof may be transferred to computers onsite using, for example, over-the-air updates, or transfer of new or updated models from offsite to onsite computers using wired and/or wireless communication methods, or on-site model development, or on-site model updates, or other software or model updates, or any combination thereof.

In some embodiments, the flow rate of LDF entering a reservoir may be greater than the flow rate of HDF exiting a reservoir. In some embodiments, the flow rate of HDF entering a reservoir may be greater than the flow rate of LDF exiting a reservoir. In some embodiments, the total volume of LDF+HDF in a reservoir may increase. In some embodiments, the total volume of LDF+HDF in a reservoir may decrease.

In some embodiments, the flow rate of LDF entering the second reservoir may be greater than the flow rate of HDF exiting the second reservoir. In some embodiments, the flow rate of HDF entering the second reservoir may be greater than the flow rate of LDF exiting the second reservoir. In some embodiments, the total volume of LDF+HDF in a second reservoir may increase. In some embodiments, the total volume of LDF+HDF in a second reservoir may decrease. In some embodiments, a buffer tank, or a subsea compensator, or a bladder tank, or any combination thereof may be fluidly connected to a rigid subsea tank comprising the second reservoir. In some embodiments, a buffer tank, or a subsea compensator, or a bladder tank, or any combination thereof may be fluidly connected to a rigid subsea tank comprising the second reservoir to, for example, enable the total volume of HDF+LDF the second reservoir to change, such as decrease or increase, while enabling the second reservoir to remain at about the same pressure as the adjacent body of water at the same elevation, or to enable the second reservoir to remain at about the same pressure. In some embodiments, said buffer tank, or a subsea compensator, or a bladder tank, or any combination thereof may be fluidly connected to the rigid subsea tank by a pipe or other fluid conduit. In some embodiments, said buffer tank, or a subsea compensator, or a bladder tank, or any combination thereof may store LDF, or HDF, or any combination thereof. In some embodiments, a flow meter, or a flow controller, or a valve, or pressure sensor, or any combination thereof may be fluidly connected to said pipe or other fluid conduit between the rigid subsea tank and the buffer tank, or a subsea compensator, or a bladder tank, or any combination thereof and/or may measure or control the volume of LDF or HDF entering or exiting the buffer tank, or a subsea compensator, or a bladder tank, or any combination thereof. In some embodiments, a buffer tank, or a subsea compensator, or a bladder tank, or any combination thereof connected to the a rigid subsea tank by a pipe or other conduit with fluidly connected flow meter, or a flow controller, or a valve, or pressure sensor, or any combination thereof may comprise an effective and/or passive method for determining mismatches in LDF or HDF volumetric flows, and/or changes in stored volume, even if said mismatches may be missed or unanticipated by computational models, or other sensors, or other equipment. In some embodiments, measuring and monitoring flow rates of LDF or HDF into or out of buffer tanks may comprise an effective method or an additional check for determining the state of volumetric flows and fluid pressures in the system. In some embodiments, a buffer tank, or a subsea compensator, or a bladder tank, or any combination thereof may comprise less than or equal to 10% of the total volumetric storage capacity of the second reservoir or the lower elevation reservoir. In some embodiments, a buffer tank, or a subsea compensator, or a bladder tank, or any combination thereof may comprise less than or equal to one or more or any combination of the following: 0.1%, or 1%, or 2%, or 3%, or 4%, or 5%, or 6%, or 7%, or 8%, or 9%, or 10%, or 11%, or 12%, or 13%, or 14%, or 15%, or 20%, or 30%, or 40%, or 50% of the total volumetric storage capacity of the second reservoir or the lower elevation reservoir.

In some embodiments, fluid may be transferred into a buffer tank, or a subsea compensator, or a bladder tank, or any combination thereof by transferring a greater volume of LDF into the second reservoir than the volume of HDF being transferred out of the second reservoir. In some embodiments, fluid may be added to a buffer tank, or a subsea compensator, or a bladder tank, or any combination thereof by transferring a greater volume of HDF into the second reservoir than the volume of LDF being transferred out of the second reservoir. In some embodiments, fluid may be added to a buffer tank, or a subsea compensator, or a bladder tank, or any combination thereof by transferring LDF and HDF into the second reservoir. In some embodiments, fluid may be transferred into a buffer tank, or a subsea compensator, or a bladder tank, or any combination thereof by increasing the total volume of fluid in the second reservoir.

In some embodiments, fluid may be transferred out of a buffer tank, or a subsea compensator, or a bladder tank, or any combination thereof by transferring a lower volume of LDF into the second reservoir than the volume of HDF being transferred out of the second reservoir. In some embodiments, fluid may be added to a buffer tank, or a subsea compensator, or a bladder tank, or any combination thereof by transferring a lower volume of HDF into the second reservoir than the volume of LDF being transferred out of the second reservoir. In some embodiments, fluid may be transferred into a buffer tank, or a subsea compensator, or a bladder tank, or any combination thereof by transferring LDF and HDF into the second reservoir. In some embodiments, fluid may be transferred from or out of a buffer tank, or a subsea compensator, or a bladder tank, or any combination thereof by increasing the total volume of fluid in the second reservoir.

In some embodiments, it may be desirable to add fluid to or remove fluid from a buffer tank, or a subsea compensator, or a bladder tank, or any combination thereof. For example, in some embodiments, before charging or discharging, it may be desirable for the buffer tank, or a subsea compensator, or a bladder tank, or any combination thereof to store fluid at partial capacity of the buffer tank, or a subsea compensator, or a bladder tank, or any combination thereof, which may comprise less fluid than the maximum storage capacity and more fluid than the minimum storage capacity. For example, in some embodiments, said partial capacity state may be desirable to ensure a buffer tank, or a subsea compensator, or a bladder tank, or any combination thereof may passively or actively add fluid to the second reservoir during an under-pressure event or if a greater volume of fluid is exiting the second reservoir than entering the second reservoir, or may passively or actively remove fluid or transfer fluid from the second reservoir during an over-pressure event or if a greater volume of fluid is entering the second reservoir than exiting the second reservoir. For example, in some embodiments, it may be desirable to remove fluid from a from a buffer tank, or a subsea compensator, or a bladder tank, or any combination thereof, which may be due to, for example, the accumulation of fluid in the bladder tank during charging, or discharging, or both. For example, in some embodiments, it may be desirable to add fluid to a buffer tank, or a subsea compensator, or a bladder tank, or any combination thereof which may be due to, for example, the transfer of fluid out of a buffer tank, or a subsea compensator, or a bladder tank, or any combination thereof of fluid in the bladder tank during charging, or discharging, or both.

In some embodiments, it may be important to at least partially synchronize LDF and HDF total volumetric flows during charging and/or discharging to, for example, enable the second reservoir to be a closed system and/or to enable the second reservoir to be of a relatively smaller or reduced volumetric capacity due to the displacing of LDF and HDF during storing power and generating power.

In some embodiments, adding fluid to a buffer tank, or a subsea compensator, or a bladder tank, or any combination thereof may comprise:
  Pumping a greater volume of LDF into the subsea tank than the volume of HDF being pumped out of the subsea tank. Pumping LDF into the subsea tank at a greater volumetric flow rate than the volumetric flow rate of HDF being pumped from the subsea tank; or
  Allowing a greater volume of HDF to enter the subsea tank than the volume of LDF allowed to exit the subsea tank. Allowing the volumetric flow rate of HDF entering the subsea tank to be greater than the volumetric flow rate of LDF exiting the subsea tank.

In some embodiments, removing fluid from a buffer tank, or a subsea compensator, or a bladder tank, or any combination thereof may comprise:
  Pumping a greater volume of HDF out of the subsea tank than the volume of LDF pumped into of the subsea tank. Pumping HDF from the subsea tank at a greater volumetric flow rate than the volumetric flow rate of LDF entering the subsea tank; or
  Allowing a greater volume of LDF to exit the subsea tank than the volume of HDF allowed to enter the subsea tank. Allowing the volumetric flow rate of LDF exiting the subsea tank to be greater than the volumetric flow rate of HDF entering the subsea tank.

In some embodiments, adding fluid to a buffer tank, or a subsea compensator, or a bladder tank, or any combination thereof may comprise:
  For example, closing an HDF valve and opening an LDF valve. Pumping or otherwise transferring a portion of LDF from, for example, the first reservoir into, for example, the second reservoir. For example, in some embodiments, by transferring a portion of LDF into the second reservoir while preventing the transfer of a portion of HDL from the second reservoir, such as due to a closed HDL valve, the total volume of stored fluid in the second reservoir may increase. For example, in some embodiments, by transferring a portion of LDF into the second reservoir while preventing the transfer of a portion of HDL from the second reservoir, such as due to a closed HDL valve, the total volume of stored fluid in the second reservoir, which may include a fluidly connected buffer tank, or a subsea compensator, or a bladder tank, or any combination thereof, may increase.
  For example, closing an LDF valve and opening an HDF valve. Allowing or otherwise transferring a portion of HDF from, for example, the first reservoir into, for example, the second reservoir. For example, in some embodiments, by transferring a portion of HDF into the second reservoir while preventing the transfer of a portion of LDL from the second reservoir, such as due to a closed HDL valve, the total volume of stored fluid in the second reservoir may increase. For example, in some embodiments, by transferring a portion of HDF into the second reservoir while preventing the transfer of a portion of LDL from the second reservoir, such as due to a closed HDL valve, the total volume of stored fluid in the second reservoir, which may include fluidly connected buffer tank, or a subsea compensator, or a bladder tank, or any combination thereof, may increase.
  For example, transferring a portion of LDF and/or HDF into, for example, the second reservoir such that the total volume of stored fluid in the second reservoir increases. For example, in some embodiments, by transferring a portion of LDF and HDF into the second reservoir, the total volume of stored fluid in the second reservoir may increase. For example, in some embodiments, by transferring a portion of LDF and HDF into the second reservoir, the total volume of stored fluid in the second reservoir, which may include an attached buffer tank, or a subsea compensator, or a bladder tank, or any combination thereof, may increase.

In some embodiments, removing fluid to a buffer tank, or a subsea compensator, or a bladder tank, or any combination thereof may comprise:

For example, closing an HDF valve and opening an LDF valve. Allowing or otherwise transferring a portion of LDF from, for example, the second reservoir into, for example, the first reservoir. For example, in some embodiments, by transferring a portion of LDF from the second reservoir while preventing the transfer of a portion of HDL into the second reservoir, such as due to a closed HDL valve, the total volume of stored fluid in the second reservoir may decrease. For example, in some embodiments, by transferring a portion of LDF from the second reservoir while preventing the transfer of a portion of HDL into the second reservoir, such as due to a closed HDL valve, the total volume of stored fluid in the second reservoir, which may include a fluidly connected buffer tank, or a subsea compensator, or a bladder tank, or any combination thereof, may decrease.

For example, closing an LDF valve and opening an HDF valve. Pumping or otherwise transferring a portion of HDF from, for example, the second reservoir into, for example, the first reservoir. For example, in some embodiments, by transferring a portion of HDF out of the second reservoir while preventing the transfer of a portion of LDL into the second reservoir, such as due to a closed HDL valve, the total volume of stored fluid in the second reservoir may decrease. For example, in some embodiments, by transferring a portion of HDF from the second reservoir while preventing the transfer of a portion of LDL into the second reservoir, such as due to a closed HDL valve, the total volume of stored fluid in the second reservoir, which may include fluidly connected buffer tank, or a subsea compensator, or a bladder tank, or any combination thereof, may decrease.

For example, transferring a portion of LDF and/or HDF from, for example, the second reservoir such that the total volume of stored fluid in the second reservoir decreases. For example, in some embodiments, by transferring a portion of LDF and HDF from the second reservoir, the total volume of stored fluid in the second reservoir may decrease. For example, in some embodiments, by transferring a portion of LDF and HDF from the second reservoir, the total volume of stored fluid in the second reservoir, which may include an attached buffer tank, or a subsea compensator, or a bladder tank, or any combination thereof, may decrease.

Floating Barrier or Divider

In some embodiments, a storage reservoir may be configured to store a first fluid, a second fluid, and a third fluid. For example, in some embodiments, a storage reservoir may be configured to store a first fluid, a second fluid, and a third fluid, wherein the second fluid has a density greater than the density of the first fluid and the third fluid, wherein the third fluid has a density greater than the first fluid, and the first fluid has a density lower than the density of the second fluid and third fluid. For example, in some embodiments, a storage reservoir may be configured to store a first fluid, a second fluid, and a third fluid, wherein the second fluid (e.g. high density liquid, or HDL) has a density greater than the first fluid (e.g. low density liquid, or LDL), and wherein the third fluid (e.g. medium density liquid, or MDL) has a density greater than the density of the first fluid and lower than the density of the second fluid.

In some embodiments, one or more or any combination of the first fluid, or the second fluid, or third fluid may comprise a liquid, or solid-liquid mixture, or an emulsion, or a suspension, or a gas, or a supercritical fluid, or any combination thereof. In some embodiments, one or more or any combination of the first fluid, or the second fluid, or third fluid may comprise a liquid or liquid phases.

In some embodiments, the third fluid may form a layer between the first fluid and second fluid, wherein said layer comprising third fluid may comprise a barrier or divider, which may comprise a liquid floating barrier or divider. For example, in some embodiments, the "Floating Barrier" in FIG. 3 and FIG. 4 may comprise a third fluid or a third fluid layer or a third fluid comprising a liquid. In some embodiments, a liquid phase barrier or divider may be desirable because, for example, a liquid phase divider or barrier may minimize the potential surface area or contact area or direct liquid-liquid interface between the first fluid and second fluid in a storage reservoir or other storage or transport region. In some embodiments, a liquid phase barrier or divider may be desirable because, for example, a liquid phase divider or barrier may possess lower risk for friction related movement issues, such as getting 'stuck' or undesired non-symmetrical movement, relative to, for example, a solid barrier or divider.

In some embodiments, it may be desirable to employ a barrier or divider or a floating barrier or divider in a storage reservoir possessing minimal or minimized motion. In some embodiments, it may be desirable to employ a liquid barrier or divider in a storage reservoir possessing minimal or minimized motion. For example, a reservoir undergoing significant motion or uncontrolled dynamic movements may resulting in undesirable sloshing or mixing, which may result in greater rates of mixing of the first fluid and second fluid, or dispersion or mixing of a third fluid or a liquid barrier, or reduced effectiveness of the floating barrier or divider, or any combination thereof. For example, it may be desirable for a reservoir employing a barrier or divider or a floating barrier or divider to comprise one or more or any combination of the following: a fixed structure, or a limited motion floating structure, or a tethered buoyant structure, or a motion restricted floating structure, or motion dampened floating structured, or motion compensated floating, or tethered floating structure, or seabed positioned structure, or land-based structure, or seabed-based structure, or any combination thereof.

In some embodiments, a third fluid may be positioned or located between the first fluid and second fluid in a storage reservoir. The position or elevation of the third fluid layer, which may comprise a liquid divider or barrier, may move with changes in the liquid level and/or volume of the second fluid in a storage reservoir, or changes in the hypothetical liquid-liquid interface, or any combination thereof. In some embodiments, a liquid divider or barrier comprising a third fluid may be located between a first fluid and a second fluid in a storage reservoir. The position or elevation of the third fluid, which may comprise a liquid divider or barrier, may move with changes in the liquid level and/or volume of the second fluid in a storage reservoir, or changes in the hypothetical liquid-liquid interface, or any combination thereof. For example, if the volume of second fluid in a storage reservoir increases, which may increase the liquid level of the second fluid in the storage reservoir, the elevation of the third fluid layer may rise or increase. In some embodiments, the third fluid may float on or above the second fluid in a storage tank, which may enable the position or elevation of the third fluid to adjust or change with changes in the liquid level of the second fluid in the storage reservoir. In some embodiments, the change or mobility in the liquid level or elevation of the third fluid layer or divider or barrier may occur naturally or passively in relationship or correlation with changes in the fluid level or elevation of the second fluid in a storage reservoir.

In some embodiments, the first fluid may be soluble in the second fluid, or the second fluid may be soluble in the first fluid, or any combination thereof. In some embodiments, it may be desirable to minimize contact or mixing of the first and second fluids. In some embodiments, it may be desirable to minimize contact or mixing of the first and second fluids, if, for example, the first fluid and second fluid may be stored in the same tank or reservoir. In some embodiments, a third fluid may be employed or present in the storage tank or reservoir, wherein the third fluid may have a density greater than the density of the first fluid and lower than the density of the second fluid. The third fluid may be located or may float above or on the second fluid and/or may be located below the first fluid and/or the first fluid may float above or on the third fluid. In some embodiments, the third fluid may comprise a floating barrier or divider. In some embodiments, the third fluid may be insoluble in or possess a low solubility in the first fluid and/or second fluid. In some embodiments, the third fluid may reduce or prevent or minimize the potential mixing or contact between the first fluid and the second fluid. For example, in some embodiments, the first fluid may comprise a low salinity water or solution, such as freshwater, or brackish water, or a solution with a salinity lower than the salinity of the second fluid, or any combination thereof, and/or the second fluid may comprise a high salinity water or solution, such as a brine, and/or the third fluid may comprise an oil or hydrophobic fluid which may be practically insoluble or possesses a low solubility in the first and/or second fluid and/or the third fluid may possess a density greater than the density of the first fluid and less than the density of the second fluid. For example, in some embodiments, the first fluid may comprise a water soluble organic solvent, such as ethanol or methanol and/or the second fluid may comprise a high salinity water or solution, such as a brine, and/or the third fluid may comprise an oil or hydrophobic fluid which may be practically insoluble or possesses a low solubility in the first and/or second fluid and/or the third fluid may possess a density greater than the density of the first fluid and less than the density of the second fluid. For example, in some embodiments, the first fluid may comprise a water soluble organic solvent, such as ethanol or methanol and/or the second fluid may comprise a low salinity water, such as freshwater, or brackish water, or seawater, or a solution with a similar density to seawater, and/or the third fluid may comprise an oil or hydrophobic fluid which may be practically insoluble or possesses a low solubility in the first and/or second fluid and/or the third fluid may possess a density greater than the density of the first fluid and less than the density of the second fluid. In some embodiments, it may be desirable for the volume of the third fluid to be sufficient to cover at least a portion of the cross sectional area of a tank or reservoir, or the surface area of the surface of the second fluid in a tank or reservoir. For example, in some embodiments, it may be desirable for the volume of the third fluid to be sufficient to cover at least 10%, or 20%, or 30%, or 40%, or 50%, or 60%, or 70%, or 80%, or 90%, or 95%, or 99%, or 100% of the cross sectional area of a tank or reservoir, or the surface area of the surface of the second fluid in a tank or reservoir. For example, in some embodiments, it may be desirable for the liquid layer comprising the third fluid or the floating barrier or divider comprising the third fluid to possess a thickness greater than or equal to 0.1 inch, 0.2 inch, or 0.25 inch, 0.5 inch, or 0.75 inch, or 1 inch, or 2 inches, or 3 inches, or 4 inches, or 5 inches, or 6 inches, or 7 inches, or 8 inches, or 9 inches, or 10 inches, or 11 inches, or 12 inches, or 1.5 feet, or 2 feet, or 2.5 feet, or 3 feet, or 4 feet, or 5 feet, or 6 feet, or 7 feet, or 8 feet, or 9 feet, or 10 feet, or any combination thereof.

In some embodiments, the floating barrier or divider may comprise solid objects with a density greater than the density of the first fluid and less than the density of the second fluid. In some embodiments, said objects may be insoluble or practically insoluble in the first fluid or second fluid. In some embodiments, greater than 10, or greater than 100, or greater than 1,000 objects may be present in a single reservoir or a single tank. In some embodiments, greater than 10, or greater than 100, or greater than 1,000 objects may be present in a single reservoir or a single tank at a liquid-liquid interface or hypothetical liquid-liquid interface between a first fluid and a second fluid. In some embodiments said objects may be non-homogeneous or a variety of different shapes and sizes. In some embodiments, said objects may be nearly homogeneous. For example, the floating barrier or divider may comprise multiple small spheres with a customized density or with a density greater than the density of the first fluid and less than the density of the second fluid. For example, said spheres may be a diameter less than, or greater than, or equal to one or more or any combination of the following: 0.1 cm, or 0.5 cm, or 1 cm, or 2 cm, or 3 cm, or 4 cm, or 5 cm, or 6 cm, or 7 cm, or 8 cm, or 9 cm, or 10 cm, or 15 cm, or 20 cm, or 25 cm, or 30 cm, or 40 cm, or 50 cm. For example, in some embodiments, it may be desirable for the said spheres to occupy or cover at least 10%, or 20%, or 30%, or 40%, or 50%, or 60%, or 70%, or 80%, or 90%, or 95%, or 99%, or 100% of the cross sectional area of a tank or reservoir, or the surface area of the surface of the second fluid in a tank or reservoir, or the surface area of the hypothetical liquid-liquid interface between the first fluid and the second fluid, or the volume or surface area of the cline or salinity cline or mixing zone between the first and second fluid, or any combination thereof.

Regeneration or Recovery of LDL from HDL or HDL from LDL

In some embodiments, the first fluid or lower density fluid (LDF) or lower density liquid (LDL) may be soluble in the second fluid or higher density fluid (HDF) or higher density liquid (HDL). In some embodiments, systems and methods may be employed to minimize or prevent the mixing or dissolution of the first fluid in the second fluid or second fluid in the first fluid. For example, some embodiments may employ or comprise one or more or any combination of the following: a barrier or divider, or a third fluid comprising a barrier or divider, or barrier or divider comprising multiple solid objects, or diffuser system, or cline, or isolated storage, or any combination thereof. However, even in embodiments employing systems and methods for minimizing or preventing mixing or dissolution of the first fluid in the second fluid or second fluid in the first fluid, some mixing or dissolution of at a portion of the first fluid and second fluid may occur.

Some embodiments may comprise systems and methods for recovering or regenerating chemicals or components from one fluid which may have dissolved in another fluid. Some embodiments may comprise systems and methods for recovering or regenerating first fluid from second fluid, or second fluid from first fluid, or any combination thereof. For example, in some embodiments, a portion of second fluid may dissolve in a portion of first fluid, or a portion of first fluid may dissolve in a portion of second fluid, or any combination thereof. In some embodiments, regenerating or recovery may comprise removing or separating at least a portion of the second fluid or the chemical constituents of the second fluid from the first fluid and transferring or adding said removed or separated second fluid or the chemical constituents of the second fluid to at least a portion of the second fluid. In some embodiments, regenerating or recovery may comprise removing or separating at least a portion of the first fluid or the chemical constituents of the first fluid from the second fluid and transferring or adding said removed or separated first fluid or the chemical constituents of the second fluid to at least a portion of the second fluid. For example, if a first fluid comprises freshwater and a second fluid comprises brine, and a portion of first fluid dissolves in the second fluid and a portion of second fluid dissolves in first fluid, the salt concentration or salinity of the first fluid may increase, while the salt concentration or salinity of the second fluid may decrease. For example, in some embodiments, the salinity of the first fluid and second fluid may be measured and/or monitored. In some embodiments, it may be desirable for the first fluid to have a salinity below a defined salinity or salinity range and/or it may be desirable for the first fluid to have a salinity above a defined salinity or salinity range. For example, in some embodiments, it may be desirable for the first fluid to have a salinity below a certain range to, for example, including but not limited to, one or more or any combination of the following: maintain a desired density range, or for chemical compatibility, or for viscosity, or for ensure the first fluid is within certain system design parameters or constraints. For example, in some embodiments, it may be desirable for the first fluid to have a salinity above a certain range to, for example, including but not limited to, one or more or any combination of the following: optimize or minimize parasitic energy consumption associated with regeneration or recovery, or optimize or minimize capital cost or CAPEX or sizing associated with regeneration or recovery equipment, or to maintain a desired density range, or for chemical compatibility, or for viscosity, or to ensure the first fluid is within certain system design parameters or constraints. For example, in some embodiments, it may be desirable for the second fluid to have a salinity below a certain range to, for example, including but not limited to, one or more or any combination of the following: maintain a desired density range, or for chemical compatibility, or for viscosity, or for ensure the first fluid is within certain system design parameters or constraints, or ensure the solution remains within solubility limits, or to prevent crystallization, or to prevent precipitation, or to prevent solid formation. For example, in some embodiments, it may be desirable for the second fluid to have a salinity above a certain range to, for example, including but not limited to, one or more or any combination of the following: optimize or minimize parasitic energy consumption associated with regeneration or recovery, or optimize or minimize capital cost or CAPEX or sizing associated with regeneration or recovery equipment, or to maintain a desired density range, or for chemical compatibility, or for viscosity, or to ensure the second fluid is within certain system design parameters or constraints. For example, in some embodiments, the biofouling, or scaling, or pH, or dissolved gas concentration, or dissolved oxygen concentration, or viscosity, or density, or other chemical or physical or biological properties may be monitored and/or adjusted.

For example, in some embodiments, it may be desirable for the first fluid to comprise an aqueous solution with a salinity greater than 0.1 wt % and less than 1 wt %. For example, in some embodiments, it may be desirable for the second fluid to comprise an aqueous solution with a salinity greater than 30 wt % and less than 32 wt %. For example, in some embodiments, the salinity of the first fluid and the second fluid may be monitored. For example, in some embodiments, regenerating or recovering systems and methods may be employed to adjust the salinity of the first fluid and/or second fluid to, for example, maintain the salinity or composition or concentration within a desired range. For example, in some embodiments, regenerating or recovering systems and methods may be employed to remove a stream comprising salt from the first fluid and transfer or add said stream comprising salt to the second fluid, or remove a stream comprising water from the second fluid and transfer or add said stream comprising water to the first fluid, or any combination thereof. For example, in some embodiments, a portion of the first fluid may be separated into a stream comprising brine and a stream comprising water, wherein the stream comprising brine may be added to the second fluid and the stream comprising water may be added to the first fluid.

In some embodiments, regenerating or recovering first fluid from second fluid or second fluid from first fluid may be conducted continuously, or semi-continuously, or in a batch configuration, or any combination thereof.

For example, in some embodiments, a portion of second fluid or a portion of the chemical constituents of second fluid may be removed or separated continuously from a portion of first fluid, or a portion of first fluid or a portion of the chemical constituents of first fluid may be removed or separated continuously from a portion of second fluid, or any combination thereof. In some embodiments, it may be desirable for the rate of remove or regeneration to correlate with or be adjusted to follow the predicted or measured rate of dissolution or mixing of the second fluid into the first fluid, or of the first fluid into the second fluid, or any combination thereof. In some embodiments, the regeneration or recovery equipment may be sized or may have capacity sized in relation to the predicted or anticipated rate of mixing or dissolution between fluids in the system, such as, for example, the predicted or anticipated rate of mixing or dissolution between first fluid and second fluid or second fluid and first fluid.

For example, in some embodiments, a portion of second fluid or a portion of the chemical constituents of second fluid may be removed or separated from a portion of first fluid, or a portion of first fluid or a portion of the chemical constituents of first fluid may be removed or separated from a portion of second fluid, or any combination thereof if the salinity is above or below a desired level. For example, a regeneration or recovery system may be turned on or employed when the salinity of the first fluid is greater than a desired or pre-defined level, or when the salinity of the second fluid is less than a desired or pre-defined level, or any combination thereof.

In some embodiments, the rate of regeneration or recovery may be adjustable or variable. For example, in some embodiments, the rate of regeneration or recovery may be adjusted to follow or correlate with the rate of mixing or dissolution between fluids. For example, in some embodiments, the rate of regeneration or recovery may be adjusted depending on electricity prices, or electricity demand, or energy prices, or energy demand, or any combination thereof. For example, if electricity prices are low or demand for electricity is low, a regeneration or recovery system may operate at a higher rate, or higher capacity rate, or may be turned-on, or may operate at a higher energy consumption state, or may operate more energy intensive operations, or any combination thereof.

In some embodiments, recovery or regeneration may comprise separation systems and methods. For example, in some embodiments, recovery or regeneration may comprise separating at least a portion of first fluid from a portion of the second fluid, or at least a portion of the second fluid from at least a portion of the first fluid, or at least a portion of a chemical constituent of the first fluid from at least a portion of the second fluid, or at least a portion of a chemical constituent of the second fluid from at least a portion of the first fluid, or any combination thereof. In some embodiments, the recovery or regeneration may comprise separating dissolved or mixes fluids or chemicals from a fluid comprising a solution.

For example, in some embodiments, regeneration or recovery or other separations described herein may comprise, including, but not limited to, one or more or any combination of the following: a membrane-based separation process, or an electrochemical separation process, or an electrical separation process, or a physical separation process, or an electrical membrane separation process, or a charged membrane separation process, or an extraction process, or a distillation process, or an evaporation process, or a heat recovery distillation process, or an osmotic process, or a cryoseparation process, or a freezing separation process, or a crystallization process, or a freeze desalination process, or a precipitation process, or a solid-liquid separation process, or a gas-liquid separation process, or a liquid-liquid separation process, or a fluid separation process, or a solventing-out process, or a salting-out process.

For example, in some embodiments, the following is a specific example recovery or regeneration systems and methods: For example, a process may employ a first fluid comprising water and a second fluid comprising magnesium chloride brine. In the present example, the first fluid may operate with a desired concentration range of 0.25-3.5 wt % magnesium chloride salinity. In the present example, the second fluid may operate with a desired concentration range of 28-31 wt % magnesium chloride salinity. In the present example, the first reservoir and second reservoir may store a combined 350,000 cubic meters of first fluid and 350,000 cubic meters of second fluid, or 700,000 cubic meters of stored fluid volume. The example energy storage system may store 400 MWh of input electricity, and 300 MWh of electricity including an example 75% round-trip energy efficiency of the pump/turbine and/or other equipment. Each full charge-discharge cycle may occur once every 24 hours. During each charge—discharge cycle or energy storage cycle, it may be estimated that, on average, 12 metric tons of the first fluid dissolves in the second fluid and 12 metric tons of the second fluid dissolves in the first fluid. If a regeneration or recovery system were to be designed to run continuously, it may be desirable for the regeneration or recovery system to separate at least 0.5 metric tons per hour of second fluid from first fluid (12 metric tons/24 hours per cycle) and to separate at least 0.5 metric tons per hour of second fluid from first fluid (12 metric tons/24 hours per cycle).

Example Regenerating or Recovering Second Fluid from First Fluid: 12 metric tons of 30 wt % magnesium chloride brine may comprise about 3.6 metric tons of magnesium chloride. To separate or recover 3.6 metric tons of magnesium chloride from the first fluid, or the solution comprising 1.0010275 wt % magnesium chloride after increasing concentration due to dissolution of 12 metric tons of 30 wt % magnesium chloride brine, about 358.75 metric tons of first fluid may be removed and separated in recovery or regeneration during each charge—discharge cycle. 358.75 metric tons of first fluid comprising 1.0010275 wt % magnesium chloride may be separated in multiple separation stages comprising electrodialysis, reverse osmosis, ultra-high pressure reverse osmosis, and mechanical vapor compression (MVC) distillation or multi-effect distillation (MED). For example, a first stage comprising electrodialysis and/or reverse osmosis may produce a retentate or concentrate comprising 72 metric tons of 5 wt % magnesium chloride retentate or concentrate, and 286.75 metric tons of water permeate or diluate. Said 286.75 metric tons of water permeate or diluate may be added to the first fluid. At, for example, 3 kWh per cubic meter (about 1 metric ton of water) of permeate or diluate, said first stage may consume 860.25 kWh or 0.86025 MWh of electricity per an energy storage charge-discharge cycle. For example, a second stage may comprise ultra-high pressure reverse osmosis, which may separate the 72 metric tons of 5 wt % magnesium chloride into a retentate comprising 30 metric tons of 12 wt % magnesium chloride and a permeate comprising 42 metric tons of water. Said 42 metric tons of permeate may be added to the first fluid. At, for example, 8 kWh per cubic meter of permeate, said second stage may consume 336 kWh or 0.336 MWh of electricity per an energy storage charge-discharge cycle. For example, a third stage may comprise mechanical vapor compression (MVC) distillation, which may separate the 30 metric tons of 12 wt % magnesium chloride into a concentrate comprising 11.25 metric tons of 32 wt % magnesium chloride and a condensate comprising 18.75 metric tons of water. Said 18.75 metric tons of condensate may be added to the first fluid. At, for example, 30 kWh per cubic meter of condensate, said third stage may consume 562.5 kWh or 0.5625 MWh of electricity per an energy storage charge-discharge cycle. Said concentrate comprising 11.25 metric tons of 32 wt % magnesium chloride may be added to the second fluid, which may complete the regeneration or recovery of second fluid from first fluid. The total electricity consumption involved with regenerating or recovery second fluid from first fluid in the present example may be about 1.76 MWh, or a parasitic energy loss or impact on round-trip-efficiency of about 0.44% on a total round trip energy efficiency basis.

Example Regenerating or Recovering First Fluid from Second Fluid:
  Option 1—Distillation: 12 metric tons of 1 wt % magnesium chloride solution may comprise about 11.88 metric tons of water and 0.12 metric tons of magnesium chloride. If 12 metric tons of first fluid comprising 1 wt % magnesium chloride solution dissolves in 350,000 cubic meters of second fluid comprising 30 wt % magnesium chloride, 185.6 metric tons of second fluid may be removed for regeneration or recovery to produce about 11.6 metric tons of water from concentrating the portion of second fluid to 32 wt % (and potentially preventing precipitation or crystallization by, for example, avoiding concentrating the portion of second fluid to or beyond its solubility limits of 33-36 wt %). Said 11.6 metric tons of separated water may be added to the first fluid. Additionally, about 0.4 metric tons of second fluid, comprising 0.12 metric tons of magnesium chloride and 0.280 metric tons of water, may be added to the first fluid. For example, 185.6 metric tons of second fluid comprising 30 wt % magnesium chloride may be separated into 11.6 metric tons of condensate comprising water and 174 metric tons of a brine comprising 32 wt % magnesium chloride using, for example, mechanical vapor compression (MVC) distillation. For example, said mechanical vapor compression distillation may consume 40 kWh of electricity per cubic meter of condensate (about 1 metric ton of water), which may result in an electricity consumption of 464 kWh or 0.464 MWh for regenerating or recovering first fluid from second fluid, or a parasitic energy loss or impact on round-trip-efficiency of about 0.116% on a total round trip energy efficiency basis.
  Option 2—Distillation and Crystallization: 12 metric tons of 1 wt % magnesium chloride solution may comprise about 11.88 metric tons of water and 0.12 metric tons of magnesium chloride. If 12 metric tons of first fluid comprising 1 wt % magnesium chloride solution dissolves in 350,000 cubic meters of second fluid comprising 30 wt % magnesium chloride, about 16.57 metric tons of second fluid may be removed for regeneration or recovery to produce about 11.6 metric tons of water liquid and about 4.97 metric tons of magnesium chloride solid using crystallization. Said 11.6 metric tons of water liquid may be added to the first fluid and about 4.97 metric tons of magnesium chloride solid using crystallization may be added or dissolved into the second fluid. Additionally, about 0.4 metric tons of second fluid, comprising 0.12 metric tons of magnesium chloride and 0.280 metric tons of water, may be added to the first fluid. For example, at 90 kWh per cubic meter (about 1 metric ton of water) of water condensate, producing 11.6 metric tons of water condensate using a vapor distillation crystallizer may consume 1,044 kWh or 1.044 MWh for regenerating or recovering first fluid from second fluid, or a parasitic energy loss or impact on round-trip-efficiency of about 0.261% on a total round trip energy efficiency basis.

Example Total Regenerating Electricity Consumption per Charge-Discharge Cycle:
  Regenerating or Recovering First Fluid from Second Fluid: 1.76 MWh per cycle
  Regenerating or Recovering Second Fluid from First Fluid: 0.464 MWh per cycle
  Total Regenerating or Recovery Energy Consumption: 2.224 MWh per cycle or a Round-Trip Efficiency Impact of 0.556%

In some embodiments, recovery or regeneration may require energy or may be energy intensive. In some embodiments, it may be desirable to optimize or minimize the energy consumption involved in recovery or regeneration. For example, some embodiments may minimize energy consumption from recovery or regeneration by employing systems and methods or practices to reduce or prevent or minimize the rate or level or amount of mixing or dissolution which may, for example, occur between the first fluid and second fluid. For example, some embodiments may optimize or maximize the energy efficiency of the recovery or regeneration systems and methods. In some embodiments, it may be desirable for recovery or regeneration to impact the round-trip energy efficiency of the energy storage system by less than or equal to one or more or any combination of the following: 0.1%, or 0.5%, or 1%, or 2%, or 3%, or 4%, or 5%, or 6%, or 7%, or 8%, or 9%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%. In some embodiments, recovery or regeneration energy consumption may comprise a parasitic energy load or parasitic load on the energy storage system.

Example Embodiments

A system for storing and generating power comprising:
  a first storage reservoir configured to store a first fluid;
  a second storage reservoir located at a lower elevation than the first storage reservoir and configured to store a second fluid wherein said second fluid has a higher density than the first fluid;
  a pump;
  wherein the pump and the first and the second reservoir are operatively connected such that power is stored by displacing the second fluid in the second storage reservoir by pumping the first fluid from the first storage reservoir to the second storage reservoir and such that power is generated by allowing the pumped first fluid in the second storage reservoir to exit the second reservoir; and wherein the first fluid is a liquid; and
  wherein the first fluid is soluble in the second fluid; and
  wherein a portion of the first fluid dissolves in the second fluid and a portion of second fluid dissolves in the first fluid; and
  further comprising a system to regenerate at least a portion of said second fluid dissolved in the first fluid from the first fluid and at least a portion of said first fluid dissolved in the second fluid from the second fluid.

A system for storing and generating power comprising:
  a first storage reservoir configured to store a first fluid;
  a second storage reservoir located at a lower elevation than the first storage reservoir and configured to store a second fluid wherein said second fluid has a higher density than the first fluid;
  a pump; and
  a generator;
  wherein the pump, the generator, and the first and the second reservoir are operatively connected such that power is stored by displacing the first fluid in the first storage reservoir by pumping the second fluid in the second storage reservoir to the first storage reservoir and power is generated or discharged by allowing the second fluid in the first storage reservoir to return to the second storage reservoir; and wherein the first fluid is a liquid; and wherein the first fluid is soluble in the second fluid; and wherein a portion of the first fluid dissolves in the second fluid and a portion of second fluid dissolves in the first fluid; and further comprising a system to regenerate at least a portion of said second fluid dissolved in the first fluid from the first fluid and at least a portion of said first fluid dissolved in the second fluid from the second fluid, Additional Notes on Salinities, Densities, and Solubilities In some embodiments, low solubility or practically insoluble may comprise a solubility less than or equal to one or more or any combination of the following: 50 wt %, or 40 wt %, or 30 wt %, or 20 wt %, or 10 wt %, or 5 wt %, or 4 wt %, or 3 wt %, or 2 wt %, or 1 wt %, or 0.5 wt %, or 0.25 wt %, or 0.1 wt %, or 0.05 wt %, or 0.025 wt %, or 0.01 wt %, or 0.005 wt %, or 0.001 wt %, or 0.0001 wt %.

In some embodiments, low solubility or practically insoluble may comprise a solubility less than or equal to one or more or any combination of the following: 5 wt %, or 4 wt %, or 3 wt %, or 2 wt %, or 1 wt %, or 0.5 wt %, or 0.25 wt %, or 0.1 wt %, or 0.05 wt %, or 0.025 wt %, or 0.01 wt %, or 0.005 wt %, or 0.001 wt %, or 0.0001 wt %.

In some embodiments, the salinity of the first fluid may comprise a weight percent concentration of a solute in a solution less than the concentration of said solute in a solution in the second fluid. In some embodiments, the salinity of the first fluid may comprise a weight percent concentration of a density increasing solute in a solution less than the concentration of said density increasing solute in a solution in the second fluid. A density increasing solute may comprise a chemical, which increases the density of a solution, such as an aqueous solution, with increasing concentration. Example density increasing solutes in may include, but are not limited to, salts, or sugars, diols, or glycols, or carbonates, or esters, or fluorocarbons, or halogenated compounds, or urea, or any combination thereof. In some embodiments, the salinity of the first fluid may comprise a weight percent concentration of a density decreasing solute in a solution greater than the concentration of said density decreasing solute in a solution in the second fluid. A density decreasing solute may comprise a chemical, which decreases the density of a solution, such as an aqueous solution, with increasing concentration. Example density decreasing solutes may include, but are not limited to, alcohols, or ketones, or aldehydes, or ethers, or esters, or hydrocarbons, or alkanes, or alkenes, or alkynes, or organic solvents, or any combination thereof.

In some embodiments, a first fluid may comprise a solution of a water soluble density decreasing solute and water. For example, in some embodiments, a first fluid may comprise greater than or equal to one or more or any combination of the following weight percent (wt %) concentration of density decreasing solute: 1%, or 2%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%. For example, in some embodiments, a first fluid may comprise methanol and water, wherein methanol is the density decreasing solvent.

Example third fluids which may have a density greater than some first fluids and a density greater than some second fluids may include, but are not limited to, one or any combination of the following: Environmental Oils, umbilical storage fluid, or marine oils, or marine-friendly oils, or bio-derived oils, or ENVIROSOL, or high density environmental oil, or HDEO (EP), biodiesel, or vegetable oil, or waste oils, or esters, or hydroxyl derivatives, or ethyl esters of oils, pyrolysis oil, or bio-oil, or mineral oil, or bitumen, hydrocarbon blends, or hydrocarbon mixtures, or carbon compound mixtures, or high density subsea actuator fluid, or environmentally acceptable oil, paraffin oil, or mineral oil, or Cresol, or o-cresol, or m-cresol, or p-cresol, or Creosote, or Heavy oil, or heavy crude, or Dichloromethane, or Dichlorobenzene, or Dichloromethane, or Ethylene Dichloride, or fluorocarbon, or silicon oil, or polypropylene glycol, or refrigerant, or Furfural, or Fluorosilicone oil, bio-oil with stabilizers, or bio-oil with chemical stabilizers, or stabilized bio-oil.

In some embodiments, the salinity of the first fluid may be less than or equal to one or more or any combination of the following: 0.01 wt %, or 0.1 wt %, or 0.5 wt %, or 1 wt %, or 2 wt %, or 3 wt %, or 4 wt %, or 5 wt %, or 6 wt %, or 7 wt %, or 8 wt %, or 9 wt %, or 10 wt %, or 15 wt %, or 20 wt %, or 25 wt %, or 30 wt %, or 35 wt %, or 40 wt %.

In some embodiments, the salinity of the second fluid may be greater than or equal to one or more or any combination of the following: 0 wt %, or 0.01 wt %, or 0.1 wt %, or 0.5 wt %, or 1 wt %, or 2 wt %, or 3 wt %, or 4 wt %, or 5 wt %, or 6 wt %, or 7 wt %, or 8 wt %, or 9 wt %, or 10 wt %, or 15 wt %, or 20 wt %, or 25 wt %, or 30 wt %, or 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %.

In some embodiments, the density of the first fluid may comprise a density less than the density of the second fluid. In some embodiments, the density of the first fluid may comprise a density less than the density of the second fluid. In some embodiments, the density of the first fluid may be, including, but not limited to, less than or equal to one or more or any combination of the following: 0.6 kg/L, or 0.65 kg/L, or 0.70 kg/L, or 0.75 kg/L, or 0.8 kg/L, or 0.85 kg/L, or 0.9 kg/L, or 0.95 kg/L, 0.96 kg/L, or 0.97 kg/L, or 0.98 kg/L, or 0.99 kg/L, or 1.00 kg/L, 1.01 kg/L, or 1.02 kg/L, or 1.04 kg/L, or 1.05 kg/L, or 1.1 kg/L, or 1.15 kg/L, or 1.2 kg/L, or 1.25 kg/L, or 1.30 kg/L, or 1.35 kg/L, or 1.40 kg/L, or 1.45 kg/L, or 1.5 kg/L, or 1.55 kg/L, or 1.60 kg/L, or 1.65 kg/L.

In some embodiments, the density of the second fluid may comprise a density greater than the density of the first fluid. In some embodiments, the density of the second fluid may comprise a density greater than the density of the first fluid. In some embodiments, the density of the second fluid may be, including, but not limited to, greater than or equal to one or more or any combination of the following: 0.6 kg/L, or 0.65 kg/L, or 0.70 kg/L, or 0.75 kg/L, or 0.8 kg/L, 0.85 kg/L, or 0.9 kg/L, or 0.95 kg/L, 0.96 kg/L, or 0.97 kg/L, or 0.98 kg/L, or 0.99 kg/L, or 1.00 kg/L, 1.01 kg/L, or 1.02 kg/L, or 1.04 kg/L, or 1.05 kg/L, or 1.1 kg/L, or 1.15 kg/L, or 1.2 kg/L, or 1.25 kg/L, or 1.30 kg/L, or 1.35 kg/L, or 1.40 kg/L, or 1.45 kg/L, or 1.5 kg/L, or 1.55 kg/L, or 1.60 kg/L, or 1.65 kg/L, or 1.70 kg/L, or 1.75 kg/L, or 1.80 kg/L, or 1.85 kg/L, or 1.90 kg/L, or 1.95 kg/L, or 2.00 kg/L, or 2.05 kg/L, or 2.10 kg/L, or 2.15 kg/L, or 2.20 kg/L, or 2.25 kg/L, or 2.3 kg/L.

In some embodiments, the density of the second fluid may comprise a density greater than the density of the first fluid. In some embodiments, the density of the second fluid may comprise a density greater than the density of the first fluid, and a density greater than the density of the third fluid. In some embodiments, the density of the third fluid may be greater than the density of the first fluid and less than the density of the second fluid. In some embodiments, the density of a third fluid may be greater than or equal to one or more or any combination of the following: 0.6 kg/L, or 0.65 kg/L, or 0.70 kg/L, or 0.75 kg/L, or 0.8 kg/L, 0.85 kg/L, or 0.9 kg/L, or 0.95 kg/L, 0.96 kg/L, or 0.97 kg/L, or 0.98 kg/L, or 0.99 kg/L, or 1.00 kg/L, 1.01 kg/L, or 1.02 kg/L, or 1.04 kg/L, or 1.05 kg/L, or 1.1 kg/L, or 1.15 kg/L, or 1.2 kg/L, or 1.25 kg/L, or 1.30 kg/L, or 1.35 kg/L, or 1.40 kg/L, or 1.45 kg/L, or 1.5 kg/L, or 1.55 kg/L, or 1.60 kg/L, or 1.65 kg/L, or 1.70 kg/L, or 1.75 kg/L, or 1.80 kg/L, or 1.85 kg/L, or 1.90 kg/L, or 1.95 kg/L, or 2.00 kg/L, or 2.05 kg/L, or 2.10 kg/L, or 2.15 kg/L, or 2.20 kg/L, or 2.25 kg/L, or 2.3 kg/L.

Note: In some embodiments, the high density fluid or second fluid may comprise an a solution comprising a solute dissolved in water comprising, for example, sugar, or urea, or glycerol, or propylene glycol, or sugar alcohols, or glycols, or organic molecules, or a salt, or a sulfur chemical, or a carbon chemical, or a nitrogen chemical, or any combination thereof.

In some embodiments, power generation may be located on or adjacent to the energy storage system or method. For example, in some embodiments, a power generation system or method may be located on or adjacent to the higher elevation reservoir or first reservoir. For example, in some embodiments, a power plant comprising a natural gas or LNG power plant may be located on, or within the same vessel as, or any combination thereof the higher elevation reservoir or first reservoir. For example, in some embodiments, a power plant comprising a nuclear power plant may be located on, or within the same vessel as, or any combination thereof the higher elevation reservoir or first reservoir. For example, in some embodiments, a nuclear power plant may operate most efficiently or effectively at a consistent power generation rate or load, however demand for power or the value of power or the value of electricity may vary with time. In some embodiments, a nuclear power plant may generate power consistently or continuously at a high capacity factor, while the energy storage system may store at least a portion of the nuclear power during periods of low electricity or power prices or periods of low power demand and/or may release or generate the stored power when the price of electricity is high or during periods of high power demand. In some embodiments, the integration of energy storage, or offshore energy storage, or of some energy storage embodiments described herein with a nuclear power plant may have multiple notable benefits. For example, in some embodiments, an energy storage system may enable a nuclear power plant to be able to supply more power capacity or more power or greater power during periods of high demand than the power generating capacity of the nuclear power plant itself or the nameplate power capacity of the nuclear power plant. For example, in some embodiments, a nuclear power plant may have a maximum power generating capacity of 100 MW, while the energy storage system may have a maximum power generating capacity of 200 MW, such that during periods of high power demand or high power prices, the integrated system may provide 300 MW of power (100 MW+200 MW) rather than just the 100 MW provided by the nuclear power plant. For example, in some embodiments, an offshore nuclear power plant may enable improved construction timelines and permitting compared to onshore nuclear power plants due to use of or know-how from more frequently constructed marine nuclear power plants, such as nuclear power generation systems employed in aircraft carriers and submarines, or by connecting to connecting to aircraft carriers or submarines or other nuclear powered marine vessels, or NIMBY, or the offshore location enabling less public opposition due to the nuclear power generation, or any combination thereof.

Alternatively, in some embodiments, an energy storage system may be integrated with or store at least a portion of power from an onshore nuclear power plant.

In some embodiments, power output, or round trip efficiency, or energy storage capacity, or energy output, or any combination thereof may be increased by selective heating and/or cooling of the LDF, or HDF, or any combination thereof. Fluid, including liquid, may change in density or volume with temperature. In some embodiments, heat may be removed from an HDF or LDF before, or during, or after, or any combination thereof pumping or storing power. In some embodiments, heat may be removed from an HDF or LDF before, or during, or after, or any combination thereof passing through a turbine or generator or generating power. In some embodiments, heat may be added to an HDF or LDF before, or during, or after, or any combination thereof pumping or storing power. In some embodiments, heat may be added to an HDF or LDF before, or during, or after, or any combination thereof passing through a turbine or generator, or generating power.

For example, in some embodiments, LDF may be cooled before, or during, or after, or any combination thereof pumping, which may increase the density or reduce the volume of LDF for a given mass flow rate, which may reduce required power input and/or may increase round trip energy efficiency. For example, cooling may be provided by, including, but not limited to, one or more or any combination of the following: cold air, or cold water, or ice water, or chiller, or gasification of LNG, or OTEC, or cold deep ocean water, or other cold source, or any combination thereof.

For example, in some embodiments, HDF may be cooled before, or during, or after, or any combination thereof pumping, which may increase the density or reduce the volume of HDF for a given mass flow rate, which may reduce required power input and/or may increase round trip energy efficiency. For example, cooling may be provided by, including, but not limited to, one or more or any combination of the following: cold air, or cold water, or ice water, or chiller, or gasification of LNG, or OTEC, or cold deep ocean water, or other cold source.

For example, in some embodiments, LDF may be heated before, or during, or after, or any combination thereof passing through a turbine or generating power, which may reduce the density or increase the volume of LDF for a given mass flow rate, which may increase the potential power output and/or may increase round trip energy efficiency. For example, heating may be provided by, including, but not limited to, one or more or any combination of the following: warm surface seawater, or waste heat, or solar heat, or heat pump, or thermal storage, or pressure heat, or OTEC.

For example, in some embodiments, HDF may be heated before, or during, or after, or any combination thereof passing through a turbine or generating power, which may reduce the density or increase the volume of HDF for a given mass flow rate, which may increase the potential power output and/or may increase round trip energy efficiency. For example, heating may be provided by, including, but not limited to, one or more or any combination of the following: warm surface seawater, or waste heat, or solar heat, or heat pump, or thermal storage, or pressure heat, or OTEC.

In some embodiments, the second reservoir may comprise a tank configured to store HDF and a tank configured to store LDF. For example, in some embodiments, it may be desirable to store LDF and HDF separately. For example, in some embodiments, the second reservoir may be configured such that the volumetric flow rate of LDF may be independent of the volumetric flow rate of HDF, and/or the volumetric flow rate of HDF may be independent of the volumetric flow rate of LDF. For example, in some embodiments, the second reservoir may comprise an LDF tank and an HDF tank. For example, in some embodiments, the LDF tank may possess a different design or configuration than the HDF tank. For example, in some embodiments, the LDF tank may possess the same design or configuration as the HDF tank. For example, in some embodiments, the second reservoir may comprise an LDF tank comprising a bladder tank, and an HDF tank comprising a rigid tank. For example, in some embodiments, the second reservoir may comprise an LDF tank comprising a rigid tank, and an HDF tank comprising a bladder tank. For example, in some embodiments, the second reservoir may comprise an LDF tank comprising a bladder tank, and an HDF tank comprising a bladder tank. For example, in some embodiments, the second reservoir may comprise an LDF tank comprising a rigid tank, and an HDF tank comprising a rigid tank. For example, in some embodiments, LDF may be insoluble in seawater, while HDF may be soluble in seawater. For example, in some embodiments, LDF may be insoluble in ocean water, while HDF may be soluble in seawater, wherein it may be desirable for LDF to be stored in an open rigid tank wherein seawater may displace LDF and LDF may displace seawater, and/or wherein HDF may be stored in a bladder tank to, for example, ensure the HDF may be at least partially chemically separate from the seawater. In some embodiments, In some embodiments, LDF and HDF may be stored in the same tank in the first reservoir and LDF and HDF may be stored in the same tank in the second reservoir. In some embodiments, LDF and HDF may be stored in different tanks, or separately or fluidly separate, in the first reservoir and LDF and HDF may be stored in the same tank, or fluidly connected, in the second reservoir. In some embodiments, LDF and HDF may be stored in the same tank, or fluidly connected, in the first reservoir and LDF and HDF may be stored in different tanks, or separately or fluidly separate, in the second reservoir. In some embodiments, LDF and HDF may be stored in different tanks, or separately or fluidly separate, in the first reservoir and LDF and HDF may be stored in different tanks, or separately or fluidly separate, in the second reservoir.

Subsea Pressure Exchanger Pressure Difference in Some Embodiments

In some embodiments with a subsea pressure exchanger, the pressure difference exchanged by the pressure exchanger during charging may be within the design pressure difference ranges of currently available pressure exchangers from desalination PX pressure exchanger vendors.

For example, the following table shows the calculated maximum required pressure difference exchanged by the SOME EMBODIMENTS subsea pressure exchanger by subsea tank water depth for some embodiments with Potassium Carbonate Brine (1,520 kg/m³) as the HDL:

| Depth (m) vs. Max Pressure Difference (Bar) Exchanged using Potassium Carbonate Brine (1,520 kg/m³) | |
|---|---|
| Depth (m) | Max. Pressure Difference Exchanged by PX (Bar) |
| 500 | 26.89 |
| 1,000 | 51.77 |
| 1,500 | 76.60 |
| 2,000 | 101.45 |

For example, the following table shows the calculated maximum required pressure difference exchanged by the SOME EMBODIMENTS subsea pressure exchanger by subsea tank water depth for some embodiments with Magnesium Chloride Brine (1,330 kg/m³) as the HDL:

| Depth (m) vs. Max Pressure Difference (Bar) Exchanged using Magnesium Chloride Brine (1,330 kg/m³) | |
|---|---|
| Depth (m) | Max. Pressure Difference Exchanged by PX (Bar) |
| 500 | 17.39 |
| 1,000 | 32.74 |
| 1,500 | 48.10 |
| 2,000 | 63.45 |

Example Calculation of Pressure Difference Exchanged by Subsea Pressure Exchanger In some embodiments, the pressure difference exchanged by the pressure exchanger during charging may be about the same as the pressure difference between the hydrostatic pressure of the HDL and the internal pressure of the subsea tank (which should be about the same as the hydrostatic pressure of seawater adjacent to the subsea tank), plus the pressure drop associated with any frictional losses. In some embodiments, the pressure difference exchanged by the pressure exchanger during discharging may be about the same as the pressure difference between the hydrostatic pressure of the HDL and the internal pressure of the subsea tank (which should be about the same as the hydrostatic pressure of seawater adjacent to the subsea tank), minus the pressure drop associated with any frictional losses.

Example Equation for Pressure Difference Exchanged by Pressure Exchanger during SOME EMBODIMENTS Energy Storage Charging (Storing Power):

$$\Delta P \text{ Charging} = (pHDL - pST + pD)/ePX$$

Equation for Pressure Difference Exchanged by Pressure Exchanger during SOME EMBODIMENTS Energy Storage Discharging (Generating Power):

$$\Delta P \text{ Discharging} = (pHDL - pST - pD) * ePX$$

WHEREIN:

$\Delta P$ Charging = Pressured difference exchanged by $PX$ during charging $\Delta P$ Discharging = Pressured difference exchanged by $PX$ during discharging $pHDL$ = Hydrostatic pressure of $HDL$ at depth $pST$ = Internal pressure of the subsea tank $pD$ = Pressure drop associated with any frictional losses $ePX$ = Decimal efficiency of $PX$ (e.g. 0.98)

In SOME EMBODIMENTS, the maximum pressure difference experienced by the pressure exchanger occurs during charging.

For example, if the SOME EMBODIMENTS subsea tank may be located at a water depth of 1,000 meters, the following may be a calculation of the pressure difference exchanged by the subsea pressure exchanger if the HDL may be potassium carbonate brine:

$$\frac{(148.96 \text{ Bar}) - (100.25 \text{ Bar}) + (1 \text{ Bar} + 1 \text{ Bar})}{0.98} = 51.77 \text{ Bar}$$

WHEREIN:

148.96 Bar = Hydrostatic pressure of $HDL$ at 1,000 meter depth 100.25 Bar = Internal pressure of the subsea tank 1 Bar + 1 Bar = Pressure drop associated with any frictional losses 0.98 = Decimal efficiency of $PX$ 51.77 Bar = Pressured difference exchanged by $PX$ during charging Some Embodiments Subsea Tank

| | SOME EMBODIMENTS Subsea Tank vs. Some embodiments Field SOST Properties | |
|---|---|---|
| Property | Some embodiments Subsea Oil Storage Tank (SOST) | SOME EMBODIMENTS Subsea Tank |
| Stored Fluids | LDL: Crude Oil<br>HDL: Ballast Seawater<br>Crude oil may be toxic to marine life and forms an oil 'slick' on the ocean surface if leaked. | LDL: Ethanol or n-Butane<br>HDL: Potassium Carbonate Brine or Magnesium Chloride Brine<br>SOME EMBODIMENTS HDLs and LDLs are non-toxic to marine life and do not form a 'slick' if leaked. |
| Fluid Handling | Crude oil (LDL) contains hydrogen sulfide and other potentially corrosive and hazardous chemicals, which the SOST must resist. | SOME EMBODIMENTS HDL and LDL are stored in a closed loop and, as a result, are of a consistent and controlled composition.<br>SOME EMBODIMENTS subsea tank materials are compatible with HDL and LDL<br>SOME EMBODIMENTS LDL and HDL may be treated with biocides, oxygen scavengers, and corrosion inhibitors. It may be important to note that LDL and HDL in SOME EMBODIMENTS will rarely, if ever, require treatment because SOME EMBODIMENTS may be a closed system. |
| Buoyancy | Some embodiments Field Crude Oil has an API of 27o, which may be equivalent to a specific gravity of 0.893 at 15° C. Piles are designed to withstand the upward buoyancy force of the SOST tank, | SOME EMBODIMENTS Subsea Tank may be designed without any net buoyancy (i.e., not buoyant). This may be possible either through the storage of a minimum volume of HDL (which has a significantly greater density than seawater) and/or through use of a separate ballast region storing a high-density fluid. |
| Construction Material | Steel with:<br>Major external & internal cathodic protection<br>Lower internal 2 m may be coated<br>Internal pipework may be CRA 25Cr<br>Biocide & corrosion inhibitor use | Steel with:<br>Internal coating<br>External and internal cathodic protections<br>Biocide & corrosion inhibitor use (significantly less may be required because SOME EMBODIMENTS may be a closed system) |
| Design Lifespan | 30+ years | 30+ years |
| Storage Volume | 275,000 barrels | Each SOME EMBODIMENTS subsea tank may store 275,000 barrels |
| Connection to Seabed | 8, 96" piles driven to 45 m + mud mats; bottom sits ~1 m above seabed | Piles, or anchors may be employed. The bottom may sit above the seabed. |
| Water Depth | 132 m | 500+ meters |

Some Embodiments Subsea Tank Buoyancy and Installation

Example Embodiment Subsea Tank Employing Storage of Minimum Volume of HDL to Prevent Buoyancy In some versions of SOME EMBODIMENTS, the subsea tank will have no net buoyancy because the tank will always store a minimum volume of HDL. The minimum stored volume of HDL in the subsea tank may be dependent on the densities of the LDL and HDL and the mass and density of the subsea tank.

The following are the equations for calculating the minimum amount of HDL (as a decimal proportion of the total subject tank volume), excluding the mass of the steel tank. If the mass of the steel tank may be included, the minimum amount of HDL will be lower than the value calculated by the below equations.

$$(dHDL)(x) + (dLDL)(y) = (dSeawater)$$
$$x + y = 1$$

Wherein:

$(dHDL)$ = Specific Gravity of HDL $(dLDL)$ = Specific Gravity of LDL $(dSeawater)$ = Specific Gravity of Seawater $(x)$ = Minimum proportion of subsea tank stored volume that is HDL $(y)$ = Maximum proportion of subsea tank stored volume that is LDL For example, if the LDL may be ethanol with a specific gravity of 0.789, the HDL may be potassium carbonate brine with a specific gravity of 1.520, and seawater has a density of 1.028, then the minimum proportion of subsea tank stored volume that may be HDL to prevent buoyancy may be 0.327.

Example Subsea Tank Employing Ballast Region and Ballast Fluid to Prevent Buoyancy In some versions of the SOME EMBODIMENTS subsea tank, a ballast fluid designed to increase the density of the Subsea tank may be stored in a separate compartment in the Subsea tank and/or may comprise a different fluid in the HDL used for storing power. For example, the ballast fluid may comprise a high-density solid liquid mixture, or a mud. In some versions of SOME EMBODIMENTS, the ballast fluid may remain in the Subsea tank for the life of the tank, or the life of some embodiments, meaning it may be inconsequential if a ballast fluid comprising a solid-liquid mixture loses its suspension within the ballast storage region of the subsea tank. However, it may be desirable for design in the ballast storage region enable any settling particulates to settle evenly. For example, to prevent uneven settling of particulates, the ballast region may comprise sub-compartments, or the floor of the ballast region may be relatively level. In some versions of SOME EMBODIMENTS, the ballast region may be located at the bottom of the subsea tank.

During installation, the subsea tank storage region may be filled with an LDL+HDL at a ratio to ensure the subsea tank may be neutrally buoyant, or at a desired buoyancy. The ballast region may be filled with seawater. Once the subsea tank may be installed and before the commencement of operations of the subsea tank in SOME EMBODIMENTS, a high-density fluid may be piped/transferred into the ballast region, displacing the seawater in the ballast region, and providing sufficient additional mass and net density to allow for additional LDL to enter the subsea tank during storing power or charging.

The ballast fluid may comprise a solid-liquid mixture, such as a drilling mud, because it may be easier to pump to the deep ocean depths of the subsea tank than, for example, sand or rock fill or cement or concrete or aggregate or mass.

Example Detailed Figure Descriptions

FIG. 1—Steady State of the Subsea Tank in the Absence of Other System Components FIG. 1 Example Summary FIG. 1 may show the steady state of the subsea tank in the absence of other system components. FIG. 1 may show an isolated rigid subsea tank (T1) connected by a pipe (L1) to a subsea pressure compensator (PC1). T1 may be full of liquid. T1 may be located subsea on the seabed. The pressure inside of T1 may be at equilibrium with the hydrostatic pressure of seawater adjacent to T1 due to subsea pressure compensator (PC1).

Important Note: In SOME EMBODIMENTS, the volume of liquid in the subsea tank may be designed to remain relatively constant. The subsea pressure compensator (PC1) may be employed to compensate for potential fluctuations which may occur during changes in SOME EMBODIMENTS operating mode, such as charging (i.e., storing power), or discharging (i.e., generating power), or rate of charging or discharging, or start-up, or shutdown.

FIG. 1 Example Properties

Water Depth at Bottom of Subsea Tank: 1,000 meters

Volume of T1: 30,000 cubic meters

Estimated Hydrostatic Pressure Adjacent to T1 at PC1: 100 Bar

Estimated Pressure of Liquid Inside T1: 100 Bar

FIG. 1 Example Key

| FIG. 1 Key | |
|---|---|
| Label | Description |
| T1 | Rigid subsea tank comprising steel or composite. Inside the subsea tank, Low Density Fluid floats above high-density liquid. Low-density liquid may be practically insoluble in High Density Fluid. |
| L1 | Pipe connecting T1 to PC1. |
| PC1 | Subsea compensator or subsea pressure compensator. |

FIG. 2—Steady State of the Subsea Tank and Flow Control and Shut-off Valves in the Absence of Other System Components or When Isolated/Shut-off From Other System Components FIG. 2 Example Summary FIG. 2 may show the steady state of the subsea tank and flow control and shut off valves in the absence of other system components or when isolated/shut off from other system components (i.e., shutoff valves V1 and V4 may be closed). The purpose of FIG. 2 may be to show the pressure inside the subsea tank will passively default to being at equilibrium with the pressure of the adjacent body of water at about the same depth when shutoff or isolated from risers or pressure exchangers using valves. In other words, when isolated using valves (i.e., V1 and V4), the subsea tank system naturally maintains an internal pressure at equilibrium with the adjacent body of water at about the same water depth due to the connected subsea pressure compensator (PC1). FIG. 2 may show an isolated rigid subsea tank (T1) connected by a pipe (L1) to a subsea pressure compensator (PC1). T1 may be full of liquid. T1 may be located subsea on the seabed. The pressure inside of T1 may be at equilibrium with the hydrostatic pressure of seawater adjacent to T1 due to subsea pressure compensator (PC1). FIG. 2 also may show the rigid subsea tank (T1) connected by pipe (L2) to a flow controller or shutoff valve (V1) and connected by pipe (L6) to a flow controller or shutoff valve (V4). In FIG. 2, V1 and V4 may be closed/shutoff.

FIG. 2—Example Properties
- Water Depth at Bottom of Subsea Tank: 1,000 meters
- Volume of T1: 30,000 cubic meters
- Estimated Hydrostatic Pressure Adjacent to T1 at PC1: 100 Bar
- Estimated Pressure of Liquid Inside T1: 100 Bar FIG. 2—Example Key

| Label | Description |
|---|---|
| T1 | Rigid subsea tank comprising steel or composite. Inside the subsea tank, Low Density Fluid floats above high-density liquid. Low-density liquid may be practically insoluble in high-density liquid. |
| L1 | Pipe connecting T1 to PC1. |
| PC1 | Subsea compensator or subsea pressure compensator. PC1 may enable T1 to remain at a pressure near equilibrium with the pressure of the adjacent body of water at about the same depth. |
| L2 | Pipe connecting T1 to V1. L2 connects the low-density liquid layer portion of the subsea tank (i.e. top of tank) to V1. |
| V1 | Valve and/or flow controller. V1 controls the flow rate of low-density liquid into or out of the subsea tank and allows for the isolation of the subsea tank, if or when desired, from the low-density liquid in the pressure exchanger or riser. V1 may comprise a flow controller and a shutoff valve. |
| L6 | Pipe connecting T1 to V4. L6 connects the high-density liquid layer portion of the subsea tank (i.e. bottom of tank) to V4. |
| V4 | Valve and/or flow controller. V4 controls the flow rate of high-density liquid into or out of the subsea tank and allows for the isolation of the subsea tank, if or when desired, from the high-density liquid in the pressure exchanger or riser. V4 may comprise a flow controller and a shutoff valve. |

FIG. 3—Example Embodiment without Power Generating or Pressure Exchanging Equipment, such as Pumps/Turbines and Pressure Exchangers FIG. 3 Example Summary FIG. 3 may show an integrated system without power generating or pressure exchanging equipment, such as pumps/turbines and pressure exchangers. FIG. 3 may show the steady state pressures in the system if all valves may be closed, except for V2. The purpose of FIG. 3 may be to show the pressure in the subsea tank will remain at equilibrium with hydrostatic pressure of adjacent body of water at about the same elevation/water depth, even in the absence of pumps/turbines and pressure exchangers, due to shutoff valves and pressure compensator (PC1) connected to the subsea tank.

FIG. 3—Example Properties
- Water Depth at Bottom of Subsea Tank: 1,000 meters
- Low Density Fluid Density (LDF): 790 kg/m$^3$
- High Density Fluid Density (HDF): 1,520 kg/m$^3$
- Solubility of LDF in HDF: Insoluble
- Note: The components located below the 'Near Seabed' dashed line may be at about the same water depth/elevation to simplify the pressure and energy calculations. Similarly, the components located above the 'Near Surface' dashed line may be at about the same water depth/elevation to simplify the pressure and energy calculations.

FIG. 3 Example Key

| Label | Description |
|---|---|
| T2 | Storage tank on floating on sea surface (e.g., FSO). Stores both LDF and HDF. |
| L11 | Pipe transferring LDF between T2 and V3. |
| V3 | Valve and/or flow controller. V3 controls the flow rate of LDF into or out of the floating tank (T2) and allows for the isolation of T2, if or when desired, from the low-density liquid in the riser. V3 may comprise a flow controller and a shutoff valve. |
| L3 | Riser pipe for transferring LDF between V3 and V1. |
| L4 | Pipe connecting L3 to V2 at an elevation or depth 'Near Seabed'. |
| V2 | Valve. V2 may be the valve between PC2 and L4. V2 prevents the pressure of L3 'Near Seabed' from dropping below the hydrostatic pressure of the adjacent body of water at about the same depth. If the pressure of L3 'Near Seabed' drops below the hydrostatic of the adjacent body of water at about the same depth, V2 opens and V3 closes to allow the pressure in L3 to equilibrate. If the pressure of L3 'Near Seabed' may be above the hydrostatic pressure of the adjacent body of water, V2 closes. |
| L5 | Pipe connecting V2 to PC1 at an elevation or depth 'Near Seabed'. |
| PC2 | Subsea compensator or subsea pressure compensator. PC2 provides an additional system to prevent an under-pressure event from occurring in L3 and T1. |
| V1 | Valve and/or flow controller. V1 controls the flow rate of low-density liquid into or out of the subsea tank and allows for the isolation of the subsea tank, if or when desired, from the low-density liquid in the pressure exchanger or riser. V1 may comprise a flow controller and a shutoff valve. |
| L2 | Pipe connecting T1 to V1. L2 connects the low-density liquid layer portion of the subsea tank (i.e., top of tank) to V1. |
| T1 | Rigid subsea tank comprising steel or composite. Inside the subsea tank, Low Density Fluid floats above high-density liquid. Low Density Fluid may be practically insoluble in High Density Fluid. |
| L1 | Pipe connecting T1 to PC1. |
| PC1 | Subsea compensator or subsea pressure compensator. PC1 may enable T1 to remain at a pressure near equilibrium with the pressure of the adjacent body of water at about the same depth. |

FIG. 3 Key

| Label | Description |
| --- | --- |
| L6 | Pipe connecting T1 to V4. L6 connects the High Density Fluid layer portion of the subsea tank (i.e. bottom of tank) to V4. |
| V4 | Valve and/or flow controller. V4 controls the flow rate of High Density Fluid into or out of the subsea tank and allows for the isolation of the subsea tank, if or when desired, from the High Density Fluid in the pressure exchanger or riser. V4 may comprise a flow controller and a shutoff valve. |
| L7 | Riser pipe for transferring HDF between V4 and T2. |
| Near Surface | Elevation region 'Near Surface', such as near sea level. System components above the 'Near Surface' dashed line may be at an elevation near the surface of the body of water. For simplicity of calculations, the system components above 'Near Surface' dashed line may be at about the same elevation. |
| Seabed to Surface | Elevation region between the 'Near Surface' and 'Near Seabed'. Generally, risers may be located in this region. |
| Near Seabed | Elevation region 'Near Seabed', such as near seabed or the region of lowest system component elevation. For simplicity of calculations, the system components below 'Near Seabed' dashed line may be at about the same elevation. |

Energy Calculations Background—Example Analogy—Land Based Hydropower:

Land-based hydroelectric power, such as a hydroelectric dam on land, generates power due to the hydrostatic pressure difference between water and air at the bottom of an elevation difference (also known as hydraulic head height), which occurs due to the density difference between air and water.

The potential energy generated by a hydroelectric dam may be calculated by the potential energy formula:

$$\text{Energy} = \text{Net Mass} * \text{Gravitational Field} * \text{Head Height}$$

Wherein:

Net Mass may be Volume of Water ($m^3$)*Net Density ($kg/m^3$), (kg)

Net Density may be the difference in density between HDF and LDF ($kg/m^3$)

Gravitational Field may be the acceleration due to gravity, 9.8 $m/s^2$

Head Height may be the elevation difference (m)

Energy may be the potential energy (Joules)

Air has a density of 1.23 $kg/m^3$ at sea level at 15° C. and water has a density of 999.07 $kg/m^3$ at 15° C. The net density difference between water and air may be 997.84 $kg/m^3$ at 15° C. and sea level. If, for example, the head height of a dam may be 100 meters, the energy generated by 1 $m^3$ of water in a hydroelectric dam may be 977,883 J (0.272 kWh), or 1 $m^3$*997.84 $kg/m^3$*9.8 $m/s^2$*100 m.

Pressure Calculations Background—Example Analogy—Land Based Hydropower:

The hydrostatic pressure of water at the bottom of a hydroelectric dam may be calculated by the following:

$$\text{Pressure} = \text{Net Density} * \text{Gravitational Field} * \text{Head Height}$$

Wherein:

Net Density may be the difference in density between HDF and LDF, ($kg/m^3$)

Gravitational Field may be the acceleration due to gravity, 9.8 $m/s^2$

Head Height may be the elevation difference (m)

Energy may be the potential energy (Joules)

Air has a density of 1.23 $kg/m^3$ at sea level at 15° C. and water has a density of 999.07 $kg/m^3$ at 15° C. The net density difference between water and air may be 997.84 $kg/m^3$ at 15° C. and sea level. If, for example, the head height of a dam may be 100 meters, the hydrostatic pressure at the bottom of the hydroelectric dam may be 977,883 Pa (9.78 Bar), or 997.84 $kg/m^3$*9.8 $m/s^2$*100 m.

Example Potential Energy Calculation:

In some embodiments, energy may be stored in the hydrostatic pressure difference between an HDF and an LDF at the bottom of an elevation difference, which occurs due to the density difference between HDF and LDF.

The potential energy stored may be calculated by the potential energy formula:

$$\text{Energy} = \text{Net Mass} * \text{Gravitational Field} * \text{Head Height}$$

Wherein:

Net Mass may be Volume of Brine ($m^3$)*Net Density ($kg/m^3$) (kg)

Net Density may be the difference in density between HDF and LDF

Gravitational Field may be the acceleration due to gravity, 9.8 $m/s^2$

Head Height may be the elevation difference or seawater depth of the brine outlet (m)

Energy may be the potential energy (Joules) LDF may have a density of about 790 $kg/m^3$ and HDF may have a density of about 1,520 $kg/m^3$. The net density difference between LDF and HDF may be 730 $kg/m^3$. If, for example, the elevation difference between the 'T1' and 'T2' may be 1,000 meters, the potential energy generated by 1 $m^3$ of LDF displaced by 1 $m^3$ of HDF may be 7,154,000 J (or 1.99 kWh), or 1 $m^3$*730 $kg/m^3$*9.8 $m/s^2$*1,000 m.

Example Pressure Calculations—HDF Pressures:

Pressure of HDF ('Near Surface') in L7 if V4 May be Closed

HDF 'Near Surface' may be at about the same pressure HDF at the bottom of the T2 tank, which may vary depending on the height of T2, the volume of HDF and/or LDF in the T2 tank, and the depth which the floating vessel (e.g., FSO) comprising T2 may be sitting in the water. For example, if the height of T2 may be 30 meters above the surface of the body of water and T2 may be full of HDF liquid, the pressure of HDF at the bottom of T2 may be 446,880 Pa (4.47 Bar), or 1,520 kg/m$^3$*9.8 m/s$^2$*30 m. For simplicity of the calculation, the pressure of HDF near surface may be at equilibrium with the atmospheric pressure which may be about 0 Bar gauge pressure.

Pressure of HDF ('Near Seabed') in L7 if V4 May be Closed

HDF 'Near Seabed' may be at a pressure equal to the hydrostatic pressure of HDF at the elevation difference or hydraulic head height equal to the difference in elevation between the 'Near Surface' elevation and the 'Near Seabed' elevation. For example, if the elevation difference between 'Near Surface' elevation and the 'Near Seabed' elevation may be 1,000 meters, the pressure of HDF 'Near Seabed' may be 14,896,000 Pa (148.96 Bar), or 1,520 kg/m$^3$*9.8 m/s$^2$*1,000 m.

Example Pressure Calculations—LDF Pressures:

Pressure of LDF ('Near Surface') in L3 if V1, V2, and V3 May be Closed

LDF 'Near Surface' may be at about the same pressure LDF at the top of the T2 tank, which may vary depending on the height of T2, the volume of HDF and/or LDF in the T2 tank, and the depth which the floating vessel (e.g. FSO) comprising T2 may be sitting in the water. For simplicity of the calculation, the pressure of HDF near surface may be at equilibrium with the atmospheric pressure which may be about 0 Bar gauge pressure.

Pressure of LDF ('Near Seabed') in L3 if V1, V2, and V3 may be closed

LDF 'Near Seabed' in L3 if V1, V2, and V3 may be closed may be at a pressure equal to the hydrostatic pressure of LDF at the elevation difference or hydraulic head height equal to the difference in elevation between the 'Near Surface' elevation and the 'Near Seabed' elevation. For example, if the elevation difference between the 'Near Surface' elevation and the 'Near Seabed' elevation may be 1,000 meters and V1, V2, and V3 may be closed, the pressure of LDF 'Near Seabed' may be 7,742,000 Pa (77.42 Bar), or 790 kg/m$^3$*9.8 m/s$^2$*1,000 m.

Pressure of LDF ('Near Surface') in L3 if V2 May be Open and V1 and V3 May be Closed LDF 'Near Surface' in L3 if V2 may be open and V1 and V3 may be closed may be at a pressure equal to the hydrostatic pressure of seawater adjacent to PC2 'Near Seabed' minus the hydrostatic pressure of LDF 'Near Seabed'. Because V2 may be open, L3 'Near Seabed' may be at pressure equilibrium the seawater adjacent to PC2 'Near Seabed', which directly influences the pressure of LDF in L3 'Near Surface'. For example, if the elevation difference between the 'Near Surface' elevation and the 'Near Seabed' elevation may be 1,000 meters and V2 may be open and V1 and V3 may be closed, the pressure of LDF 'Near Surface' in L3 may be 2,303,000 Pa (23.03 Bar), or (Hydrostatic Pressure of Seawater at 'Near Seabed')−(Hydrostatic Pressure of LDF at 'Near Seabed'), or (1025 kg/m$^3$*9.8 m/s$^2$*1,000 m)−(790 kg/m$^3$*9.8 m/s$^2$*1,000 m).

Pressure of LDF ('Near Seabed') in L3 if V2 May be Open and V1 and V3 May be Closed LDF 'Near Seabed' in L3 if V2 may be open and V1 and V3 may be closed may be at a pressure equal to the hydrostatic pressure of seawater adjacent to PC2 'Near Seabed'. Because V2 may be open, L3 'Near Seabed' may be at pressure equilibrium the seawater adjacent to PC2 'Near Seabed'. For example, if the elevation difference between the 'Near Surface' elevation and the 'Near Seabed' elevation may be 1,000 meters and V2 may be open and V1 and V3 may be closed, the pressure of LDF 'Near Seabed' in L3 may be 10,045,000 Pa (100.45 Bar), or 1025 kg/m$^3$*9.8 m/s$^2$*1,000 m.

FIG. 3—Example Pressures

| Label | Internal Pressure |
|---|---|
| T2 | 0 Bar (gauge pressure) |
| L11 | 0 Bar (gauge pressure) |
| L3 (Near Surface) | 23.03 Bar |
| L3 (Near Seabed) | 100.45 Bar |
| L4 | 100.45 Bar |
| L5 | 100.45 Bar |
| PC2 | 100.45 Bar |
| L2 | 100.45 Bar |
| T1 | 100.45 Bar |
| L1 | 100.45 Bar |
| PC1 | 100.45 Bar |
| L6 | 100.45 Bar |
| L7 (Near Surface) | 0 Bar (gauge pressure) |
| L7 (Near Seabed) | 148.96 Bar |
| Near Surface | 0 Bar (gauge pressure) (pressure at surface of the sea) |
| Near Seabed | 100.45 Bar (hydrostatic pressure of seawater at 1,000 meter depth) |

FIGS. 4A-4C—Example Embodiment with a Pressure Equilibrized Tank and Power Storing/Generating Equipment, Wherein the Pressure Equilibration May be Achieved Using a Subsea Electric Pump/Generator on Each the LDF and HDF Fluid Streams FIGS. 4A-4C Summary FIGS. 4A-4C show an Example Embodiment with a pressure equilibrized tank and power storing/generating equipment, wherein the pressure equilibration may be achieved using a subsea electric pump/generator on each the LDF and HDF fluid streams. The purpose of FIG. 4 may be to show how other, more commonly understood equipment, such as electric pumps and generators, can achieve the same outcome (an equilibrized tank) as a subsea pressure exchanger, except at a potentially lower energy efficiency than a subsea pressure exchanger.

FIG. 4A may show an embodiment at a paused state. FIG. 4B may show an embodiment charging, as in storing electricity. FIG. 4C may show an embodiment discharging, as in generating electricity.

In FIGS. 4A-4C, power from excess hydraulic pressure may be transferred by converting hydraulic pressure into electricity and electricity back into hydraulic pressure. For example, in FIG. 4B (system 'Charging'), pressure/power may be transferred from the LDF to the HDF to overcome the hydrostatic pressure of the HDF and enabling the transfer of HDF from the subsea tank (T1) to the surface tank (T2). For example, in FIG. 4B (system 'Charging'), excess LDF pressure in L3 may be converted into electricity using a hydraulic generator (P2) and transferred using an electric power cable (E3) to a subsea pump (P3) pumping HDF (L7). For example, in FIG. 4C (system 'Discharging'), pressure/power may be transferred from the HD L to the LDF to increase the pressure of LDF transferred to the surface electric generator (P1) and enabling the system to discharge the additional potential energy storage in excess of the hydrostatic pressure of seawater (i.e. due to the density of HDF being greater than seawater). For example, in FIG. 4C (system 'Discharging'), excess HDF pressure in L7 may be converted into electricity using a hydraulic generator (P3)

and transferred using an electric power cable (E3) to a subsea pump (P2), pumping LDF in L3 at a pressure greater than the pressure of T1.

Pressure Equilibration Basic Principle

In some embodiments with a HDF possessing a density greater than the density of seawater, the hydrostatic pressure of the HDF 'Near Seabed' will be greater than the hydrostatic pressure of the adjacent seawater at about the same depth/elevation. Excess hydrostatic pressure, or the additional pressure beyond the hydrostatic pressure of the adjacent seawater at about the same depth, must be extracted before the HDF enters the subsea tank. For example, during 'Discharging', to ensure a subsea tank may be at pressure equilibrium with the hydrostatic pressure of the adjacent seawater, the 'excess pressure' must be recovered from the HDF and transferred to the LDF before the subsea tank. For example, during 'Charging', to ensure a subsea tank may be at pressure equilibrium with the hydrostatic pressure of the adjacent seawater, the 'excess pressure' must be recovered from the LDF and transferred to the HDF before the subsea tank.

It may be important to note that during 'Charging', LDF may be pressurized by the surface pump such that the pressure of LDF 'Near Seabed' before the pressure transfer method may be greater than the hydrostatic pressure of the HDF 'Near Seabed' plus the efficiency losses of the pressure transfer method to enable LDF to displace the HDF to store power.

Example Definition of 'Excess Pressure':

The difference in pressure between liquid in the riser (e.g., HDF or LDF) 'Near Seabed' and the pressure in the subsea tank. The flow of liquid into and out of the subsea tank, and ultimately the pressure of the subsea tank, may be controlled by a valve/flow controller.

Example Definition of 'Pressure Transfer Method':

The device or mechanism used to transfer 'Excess Pressure' from LDF to HDF or HDF to LDF. Example 'Pressure Transfer Methods' may include, for example:
 Subsea Pressure Exchanger
 Subsea Turbocharger
 Subsea Hydroelectric Generator—Power Cable—Hydroelectric Pump Example Calculation of 'Excess Pressure':
 Excess Pressure=(Pressure of Liquid in Riser 'Near Seabed')−(Pressure in Subsea Tank)

FIGS. 4A-4C Example Properties
 Water Depth at Bottom of Subsea Tank: 1,000 meters
 Low Density Fluid Density (LDF): 790 kg/m$^3$
 High Density Fluid Density (HDF): 1,520 kg/m$^3$
 Solubility of LDF in HDF: Insoluble
 Volume of Stored LDF: 30,000 m$^3$
 Volume of Stored HDF: 30,000 m$^3$
 Energy Storage Duration: 10 Hours
 Energy Efficiency of Surface Pump/Turbine Generator (Pumping): 90%
 Energy Efficiency of Surface Pump/Turbine Generator (Generating): 90%
 Energy Efficiency of Subsea Pump/Turbine Generator (Pumping): 90%
 Energy Efficiency of Subsea Pump/Turbine Generator (Generating): 90%
 Pressure Drop (Losses) in LDF Riser during Charging: 1 Bar
 Pressure Drop (Losses) in LDF Riser during Discharging: 1 Bar
 Pressure Drop (Losses) in HDF Riser during Charging: 1 Bar
 Pressure Drop (Losses) in HDF Riser during Discharging: 1 Bar
 Note: Calculations may be for one surface tank and one subsea tank. Some embodiments may have multiple surface tanks within a single floating vessel hull. Some embodiments may have multiple subsea tanks.
 Note: The components located below the 'Near Seabed' dashed line may be at about the same water depth/elevation to simplify the pressure and energy calculations. Similarly, the components located above the 'Near Surface' dashed line may be at about the same water depth/elevation to simplify the pressure and energy calculations.

FIGS. 4A-4C Example Key

| Label | Description |
|---|---|
| T2 | Storage tank on floating on sea surface (e.g., FSO). Stores both LDF and HDF. |
| L11 | Pipe transferring LDF between T2 and P1. |
| P1 | Hydroelectric Pump/Generator. Comprises a reversible hydroelectric pump/turbine generator. |
| E1 | Submarine electricity cable, which may be located on the seafloor. |
| E2 | Dynamic power cable transferring electricity between the submarine electricity cable 'Near Seabed' (E1) and the Pump/Turbine generator located on 'Near Surface' (P1). |
| L10 | Pipe transferring LDF between P1 and V3. |
| V3 | Valve and/or flow controller. V3 controls the flow rate of LDF into or out of the hydroelectric pump/generator (P1) and the floating tank (T2), and allows for the isolation of T2, if or when desired, from the low-density liquid in the riser. V3 may comprise a flow controller and a shutoff valve. |
| L3 | Riser pipe transferring LDF between V3 and V1. |
| L4 | Pipe connecting L3 to V2 at an elevation or depth 'Near Seabed'. Transfers LDF. |
| V2 | Valve. V2 may be the valve between PC2 and L4. V2 prevents the pressure of L3 'Near Seabed' from dropping below the hydrostatic pressure of the adjacent body of water at about the same depth. If the pressure of L3 'Near Seabed' drops below the hydrostatic of the adjacent body of water at about the same depth, V2 opens and V3 closes to allow the pressure in L3 to equilibrate. If the pressure of L3 'Near Seabed' may be above the hydrostatic pressure of the adjacent body of water, V2 closes. |
| L5 | Pipe connecting V2 to PC1 at an elevation or depth 'Near Seabed'. |
| PC2 | Subsea compensator or subsea pressure compensator. PC2 provides an additional system to prevent an under-pressure event from occurring in L3 and T1. |

FIGS. 4A-4C Key

| Label | Description |
|---|---|
| P2 | Subsea LDF hydroelectric pump/turbine generator. During SOME EMBODIMENTS 'Charging', P2 may be in generator mode, generating electricity from the excess pressure ('excess pressure' comprises the pressure difference between L3 and L8, wherein the pressure of L8 may be controlled by V1 and may be about the same as the pressure inside T1), wherein the electricity generated may be transferred to P3 using E3. During SOME EMBODIMENTS 'Discharging', P2 may be in pump mode, pumping LDF using electricity generated from P3 and transferred to P2 using E3. |
| E3 | Subsea electricity cable transferred electric power between P3 and P2. |
| L8 | Pipe transferring LDF between P2 and V1. |
| V1 | Valve and/or flow controller. V1 controls the flow rate of Low Density Fluid into or out of the subsea tank and allows for the isolation of the subsea tank, if or when desired, from the Low Density Fluid in the pressure exchanger or riser. V1 may comprise a flow controller and a shutoff valve. |
| L2 | Pipe transferring LDF between T1 and V1. L2 connects the LDF layer portion of the subsea tank (i.e. top of tank) to V1. |
| T1 | Rigid subsea tank comprising steel or composite. Inside the subsea tank, Low Density Fluid floats above High Density Fluid. Low Density Fluid may be practically insoluble in High Density Fluid. |
| L1 | Pipe connecting T1 to PC1. |
| PC1 | Subsea compensator or subsea pressure compensator. PC1 may enable T1 to remain at a pressure near equilibrium with the pressure of the adjacent body of water at about the same depth. |
| L6 | Pipe connecting T1 to V4. L6 connects the High Density Fluid layer portion of the subsea tank (i.e. bottom of tank) to V4. |
| V4 | Valve and/or flow controller. V4 controls the flow rate of High Density Fluid into or out of the subsea tank and allows for the isolation of the subsea tank, if or when desired, from the High Density Fluid in the pressure exchanger or riser. V4 may comprise a flow controller and a shutoff valve. |
| L9 | Pipe transferring HDF between P3 and V4. |
| P3 | Subsea HDF hydroelectric pump/turbine generator. During SOME EMBODIMENTS 'Discharging', P3 may be in generator mode, generating electricity from the excess pressure ('excess pressure' comprises the pressure difference between L7 and L9, wherein the pressure of L9 may be controlled by V4 and may be about the same as the pressure inside T1), wherein the electricity generated may be transferred to P2 using E3. During SOME EMBODIMENTS 'Charging', P3 may be in pump mode, pumping HDF using electricity generated from P2 and transferred to P3 using E3. |
| L7 | Riser pipe for transferring HDF between V4 and T2. |
| Near Surface | Elevation region 'Near Surface', such as near sea level. System components above the 'Near Surface' dashed line may be at an elevation near the surface of the body of water. For simplicity of calculations, the system components above 'Near Surface' dashed line may be at about the same elevation. |
| Seabed to Surface | Elevation region between the 'Near Surface' and 'Near Seabed'. Generally, risers may be located in this region. |
| Near Seabed | Elevation region 'Near Seabed', such as near seabed or the region of lowest system component elevation. For simplicity of calculations, the system components below 'Near Seabed' dashed line may be at about the same elevation. |

FIGS. 4A-4C Example Pressure Calculations—HDF Pressures:
Pressure of HDF ('Near Surface') in L7 if System Shown in FIGS. 4A-4C (FIG. 4B) May be Charging, as in, LDF May be Transferred from T2 to T1 to Displace HDF from T1 into T2:

HDF 'Near Surface' during charging may be at about the same pressure HDF at the bottom of the T2 tank, which may vary depending on the height of T2, the volume of HDF and/or LDF in the T2 tank, and the depth which the floating vessel (e.g. FSO) comprising T2 may be sitting in the water. For example, if the height of T2 may be 30 meters above the surface of the body of water and T2 may be full of HDF liquid, the pressure of HDF at the bottom of T2 may be 446,880 Pa (4.47 Bar), or 1,520 kg/m$^3$*9.8 m/s$^2$*30 m. For simplicity of the calculation, the pressure of HDF near surface may be at equilibrium with the atmospheric pressure which may be about 0 Bar gauge pressure.

Pressure of HDF ('Near Seabed') in L7 if System Shown in FIGS. 4A-4C (FIG. 4B) May be Charging, as in, LDF May be Transferred from T2 to T1 to Displace HDF from T1 into T2

HDF 'Near Seabed' during charging may be at a pressure equal to the hydrostatic pressure of HDF at the 'Near Surface' elevation, plus the pressure drop associated with the flow rate of HDF through the riser (L7). For example, if the hydrostatic pressure of HDF may be 14,896,000 Pa (148.96 Bar), or 1,520 kg/m$^3$*9.8 m/s$^2$*1,000 m, and the pressure drop associated with the flow rate of HDF through the riser may be 1 Bar, the total Pressure of HDF ('Near Seabed') in L7 may be 149.96 Bar.

Pressure of HDF ('Near Surface') in L7 if System Shown in FIGS. 4A-4C (FIG. 4C) May be Discharging, as in, HDF May be Allowed to Flow from T2 to T1 to Displace LDF from T1 into T2

HDF 'Near Surface' during discharging may be at about the same pressure HDF at the bottom of the T2 tank, which may vary depending on the height of T2, the volume of HDF and/or LDF in the T2 tank, and the depth which the floating vessel (e.g. FSO) comprising T2 may be sitting in the water. For example, if the height of T2 may be 30 meters above the surface of the body of water and T2 may be full of HDF liquid, the pressure of HDF at the bottom of T2 may be 446,880 Pa (4.47 Bar), or 1,520 kg/m$^3$*9.8 m/s$^2$*30 m. For simplicity of the calculation, the pressure of HDF near surface may be at equilibrium with the atmospheric pressure which may be about 0 Bar gauge pressure.

Pressure of HDF ('Near Seabed') in L7 if System Shown in FIGS. 4A-4C (FIG. 4C) May be Discharging, as in, HDF May be Allowed to Flow from T2 to T1 to Displace LDF from T1 into T2

HDF 'Near Seabed' during discharging may be at a pressure equal to the hydrostatic pressure of HDF at the 'Near Surface' elevation, minus the pressure drop associated with the flow rate of HDF through the riser (L7). For example, if the hydrostatic pressure of HDF may be 148.96 Bar, 14,896,000 Pa (148.96 Bar), or 1,520 kg/m$^3$*9.8 m/s$^2$*1,000 m, and the pressure drop associated with the flow rate of HDF through the riser may be 1 Bar, the total Pressure of HDF ('Near Seabed') in L7 may be 147.96 Bar.

FIGS. 4A-4C Example Pressure Calculations—LDF Pressures:

Pressure of LDF in L3 ('Near Surface') if System Shown in FIGS. 4A-4C (FIG. 4B) May be Charging, as in, LDF May be Transferred from T2 to T1 to Displace HDF from T1 into T2

LDF 'Near Surface' in L3 during charging may be at a pressure equal to the following combined sum of added pressures and subtracted pressures:

| Added Pressures | Subtracted Pressures |
| --- | --- |
| a) Hydrostatic Pressure of HDF at 'Near Seabed' Elevation | e) Hydrostatic Pressure of LDF at 'Near Seabed' Elevation |
| b) Pressure Losses in Subsea Pressure Exchange Method (Subsea Hydroelectric Generator - Power Cable - Hydroelectric Pump in FIG. 4A-4C) | |
| c) Pressure Drop Associated with Flow Rate of HDF through Riser | |
| d) Pressure Drop Associated with Flow Rate of LDF through Riser | |

As in, the LDF 'Near Surface' in L3 during charging may be at a pressure equal to:

$$('a' + 'b' + 'c' + 'd') - 'e'$$

$'a' = 1,520$ kg/m$^3$ * 9.8 m/s$^2$ * 1,000 m = 148.96 Bar $'b'$ = (Hydrostatic Pressure of $HDF$ +

Pressure Drop Associated with Flow Rate of $HDF$ through Riser) *

(1 − Pressure Transfer Method Efficiency) =

(148.96 Bar + 3 Bar) * (1 − 0.9 * 0.9) =

(148.96 Bar + 3 Bar) * (0.19) = 28.87 Bar $'c' = 1$ Bar $'d' = 1$ Bar $'e' = 790$ kg/m$^3$ * 9.8 m/s$^2$ * 1,000 m = 77.42 Bar $('a' + 'b' + 'c' + 'd') - 'e' =$ (148.96 Bar + 28.87 Bar + 1 Bar + 1 Bar) − 77.42 Bar = 102.41 Bar

The pressure of LDF 'Near Surface' in L3 during charging: 102.41 Bar

Pressure of LDF in L3 ('Near Seabed') if System Shown in FIGS. 4A-4C (FIG. 4B) May be Charging, as in, LDF May be Transferred from T2 to T1 to Displace HDF from T1 into T2

LDF 'Near Seabed' in L3 during charging may be at a pressure equal to the following combined sum of added pressures:

| Added Pressures |
| --- |
| a) Hydrostatic Pressure of HDF at 'Near Seabed' Elevation |
| b) Pressure Losses in Subsea Pressure Exchange Method (Subsea Hydroelectric Generator - Power Cable - Hydroelectric Pump in FIG. 4A-4C) |
| c) Pressure Drop Associated with Flow Rate of HDF through Riser |
| d) Pressure Drop Associated with Flow Rate of LDF through Riser |

As in, the LDF 'Near Surface' in L3 during charging may be at a pressure equal to:

$$'a' + 'b' + 'c' + 'd'$$

$'a' = 1,520$ kg/m$^3$ * 9.8 m/s$^2$ * 1,000 m = 148.96 Bar $'b'$ = (Hydrostatic Pressure of $HDF$ +

Pressure Drop Associated with Flow Rate of $HDF$ through Riser) *

(1 − Pressure Transfer Method Efficiency) =

(148.96 Bar + 3 Bar) * (1 − 0.9 * 0.9) =

(148.96 Bar + 3 Bar) * (0.19) = 28.87 Bar $'c' = 1$ Bar $'d' = 1$ Bar $'a' + 'b' + 'c' + 'd' =$ 148.96 Bar + 28.87 Bar + 1 Bar + 1 Bar = 179.83 Bar

The pressure of LDF 'Near Seabed' in L3 during charging: 179.83 Bar

Pressure of LDF ('Near Surface') in L3 if System Shown in FIGS. 4A-4C (FIG. 4C) May be Discharging, as in, HDF May be Allowed to Flow from T2 to T1 to Displace LDF from T1 into T2

LDF 'Near Surface' in L3 during discharging may be at a pressure equal to the following combined sum of added pressures and subtracted pressures:

| Added Pressures | Subtracted Pressures |
| --- | --- |
| (a) Hydrostatic Pressure of HDF at 'Near Seabed' Elevation | (b) Pressure Losses in Subsea Pressure Exchange Method (Subsea Hydroelectric Generator - Power Cable - Hydroelectric Pump in FIG. 4A-4C) |
| | (c) Pressure Drop Associated with Flow Rate of HDF through Riser |
| | (d) Pressure Drop Associated with Flow Rate of LDF through Riser |
| | (e) Hydrostatic Pressure of LDF at 'Near Seabed' Elevation |

As in, the LDF 'Near Surface' in L3 during discharging may be at a pressure equal to:

$$'a' - ('b' + 'c' + 'd' + 'e')$$

$'a' = 1,520$ kg/m$^3$ * 9.8 m/s$^2$ * 1,000 m = 148.96 Bar $'b'$ = (Hydrostatic Pressure of $HDF$ +

Pressure Drop Associated with Flow Rate of $HDF$ through Riser) *

-continued $$(1 - \text{Pressure Transfer Method Efficiency}) =$$

$$(148.96 \text{ Bar} + 3 \text{ Bar}) * (1 - 0.9 * 0.9) =$$

$$(148.96 \text{ Bar} + 3 \text{ Bar}) * (0.19) = 28.87 \text{ Bar}$$

$$\text{`}c\text{'} = 1 \text{ Bar}$$

$$\text{`}d\text{'} = 1 \text{ Bar}$$

$$\text{`}e\text{'} = 790 \text{ kg/m}^3 * 9.8 \text{ m/s}^2 * 1,000 \text{ m} = 77.42 \text{ Bar}$$

$$\text{`}a\text{'} - (\text{`}b\text{'} + \text{`}c\text{'} + \text{`}d\text{'} + \text{`}e\text{'}) =$$

$$148.96 \text{ Bar} - (28.87 \text{ Bar} + 1 \text{ Bar} + 1 \text{ Bar} + 77.42 \text{ Bar}) = 40.67 \text{ Bar}$$

The pressure of LDF 'Near Surface' in L3 during discharging: 40.67 Bar

Pressure of LDF ('Near Seabed') in L3 if System Shown in FIGS. 4A-4C (FIG. 4C) May be Discharging, as in, HDF May be Allowed to Flow from T2 to T1 to Displace LDF from T1 into T2

LDF 'Near Seabed' in L3 during discharging may be at a pressure equal to the following combined sum of added pressures and subtracted pressures:

| Added Pressures | Subtracted Pressures |
|---|---|
| (a) Hydrostatic Pressure of HDF at 'Near Seabed' Elevation | (b) Pressure Losses in Subsea Pressure Exchange Method (Subsea Hydroelectric Generator - Power Cable - Hydroelectric Pump in FIG. 4A-4C) <br> (c) Pressure Drop Associated with Flow Rate of HDF through Riser |

As in, the LDF 'Near Surface' in L3 during discharging may be at a pressure equal to:

$$\text{`}a\text{'} - (\text{`}b\text{'} + \text{`}c\text{'})$$

$$\text{`}a\text{'} = 1,520 \text{ kg/m}^3 * 9.8 \text{ m/s}^2 * 1,000 \text{ m} = 148.96 \text{ Bar}$$

$$\text{`}b\text{'} = (\text{Hydrostatic Pressure of } HDF +$$

$$\text{Pressure Drop Associated with Flow Rate of } HDF \text{ through Riser}) *$$

$$(1 - \text{Pressure Transfer Method Efficiency}) =$$

$$(148.96 \text{ Bar} + 3 \text{ Bar}) * (1 - 0.9 * 0.9) =$$

$$(148.96 \text{ Bar} + 3 \text{ Bar}) * (0.19) = 28.87 \text{ Bar}$$

$$\text{`}c\text{'} = 1 \text{ Bar}$$

$$\text{`}a\text{'} - (\text{`}b\text{'} + \text{`}c\text{'}) = 148.96 \text{ Bar} - (28.87 \text{ Bar} + 1 \text{ Bar}) = 119.09 \text{ Bar}$$

The pressure of LDF 'Near Seabed' in L3 during discharging: 119.09 Bar

FIG. 4B and FIG. 4C Example Flow Rate Calculations

Flow rate calculations assume the system operates at a fixed liquid flow rate, which may be the max flow rate. A real system may operate at max flow rate or may operate with variable flow rate. The present example calculations use a fixed flow rate to simplify calculations. Additionally, 'Charging' calculations assume the system starts charging from a state of 0% charged (i.e., all LDF may be in the surface tank (T2) and all HDF may be in the subsea tank (T1)). Additionally, 'Discharging' calculations assume the system starts discharging from a state of 100% charged (i.e., all LDF may be in the subsea tank (T1) and all HDF may be in the surface tank (T2)).

During 'Charging' and 'Discharging', the volumetric flow rate of LDF may be about equal to the volumetric flow rate of HDF.

Based on the assumptions described above, the volumetric flow rate may be calculated according to the following:

$$\text{Storage Volume } (\text{m}^3) / \text{Duration (hours)} = \text{Volumetric Flow Rate } (\text{m}^3/\text{hour})$$

$$30,000 \text{ m}^3 / 10 \text{ hours} = 3,000 \text{ m}^3/\text{hour}$$

Volumetric Flow Rate of LDF During Charging or Discharging: 3,000 m³/hr, or 0.833 m³/s Volumetric Flow Rate of HDF During Charging or Discharging: 3,000 m³/hr, or 0.833 m³/s FIGS. 4B and 4C Example Power Calculations FIG. 4B Power Calculations for Charging (Input Electric Power)

The following may be the calculation for electric power input during charging with a known liquid volumetric flow rate and a known liquid pressure:

$$\text{Pressure (Pa)} * \text{Volumetric Flow Rate } (\text{m}^3/\text{s}) = \text{Power (W)}$$

$$10,241,000 \text{ Pa} * 0.833 \text{ m}^3/\text{s} = 8,530,753 \text{ Watts} = 8.530753 \text{ MW}$$

Power may be divided by pump efficiency (unitless decimal value) to determine total required electric power input:

$$8.530753 \text{ MW}/0.9 = 9.47861 \text{ MW}$$

FIG. 4B Electric Power Input: 9.47861 MW

FIG. 4C Power Calculations for Discharging (Output Electric Power)

The following may be the calculation for electric power output during discharging with a known liquid volumetric flow rate and a known liquid pressure:

$$\text{Pressure (Pa)} * \text{Volumetric Flow Rate } (\text{m}^3/\text{s}) = \text{Power (W)}$$

$$4,067,000 \text{ Pa} * 0.833 \text{ m}^3/\text{s} = 3,387,811 \text{ Watts} = 3.387811 \text{ MW}$$

Power may be multiplied by generator efficiency (unitless decimal value) to determine total electric power output:

$$3.387811 \text{ MW} * 0.9 = 3.049030 \text{ MW}$$

FIG. 4C Electric Power Output: 3.049030 MW

FIGS. 4B and 4C Example Energy Calculations

FIG. 4B Energy Calculations Charging (Input Electricity)

The unit for energy may be power times time, such as MW*hr or MWh. In the present example calculations, the duration (time) of discharge may be 10 hours, and the input power for the duration may be fixed.

The following may be the calculation for total charging energy input (input electricity):

$$\text{Electric Power Input (MW)} * \text{Time (hrs)} = \text{Electrical Energy Input (MWh)}$$
$$9.47861 \text{ MW} * 10 \text{ hrs} = 94.7861 \text{ MWh}$$

FIG. 4B Total Electrical Energy (Electricity) Input: 94.7861 MWh

FIG. 4C Energy Calculations Discharging (Output Electricity)

The unit for energy may be power times time, such as MW*hr or MWh. In the present example calculations, the duration (time) of discharge may be 10 hours, and the input power for the duration may be fixed.

The following may be the calculation for total charging energy input (input electricity):

$$\text{Electric Power Input (MW)} * \text{Time (hrs)} = \text{Electrical Energy Input (MWh)}$$
$$3.049030 \text{ MW} * 10 \text{ hrs} = 30.49030 \text{ MWh}$$

FIG. 4C Total Electrical Energy (Electricity) Output: 30.49030 MWh

FIGS. 4A-4C Example Round Trip Energy Efficiency Calculations

Round Trip Electric Energy Efficiency may be the amount of electricity output divided by the amount of electricity input. If the energy storage system completes a full charge—discharge cycle (i.e. charge from 0% to 100% and then discharge from 100% to 0%), then the round trip electrical energy efficiency may be equal to the total electricity input divided by the total electricity output.

The following may be the calculation for FIGS. 4A-4C Round Trip Energy Efficiency (Please note the energy efficiency in FIG. 4A-4C may be low due to the use of Subsea Electrical Power Pumps and Generators instead of a Subsea Pressure Exchanger, which may illustrate the importance of the Subsea Pressure Exchanger):

$$\text{Total Electricity Output (MWh)} / \text{Total Electricity Input (MWh)} =$$
$$\text{Round Trip Electrical Energy Efficiency}$$
$$30.49030 \text{ MWh} / 94.7861 \text{ MWh} = 0.321674803 = 32.17\%$$

FIG. 4A-4C Round Trip Electrical Efficiency: 32.17%

FIGS. 5A-5C-FIG. 5A-5C may show an embodiment with a pressure equilibrized tank and power storing/generating equipment, wherein the pressure equilibration may be achieved using a subsea pressure exchanger.

FIGS. 5A-5C Example Summary

FIGS. 5A-5C may show an embodiment with a pressure equilibrized tank and power storing/generating equipment, wherein the pressure equilibration may be achieved using a subsea pressure exchanger.

FIG. 5A may show an embodiment at a paused state (e.g. not charging or discharging, no liquid may be flowing). FIG. 5B may show an embodiment charging, as in storing electricity. FIG. 5C may show an embodiment discharging, as in generating electricity.

In FIGS. 5A-5C, excess hydraulic pressure may be directly transferred by means of a pressure exchanger, a simple, robust device commonly found in the reverse osmosis desalination industry. In FIG. 5B (system 'Charging'), pressure may be directly transferred from the LDF to the HDF using a pressure exchanger (PX1) to overcome the hydrostatic pressure of the HDF and enabling the transfer of HDF from the subsea tank (T1) to the surface tank (T2). In FIG. 4C (system 'Discharging'), pressure may be transferred from the HDF to the LDF using a pressure exchanger (PX) to increase the pressure of LDF transferred to the surface electric generator (P1) and enabling the system to discharge the additional potential energy storage in excess of the hydrostatic pressure of seawater (i.e., due to the density of HDF being greater than seawater).

Example Pressure Equilibration Basic Principle

In some embodiments with a HDF possessing a density greater than the density of seawater, the hydrostatic pressure of the HDF 'Near Seabed' may be greater than the hydrostatic pressure of the adjacent seawater at about the same depth/elevation. Excess hydrostatic pressure, or the additional pressure beyond the hydrostatic pressure of the adjacent seawater at about the same depth, must be extracted before the HDF enters the subsea tank. For example, during 'Discharging', to ensure a subsea tank may be at pressure equilibrium with the hydrostatic pressure of the adjacent seawater, the 'excess pressure' must be recovered from the HDF and transferred to the LDF before the subsea tank. For example, during 'Charging', to ensure a subsea tank may be at pressure equilibrium with the hydrostatic pressure of the adjacent seawater, the 'excess pressure' must be recovered from the LDF and transferred to the HDF before the subsea tank.

It may be important to note that during 'Charging', LDF may be pressurized by the surface pump such that the pressure of LDF 'Near Seabed' before the pressure transfer method may be greater than the hydrostatic pressure of the HDF 'Near Seabed' plus the efficiency losses of the pressure transfer method to enable LDF to displace the HDF to store power.

Example Definition of 'Excess Pressure':

The difference in pressure between liquid in the riser (e.g. HDF or LDF) 'Near Seabed' and the pressure in the subsea tank (which may be at the about the same pressure as the adjacent seawater at the 'Near Seabed' depth or elevation). The flow of liquid into and out of the subsea tank, and ultimately the pressure of the subsea tank, may be controlled by a valve/flow controller.

Example Definition of 'Pressure Transfer Method':

The device or mechanism used to transfer 'Excess Pressure' from LDF to HDF or HDF to LDF. Example 'Pressure Transfer Methods' may include, for example:

Subsea Pressure Exchanger

Subsea Turbocharger

Subsea Hydroelectric Generator—Power Cable—Hydroelectric Pump

In FIG. 5A-5C, the Pressure Transfer Method may be a 'Subsea Pressure Exchanger'.

Example Calculation of 'Excess Pressure':

Excess Pressure=(Pressure of Liquid in Riser 'Near Seabed')−(Pressure in Subsea Tank)

Example Pressure Exchanger and Pressure Exchanger Subsea Tank Integration in Some Embodiments Employing Low Pressure Difference Subsea Pump:

In some embodiments, the subsea pressure exchanger and/or subsea tank may require a low pressure difference purge pump. In some embodiments, the subsea pressure exchanger and/or subsea tank may require a low pressure difference purge pump to, for example, transfer high density fluid (HDF) or low density fluid (LDF) from the subsea tank into the pressure exchanger and/or to transfer high density fluid (HDF) or low density fluid (LDF) from the pressure exchanger into the subsea tank. In some embodiments, the low pressure difference subsea pump may comprise a purge pump because the purge pump may transfer fluid from the subsea tank into the pressure exchange, evacuating or displacing or purging the opposing fluid in the pressure exchanger from the pressure exchanger into the subsea tank. Said low pressure difference pumping or 'purging' may occur continuously and/or during each rotational cycle of a rotating or rotary pressure exchanger.

In some embodiments, the low pressure difference subsea pump may provide sufficient pressure to enable the transfer of LDF into the subsea tank and displacement or transfer of HDF out of the subsea tank and into the pressure exchanger at a desired flow rate during the storing of power or 'charging.' In some embodiments, the low pressure difference subsea pump may provide sufficient pressure to enable the transfer of HDF into the subsea tank and displacement or transfer of LDF out of the subsea tank at a desired flow rate during the generating power or 'discharging.' In some embodiments, the low pressure difference subsea pump may provide sufficient pressure to enable the transfer of HDF out of the subsea tank and into the pressure exchanger at a desired flow rate during the storing of power or 'charging.' In some embodiments, the low pressure difference subsea pump may provide sufficient pressure to enable the transfer of LDF out of the subsea tank and into the pressure exchanger at a desired flow rate during the storing of power or 'charging.' In some embodiments, the pressure difference provided by the subsea pressure exchanger may be sufficient to enable fluids simultaneously enter and exit the subsea tank at desired flow rates. In some embodiments, the pressure difference provided by the low pressure difference subsea pump during charging may comprise the pressure required to transfer LDF in and displace HDF out of the subsea tank at a desired flow rate. In some embodiments, the pressure difference provided by the low pressure difference subsea pump during charging may comprise the pressure required to transfer HDF in and displace LDF out of the subsea tank at a desired flow rate.

In some embodiments, a low pressure difference pump may be fluidly connected to the LDF and/or HDF, and/or may be located in the flow path or be capable of pumping in the flow path between the subsea pressure exchanger and the subsea tank. In some embodiments, a low pressure difference subsea pump may be fluidly connected to the LDF and a separate low pressure difference subsea pump may be fluidly connected to the HDF pump. In some embodiments, the low pressure difference HDF subsea pump may pump HDF from the subsea tank into the subsea pressure exchanger during the storing of power or 'charging.' In some embodiments, the low pressure difference LDF subsea pump may pump LDF from the subsea tank into the subsea pressure exchanger during the generating of power or 'discharging.' In some embodiments, the low pressure difference LDF subsea pump may disengage or disconnect from the LDF fluid path when the system is storing power or 'charging.' In some embodiments, the low pressure difference HDF subsea pump may disengage or disconnect from the HDF fluid path when the system is generating power or 'discharging.' In some embodiments, the low pressure difference subsea pump(s) may be powered using electricity. In some embodiments, the low pressure difference subsea pump(s) may be powered using, for example, hydraulic pressure, or a hydraulic fluid, or a turbocharger, or pressure exchanger, or any combination thereof. In some embodiments, the low pressure difference subsea pump(s) may be powered by electricity from a subsea power cable, or a dynamic power cable, or any combination thereof. In some embodiments, the low pressure difference subsea pump(s) may be powered by electricity or other power from a bleed stream, which may be extracted from the high pressure LDF or HDF before, or within, or after, or any combination thereof the pressure exchanger, for example, wherein the bleed stream passes through a hydraulic generator, generating electricity or hydraulic power. For example, in some embodiments, the bleed stream may be extracted from a portion of the high pressure LDF during charging and/or a portion of the high pressure HDF during discharging. In some embodiments, the low pressure difference subsea pump(s) may comprise high flow, low pressure difference pumps. For example, in some embodiments, the pressure difference provided by the low pressure difference pumps may be, for example, less than or equal to, one or more or any combination thereof: 0.1 Bar, or 0.2 Bar, or 0.3 Bar, or 0.4 Bar, or 0.5 Bar, or 1 Bar, or 1.5 Bar, or 2 Bar, or 2.5 Bar, or 3 Bar, or 3.5 Bar, or 4 Bar, or 4.5 Bar, or 5 Bar. For example, in some embodiments, the pressure difference provided by the low pressure difference pumps may be, for example, significantly less than the pressure difference transferred or exchanged by the pressure exchanger. For example, in some embodiments, the pressure difference provided by the low pressure difference pumps may be, for example, greater than or equal to 50%, or 60%, or 70%, or 80%, or 90%, or 91%, or 92%, or 93%, or 94%, or 95%, or 96%, or 97%, or 98%, or 99%, or any combination thereof less than the pressure difference transferred or exchanged by the pressure exchanger. In FIG. 5A-C, for example, low pressure difference subsea pumps may be integrated within or part of 'V1' and 'V4'. In FIG. 5A-C, for example, the low pressure difference subsea pumps may be integrated within or part of 'V1' and 'V4' and/or may be powered by the same power source provided to valves, or flow controllers, or flow meters, or temperature sensors, or pressure sensors, or other subsea equipment, or any combination thereof.

For example, in some embodiments, during the storing of power or 'charging,' the low pressure difference HDF subsea pump may pump HDF from the subsea tank into the subsea pressure exchanger. For example, in some embodiments, during the storing of power or 'charging,' the low pressure difference HDF subsea pump may pump HDF from the subsea tank into the subsea pressure exchanger while LDF may be transfer from the pressure exchanger to the subsea tank. For example, in some embodiments, during the storing of power or 'charging,' the low pressure difference HDF subsea pump may pump HDF from the subsea tank into the subsea pressure exchanger, while low pressure difference LDF subsea pump may be disengaged and/or the LDF may be transfer from the pressure exchanger to the subsea tank.

For example, in some embodiments, during the generating of power or 'discharging,' the low pressure difference LDF subsea pump may pump LDF from the subsea tank into the subsea pressure exchanger. For example, in some embodiments, during the generating of power or 'discharging,' the low pressure difference LDF subsea pump may pump LDF from the subsea tank into the subsea pressure exchanger while HDF may be transfer from the pressure exchanger to the subsea tank. For example, in some embodiments, during the generating of power or 'discharging,' the low pressure difference LDF subsea pump may pump LDF from the subsea tank into the subsea pressure exchanger, while low pressure difference HDF subsea pump may be disengaged and/or the HDF may be transfer from the pressure exchanger to the subsea tank.

For example, in some embodiments, during the storing of power or charging, the low pressure difference HDF subsea pump may operate, displacing at least a portion of the depressurized LDF (which may comprise LDF with about the same pressure as the internal pressure of the subsea tank due to pressure extraction in the pressure exchanger) with HDF during each pressure exchanger rotation or pressure exchange cycle. A portion of the LDF may remain in the pressure exchanger during each cycle, for example, to maintain a liquid-liquid interface and/or to reduce or minimize the transfer of HDF into the LDF pipe.

For example, during generating power or discharging, the low pressure difference LDF subsea pump may operate, displacing at least a portion of the depressurized HDF (which may comprise HDF with about the same pressure as the internal pressure of the subsea tank due to pressure extraction in the pressure exchanger) during each pressure exchanger rotation or pressure exchange cycle. A portion of the HDF may remain in the pressure exchanger during each cycle, for example, to maintain a liquid-liquid interface and/or to reduce or minimize the transfer of HDF into the LDF pipe.

Potential Mixing of LDF and HDF within the Subsea Pressure Exchanger:

In some embodiments, a portion of HDF may mix with LDF in the subsea pressure exchanger. In some embodiments, a portion of mixing may be due to, for example, including but not limited to, high pressures, or turbulence, or any combination thereof. In some embodiments, a mixed portion of LDF and HDF may comprise a two liquid phase liquid-liquid mixture. In some embodiments, a mixed portion of LDF and HDF may be located within the subsea pressure exchanger at a liquid-liquid interface. In some embodiments, a portion of a mixed portion of LDF and HDF may transfer into the LDF or HDF. In some embodiments, a portion of a mixed portion of LDF and HDF may transfer into the LDF or HDF pipes. In some embodiments, if the LDF and HDF are practically insoluble in each other, or already saturated in solubility (as in LDF is fully saturated with dissolved HDF and HDF is fully saturated with dissolved LDF), or any combination thereof, a mixture of LDF and HDF transferred into an LDF pipe or HDF pipe may separate, or gravitationally separate, or self separate. For example, if a mixture of LDF and HDF are transferred into a tank, the HDF may gravitationally sink or separate into an HDF lay and/or the LDF may gravitationally float or separate into an LDF layer. In some embodiments, it may be desirable to separate potential mixtures of LDF and HDF before, for example, further transfer into a pipe, or tank, or pump, or turbine, or other equipment, or any combination thereof. For example, in some embodiments, decanters, or coalescers, or other fluid separators may be located or fluidly connected to LDF or HDF fluid flows exiting the pressure exchanger. In some embodiments, separated LDF or HDF from any LDF and HDF fluid mixtures produced by a pressure exchanger may be transferred to nearby tanks or storage reservoirs, or to the flows of the same or similar fluid (for example: separated LDF may be transferred to an LDF pipe or fluid flow, and/or separated HDF may be transferred to an HDF pipe or fluid flow), or any combination thereof. For example, in some embodiments, it may be desirable to separate at least a portion of HDL from LDL before LDL is transferred from the lower elevation region to the higher elevation region, and/or it may be desirable to separate at least a portion of LDL from HDL before HDL is transferred from the lower elevation region to the higher elevation region.

FIGS. 5A-5C Example Properties
  Water Depth at Bottom of Subsea Tank: 1,000 meters
  Low Density Fluid Density (LDF): 790 kg/m$^3$
  High Density Fluid Density (HDF): 1,520 kg/m$^3$
  Solubility of LDF in HDF: Insoluble
  Volume of Stored LDF: 30,000 m$^3$
  Volume of Stored HDF: 30,000 m$^3$
  Energy Storage Duration: 10 Hours
  Energy Efficiency of Surface Pump/Turbine Generator (Pumping): 90%
  Energy Efficiency of Surface Pump/Turbine Generator (Generating): 90%
  Energy Efficiency of Subsea Pressure Exchanger: 98%
  Pressure Drop (Losses) in LDF Riser during Charging: 1 Bar
  Pressure Drop (Losses) in LDF Riser during Discharging: 1 Bar
  Pressure Drop (Losses) in HDF Riser during Charging: 1 Bar
  Pressure Drop (Losses) in HDF Riser during Discharging: 1 Bar
  Note: Calculations may be for one surface tank and one subsea tank. Some embodiments may have multiple surface tanks within a single floating vessel hull. Some embodiments may have multiple subsea tanks.
  Note: The components located below the 'Near Seabed' dashed line may be at about the same water depth/elevation to simplify the pressure and energy calculations. Similarly, the components located above the 'Near Surface' dashed line may be at about the same water depth/elevation to simplify the pressure and energy calculations.

FIGS. 5A-5C Example Key

| Label | Description |
|---|---|
| | FIGS. 5A-5C Key |
| T2 | Storage tank on floating on sea surface (e.g. FSO). Stores both LDF and HDF. |
| L11 | Pipe transferring LDF between T2 and P1. |
| P1 | Hydroelectric Pump/Generator. Comprises a reversible hydroelectric pump/turbine generator. |
| E1 | Submarine electricity cable, which may be located on the seafloor. |
| E2 | Dynamic power cable transferring electricity between the submarine electricity cable 'Near Seabed' (E1) and the Pump/Turbine generator located on 'Near Surface' (P1). |
| L10 | Pipe transferring LDF between P1 and V3. |
| V3 | Valve and/or flow controller. V3 controls the flow rate of LDF into or out of the hydroelectric pump/generator (P1) and the floating tank (T2), and allows for the isolation of T2, if or when desired, from the Low Density Fluid in the riser. V3 may comprise a flow controller and a shutoff valve. |

-continued

FIGS. 5A-5C Key

| Label | Description |
|---|---|
| L3 | Riser pipe transferring LDF between V3 and V1. |
| L4 | Pipe connecting L3 to V2 at an elevation or depth 'Near Seabed'. Transfers LDF. |
| V2 | Valve. V2 may be the valve between PC2 and L4. V2 prevents the pressure of L3 'Near Seabed' from dropping below the hydrostatic pressure of the adjacent body of water at about the same depth. If the pressure of L3 'Near Seabed' drops below the hydrostatic of the adjacent body of water at about the same depth, V2 opens and V3 closes to allow the pressure in L3 to equilibrate. If the pressure of L3 'Near Seabed' may be above the hydrostatic pressure of the adjacent body of water, V2 closes. |
| L5 | Pipe connecting V2 to PC1 at an elevation or depth 'Near Seabed' |
| PC2 | Subsea compensator or subsea pressure compensator. PC2 provides an additional system to prevent an under-pressure event from occurring in L3 and T1. |
| PX1 | Subsea pressure exchanger. During 'charging', PX1 transfers 'excess pressure' from the LDF to the HDF. During 'discharging', PX1 transfers 'excess pressure' from the HDF to the LDF. |
| L8 | Pipe transferring LDF between PX1 and V1. |
| V1 | Valve and/or flow controller and/or Low Pressure Difference LDF subsea pump. V1 controls the flow rate of low-density liquid into or out of the subsea tank and allows for the isolation of the subsea tank, if or when desired, from the Low Density Fluid in the pressure exchanger or riser. V1 may comprise a flow controller and a shutoff valve. V1 may comprise a low pressure difference LDF subsea pump. In some embodiments, the low pressure difference subsea pump in V1 may transfer LDF from the subsea tank into the pressure exchanger during the generating of power or 'discharging.' |
| L2 | Pipe transferring LDF between T1 and V1. L2 connects the LDF layer portion of the subsea tank (i.e. top of tank) to V1. |
| T1 | Rigid subsea tank comprising steel or composite. Inside the subsea tank, Low Density Fluid floats above High Density Fluid. Low Density Fluid may be practically insoluble in High Density Fluid. |
| L1 | Pipe connecting T1 to PC1. |
| PC1 | Subsea compensator or subsea pressure compensator. PC1 may enable T1 to remain at a pressure near equilibrium with the pressure of the adjacent body of water at about the same depth. |
| L6 | Pipe connecting T1 to V4. L6 connects the high-density liquid layer portion of the subsea tank (i.e. bottom of tank) to V4. |
| V4 | Valve and/or flow controller and/or Low Pressure Difference HDF subsea pump. V4 controls the flow rate of High Density Fluid into or out of the subsea tank and allows for the isolation of the subsea tank, if or when desired, from the High Density Fluid in the pressure exchanger or riser. V4 may comprise a flow controller and a shutoff valve. V4 may comprise a low pressure difference HDF subsea pump. In some embodiments, the low pressure difference subsea pump in V4 may transfer HDF from the subsea tank into the pressure exchanger during the storing of power or 'charging.' |
| L9 | Pipe transferring HDF between PX1 and V4. |
| L7 | Riser pipe for transferring HDF between V4 and T2. |
| Near Surface | Elevation region 'Near Surface', such as near sea level. System components above the 'Near Surface' dashed line may be at an elevation near the surface of the body of water. For simplicity of calculations, the system components above 'Near Surface' dashed line may be at about the same elevation. |
| Seabed to Surface | Elevation region between the 'Near Surface' and 'Near Seabed'. Generally, risers may be located in this region. |
| Near Seabed | Elevation region 'Near Seabed', such as near seabed or the region of lowest system component elevation. For simplicity of calculations, the system components below 'Near Seabed' dashed line may be at about the same elevation. |

FIGS. 5A-5C Example Pressure Calculations—HDF Pressures:

Pressure of HDF ('Near Surface') in L7 if System Shown in FIGS. 5A-5C (FIG. 5B) May be Charging, as in, LDF May be Transferred from T2 to T1 to Displace HDF from T1 into T2:

HDF 'Near Surface' during charging may be at about the same pressure HDF at the bottom of the T2 tank, which may vary depending on the height of T2, the volume of HDF and/or LDF in the T2 tank, and the depth which the floating vessel (e.g. FSO) comprising T2 may be sitting in the water. For example, if the height of T2 may be 30 meters above the surface of the body of water and T2 may be full of HDF liquid, the pressure of HDF at the bottom of T2 may be 446,880 Pa (4.47 Bar), or 1,520 kg/m$^3$*9.8 m/s$^2$*30 m. For simplicity of the calculation, the pressure of HDF near surface may be at equilibrium with the atmospheric pressure which may be about 0 Bar gauge pressure.

Pressure of HDF ('Near Seabed') in L7 if System Shown in FIGS. 5A-5C (FIG. 5B) May be Charging, as in, LDF May be Transferred from T2 to T1 to Displace HDF from T1 into T2

HDF 'Near Seabed' during charging may be at a pressure equal to the hydrostatic pressure of HDF at the 'Near Surface' elevation, plus the pressure drop associated with the flow rate of HDF through the riser (L7). For example, if the hydrostatic pressure of HDF may be 14,896,000 Pa (148.96 Bar), or 1,520 kg/m$^3$*9.8 m/s$^2$*1,000 m, and the pressure drop associated with the flow rate of HDF through the riser may be 1 Bar, the total Pressure of HDF ('Near Seabed') in L7 may be 149.96 Bar.

Pressure of HDF ('Near Surface') in L7 if System Shown in FIGS. 5A-5C (FIG. 5C) May be Discharging, as in, HDF May be Allowed to Flow from T2 to T1 to Displace LDF from T1 into T2

HDF 'Near Surface' during discharging may be at about the same pressure HDF at the bottom of the T2 tank, which may vary depending on the height of T2, the volume of HDF and/or LDF in the T2 tank, and the depth which the floating vessel (e.g. FSO) comprising T2 may be sitting in the water. For example, if the height of T2 may be 30 meters above the surface of the body of water and T2 may be full of HDF liquid, the pressure of HDF at the bottom of T2 may be 446,880 Pa (4.47 Bar), or 1,520 kg/m$^3$*9.8 m/s$^2$*30 m. For simplicity of the calculation, the pressure of HDF near surface may be at equilibrium with the atmospheric pressure which may be about 0 Bar gauge pressure.

Pressure of HDF ('Near Seabed') in L7 if System Shown in FIGS. 5A-5C (FIG. 5C) May be Discharging, as in, HDF May be Allowed to Flow from T2 to T1 to Displace LDF from T1 into T2

HDF 'Near Seabed' during discharging may be at a pressure equal to the hydrostatic pressure of HDF at the 'Near Surface' elevation, minus the pressure drop associated with the flow rate of HDF through the riser (L7). For example, if the hydrostatic pressure of HDF may be 148.96 Bar, 14,896,000 Pa (148.96 Bar), or 1,520 kg/m$^3$*9.8 m/s$^2$*1,000 m, and the pressure drop associated with the flow rate of HDF through the riser may be 1 Bar, the total Pressure of HDF ('Near Seabed') in L7 may be 147.96 Bar.

FIGS. 5A-5C Example Pressure Calculations:

Pressure of LDF in L3 ('Near Surface') if System Shown in FIGS. 5A-5C (FIG. 5B) May be Charging, as in, LDF May be Transferred from T2 to T1 to Displace HDF from T1 into T2

LDF 'Near Surface' in L3 during charging may be at a pressure equal to the following combined sum of added pressures and subtracted pressures:

| Added Pressures | Subtracted Pressures |
|---|---|
| a) Hydrostatic Pressure of HDF at 'Near Seabed' Elevation | e) Hydrostatic Pressure of LDF at 'Near Seabed' Elevation |
| b) Pressure Losses in Subsea Pressure Exchanger | |
| c) Pressure Drop Associated with Flow Rate of HDF through Riser | |
| d) Pressure Drop Associated with Flow Rate of LDF through Riser | |

As in, the LDF 'Near Surface' in L3 during charging may be at a pressure equal to:

$$('a' + 'b' + 'c' + 'd') - 'e'$$

$$'a' = 1{,}520 \text{ kg/m}^3 * 9.8 \text{ m/s}^2 * 1{,}000 \text{ m} = 148.96 \text{ Bar}$$

$'b' = $ (Hydrostatic Pressure of $HDF$ +

Pressure Drop Associated with Flow Rate of $HDF$ through Riser) *

(1 – Pressure Transfer Method Efficiency) =

$(148.96 \text{ Bar} + 3 \text{ Bar}) * (1 - 0.98) =$ $(148.96 \text{ Bar} + 3 \text{ Bar}) * (0.02) = 3.04 \text{ Bar}$ $'c' = 1 \text{ Bar}$ $'d' = 1 \text{ Bar}$ $'e' = 790 \text{ kg/m}^3 * 9.8 \text{ m/s}^2 * 1{,}000 \text{ m} = 77.42 \text{ Bar}$ $('a' + 'b' + 'c' + 'd') - 'e' =$ $(148.96 \text{ Bar} + 3.04 \text{ Bar} + 1 \text{ Bar} + 1 \text{ Bar}) - 77.42 \text{ Bar} = 76.58 \text{ Bar}$ The pressure of LDF 'Near Surface' in L3 during charging: 76.58 Bar Pressure of LDF in L3 ('Near Seabed') if System Shown in FIGS. 5A-5C (FIG. 5B) May be Charging, as in, LDF May be Transferred from T2 to T1 to Displace HDF from T1 into T2

LDF 'Near Seabed' in L3 during charging may be at a pressure equal to the following combined sum of added pressures:

| Added Pressures |
|---|
| a) Hydrostatic Pressure of HDF at 'Near Seabed' Elevation |
| b) Pressure Losses in Subsea Pressure Exchanger |
| c) Pressure Drop Associated with Flow Rate of HDF through Riser |
| d) Pressure Drop Associated with Flow Rate of LDF through Riser |

As in, the LDF 'Near Surface' in L3 during charging may be at a pressure equal to:

$$'a' + 'b' + 'c' + 'd'$$

$$'a' = 1{,}520 \text{ kg/m}^3 * 9.8 \text{ m/s}^2 * 1{,}000 \text{ m} = 148.96 \text{ Bar}$$

$'b' = $ (Hydrostatic Pressure of $HDF$ +

Pressure Drop Associated with Flow Rate of $HDF$ through Riser) *

(1 – Pressure Transfer Method Efficiency) =

$(148.96 \text{ Bar} + 3 \text{ Bar}) * (1 - 0.98) =$ $(148.96 \text{ Bar} + 3 \text{ Bar}) * (0.02) = 3.04 \text{ Bar}$ $'c' = 1 \text{ Bar}$ $'d' = 1 \text{ Bar}$ $'a' + 'b' + 'c' + 'd' = 148.96 \text{ Bar} + 3.04 \text{ Bar} + 1 \text{ Bar} + 1 \text{ Bar} = 154 \text{ Bar}$ The pressure of LDF 'Near Seabed' in L3 during charging: 154 Bar Pressure of LDF ('Near Surface') in L3 if System Shown in FIGS. 5A-5C (FIG. 5C) May be Discharging, as in, HDF May be Allowed to Flow from T2 to T1 to Displace LDF from T1 into T2

LDF 'Near Surface' in L3 during discharging may be at a pressure equal to the following combined sum of added pressures and subtracted pressures:

| Added Pressures | Subtracted Pressures |
|---|---|
| (a) Hydrostatic Pressure of HDF at 'Near Seabed' Elevation | (b) Pressure Losses in Subsea Pressure Exchanger |
| | (c) Pressure Drop Associated with Flow Rate of HDF through Riser |
| | (d) Pressure Drop Associated with Flow Rate of LDF through Riser |
| | (e) Hydrostatic Pressure of LDF at 'Near Seabed' Elevation |

As in, the LDF 'Near Surface' in L3 during discharging may be at a pressure equal to:

$$'a' - ('b' + 'c' + 'd' + 'e')$$

$'a' = 1{,}520 \text{ kg/m}^3 * 9.8 \text{ m/s}^2 * 1{,}000 \text{ m} = 148.96 \text{ Bar}$ $'b' = $ (Hydrostatic Pressure of $HDF +$ Pressure Drop Associated with Flow Rate of $HDF$ through Riser) $*$ $(1 - $ Pressure Transfer Method Efficiency$) =$ $(148.96 \text{ Bar} + 3 \text{ Bar}) * (1 - 0.98) =$ $(148.96 \text{ Bar} + 3 \text{ Bar}) * (0.02) = 3.04 \text{ Bar}$ $'c' = 1 \text{ Bar}$ $'d' = 1 \text{ Bar}$ $'e' = 790 \text{ kg/m}^3 * 9.8 \text{ m/s}^2 * 1{,}000 \text{ m} = 77.42 \text{ Bar}$ $'a' - ('b' + 'c' + 'd' + 'e') =$ $148.96 \text{ Bar} - (3.04 \text{ Bar} + 1 \text{ Bar} + 1 \text{ Bar} + 77.42 \text{ Bar}) = 66.5 \text{ Bar}$ The Pressure of LDF 'Near Surface' in L3 During Discharging: 66.5 Bar Pressure of LDF ('Near Seabed') in L3 if System Shown in FIGS. 5A-5C (FIG. 5C) May be Discharging, as in, HDF May be Allowed to Flow from T2 to T1 to Displace LDF from T1 into T2

LDF 'Near Seabed' in L3 during discharging may be at a pressure equal to the following combined sum of added pressures and subtracted pressures:

| Added Pressures | Subtracted Pressures |
|---|---|
| (a) Hydrostatic Pressure of HDF at 'Near Seabed' Elevation | (b) Pressure Losses in Subsea Pressure Exchangers |
| | (c) Pressure Drop Associated with Flow Rate of HDF through Riser |

As in, the LDF 'Near Surface' in L3 during discharging may be at a pressure equal to:

$$'a' - ('b' + 'c')$$

$'a' = 1{,}520 \text{ kg/m}^3 * 9.8 \text{ m/s}^2 * 1{,}000 \text{ m} = 148.96 \text{ Bar}$ $'b' = $ (Hydrostatic Pressure of $HDF +$ Pressure Drop Associated with Flow Rate of $HDF$ through Riser) $*$ $(1 - $ Pressure Transfer Method Efficiency$) =$ $(148.96 \text{ Bar} + 3 \text{ Bar}) * (1 - 0.98) =$ $(148.96 \text{ Bar} + 3 \text{ Bar}) * (0.02) = 3.04 \text{ Bar}$ $'c' = 1 \text{ Bar}$ $'a' - ('b' + 'c') = 148.96 \text{ Bar} - (3.04 \text{ Bar} + 1 \text{ Bar}) = 144.92 \text{ Bar}$ The pressure of LDF 'Near Seabed' in L3 during discharging: 144.92 Bar FIG. 5B and FIG. 5C Example Flow Rate Calculations Flow rate calculations assume the system operates at a fixed liquid flow rate, which may be the max flow rate. A real system may operate at max flow rate or may operate with variable flow rate. The present example calculations use a fixed flow rate to simplify calculations. Additionally, 'Charging' calculations assume the SOME EMBODIMENTS system starts charging from a state of 0% charged (i.e., all LDF may be in the surface tank (T2) and all HDF may be in the subsea tank (T1)). Additionally, 'Discharging' calculations assume the SOME EMBODIMENTS system starts discharging from a state of 100% charged (i.e., all LDF may be in the subsea tank (T1) and all HDF may be in the surface tank (T2)).

During 'Charging' and 'Discharging', the volumetric flow rate of LDF may be about equal to the volumetric flow rate of HDF.

Based on the assumptions described above, the volumetric flow rate may be calculated according to the following:

$$\text{Storage Volume } (\text{m}^3)/\text{Duration (hours)} = \text{Volumetric Flow Rate } (\text{m}^3/\text{hour})$$

$$30{,}000 \text{ m}^3/10 \text{ hours} = 3{,}000 \text{ m}^3/\text{hour}$$

Volumetric Flow Rate of LDF During Charging or Discharging: 3,000 m³/hr, or 0.833 m³/s Volumetric Flow Rate of HDF During Charging or Discharging: 3,000 m³/hr, or 0.833 m³/s FIGS. 5B and 5C Example Power Calculations FIG. 5B Power Calculations for Charging (Input Electric Power)

The following may be the calculation for electric power input during charging with a known liquid volumetric flow rate and a known liquid pressure:

$$\text{Pressure (Pa)} * \text{Volumetric Flow Rate } (\text{m}^3/\text{s}) = \text{Power (W)}$$

$$7{,}658{,}000 \text{ Pa} * 0.833 \text{ m}^3/\text{s} = 6{,}379{,}114 \text{ Watts} = 6.379114 \text{ MW}$$

Power may be divided by pump efficiency (unitless decimal value) to determine total required electric power input:

$$6.379114 \text{ MW}/0.9 = 7.0879 \text{ MW}$$

FIG. 5B Electric Power Input: 7.0879 MW

FIG. 5C Power Calculations for Discharging (Output Electric Power)

The following may be the calculation for electric power output during discharging with a known liquid volumetric flow rate and a known liquid pressure:

$$\text{Pressure (Pa)} * \text{Volumetric Flow Rate } (\text{m}^3/\text{s}) = \text{Power (W)}$$

$$6{,}650{,}000 \text{ Pa} * 0.833 \text{ m}^3/\text{s} = 5{,}539{,}450 \text{ Watts} = 5.53945 \text{ MW}$$

Power may be multiplied by generator efficiency (unitless decimal value) to determine total electric power output:

$$5.53945 \text{ MW} * 0.9 = 4.98551 \text{ MW}$$

FIG. 5C Electric Power Output: 4.98551 MW

FIGS. 5B and 5C Example Energy Calculations

FIG. 5B Energy Calculations Charging (Input Electricity)

The unit for energy may be power times time, such as MW*hr or MWh. In the present example calculations, the duration (time) of discharge may be 10 hours, and the input power for the duration may be fixed.

The following may be the calculation for total charging energy input (input electricity):

Electric Power Input (MW) * Time (hrs) = Electrical Energy Input (MWh)

7.0879 MW * 10 hrs = 70.879 MWh

FIG. 5B Total Electrical Energy (Electricity) Input: 70.879 MWh

FIG. 5C Energy Calculations Discharging (Output Electricity)

The unit for energy may be power times time, such as MW*hr or MWh. In the present example calculations, the duration (time) of discharge may be 10 hours, and the input power for the duration may be fixed.

The following may be the calculation for total charging energy input (input electricity):

Electric Power Input (MW) * Time (hrs) = Electrical Energy Input (MWh)

4.98551 MW * 10 hrs = 49.8551 MWh

FIG. 5C Total Electrical Energy (Electricity) Output: 49.8551 MWh

FIGS. 5A-5C Example Round Trip Energy Efficiency Calculations

Round Trip Electric Energy Efficiency may be the amount of electricity output divided by the amount of electricity input. If the energy storage system completes a full charge—discharge cycle (i.e., charge from 0% to 100% and then discharge from 100% to 0%), then the round-trip electrical energy efficiency may be equal to the total electricity input divided by the total electricity output.

The following may be the calculation for FIG. 5A-5C Round Trip Energy Efficiency:

Total Electricity Output (MWh)/Total Electricity Input (MWh) =

Round Trip Electrical Energy Efficiency 49.8551 MWh/70.879 MWh = 0.703383231 = 70.33%

FIG. 5A-5C Round Trip Electrical Efficiency: 70.33%

FIGS. 5A-5C Example Flow Sheets

Note: Pressures in an actual system may be slightly different than the pressures shown in the following flow sheets. Pressures in an actual system may be slightly different than the pressures shown in the following flow sheets, for example, due to the pressure difference provided by the low pressure difference subsea pumps in V1 and V4. During storing of power or 'charging', the pressure of L9 may be greater than the pressure of L6 due to, for example, the operation of a low pressure difference HDF subsea pump in V4. During storing of power or 'charging', the pressure of L9 may be greater than the pressure of L6 by, for example, 0.1-5 Bar, due to, for example, the operation of a low pressure difference HDF subsea pump in V4. During generating of power or 'discharging', the pressure of L8 may be greater than the pressure of L2 due to, for example, the operation of a low pressure difference LDF subsea pump in VB. During generating of power or 'discharging', the pressure of L8 may be greater than the pressure of L2 by, for example, 0.1-5 Bar, due to, for example, the operation of a low pressure difference LDF subsea pump in V.

FIG. 5A Example Flow Sheet

| FIG. 5A Flow Sheet | |
| --- | --- |
| Label | Description |
| T2 | Pressure: ~0 Bar (Gauge Pressure) |
| | Volume: 30,000 m$^3$ |
| | LDF and HDF Volume Stored: |
| | If SOME EMBODIMENTS may be Fully Charged: |
| | 0 m$^3$ LDF, 30,000 m$^3$ HDF |
| | If SOME EMBODIMENTS may be Fully Discharged: |
| | 30,000 m$^3$ LDF, 0 m$^3$ HDF |
| L11 | Pressure: ~0 Bar (Gauge Pressure) |
| | Flow Rate: 0 m$^3$/s (No flow rate because system may be paused in FIG. 5A) |
| | Liquid: LDF |
| P1 | Power: 0 MW (No power because system may be paused in FIG. 5A) |
| | Flow Rate: 0 m$^3$/s (No flow rate because system may be paused in FIG. 5A) |
| | Liquid: LDF |
| E1 | Power: 0 MW |
| E2 | Power: 0 MW |
| L10 | Pressure: ~0 Bar (Gauge Pressure) |
| | Flow Rate: 0 m$^3$/s |
| | Liquid: LDF |
| V3 | Operating Mode: Closed |
| L3 ('Near Surface') | Pressure: 23.03 Bar |
| | Flow Rate: 0 m$^3$/s |
| | Liquid: LDF |
| L3 ('Near Seabed') | Pressure: 100.45 Bar |
| | Flow Rate: 0 m$^3$/s |
| | Liquid: LDF |
| L4 | Pressure: 100.45 Bar |
| | Flow Rate: 0 m$^3$/s |
| | Liquid: LDF |
| V2 | Operating Mode: Open |
| L5 | Pressure: 100.45 Bar |
| | Flow Rate: 0 m$^3$/s |
| | Liquid: LDF |
| PC2 | Pressure: 100.45 Bar |
| PX1 | Operating Mode: Closed (internal valves closed to prevent pressure transfer from HDF to LDF) |
| | Flow Rate: 0 m$^3$/s |
| L8 | Pressure: 100.45 Bar |
| | Flow Rate: 0 m$^3$/s |
| | Liquid: LDF |
| V1 | Operating Mode: Closed |
| L2 | Pressure: 100.45 Bar |
| | Flow Rate: 0 m$^3$/s |
| | Liquid: LDF |
| T1 | Pressure: 100.45 Bar (Gauge Pressure) |
| | Volume: 30,000 m$^3$ |
| | LDF and HDF Volume Stored: |
| | If SOME EMBODIMENTS may be Fully Charged: |
| | 0 m$^3$ LDF, 30,000 m$^3$ HDF |
| | If SOME EMBODIMENTS may be Fully Discharged: |
| | 30,000 m$^3$ LDF, 0 m$^3$ HDF |
| L1 | Pressure: 100.45 Bar |
| | Flow Rate: 0 m$^3$/s |
| PC1 | Pressure: 100.45 Bar |
| L6 | Pressure: 100.45 Bar |
| | Flow Rate: 0 m$^3$/s |
| | Liquid: HDF |
| V4 | Operating Mode: Closed |
| L9 | Pressure: 100.45 Bar |
| | Flow Rate: 0 m$^3$/s |
| | Liquid: HDF |
| L7 (Near Surface) | Pressure: ~0 Bar (Gauge Pressure) |
| | Flow Rate: 0 m$^3$/s |
| | Liquid: HDF |
| L7 (Near Seabed) | Pressure: 148.96 Bar |
| | Flow Rate: 0 m$^3$/s |
| | Liquid: HDF |

-continued

| FIG. 5A Flow Sheet | |
|---|---|
| Label | Description |
| Near Surface | Elevation: 0 meters |
| Seabed to Surface | Elevation: 0 to −1,000 meters |
| Near Seabed | Elevation: −1,000 meters |

FIG. 5B Flow Sheet

| FIG. 5B Flow Sheet | |
|---|---|
| Label | Description |
| T2 | Pressure: ~0 Bar (Gauge Pressure)<br>Volume: 30,000 m³ |
| L11 | Pressure: ~0 Bar (Gauge Pressure) (Pressure may be greater to allow for flow of LDF from T2 to P1)<br>Flow Rate: 0.833 m³/s<br>Liquid: LDF |
| P1 | Power (Input): 7.0879 MW<br>Flow Rate: 0.833 m³/s<br>Liquid: LDF |
| E1 | Power (to E2): 7.0879 MW |
| E2 | Power (to P1): 7.0879 MW |
| L10 | Pressure: 76.58 Bar<br>Flow Rate: 0.833 m³/s<br>Liquid: LDF |
| V3 | Operating Mode: Open |
| L3 ('Near Surface') | Pressure: 76.58 Bar<br>Flow Rate: 0.833 m³/s<br>Liquid: LDF |
| L3 ('Near Seabed') | Pressure: 154 Bar<br>Flow Rate: 0.833 m³/s<br>Liquid: LDF |
| L4 | Pressure: 154 Bar<br>Flow Rate: 0 m³/s<br>Liquid: LDF |
| V2 | Operating Mode: Closed |
| L5 | Pressure: 100.45 Bar<br>Flow Rate: 0 m³/s<br>Liquid: LDF |
| PC2 | Pressure: 100.45 Bar |
| PX1 | Operating Mode: Open<br>LDF Flow Rate: 0.833 m³/s<br>HDF Flow Rate: 0.833 m³/s |
| L8 | Pressure: ~100.45 Bar<br>Flow Rate: 0.833 m³/s<br>Liquid: LDF |
| V1 | Operating Mode: Open |
| L2 | Pressure: ~100.45 Bar<br>Flow Rate: 0.833 m³/s<br>Liquid: LDF |
| T1 | Pressure: ~100.45 Bar (Gauge Pressure)<br>Volume: 30,000 m³ |
| L1 | Pressure: 100.45 Bar<br>Flow Rate: 0 m³/s |
| PC1 | Pressure: 100.45 Bar |
| L6 | Pressure: ~100.45 Bar<br>Flow Rate: 0.833 m³/s<br>Liquid: HDF |
| V4 | Operating Mode: Open |
| L9 | Pressure: ~100.45 Bar<br>Flow Rate: 0.833 m³/s<br>Liquid: HDF |
| L7 (Near Surface) | Pressure: ~0 Bar (Gauge Pressure)<br>Flow Rate: 0.833 m³/s<br>Liquid: HDF |
| L7 (Near Seabed) | Pressure: 149.96 Bar<br>Flow Rate: 0.833 m³/s<br>Liquid: HDF |

-continued

| FIG. 5B Flow Sheet | |
|---|---|
| Label | Description |
| Near Surface | Elevation: 0 meters |
| Seabed to Surface | Elevation: 0 to −1,000 meters |
| Near Seabed | Elevation: −1,000 meters |

FIG. 5C Flow Sheet

| FIG. 5C Flow Sheet | |
|---|---|
| Label | Description |
| T2 | Pressure: ~0 Bar (Gauge Pressure)<br>Volume: 30,000 m³ |
| L11 | Pressure: ~0 Bar (Gauge Pressure) (Pressure may be greater to allow for flow of LDF from P1 to T2)<br>Flow Rate: 0.833 m³/s<br>Liquid: LDF |
| P1 | Power (Output): 4.98551 MW<br>Flow Rate: 0.833 m³/s<br>Liquid: LDF |
| E1 | Power (to Grid): 4.98551 MW |
| E2 | Power (to E1): 4.98551 MW |
| L10 | Pressure: 76.58 Bar<br>Flow Rate: 0.833 m³/s<br>Liquid: LDF |
| V3 | Operating Mode: Open |
| L3 ('Near Surface') | Pressure: 66.5 Bar<br>Flow Rate: 0.833 m³/s<br>Liquid: LDF |
| L3 ('Near Seabed') | Pressure: 144.92 Bar<br>Flow Rate: 0.833 m³/s<br>Liquid: LDF |
| L4 | Pressure: 144.92 Bar<br>Flow Rate: 0 m³/s<br>Liquid: LDF |
| V2 | Operating Mode: Closed |
| L5 | Pressure: 100.45 Bar<br>Flow Rate: 0 m³/s<br>Liquid: LDF |
| PC2 | Pressure: 100.45 Bar |
| PX1 | Operating Mode: Open<br>LDF Flow Rate: 0.833 m³/s<br>HDF Flow Rate: 0.833 m³/s |
| L8 | Pressure: ~100.45 Bar<br>Flow Rate: 0.833 m³/s<br>Liquid: LDF |
| V1 | Operating Mode: Open |
| L2 | Pressure: ~100.45 Bar<br>Flow Rate: 0.833 m³/s<br>Liquid: LDF |
| T1 | Pressure: ~100.45 Bar (Gauge Pressure)<br>Volume: 30,000 m³ |
| L1 | Pressure: 100.45 Bar<br>Flow Rate: 0 m³/s |
| PC1 | Pressure: 100.45 Bar |
| L6 | Pressure: ~100.45 Bar<br>Flow Rate: 0.833 m³/s<br>Liquid: HDF |
| V4 | Operating Mode: Open |
| L9 | Pressure: ~100.45 Bar<br>Flow Rate: 0.833 m³/s<br>Liquid: HDF |
| L7 (Near Surface) | Pressure: ~0 Bar (Gauge Pressure)<br>Flow Rate: 0.833 m³/s<br>Liquid: HDF |
| L7 (Near Seabed) | Pressure: 147.96 Bar<br>Flow Rate: 0.833 m³/s<br>Liquid: HDF |

-continued

| FIG. 5C Flow Sheet | |
|---|---|
| Label | Description |
| Near Surface | Elevation: 0 meters |
| Seabed to Surface | Elevation: 0 to −1,000 meters |
| Near Seabed | Elevation: −1,000 meters |

FIGS. 5B-5C Example Step-by-Step Descriptions

FIG. 5B Step-by-Step Description
1) Electricity may be transferred from an electricity source (such as offshore wind or an electricity grid) through a submarine electric power cable (E1), through a dynamic power cable (E2), to a pump (P1).
2) LDF may be transferred from the surface tank (T2) to P1, where P1 pressurizes/pumps LDF. LDF flows through a pipe (L10), through an open valve (V3), through a riser (L3) to a subsea pressure exchanger (PX1).
3) LDF may be pressure exchanged with HDF in the subsea pressure exchanger (PX1), where 'excess pressure' may be transferred from LDF to HDF.
   a. Note: The baseline pressure from which 'excess pressure' may be determined (i.e., Excess Pressure=High Before Pressure Exchanger—Baseline Pressure) may be controlled by a valve on each LDF and HDF pipe located between PX1 and T1 (i.e., V1 and V4) and may be controlled to match the hydrostatic pressure of the adjacent body of water at about the same depth. Excess pressure may be defined as pressure in excess of the hydrostatic pressure of the adjacent body of water, or pressure in excess of the internal pressure of the subsea tank, which may be at about the same pressure.
4) LDF flows from PX1, through a pipe (L8), through an open valve (V1), through a pipe (L2) into the subsea tank (T1). In the subsea tank, every unit volume of LDF entering the subsea tank, and about equivalent unit volume of HDF exits the subsea tank.
5) HDF flows from the subsea tank (T1) through a pipe (L6), through a low pressure difference HDF subsea pump and open valve (V4), through a pipe (L9), to the subsea pressure exchanger (PX1). The low pressure difference HDF subsea pump may be employed to, for example, enable HDF to exit the subsea tank at a desired flow rate, and/or enable the transfer of HDF from the subsea tank into the subsea pressure exchanger at a desired flow rate and the transfer of LDF out of the subsea pressure exchanger into the subsea tank at a desired flow rate.
6) HDF may be pressure exchanged with LDF in the subsea pressure exchanger (PX1), where HDF may be pressurized by the 'excess pressure' transferred from LDF.
   a. Note: '6)' may be the same step as '3)', as in occurring at about the same time in the same component. '6)' may be explained from the perspective of HDF, while '3)' may be explained from the perspective of LDF.
7) HDF flows from PX1 through a riser (L7) to the surface tank (T2).

FIG. 5C Step-by-Step Description
1) HDF may be allowed (due to the opening of V4, V1, V3, and opening internal valve of PX1, and changing operating mode of P1 to 'generating mode') to flow from the surface tank (T2), through a riser (L7), to the pressure exchanger (PX1).
2) HDF may be pressure exchanged with LDF in the subsea pressure exchanger (PX1), where 'excess pressure' may be transferred from the HDF to the LDF.
   a. Note: The baseline pressure from which 'excess pressure' may be determined (i.e. Excess Pressure=High Before Pressure Exchanger–Baseline Pressure) may be controlled by a valve on each LDF and HDF pipe located between PX1 and T1 (i.e. V1 and V4) and may be controlled to match the hydrostatic pressure of the adjacent body of water at about the same depth. Excess pressure may be defined as pressure in excess of the hydrostatic pressure of the adjacent body of water, or pressure in excess of the internal pressure of the subsea tank, which may be at about the same pressure.
3) HDF flows from PX1, through a pipe (L9), through an open valve (V4), through a pipe (L6) into the subsea tank (T1). In the subsea tank, every unit volume of HDF entering the subsea tank, and about equivalent unit volume of LDF exits the subsea tank.
4) LDF flows from the subsea tank (T1) through a pipe (L2), through a low pressure difference LDF subsea pump and open valve (V1), through a pipe (L8), to the subsea pressure exchanger (PX1). The low pressure difference LDF subsea pump may be employed to, for example, enable LDF to exit the subsea tank at a desired flow rate, and/or enable the transfer of LDF from the subsea tank into the subsea pressure exchanger at a desired flow rate and the transfer of HDF out of the subsea pressure exchanger into the subsea tank at a desired flow rate.
5) LDF may be pressure exchanged with HDF in the subsea pressure exchanger (PX1), where LDF may be pressurized by the 'excess pressure' transferred from HDF.
   a. Note: '6)' may be the same step as '3)', as in occurring at about the same time in the same component. '6)' may be explained from the perspective of LDF, while '3)' may be explained from the perspective of HDF.
6) LDF flows from PX1 through a riser (L3), through an open valve (V3), through a pipe (L10), into an electric generator (P1), generating electricity.
7) LDF flows from P1, through a pipe (L11), into the surface tank (T2).

Electricity may be transferred from the electric generator (P1), through a dynamic power cable (E2), through a submarine electricity cable (E1), to an application consuming electricity, such as an electricity grid.

FIGS. 6A-C

Example FIGS. 6A-C Summary

FIG. 6, or FIGS. 6A-C, may show a fluid displacement energy storage system employing an LDF pump/turbine and an HDF pump/turbine. FIG. 6, or FIGS. 6A-C, may show a fluid displacement energy storage system employing an LDF pump/turbine and an HDF pump/turbine, wherein the LDF pump/turbine may be located at an elevation about the same as the higher elevation reservoir or first reservoir and/or wherein the HDF pump/turbine may be located at an elevation about the same as the lower elevation reservoir or second reservoir. In FIG. 6, locating the LDF pump and/or turbine in the higher elevation region or at an elevation about the same as the elevation of the first reservoir may reduce the potential or required power capacity or of a dynamic power cable, or the need for a dynamic power cable, which may improve system cost, or reduce system complexity, or improve energy efficiency, or any combination thereof.

The system may enable a lower elevation reservoir at pressure equilibrium with the adjacent body of water or a lower elevation reservoir with an internal pressure about the same as the adjacent body of water at the same depth or elevation, while employing LDF with a density and hydrostatic pressure less than the body of water and an HDF with a density and hydrostatic pressure greater than the body of water. In some embodiments, employing an LDF with a density less than the body of water and an HDF with a density greater than a body of water enables significantly greater potential energy storage and energy density and enables energy storage density to potentially be uncapped, as in, the density difference may not be limited by or may be independent of the density of the body of water. In some embodiments, enabling the internal pressure of the second reservoir or lower elevation reservoir to be at about the same pressure at the adjacent body of water, or to be at about pressure equilibration with the adjacent body of water at the same depth, or any combination thereof may enable, for example, the locating of the second reservoir or lower elevation reservoir at deeper depths or lower elevations while enabling the same or similar tank volume or while enabling similar tank cost or while enabling the tank to maintain a similar wall thickness independent of depth, and/or may enable the potential depth of the lower elevation reservoir to be uncapped, or enable the locating of the system very deep bodies of water.

FIG. 6A may show the system at a steady state.

FIG. 6B may show the system charging or storing power or storing energy in the form of potential energy.

FIG. 6C may show the system discharging or generating power or converting potential energy into kinetic energy or electrical energy.

Example FIGS. 6A-C Figure Label Key

| Label | Description |
|---|---|
| | Example FIGS. 6A-C Label Key |
| T | 'T' may comprise a tank or reservoir. 'T' may comprise a rigid tank or a fixed volume tank. 'T' may be configured to store HDF and/or LDF. |
| L | 'L' may comprise a fluid pipe or fluid conduit. 'L' may transfer or comprise, for example, a liquid. 'L' may transfer or comprise, for example, HDF or LDF. |
| P | 'P' may comprise a pump, or turbine, or generator, or a device for converting electricity into mechanical or hydraulic work, or a device for converting mechanical or hydraulic work into electricity, or a device for converting or transferring hydraulic work or fluid power, or a pressure exchanger, or a turbocharger, or any combination thereof. |
| FM | 'FM' may comprise a flow meter, or flow controller, or any combination thereof. 'FM' may measure or control the flow rate, or other properties of a liquid or fluid. |
| TS | 'TS' may comprise a temperature sensor. 'TS' may measure temperature at one or more points, or may measure temperature inside the system, or may measure temperature outside or adjacent to the system, or may measure temperature differences, or any combination thereof. |
| PS | 'TS' may comprise a pressure sensor. 'TS' may measure pressure at one or more points, or may measure pressure inside the system, or may measure pressure outside or adjacent to the system, or may measure pressure differences, or any combination thereof. |
| V | 'V' may comprise a valve, or flow controller, or flow meter, or pressure sensor, or temperature sensor, or any combination thereof. 'V' may be capable of changing flow rate, or stopping flow rate, or any combination thereof of a fluid. |
| E | 'E' may comprise an power transfer medium, such as an power cable, or submarine power cable, or a dynamic power cable, or an electrical transmission method, or an electrical transmission system, or any combination thereof. |
| PC | 'PC' may comprise a pressure compensator, or bladder tank, or expansion tank, or buffer tank, or subsea compensator, or any combination thereof. 'PC' may enable pressure equilibration with an adjacent body of water or adjacent environment. An interconnected 'PC' may allow for deviations or differences in volumetric flow rate, or potential changes in stored volume in rigid tanks or rigid subsea tanks. |
| Near Surface | 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components. |
| Seabed to Surface | 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir. |
| Near Seabed | 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. |

Example FIGS. 6A-C Figure Label+Number Key

| | Example FIGS. 6A-C Label + Number Key |
|---|---|
| Label | Description |
| T1 | 'T1' may comprise a higher elevation reservoir or first reservoir. 'T1' may comprise a tank, or a floating vessel, or floating storage, or a fixed vessel, or an onshore tank, or an underground tank, or an FSO, or a TLP, or a semi-sub, or platform, or any combination thereof. |
| L1 | 'L1' may comprise low density fluid (LDF) transferred between a higher elevation reservoir (T1) and a pump and/or turbine (P1). |
| FM1 | 'FM1' may comprise a flow meter, or flow controller, which may measure the flow rate, such as mass and/or volumetric flow rate, of LDF in L1. 'FM1' may measure the mass flow rate and/or volumetric flow rate of LDF entering or exiting the higher elevation reservoir or first reservoir. |
| TS1 | 'TS1' may comprise a temperature sensor, which may measure the temperature of LDF in L1, or temperature in T1, or temperature adjacent to L1 or T1, or any combination thereof. |
| PS1 | 'PS1' may comprise a pressure sensor, which may measure the pressure of LDF in L1, or may measure the pressure of LDF before or when entering or exiting P1, or the pressure adjacent to L1, or the pressure in T1, or any combination thereof. |
| P1 | 'P1' may comprise a pump and/or turbine. 'P1' may comprise an LDF pump and/or turbine. For example, during charging, 'P1' may store power by pumping LDF from L1 to L2. For example, during discharging, 'P1' may generate power by allowing or generating power from LDF transferring through P1 from L2 to L1. In FIG. 6, 'P1' may be located 'Near Surface' or at an elevation about the same as the elevation of the higher elevation reservoir or first reservoir. |
| E1 | 'E1' may comprise a submarine power cable, or subsea electricity cable, or a power cable. In some embodiments, 'E1' may transfer power from a power source to the energy storage system, or may transfer power from the energy storage system to one or more applications consuming or using power, or any combination thereof. |
| E2 | 'E2' may comprise a power cable which may transfer power between E1 and P1. In some embodiments, 'E2' may comprise a dynamic power cable. In some embodiments, 'E2' may comprise a submarine power cable or subsea power cable. In some embodiments, 'E2' may comprise a power cable, or an onshore power cable, or an underground power cable, or any combination thereof. |
| L2 | 'L2' may comprise LDF transferred between a pump and/or turbine and a valve. |
| V1 | 'V1' may comprise a valve. 'V1' may comprise a flow controller, or a flow stopper, or a safety valve. 'V1' may be located at an elevation about the same as the higher elevation reservoir or first reservoir, or at a 'Near Surface' elevation. |
| L3 | 'L3' may comprise LDF transferred between a higher elevation region and a lower elevation region. In some embodiments, 'L3' may comprise a riser pipe, or a subsea pipe, or a flexible pipe, or a dynamic pipe, or dynamic conduit, or any combination thereof. |
| FM2 | 'FM2' may comprise a flow meter, or flow controller, which may measure the flow rate, such as mass and/or volumetric flow rate, of LDF in L3. |
| TS2 | 'TS2' may comprise a temperature sensor, which may measure the temperature of LDF in L3, or temperature adjacent to L3, or any combination thereof. |
| PS2 | 'PS2' may comprise a pressure sensor, which may measure the pressure of LDF in L3, or the pressure adjacent to L3, or any combination thereof. |
| V2 | 'V2' may comprise a valve. 'V2' may comprise a flow controller, or a flow stopper, or a safety valve. 'V2' may be located at an elevation about the same as the lower elevation reservoir or second reservoir, or at a 'Near Seabed' elevation. |
| L4 | 'L4' may comprise LDF transferred between a valve and a lower elevation reservoir. |
| FM3 | 'FM3' may comprise a flow meter, or flow controller, which may measure the flow rate, such as mass and/or volumetric flow rate, of LDF in L4. 'FM3' may measure the mass flow rate and/or volumetric flow rate of LDF entering or exiting the lower elevation reservoir or second reservoir. |
| TS3 | 'TS3' may comprise a temperature sensor, which may measure the temperature of LDF in L4, or temperature in T2, or temperature adjacent to L4 or T4, or any combination thereof. |
| PS3 | 'PS3' may comprise a pressure sensor, which may measure the pressure of LDF in L4, or may measure the pressure of LDF entering or exiting T2, or the pressure adjacent to L4, or the pressure in T2, or any combination thereof. |
| T2 | 'T1' may comprise a lower elevation reservoir or second reservoir. 'T2' may comprise a tank. 'T2' may be configured to store LDF and/or HDF. 'T2' may comprise a rigid tank. In some embodiments, it may be desirable for 'T2' to possess an internal pressure about the same as the pressure of the adjacent body of water at about the same elevation. |
| L5 | 'L5' may comprise fluid which may be transferred between T2 and PC1. In some embodiments, L5 may comprise LDF, or HDF, or any combination thereof. In some embodiments, fluid may transfer or pass through L5 if the pressure in T2 is substantially different than the pressure of the body of water adjacent to T2 at about the same elevation. In some embodiments, fluid may transfer or pass through L5 if the volume of fluid entering or exiting T2 at L4 is different than the volume of fluid exiting or entering T2 at L7. |

Example FIGS. 6A-C Label + Number Key

| Label | Description |
|---|---|
| V3 | 'V3' may comprise a valve. 'V3' may comprise a flow controller, or a flow stopper, or a safety valve. 'V3' may be located at an elevation about the same as the lower elevation reservoir or second reservoir, or at a 'Near Seabed' elevation. 'V3' may open or allow fluid flow in L5 and L6 when desired or, for example, when the internal pressure of T2 is different from the internal pressure of PC1, or when the internal pressure of T2 is different from the pressure of the water body adjacent to T1 at about the same elevation as T1, or any combination thereof. |
| L6 | 'L6' may comprise fluid which may be transferred between T2 and PC1. In some embodiments, L6 may comprise LDF, or HDF, or any combination thereof. In some embodiments, fluid may transfer or pass through L6 if the pressure in T2 is substantially different than the pressure of the body of water adjacent to T2 at about the same elevation. In some embodiments, fluid may transfer or pass through L6 if the volume of fluid entering or exiting T2 at L4 is different than the volume of fluid exiting or entering T2 at L7. |
| PS4 | 'PS4' may comprise a pressure sensor, which may measure the pressure of LDF in L6, or may measure the pressure fluid entering or exiting T2, or the pressure adjacent to L6, or the pressure in T2, or measure the internal pressure of PC1, or measure the pressure adjacent to PC1, or any combination thereof. |
| TS4 | 'TS4' may comprise a temperature sensor, which may measure the temperature of LDF or HDF in L6, or may measure the temperature fluid entering or exiting T2, or the temperature adjacent to L6, or the temperature in T2, or measure the internal temperature of PC1, or measure the temperature adjacent to PC1, or any combination thereof. |
| FM4 | 'FM4' may comprise a flow meter, or flow controller, which may measure the flow rate, such as mass and/or volumetric flow rate, of LDF and/or HDF in L6. 'FM4' may measure the mass flow rate and/or volumetric flow rate of LDF and/or HDF entering or exiting PC1. FM4 may measure the fluid flow direction, which may indicate if volume of fluid entering T2 is greater than the volume of fluid exiting, or if the volume of fluid exiting T2 is greater than the volume of fluid entering. |
| PC1 | 'PC1' may comprise a pressure compensator, or bladder tank, or expansion tank, or buffer tank, or subsea compensator, or any combination thereof. 'PC1' may enable pressure equilibration with an adjacent body of water or adjacent environment. An interconnected 'PC1' may allow for deviations or differences in volumetric flow rate, or potential changes in stored volume in rigid tanks or rigid subsea tanks. In some embodiments, PC1 may be at about the same elevation as T2, or the lower elevation reservoir, or the second reservoir. |
| L7 | 'L7' may comprise fluid which may be transferred between T2 and V4 and/or P2. In some embodiments, L7 may comprise HDF. |
| FM5 | 'FM5' may comprise a flow meter, or flow controller, which may measure the flow rate, such as mass and/or volumetric flow rate, of HDF in L8, or L7, or the flow rate of fluid exiting P2, or the flow rate of fluid entering P2, or any combination thereof. |
| TS5 | 'TS5' may comprise a temperature sensor, which may measure the temperature of L8, or L7, or may measure the temperature fluid entering or exiting T2, or the temperature adjacent to L8 or L7, or the temperature in T2, or measure the internal temperature of P2, or measure the temperature adjacent to P2, or any combination thereof. |
| PS5 | 'PS5' may comprise a pressure sensor, which may measure the pressure of L8, or L7, or may measure the pressure of fluid entering or exiting T2, or the pressure adjacent to L8 or L7, or the pressure in T2, or measure the internal pressure of P2, or measure the pressure adjacent to P2, or any combination thereof. |
| V4 | 'V4' may comprise a valve. 'V4' may comprise a flow controller, or a flow stopper, or a safety valve. 'V4' may be located at an elevation about the same as the lower elevation reservoir or second reservoir, or at a 'Near Seabed' elevation. 'V4' may open or allow fluid flow in L7 and/or L8 when desired. |
| L8 | 'L8' may comprise fluid which may be transferred between P2 and V4 and/or T2. In some embodiments, L8 may comprise HDF. |
| P2 | 'P2' may comprise a pump and/or turbine. 'P2' may comprise an HDF pump and/or turbine. For example, during charging, 'P2' may store power by pumping HDF from L8 to L9. For example, during discharging, 'P2' may generate power by allowing or generating power from HDF transferring through P2 from L9 to L8. In FIG. 6, 'P2' may be located 'Near Seabed' or at an elevation about the same as the elevation of the lower elevation reservoir or second reservoir. |
| E3 | 'E3' may comprise a submarine power cable, or subsea electricity cable, or a power cable. In some embodiments, 'E3' may transfer power from 'E1,' or 'E3' may transfer power to 'E1,' or 'E3' may transfer power to P2, or 'E3' may transfer power from P2, or may transfer power from a power source to the energy storage system, or may transfer power from the energy storage system to one or more applications consuming or using power, or any combination thereof. |
| L9 | 'L9' may comprise a fluid which may be transferred between P2 and T1, or P2 and V6, or P2 and V5, or any combination thereof. In some embodiments, L9 may comprise HDF. In some embodiments, L9 may transverse the higher elevation region and the lower elevation region, or Near Seabed to Near Surface. In some embodiments, L9 may comprise a pipe, or a riser, or a flow line. |
| PS6 | 'PS6' may comprise a pressure sensor, which may measure the pressure of L9, or may measure the pressure of fluid entering or exiting P2, or the pressure adjacent to L9, or any combination thereof. |

Example FIGS. 6A-C Label + Number Key

| Label | Description |
|---|---|
| TS6 | 'TS6' may comprise a temperature sensor, which may measure the temperature of L9, or may measure the temperature of fluid entering or exiting P2, or the temperature adjacent to L9, or any combination thereof. |
| FM6 | 'FM6' may comprise a flow meter, or flow controller, which may measure the flow rate, such as mass and/or volumetric flow rate, of HDF in L9, or the flow rate of fluid exiting P2, or the flow rate of fluid entering P2, or any combination thereof. |
| V5 | 'V5' may comprise a valve. 'V5' may comprise a flow controller, or a flow stopper, or a safety valve. 'V5' may be located at an elevation about the same as the lower elevation reservoir or second reservoir, or at a 'Near Seabed' elevation, or within the 'Seabed to Surface' elevation, or 'Near Surface' elevation, or any combination thereof. 'V5' may open or allow fluid flow in L9 and/or L10 when desired. |
| FM7 | 'FM7' may comprise a flow meter, or flow controller, which may measure the flow rate, such as mass and/or volumetric flow rate, of HDF in L9 or L10, or the flow rate of fluid exiting T1, or the flow rate of fluid entering T1, or any combination thereof. |
| TS7 | 'TS7' may comprise a temperature sensor, which may measure the temperature of L9 or L10, or may measure the temperature of fluid entering or exiting T1, or the temperature adjacent to L9 or L10, or any combination thereof. |
| PS7 | 'PS7' may comprise a pressure sensor, which may measure the pressure of L9 or L10, or may measure the pressure of fluid entering or exiting T1, or the pressure adjacent to L9 or L10, or any combination thereof. |
| V6 | 'V6' may comprise a valve. 'V6' may comprise a flow controller, or a flow stopper, or a safety valve. 'V6' may be located at an elevation about the same as the or 'Near Surface' elevation, or at a 'Near Seabed' elevation, or within the 'Seabed to Surface' elevation, or any combination thereof. 'V6' may open or allow fluid flow in L9 and/or L10 when desired. |
| L10 | 'L10' may comprise a fluid which may be transferred between T1 and P2, or T1 and V6, or any combination thereof. In some embodiments, L10 may comprise HDF. In some embodiments, L10 may transverse the higher elevation region and the lower elevation region, or Near Seabed to Near Surface. In some embodiments, L10 may comprise a pipe, or a riser, or a flow line. |

Example FIGS. 6A-C Step-by-Step Description

Charging: Lower density fluid (LDF) is pumped from a higher elevation reservoir or first reservoir (T1) using an LDF pump (P1) into a lower elevation reservoir or second reservoir (T2), displacing at least a portion of higher density fluid (HDF) in the lower elevation reservoir or second reservoir (T2). Simultaneously, HDF is pumped from the lower elevation reservoir or second reservoir (T2) using an HDF pump (P2) into the higher elevation reservoir or first reservoir (T1).

In some embodiments, power may be stored with both the LDF pump and HDF pump simultaneously. In some embodiments, simultaneous pumping by both the LDF pump and HDF pump may enable the lower elevation reservoir pressure to be controllable or customizable, and/or may enable the internal pressure in the lower elevation reservoir or second reservoir to be about the same as the adjacent body of water at about the same depth or elevation.

Discharging: Higher density fluid (HDF) is allowed to transfer or flow from a higher elevation reservoir or first reservoir (T1), through an HDF turbine (P2), generating power, and into the lower elevation reservoir or second reservoir (T2), displacing at least a portion of lower density fluid (LDF) in the lower elevation reservoir or second reservoir (T2). Simultaneously, LDF is allowed to transfer or flow from the lower elevation reservoir or second reservoir (T2), through an LDF turbine (P1), generating power, and into the higher elevation reservoir or first reservoir (T1).

In some embodiments, power may be generated with both the LDF turbine and HDF turbine simultaneously. In some embodiments, simultaneous power generating by both the LDF turbine and HDF turbine may enable the lower elevation reservoir pressure to be controllable or customizable, and/or may enable the internal pressure in the lower elevation reservoir or second reservoir to be about the same as the adjacent body of water at about the same depth or elevation.

FIGS. 7A-C

Example FIGS. 7A-C Summary

FIG. 7, or FIGS. 7A-C, may show a fluid displacement energy storage system employing an LDF pump/turbine and an HDF pump/turbine. FIG. 7, or FIGS. 7A-C, may show a fluid displacement energy storage system employing an LDF pump/turbine and an HDF pump/turbine, wherein the LDF pump/turbine may be located at an elevation about the same as the lower elevation reservoir or second reservoir and/or wherein the HDF pump/turbine may be located at an elevation about the same as the lower elevation reservoir or second reservoir. In FIG. 7, locating the LDF pump and/or turbine in the lower elevation region or at an elevation about the same as the elevation of the second reservoir may reduce the potential or required power capacity or of a dynamic power cable, or reduce or eliminate the need for a dynamic power cable, which may improve system cost, or reduce system complexity, or improve energy efficiency, or any combination thereof.

The system may enable a lower elevation reservoir at pressure equilibrium with the adjacent body of water or a lower elevation reservoir with an internal pressure about the same as the adjacent body of water at the same depth or elevation, while employing LDF with a density and hydrostatic pressure less than the body of water and an HDF with a density and hydrostatic pressure greater than the body of water. In some embodiments, employing an LDF with a density less than the body of water and an HDF with a density greater than a body of water enables significantly greater potential energy storage and energy density and enables energy storage density to potentially be uncapped, as in, the density difference may not be limited by or may be independent of the density of the body of water. In some embodiments, enabling the internal pressure of the second reservoir or lower elevation reservoir to be at about the same pressure at the adjacent body of water, or to be at about pressure equilibration with the adjacent body of water at the same depth, or any combination thereof may enable, for example, the locating of the second reservoir or lower elevation reservoir at deeper depths or lower elevations while enabling the same or similar tank volume or while enabling similar tank cost or while enabling the tank to maintain a similar wall thickness independent of depth, and/or may enable the potential depth of the lower elevation reservoir to be uncapped, or enable the locating of the system very deep bodies of water.

FIG. 7A may show the system at a steady state.

FIG. 7B may show the system charging or storing power or storing energy in the form of potential energy.

FIG. 7C may show the system discharging or generating power or converting potential energy into kinetic energy or electrical energy.

Example FIGS. 7A-C Figure Label Key

FIGS. 7A-C may have the same Figure Label Key as 6A-C.

Example FIGS. 7A-C Figure Label+Number Key

| Label | Description |
|---|---|
| T1 | 'T1' may comprise a higher elevation reservoir or first reservoir. 'T1' may comprise a tank, or a floating vessel, or floating storage, or a fixed vessel, or an onshore tank, or an underground tank, or an FSO, or a TLP, or a semi-sub, or platform, or any combination thereof. |
| L1 | 'L1' may comprise low density fluid (LDF) transferred between a higher elevation reservoir (T1) and a pump and/or turbine (P1). L1 may comprise LDF. In FIG. 7, L1 may transverse the higher elevation region and the lower elevation region, or Near Seabed to Near Surface. In some embodiments, L1 may comprise a pipe, or a riser, or a flow line. In some embodiments, 'L1' may comprise a riser pipe, or a subsea pipe, or a flexible pipe, or a dynamic pipe, or dynamic conduit, or any combination thereof. |
| FM1 | 'FM1' may comprise a flow meter, or flow controller, which may measure the flow rate, such as mass and/or volumetric flow rate, of LDF in L1. 'FM1' may measure the mass flow rate and/or volumetric flow rate of LDF entering or exiting the higher elevation reservoir or first reservoir. |
| TS1 | 'TS1' may comprise a temperature sensor, which may measure the temperature of LDF in L1, or temperature in T1, or temperature adjacent to L1 or T1, or any combination thereof. |
| PS1 | 'PS1' may comprise a pressure sensor, which may measure the pressure of LDF in L1, or may measure the pressure of LDF before or when entering or exiting P1, or the pressure adjacent to L1, or any combination thereof. |
| P1 | 'P1' may comprise a pump and/or turbine. 'P1' may comprise an LDF pump and/or turbine. For example, during charging, 'P1' may store power by pumping LDF from L1 or L2 to L3 or L4. For example, during discharging, 'P1' may generate power by allowing or generating power from LDF transferring through P1 from L3 or L4 to L1 or L2. In FIG. 7, 'P1' may be located 'Near Seabed' or at an elevation about the same as the elevation of the lower elevation reservoir or second reservoir. |
| E1 | 'E1' may comprise a submarine power cable, or subsea electricity cable, or a power cable. In some embodiments, 'E1' may transfer power from a power source to the energy storage system, or may transfer power from the energy storage system to one or more applications consuming or using power, or any combination thereof. |
| E2 | 'E2' may comprise a power cable which may transfer power between E1 and P1. In some embodiments. 'E2' may comprise a submarine power cable or subsea power cable. |
| L2 | 'L2' may comprise LDF transferred between V1 and P1. 'L2' may comprise low density fluid (LDF) transferred between a higher elevation reservoir (T1) and a pump and/or turbine (P1). L2 may comprise LDF. In FIG. 7, L2 may transverse the higher elevation region and the lower elevation region, or Near Seabed to Near Surface. In some embodiments, L2 may comprise a pipe, or a riser, or a flow line. In some embodiments, 'L2' may comprise a riser pipe, or a subsea pipe, or a flexible pipe, or a dynamic pipe, or dynamic conduit, or any combination thereof. |
| V1 | 'V1' may comprise a valve. 'V1' may comprise a flow controller, or a flow stopper, or a safety valve. 'V1' may be located at an elevation about the same as the higher elevation reservoir or first reservoir, or at a 'Near Surface' elevation, or at an elevation about the same as the lower elevation reservoir or second reservoir, or a 'Near Seabed' elevation, or any combination thereof. |
| L3 | 'L3' may comprise LDF transferred between P1 and V1 or T2. |
| FM2 | 'FM2' may comprise a flow meter, or flow controller, which may measure the flow rate, such as mass and/or volumetric flow rate, of LDF in L2. |
| TS2 | 'TS2' may comprise a temperature sensor, which may measure the temperature of LDF in L2, or temperature adjacent to L2, or any combination thereof. |
| PS2 | 'PS2' may comprise a pressure sensor, which may measure the pressure of LDF in L2, or the pressure adjacent to L2, or any combination thereof. |
| V2 | 'V2' may comprise a valve. 'V2' may comprise a flow controller, or a flow stopper, or a safety valve. 'V2' may be located at an elevation about the same as the lower elevation reservoir or second reservoir, or at a 'Near Seabed' elevation. |
| L4 | 'L4' may comprise LDF transferred between P2 or a valve (V2) and a lower elevation reservoir or T2. |

Example FIGS. 7A-C Label + Number Key

| Label | Description |
|---|---|
| FM3 | 'FM3' may comprise a flow meter, or flow controller, which may measure the flow rate, such as mass and/or volumetric flow rate, of LDF in L4. 'FM3' may measure the mass flow rate and/or volumetric flow rate of LDF entering or exiting the lower elevation reservoir or second reservoir. |
| TS3 | 'TS3' may comprise a temperature sensor, which may measure the temperature of LDF in L4, or temperature in T2, or temperature adjacent to L4 or T4, or any combination thereof. |
| PS3 | 'PS3' may comprise a pressure sensor, which may measure the pressure of LDF in L4, or may measure the pressure of LDF entering or exiting T2, or the pressure adjacent to L4, or the pressure in T2, or any combination thereof. |
| T2 | 'T1' may comprise a lower elevation reservoir or second reservoir. 'T2' may comprise a tank. 'T2' may be configured to store LDF and/or HDF. 'T2' may comprise a rigid tank. In some embodiments, it may be desirable for 'T2' to possess an internal pressure about the same as the pressure of the adjacent body of water at about the same elevation. |
| L5 | 'L5' may comprise fluid which may be transferred between T2 and PC1. In some embodiments, L5 may comprise LDF, or HDF, or any combination thereof. In some embodiments, fluid may transfer or pass through L5 if the pressure in T2 is substantially different than the pressure of the body of water adjacent to T2 at about the same elevation. In some embodiments, fluid may transfer or pass through L5 if the volume of fluid entering or exiting T2 at L4 is different than the volume of fluid exiting or entering T2 at L7. In some embodiments, fluid may transfer or pass through L5 due to volumetric expansion or contraction, due to, for example, change in temperature of the fluid or fluids in T2. |
| V3 | 'V3' may comprise a valve. 'V3' may comprise a flow controller, or a flow stopper, or a safety valve. 'V3' may be located at an elevation about the same as the lower elevation reservoir or second reservoir, or at a 'Near Seabed' elevation. 'V3' may open or allow fluid flow in L5 and L6 when desired or, for example, when the internal pressure of T2 is different from the internal pressure of PC1, or when the internal pressure of T2 is different from the pressure of the water body adjacent to T1 at about the same elevation as T1, or any combination thereof. |
| L6 | 'L6' may comprise fluid which may be transferred between T2 and PC1. In some embodiments, L6 may comprise LDF, or HDF, or any combination thereof. In some embodiments, fluid may transfer or pass through L6 if the pressure in T2 is substantially different than the pressure of the body of water adjacent to T2 at about the same elevation. In some embodiments, fluid may transfer or pass through L6 if the volume of fluid entering or exiting T2 at L4 is different than the volume of fluid exiting or entering T2 at L7. |
| PS4 | 'PS4' may comprise a pressure sensor, which may measure the pressure of LDF in L6, or may measure the pressure fluid entering or exiting T2, or the pressure adjacent to L6, or the pressure in T2, or measure the internal pressure of PC1, or measure the pressure adjacent to PC1, or any combination thereof. |
| TS4 | 'TS4' may comprise a temperature sensor, which may measure the temperature of LDF or HDF in L6, or may measure the temperature fluid entering or exiting T2, or the temperature adjacent to L6, or the temperature in T2, or measure the internal temperature of PC1, or measure the temperature adjacent to PC1, or any combination thereof. |
| FM4 | 'FM4' may comprise a flow meter, or flow controller, which may measure the flow rate, such as mass and/or volumetric flow rate, of LDF and/or HDF in L6. 'FM4' may measure the mass flow rate and/or volumetric flow rate of LDF and/or HDF entering or exiting PC1. FM4 may measure the fluid flow direction, which may indicate if volume of fluid entering T2 is greater than the volume of fluid exiting, or if the volume of fluid exiting T2 is greater than the volume of fluid entering. |
| PC1 | 'PC1' may comprise a pressure compensator, or bladder tank, or expansion tank, or buffer tank, or subsea compensator, or any combination thereof. 'PC1' may enable pressure equilibration with an adjacent body of water or adjacent environment. An interconnected 'PC1' may allow for deviations or differences in volumetric flow rate, or potential changes in stored volume in rigid tanks or rigid subsea tanks. In some embodiments, PC1 may be at about the same elevation as T2, or the lower elevation reservoir, or the second reservoir. |
| L7 | 'L7' may comprise fluid which may be transferred between T2 and V4 and/or P2. In some embodiments, L7 may comprise HDF. |
| FM5 | 'FM5' may comprise a flow meter, or flow controller, which may measure the flow rate, such as mass and/or volumetric flow rate, of HDF in L8, or L7, or the flow rate of fluid exiting P2, or the flow rate of fluid entering P2, or any combination thereof. |
| TS5 | 'TS5' may comprise a temperature sensor, which may measure the temperature of L8, or L7, or may measure the temperature fluid entering or exiting T2, or the temperature adjacent to L8 or L7, or the temperature in T2, or measure the internal temperature of P2, or measure the temperature adjacent to P2, or any combination thereof. |
| PS5 | 'PS5' may comprise a pressure sensor, which may measure the pressure of L8, or L7, or may measure the pressure of fluid entering or exiting T2, or the pressure adjacent to L8 or L7, or the pressure in T2, or measure the internal pressure of P2, or measure the pressure adjacent to P2, or any combination thereof. |
| V4 | 'V4' may comprise a valve. 'V4' may comprise a flow controller, or a flow stopper, or a safety valve. 'V4' may be located at an elevation about the same as the lower |

| Label | Description |
|---|---|
| | Example FIGS. 7A-C Label + Number Key (continued) |
| | elevation reservoir or second reservoir, or at a 'Near Seabed' elevation. 'V4' may open or allow fluid flow in L7 and/or L8 when desired. |
| L8 | 'L8' may comprise fluid which may be transferred between P2 and V4 and/or T2. In some embodiments, L8 may comprise HDF. |
| P2 | 'P2' may comprise a pump and/or turbine. 'P2' may comprise an HDF pump and/or turbine. For example, during charging, 'P2' may store power by pumping HDF from L8 to L9. For example, during discharging, 'P2' may generate power by allowing or generating power from HDF transferring through P2 from L9 to L8. In FIG. 7, 'P2' may be located 'Near Seabed' or at an elevation about the same as the elevation of the lower elevation reservoir or second reservoir. |
| E3 | 'E3' may comprise a submarine power cable, or subsea electricity cable, or a power cable. In some embodiments, 'E3' may transfer power from 'E1,' or 'E3' may transfer power to 'E1,' or 'E3' may transfer power to P2, or 'E3' may transfer power from P2, or may transfer power from a power source to the energy storage system, or may transfer power from the energy storage system to one or more applications consuming or using power, or any combination thereof. |
| L9 | 'L9' may comprise a fluid which may be transferred between P2 and T1, or P2 and V6, or P2 and V5, or any combination thereof. In some embodiments, L9 may comprise HDF. In some embodiments, L9 may transverse the higher elevation region and the lower elevation region, or Near Seabed to Near Surface. In some embodiments, L9 may comprise a pipe, or a riser, or a flow line. In some embodiments, 'L9' may comprise a riser pipe, or a subsea pipe, or a flexible pipe, or a dynamic pipe, or dynamic conduit, or any combination thereof. In some embodiments, 'L9' may comprise a riser pipe, or a subsea pipe, or a flexible pipe, or a dynamic pipe, or dynamic conduit, or any combination thereof. |
| PS6 | 'PS6' may comprise a pressure sensor, which may measure the pressure of L9, or may measure the pressure of fluid entering or exiting P2, or the pressure adjacent to L9, or any combination thereof. |
| TS6 | 'TS6' may comprise a temperature sensor, which may measure the temperature of L9, or may measure the temperature of fluid entering or exiting P2, or the temperature adjacent to L9, or any combination thereof. |
| FM6 | 'FM6' may comprise a flow meter, or flow controller, which may measure the flow rate, such as mass and/or volumetric flow rate, of HDF in L9, or the flow rate of fluid exiting P2, or the flow rate of fluid entering P2, or any combination thereof. |
| V5 | 'V5' may comprise a valve. 'V5' may comprise a flow controller, or a flow stopper, or a safety valve. 'V5' may be located at an elevation about the same as the lower elevation reservoir or second reservoir, or at a 'Near Seabed' elevation, or within the 'Seabed to Surface' elevation, or 'Near Surface' elevation, or any combination thereof. 'V5' may open or allow fluid flow in L9 and/or L10 when desired. |
| FM7 | 'FM7' may comprise a flow meter, or flow controller, which may measure the flow rate, such as mass and/or volumetric flow rate, of HDF in L9 or L10, or the flow rate of fluid exiting T1, or the flow rate of fluid entering T1, or any combination thereof. |
| TS7 | 'TS7' may comprise a temperature sensor, which may measure the temperature of L9 or L10, or may measure the temperature of fluid entering or exiting T1, or the temperature adjacent to L9 or L10, or any combination thereof. |
| PS7 | 'PS7' may comprise a pressure sensor, which may measure the pressure of L9 or L10, or may measure the pressure of fluid entering or exiting T1, or the pressure adjacent to L9 or L10, or any combination thereof. |
| V6 | 'V6' may comprise a valve. 'V6' may comprise a flow controller, or a flow stopper, or a safety valve. 'V6' may be located at an elevation about the same as the or 'Near Surface' elevation, or at a 'Near Seabed' elevation, or within the 'Seabed to Surface' elevation, or any combination thereof. 'V6' may open or allow fluid flow in L9 and/or L10 when desired. |
| L10 | 'L10' may comprise a fluid which may be transferred between T1 and P2, or T1 and V6, or any combination thereof. In some embodiments, L10 may comprise HDF. In some embodiments, L10 may transverse the higher elevation region and the lower elevation region, or Near Seabed to Near Surface. In some embodiments, L10 may comprise a pipe, or a riser, or a flow line. |

Example FIGS. 7A-C Step-by-Step Description

Charging: Lower density fluid (LDF) is pumped from a higher elevation reservoir or first reservoir (T1) using an LDF pump (P1) into a lower elevation reservoir or second reservoir (T2), displacing at least a portion of higher density fluid (HDF) in the lower elevation reservoir or second reservoir (T2). Simultaneously, HDF is pumped from the lower elevation reservoir or second reservoir (T2) using an HDF pump (P2) into the higher elevation reservoir or first reservoir (T1).

In some embodiments, power may be stored with both the LDF pump and HDF pump simultaneously. In some embodiments, simultaneous pumping by both the LDF pump and HDF pump may enable the lower elevation reservoir pressure to be controllable or customizable, and/or may enable the internal pressure in the lower elevation reservoir or second reservoir to be about the same as the adjacent body of water at about the same depth or elevation.

Discharging: Higher density fluid (HDF) is allowed to transfer or flow from a higher elevation reservoir or first reservoir (T1), through an HDF turbine (P2), generating power, and into the lower elevation reservoir or second reservoir (T2), displacing at least a portion of lower density fluid (LDF) in the lower elevation reservoir or second reservoir (T2). Simultaneously, LDF is allowed to transfer or flow from the lower elevation reservoir or second reservoir (T2), through an LDF turbine (P1), generating power, and into the higher elevation reservoir or first reservoir (T1).

In some embodiments, power may be generated with both the LDF turbine and HDF turbine simultaneously. In some embodiments, simultaneous power generating by both the LDF turbine and HDF turbine may enable the lower elevation reservoir pressure to be controllable or customizable, and/or may enable the internal pressure in the lower elevation reservoir or second reservoir to be about the same as the adjacent body of water at about the same depth or elevation.

Example Embodiments

A system for storing and generating power comprising:
a first storage reservoir near the surface of a body of water and configured to store a first fluid;
a second storage reservoir located below the surface of the body of water and configured to store a second fluid which has a higher density than the first fluid;
a first pump fluidly connected to the first fluid;
a second pump fluidly connected to the second fluid;
wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and
wherein the first fluid is a liquid; and
wherein pressure equilibrium in the second storage reservoir is accomplished by transferring the first fluid using into first pump at a volumetric flow rate greater than the second fluid transferred into the second pump.

A system for storing and generating power comprising:
a first storage reservoir near the surface of a body of water and configured to store a first fluid;
a second storage reservoir located below the surface of the body of water and configured to store a second fluid which has a higher density than the first fluid;
a first pump fluidly connected to the first fluid;
a second pump fluidly connected to the second fluid;
a first turbine fluidly connected to the first fluid and configured to generate power;
a second turbine fluidly connected to the second fluid and configured to generate power;
wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and
wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and
wherein the first fluid is a liquid; and
wherein the volumetric flow rate of the first fluid transferred into the first pump is greater than the volumetric flow rate of the second fluid transferred into the second pump during the storing of power; and
wherein the volumetric flow rate of the first fluid transferred into the first turbine is greater than the volumetric flow rate of the second fluid transferred into the second turbine during the generating of power.

A system for storing and generating power comprising:
a first storage reservoir near the surface of a body of water and configured to store a first fluid;
a second storage reservoir located below the surface of the body of water and configured to store a second fluid which has a higher density than the first fluid;
a first pump fluidly connected to the first fluid;
a second pump fluidly connected to the second fluid;
wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and
wherein the first fluid is a liquid; and
wherein the volumetric flow rate of the first fluid transferred into the first pump is greater than the volumetric flow rate of the second fluid transferred into the second pump during the storing of power.

A system for storing and generating power comprising:
a first storage reservoir near the surface of a body of water and configured to store a first fluid;
a second storage reservoir located below the surface of the body of water and configured to store a second fluid which has a higher density than the first fluid;
a first turbine fluidly connected to the first fluid and configured to generate power;
a second turbine fluidly connected to the second fluid and configured to generate power; and
wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and
wherein the first fluid is a liquid; and
wherein the volumetric flow rate of the first fluid transferred into the first turbine is greater than the volumetric flow rate of the second fluid transferred into the second turbine during the generating of power.

A system for storing and generating power comprising:
a first storage reservoir near the surface of a body of water and configured to store a first fluid;
a second storage reservoir located below the surface of the body of water and configured to store a second fluid which has a higher density than the first fluid;
a first pump fluidly connected to the first fluid;
a second pump fluidly connected to the second fluid;
a first turbine fluidly connected to the first fluid and configured to generate power;
a second turbine fluidly connected to the second fluid and configured to generate power;
wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and
wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and wherein the first fluid is a liquid; and wherein the volumetric flow rate of the first fluid exiting the first pump is greater than the volumetric flow rate of the second fluid exiting the second pump during the storing of power; and wherein the volumetric flow rate of the first fluid exiting the first turbine is greater than the volumetric flow rate of the second fluid exiting the second turbine during the generating of power.

A system for storing and generating power comprising:

a first storage reservoir near the surface of a body of water and configured to store a first fluid;

a second storage reservoir located below the surface of the body of water and configured to store a second fluid which has a higher density than the first fluid;

a first pump fluidly connected to the first fluid;

a second pump fluidly connected to the second fluid;

a first turbine fluidly connected to the first fluid and configured to generate power;

a second turbine fluidly connected to the second fluid and configured to generate power;

wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and wherein the first fluid is a liquid; and wherein pressure equilibrium with the adjacent body of water in the second reservoir is achieved by pumping the first fluid with the first pump at a volumetric flow rate greater than the volumetric flow rate of the second fluid with the second pump during the storing of power; and wherein pressure equilibrium with the adjacent body of water is maintained in the second reservoir by allowing the volumetric flow rate of the first fluid exiting the first turbine to be greater than the volumetric flow rate of the second fluid exiting the second turbine during the generating of power.

A system for storing and generating power comprising:

a first storage reservoir near the surface of a body of water and configured to store a first fluid;

a second storage reservoir located below the surface of the body of water and configured to store a second fluid which has a higher density than the first fluid;

a first pump fluidly connected to the first fluid;

a second pump fluidly connected to the second fluid;

a first turbine fluidly connected to the first fluid and configured to generate power;

a second turbine fluidly connected to the second fluid and configured to generate power;

wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and wherein the first fluid is a liquid; and wherein pressure equilibrium with the adjacent body of water in the second reservoir is achieved by pumping the first fluid with the first pump at a volumetric flow rate greater than the volumetric flow rate of the second fluid with the second pump during the storing of power.

A system for storing and generating power comprising:

a first storage reservoir near the surface of a body of water and configured to store a first fluid;

a second storage reservoir located below the surface of the body of water and configured to store a second fluid which has a higher density than the first fluid;

a first pump fluidly connected to the first fluid;

a second pump fluidly connected to the second fluid;

wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and wherein the first fluid is a liquid; and wherein the volumetric flow rate of the first fluid exiting the first pump is greater than the volumetric flow rate of the second fluid exiting the second pump during the storing of power.

A system for storing and generating power comprising:

a first storage reservoir near the surface of a body of water and configured to store a first fluid;

a second storage reservoir located below the surface of the body of water and configured to store a second fluid which has a higher density than the first fluid;

a first turbine fluidly connected to the first fluid and configured to generate power;

a second turbine fluidly connected to the second fluid and configured to generate power; and wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and wherein the first fluid is a liquid; and wherein the volumetric flow rate of the first fluid exiting the first turbine is greater than the volumetric flow rate of the second fluid exiting the second turbine during the generating of power.

1. A system for storing and generating power comprising:
a first storage reservoir near the surface of a body of water and configured to store a first fluid; a second storage reservoir located below the surface of the body of water and configured to store a second fluid which has a higher density than the first fluid;

a first pump fluidly connected to the first fluid;
a second pump fluidly connected to the second fluid;
a first turbine fluidly connected to the first fluid and configured to generate power;
a second turbine fluidly connected to the second fluid and configured to generate power;
wherein the first pump, second pump, and the first and second reservoir are operatively connected such that power is stored by pumping the first fluid from the first storage reservoir into the second storage reservoir using the first pump and the second fluid from the second storage reservoir into the first storage reservoir using the second pump; and
wherein the first turbine, second turbine, and the first and second reservoir are operatively connected such that power is generated by transferring the second fluid from the first storage reservoir into the second storage reservoir through the second turbine and transferring the first fluid from the second reservoir to the first reservoir through the first turbine; and
wherein the first fluid is a liquid; and
wherein pressure equilibrium with the adjacent body of water in the second reservoir is achieved by pumping the first fluid with the first pump at a volumetric flow rate greater than the volumetric flow rate of the second fluid with the second pump during the storing of power.

2. The system of example embodiment 1 wherein the volumetric flow rate of first fluid transferred into the first fluid pump is greater than the volumetric flow rate of the second fluid transferred into the second fluid pump.

3. The system of example embodiment 1 wherein the volumetric flow rate of first fluid exiting the first fluid pump is greater than the volumetric flow rate of the second fluid exiting the second fluid pump.

4. The system of example embodiment 1 wherein the volumetric flow rate of first fluid transferred into the first fluid turbine is greater than the volumetric flow rate of the second fluid transferred into the second fluid turbine.

5. The system of example embodiment 1 wherein the volumetric flow rate of first fluid exiting the first fluid turbine is greater than the volumetric flow rate of the second fluid exiting the second fluid turbine.

6. The system of example embodiment 1 wherein the first fluid pump is separate from the first fluid turbine.

7. The system of example embodiment 1 wherein the first fluid pump is located at an elevation about the same as the second reservoir and wherein the first fluid turbine is located at an elevation about the same as the first reservoir.

8. The system of example embodiment 7 wherein the location of the first fluid turbine at an elevation about the same as the first reservoir reduces the required power capacity of a dynamic power cable.

9. The system of example embodiment 1 wherein the first fluid pump is located at an elevation about the same as the second reservoir and wherein the first fluid turbine is located at an elevation about the same as the second reservoir.

10. The system of example embodiment 1 wherein the second fluid pump is separate from the second fluid turbine.

11. The system of example embodiment 1 wherein the first pump and the first turbine comprise a combined pump-turbine or a pump which can act as a turbine.

12. The system of example embodiment 1 wherein the second pump and the second turbine comprise a combined pump-turbine or a pump which can act as a turbine.

13. The system of example embodiment 1 wherein the internal pressure of the second reservoir is about the same as the hydrostatic pressure of the body of water at the depth of the second reservoir plus or minus a tolerance pressure.

14. The system of example embodiment 13 wherein said tolerance pressure is plus or minus 3 percent of the hydrostatic pressure of the body of water at the depth of the second reservoir.

15. The system of example embodiment 1 wherein the first fluid pump provides a pressure difference about the same as the difference in pressure between the hydrostatic pressure of the first fluid at the depth of the second reservoir minus any frictional losses or pressure drop and the internal pressure of the second reservoir.

16. The system of example embodiment 1 wherein the second fluid pump provides a pressure difference about the same as the difference in pressure between the internal pressure of the second reservoir and hydrostatic pressure of the second fluid at the depth of the second reservoir plus any frictional losses or pressure drop.

17. The system of example embodiment 1 wherein the first fluid turbine generates power from a pressure difference about the same as the difference in pressure between the internal pressure of the second reservoir and the hydrostatic pressure of the first fluid at the depth of the second reservoir plus any frictional losses or pressure drop.

18. The system of example embodiment 1 wherein the second fluid turbine generates power from a pressure difference about the same as the difference in pressure between the hydrostatic pressure of the second fluid at the depth of the second reservoir minus any frictional losses or pressure drop and the and the internal pressure of the second reservoir.

19. The system of example embodiment 1 wherein the second reservoir is fluidly connected to a subsea pressure compensator; and wherein said subsea pressure compensator enables safe system operation in the event of a fluid flow irregularity or system disruption.

20. The system of example embodiment 1 wherein the first fluid and second fluid are stored in the same storage tank in the first reservoir.

21. The system of example embodiment 1 wherein the first fluid and second fluid are stored in separate storage tanks in the first reservoir.

22. The system of example embodiment 1 wherein the first fluid and second fluid are stored in the same storage tank in the second reservoir.

23. The system of example embodiment 1 wherein the first fluid and second fluid are at least partially separated by a floating barrier in the second reservoir.

24. The system of example embodiment 1 wherein the first fluid comprises n-butane and the second fluid comprises a brine comprising magnesium chloride, or calcium chloride, or sodium chloride.

25. The system of example embodiment 1 wherein the first fluid comprises ethanol and the second fluid comprises a brine comprising potassium carbonate.

26. The system of example embodiment 1 wherein the first fluid comprises water and the second fluid comprises a brine comprising magnesium chloride, or calcium chloride, or sodium chloride.

Notes

Example tolerance pressure differences in second reservoir may include, but are not limited to, one or more or any combination of the following percentages of total pressure, or percentages of the hydrostatic pressure of the LDF, or percentages of the hydrostatic pressure of the adjacent body of water, or percentages of the hydrostatic pressure of the HDF: 0.01%, or 0.05%, or 0.1%, or 0.25%, or 0.5%, or 0.75%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40% or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62% or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84% or 85%, or 86%, or 87%, or 88%, or 89%, or 90%, or 91%, or 92%, or 93%, or 94%, or 95%, or 96%, or 97%, or 98%, or 99%, or 100%.

Example elevation differences between the first reservoir or higher elevation reservoir and the second reservoir or lower elevation reservoir, or the depth of the second reservoir, or any combination thereof may include, but is not limited to, one or more or any combination of the following: 10 m, or 50 m, or 100 m, or 200 m, or 300 m, or 400 m, or 500 m, or 1,000 m, or 1,500 m, or 2,000 m, or 2,500 m, or 3,000 m, or 3,500 m, or 4,000 m, or 4,500 m, or 5,000 m, or 5,500 m, or 6,000 m, or 6,500 m, or 7,000 m, or 7,500 m, or 8,000 m, or 8,500 m, or 9,000 m, or 9,500 m, or 10,000 m Example pressures or pressure differences may include, but are not limited to, one or more or any combination of the following: 0.1 bar, or 0.25 bar, or 0.5 bar, or 0.75 bar, or 1 bar, or 2 bar, or 3 bar, or 4 bar, or 5 bar, or 6 bar, or 7 bar, or 8 bar, or 9 bar, or 10 bar, or 20 bar, or 30 bar, or 40 bar, or 50 bar, or 60 bar, or 70 bar, or 80 bar, or 90 bar, or 100 bar, or 110 bar, or 120 bar, or 130 bar, or 140 bar, or 150 bar, or 160 bar, or 170 bar, or 180 bar, or 190 bar, or 200 bar, or 210 bar, or 220 bar, or 230 bar, or 240 bar, or 250 bar, or 260 bar, or 270 bar, or 280 bar, or 290 bar, or 300 bar, or 310 bar, or 320 bar, or 330 bar, or 340 bar, or 350 bar, or 360 bar, or 370 bar, or 380 bar, or 390 bar, or 400 bar, or 410 bar, or 420 bar, or 430 bar, or 440 bar, or 450 bar, or 460 bar, or 470 bar, or 480 bar, or 490 bar, or 500 bar, or 510 bar, or 520 bar, or 530 bar, or 540 bar, or 550 bar, or 560 bar, or 570 bar, or 580 bar, or 590 bar, or 600 bar, or 610 bar, or 620 bar, or 630 bar, or 640 bar, or 650 bar, or 660 bar, or 670 bar, or 680 bar, or 690 bar, or 700 bar, or 710 bar, or 720 bar, or 730 bar, or 740 bar, or 750 bar, or 760 bar, or 770 bar, or 780 bar, or 790 bar, or 800 bar, or 810 bar, or 820 bar, or 830 bar, or 840 bar, or 850 bar, or 860 bar, or 870 bar, or 880 bar, or 890 bar, or 900 bar, or 910 bar, or 920 bar, or 930 bar, or 940 bar, or 950 bar, or 960 bar, or 970 bar, or 980 bar, or 990 bar, or 1000 bar.

Example Low Density Fluids (LDF)

A low density fluid (LDF) may comprise a fluid with a density less than a high density fluid in the same system or process. A low density fluid may comprise a fluid with a density less than a high density fluid which the low density fluid displaces during at least a portion of process or system operation. A low density fluid may comprise a fluid with a density less than a high density fluid which the low density fluid displaces during the storing of power or energy or charging.

A low density fluid (LDF) may comprise including, but not limited to, one or more or any combination of the following: a hydrocarbon, or an alkane, or an alkene, or an alkyne, or an aromatic hydrocarbon, or water, or freshwater, or seawater, or an organic solvent, or butane, or n-butane, or iso-butane, or propane, or cyclopropane, or cyclobutane, cyclobutene, or cyclopentane, or cyclohexane, or ethane, or LPG, or pentane, or hexane, or Mineral oil, or a mineral oil saturated hydrocarbon (MOSH), or oil, or environmental oil, or marine friendly oil, or biofuel, or crude oil, or crude oil derivative, or natural gas derivative, or hydrocarbon derivative, or hydrogen derivative, or oxygen derivative, or nitrogen derivative, or ammonia, or ammonia derivative, or an organic solvent, or diesel, or distillate, or fuel oil, or fuel hydrocarbon, or an alkane, or an alkene, or an alkyne, or a e-fuel, or ammonia, or methanol, or ethanol, or water, or desalinated water, or brackish water, or seawater, or desalination feed, or treated seawater, or treated desalination feed, or an ether, or a ketone, or an alcohol, or an aldehyde, or aliphatic hydrocarbons, or aromatic hydrocarbons, or amines, or esters, or ethers, or ketones, or nitrated, or chlorinated hydrocarbons, or acetone, or acetonitrile, or 1-butanol, or 2-butanol, or 2-butanone, or t-butyl alcohol, or cyclohexane, or diethyl ether, or dimethyl ether, or dimethoxymethane, or dimethoxyethane, or dimethylformamide (DMF), or dimethyl sulfoxide (DMSO), or ethanol, or ethyl acetate, methyl acetate, or heptane, or hexane, or methanol, methyl t-butyl ether (MTBE), or petroleum ether (ligroine), or 1-propanol, or 2-propanol, or isopropanol, or pyridine, or tetrahydrofuran (THF), or toluene, or ammonia, or triethyl amine, or amine, or organic nitrogen compound, or o-xylene, or m-xylene, or p-xylene, or a gas, or a compressed gas, or a supercritical fluid, or a suspended gas-liquid fluid, or a froth, or bubbles, or a supercritical fluid-liquid mixture.

Example High Density Fluids (HDF)

A high density fluid (HDF) may comprise a fluid with a density greater than a low density fluid in the same system or process. A high density fluid may comprise a fluid with a density greater than a low density fluid which the high density fluid displaces during at least a portion of process or system operation. A high density fluid may comprise a fluid with a density less than a low density fluid which the high density fluid displaces during the storing of power or energy or charging.

A high density fluid (HDF) may comprise including, but not limited to, one or more or any combination of the following: water, or desalinated water, or brackish water, or seawater, or desalination feed, or treated seawater, or treated desalination feed, or brine, or saline water, or a solution comprising a salt of sodium, or a solution comprising a salt of an alkali, or an ionic liquid, or an ionic salt, or a solution comprising an ionic compound, or a solution comprising a salt of an alkaline earth, or a solution comprising a salt of calcium, or a solution comprising a salt of magnesium, or a solution comprising a salt, or a solution comprising a chloride, or a solution comprising a sulfate, or a solution comprising an acetate, or a solution comprising a carboxylate, or a solution comprising a salt of potassium, or a solution comprising a carbonate, or a solution comprising a bicarbonate, or a solution comprising sodium chloride, or a solution comprising magnesium sulfate, or a solution comprising magnesium chloride, or a solution comprising calcium chloride, or a solution comprising potassium carbonate, or a solution comprising potassium acetate, or a solution comprising calcium nitrate, or a solution comprising a nitrate, or a solution comprising a bromide, or a solution comprising urea, or a solution comprising a phosphate salt, or a solution comprising a silicon compound, or a silicon compound, or a solution comprising a glycol, or a solvent comprising a glycol, or a polyol, or a diol, or a glycol ether, or a glycol, or an aqueous glycol solution, or ethylene glycol, or propylene glycol, or glycerol, or diethylene glycol, or triethylene glycol, or diglyme, or glyme, or a solution comprising ammonia, or a solution comprising an ammonium salt, or a solution comprising a nitrogenous compound, or a liquid comprising a nitrogenous compound, or a liquid comprising sulfur, or sulfur, or an acid, or a mineral acid, or a transition metal salt, or a solution comprising a salt, or a solution comprising a transition metal salt, or a liquid salt, or a liquid metal, or a carboxylic acid, or a carboxylate, or a formate, or liquid carbon dioxide, or a solid-liquid mixture, or a solid-liquid suspension, or a mud, or an emulsion, or a stable emulsion, or an unstable emulsion, or a ferrofluid, or a Newtonian fluid, or a non-newtonian fluid, or a maxwell fluid, or a suspended nanoparticle fluid, or liquid sulfur dioxide, or liquid nitrogen oxide, or liquid sulfur trioxide, or bromine, or a high density hydrocarbon, or chloroform, or carbon tetrachloride, or 1,2-dichloroethane, or N-methyl-2-pyrrolidinone (NMP), or methylene chloride, or a fluorocarbon, or a halogenated compound.

In some embodiments, for example, a system may comprise a first reservoir floating on the surface of a body of water, a second reservoir located on or near the seabed of a body of water, an LDF riser pipe to transfer LDF between the first reservoir and the second reservoir, and an HDF riser pipe to transfer HDF between the first reservoir and the second reservoir. An HDF pump and/or turbine may be fluidly connected to the HDF riser and/or may be located between the first reservoir and the second reservoir. For example, in some embodiments, the HDF pump and/or turbine may be located subsea at an elevation about the same as the second reservoir. An LDF pump and/or turbine may be fluidly connected to the LDF riser and/or may be located between the first reservoir and the second reservoir.

Embodiments

1. A process for storing or generating power comprising:
   storing energy by pumping a first fluid having a first density from a first reservoir at a first elevation to a second reservoir at a second elevation using a first fluid pump and pumping a second fluid having a second density from the second reservoir to the first reservoir using a second fluid pump; and
   generating power by allowing the second fluid to transfer from the first reservoir to the second reservoir using a second fluid turbine and allowing the first fluid to transfer from the second reservoir to the first reservoir using a first fluid turbine; and
   wherein the first elevation is above the second elevation; and
   wherein the first fluid density is less than the second fluid density; and
   wherein the first fluid displaces the second fluid in the second reservoir during the storing of energy; and
   wherein the second fluid displaces the first fluid in the second reservoir during the generating of power.
2. The process of embodiment 1 wherein the volumetric flow rate of the first fluid transferred into the first fluid pump is greater than the volumetric flow rate of the second fluid transferred into the second fluid pump.
3. The process of embodiment 1 wherein the volumetric flow rate of the first fluid exiting the first fluid pump is greater than the volumetric flow rate of the second fluid exiting the second fluid pump.
4. The process of embodiment 1 wherein the volumetric flow rate of the first fluid transferred into the first fluid turbine is greater than the volumetric flow rate of the second fluid transferred into the second fluid turbine.
5. The process of embodiment 1 wherein the volumetric flow rate of the first fluid exiting the first fluid turbine is greater than the volumetric flow rate of the second fluid exiting the second fluid turbine.
6. The process of embodiment 1 wherein the first fluid pump is separate from the first fluid turbine.
7. The process of embodiment 1 wherein the first fluid pump is located at an elevation about the same as the second reservoir and wherein the first fluid turbine is located at an elevation about the same as the first reservoir.
8. The process of embodiment 1 wherein the first fluid pump is located at an elevation about the same as the second reservoir and wherein the first fluid turbine is located at an elevation about the same as the second reservoir.
9. The process of embodiment 1 wherein the second fluid pump is separate from the second fluid turbine.
10. The process of embodiment 1 wherein the first pump and the first turbine comprise either a combined pump-turbine or a pump which can act as a turbine.
11. The process of embodiment 1 wherein the second pump and the second turbine comprise either a combined pump-turbine or a pump which can act as a turbine.
12. The process of embodiment 1 wherein the internal pressure of the second reservoir is about the same as the hydrostatic pressure of the body of water at the depth of the second reservoir plus or minus a tolerance pressure.
13. The process of embodiment 12 wherein said tolerance pressure is plus or minus 3 percent of the hydrostatic pressure of the body of water at the depth of the second reservoir.
14. The process of embodiment 1 wherein the first fluid pump provides a pressure difference about the same as the difference in pressure between the hydrostatic pressure of the first fluid at the depth of the second reservoir minus any frictional losses or pressure drop and the internal pressure of the second reservoir.

15. The process of embodiment 1 wherein the second fluid pump provides a pressure difference about the same as the difference in pressure between the internal pressure of the second reservoir and hydrostatic pressure of the second fluid at the depth of the second reservoir plus the sum of any frictional losses and pressure drop.

16. The process of embodiment 1 wherein the first fluid turbine generates power from a pressure difference about the same as the difference in pressure between the internal pressure of the second reservoir and the hydrostatic pressure of the first fluid at the depth of the second reservoir plus the sum of any frictional losses and pressure drop.

17. The process of embodiment 1 wherein the second fluid turbine generates power from a pressure difference about the same as the difference in pressure between the hydrostatic pressure of the second fluid at the depth of the second reservoir minus the sum of any frictional losses and pressure drop and the internal pressure of the second reservoir.

18. The process of embodiment 1 wherein the second reservoir is fluidly connected to a subsea pressure compensator; and wherein said subsea pressure compensator is configured to enable continued process operation in the event of a fluid flow irregularity.

19. The process of embodiment 1 wherein the first reservoir comprises a storage tank and the first fluid and the second fluid are stored together in the storage tank.

20. The process of embodiment 1 wherein the first reservoir comprises a first and a second storage tank and the first fluid is stored in the first storage tank and the second fluid is stored in the second storage tank.

21. The process of embodiment 1 wherein the second reservoir comprises a storage tank and the first fluid and the second fluid are stored together in the storage tank.

22. The process of embodiment 1 wherein the first fluid and second fluid are at least partially separated by a floating barrier in the second reservoir.

23. The process of embodiment 1 wherein the first fluid comprises n-butane and the second fluid comprises a brine comprising magnesium chloride, or calcium chloride, or sodium chloride, or any mixture thereof.

24. The process of embodiment 1 wherein the first fluid comprises ethanol and the second fluid comprises a brine comprising potassium carbonate.

25. The process of embodiment 1 wherein the first fluid comprises water and the second fluid comprises a brine comprising magnesium chloride, or calcium chloride, or sodium chloride, or any mixture thereof.

26. The process of embodiment 1 wherein the pumping of the first fluid by the first fluid pump is conducted simultaneously to the pump of the second fluid by the second fluid pump during the storing of energy.

27. The process of embodiment 1 wherein the generating of power from the first fluid by the first fluid turbine is conducted simultaneously to the generating of power from the second fluid by the second fluid turbine during the generating of power.

28. A system for storing and generating power comprising:
a first storage reservoir near the surface of a body of water and configured to store a first fluid;
a second storage reservoir located below the surface of the body of water and configured to store a second fluid which has a higher density than the first fluid;
a first pump fluidly connected to the first fluid;
a second pump fluidly connected to the second fluid;
a first turbine fluidly connected to the first fluid and configured to generate power;
a second turbine fluidly connected to the second fluid and configured to generate power;
wherein the first pump, the second pump, and the first and the second reservoir are operatively connected such that power is stored by pumping the first fluid from the first storage reservoir into the second storage reservoir using the first pump and by pumping the second fluid from the second storage reservoir into the first storage reservoir using the second pump; and
wherein the first turbine, the second turbine, and the first and the second reservoir are operatively connected such that power is generated by transferring the second fluid from the first storage reservoir into the second storage reservoir through the second turbine and transferring the first fluid from the second reservoir to the first reservoir through the first turbine; and
wherein the first fluid is a liquid; and
wherein pressure equilibrium with the adjacent body of water in the second reservoir is achieved by pumping the first fluid with the first pump at a volumetric flow rate greater than the volumetric flow rate of the second fluid with the second pump during the storing of power.

What is claimed is:

1. A process for storing or generating power comprising:
storing energy by pumping a first fluid having a first density from a first reservoir at a first elevation to a second reservoir at a second elevation using a first fluid pump and pumping a second fluid having a second density from the second reservoir to the first reservoir using a second fluid pump; and
generating power by allowing the second fluid to transfer from the first reservoir to the second reservoir using a second fluid turbine and allowing the first fluid to transfer from the second reservoir to the first reservoir using a first fluid turbine; and
maintaining an internal pressure on the second reservoir which is about the same as external pressure on the second reservoir;
wherein the first elevation is above the second elevation; and
wherein the first fluid density is less than the second fluid density; and
wherein the first fluid displaces the second fluid in the second reservoir during the storing of energy;
wherein the second fluid displaces the first fluid in the second reservoir during the generating of power;
wherein the first fluid is a liquid and wherein the second fluid is a liquid.

2. The process of claim 1 wherein the first fluid pump is separate from the first fluid turbine.

3. The process of claim 1 wherein the first fluid pump is located at an elevation the same as the second reservoir and wherein the first fluid turbine is located at an elevation the same as the first reservoir.

4. The process of claim 1 wherein the first fluid pump is located at an elevation the same as the second reservoir and wherein the first fluid turbine is located at an elevation the same as the second reservoir.

5. The process of claim 1 wherein the second fluid pump is separate from the second fluid turbine.

6. The process of claim 1 wherein the first pump and the first turbine comprise either a combined pump-turbine or a pump which can act as a turbine.

7. The process of claim 1 wherein the second pump and the second turbine comprise either a combined pump-turbine or a pump which can act as a turbine.

8. The process of claim 1 wherein the second reservoir is in a body of water and the internal pressure of the second reservoir is the same as the hydrostatic pressure of the body of water at the depth of the second reservoir plus or minus a tolerance pressure.

9. The process of claim 8 wherein said tolerance pressure is plus or minus 3 percent of the hydrostatic pressure of the body of water at the depth of the second reservoir.

10. The process of claim 1 wherein the first fluid pump provides a pressure difference the same as the difference in pressure between the hydrostatic pressure of the first fluid at the depth of the second reservoir minus any frictional losses or pressure drop and the internal pressure of the second reservoir.

11. The process of claim 1 wherein the second fluid pump provides a pressure difference the same as the difference in pressure between the internal pressure of the second reservoir and hydrostatic pressure of the second fluid at the depth of the second reservoir plus the sum of any frictional losses and pressure drop.

12. The process of claim 1 wherein the first fluid turbine generates power from a pressure difference the same as the difference in pressure between the internal pressure of the second reservoir and the hydrostatic pressure of the first fluid at the depth of the second reservoir plus the sum of any frictional losses and pressure drop.

13. The process of claim 1 wherein the second fluid turbine generates power from a pressure difference the same as the difference in pressure between the hydrostatic pressure of the second fluid at the depth of the second reservoir minus the sum of any frictional losses and pressure drop and the internal pressure of the second reservoir.

14. The process of claim 1 wherein the second reservoir is fluidly connected to a subsea pressure compensator; and wherein said subsea pressure compensator is configured to enable continued process operation in the event of a fluid flow irregularity.

15. The process of claim 1 wherein the first reservoir comprises a storage tank and the first fluid and the second fluid are stored together in the storage tank.

16. The process of claim 1 wherein the first reservoir comprises a first and a second storage tank and the first fluid is stored in the first storage tank and the second fluid is stored in the second storage tank.

17. The process of claim 1 wherein the second reservoir comprises a storage tank and the first fluid and the second fluid are stored together in the storage tank.

18. The process of claim 1 wherein the first fluid and second fluid are at least partially separated by a floating barrier in the second reservoir.

19. The process of claim 1 wherein the first fluid comprises n-butane and the second fluid comprises a brine comprising magnesium chloride, or calcium chloride, or sodium chloride, or any mixture thereof.

20. The process of claim 1 wherein the first fluid comprises ethanol and the second fluid comprises a brine comprising potassium carbonate.

21. The process of claim 1 wherein the first fluid comprises water and the second fluid comprises a brine comprising magnesium chloride, or calcium chloride, or sodium chloride, or any mixture thereof.

22. The process of claim 1 wherein the pumping of the first fluid by the first fluid pump is conducted simultaneously to the pumping of the second fluid by the second fluid pump during the storing of energy.

23. The process of claim 1 wherein the generating of power from the first fluid by the first fluid turbine is conducted simultaneously to the generating of power from the second fluid by the second fluid turbine during the generating of power.

24. The process of claim 1 further comprising
    (1) wherein the volumetric flow rate of the first fluid transferred into the first fluid pump is greater than the volumetric flow rate of the second fluid transferred into the second fluid pump; or
    (2) wherein the volumetric flow rate of the first fluid exiting the first fluid pump is greater than the volumetric flow rate of the second fluid exiting the second fluid pump; or
    (3) wherein the volumetric flow rate of the first fluid transferred into the first fluid turbine is greater than the volumetric flow rate of the second fluid transferred into the second fluid turbine; or
    (4) wherein the volumetric flow rate of the first fluid exiting the first fluid turbine is greater than the volumetric flow rate of the second fluid exiting the second fluid turbine.

25. The process of claim 1 wherein the internal pressure of the second reservoir differs from the external pressure on the second reservoir by less than or equal to a tolerance pressure of the second reservoir.

26. A system for storing and generating power comprising:
    a first storage reservoir near the surface of a body of water and configured to store a first fluid;
    a second storage reservoir located below the surface of the body of water and configured to store a second fluid which has a higher density than the first fluid;
    a first pump fluidly connected to the first fluid;
    a second pump fluidly connected to the second fluid;
    a first turbine fluidly connected to the first fluid and configured to generate power;
    a second turbine fluidly connected to the second fluid and configured to generate power; and
    a pressure compensator for maintaining pressure equilibrium between the second reservoir and the adjacent body of water;
    wherein the first pump, the second pump, and the first and the second reservoir are operatively connected such that power is stored by pumping the first fluid from the first storage reservoir into the second storage reservoir using the first pump and by pumping the second fluid from the second storage reservoir into the first storage reservoir using the second pump; and
    wherein the first turbine, the second turbine, and the first and the second reservoir are operatively connected such that power is generated by transferring the second fluid from the first storage reservoir into the second storage reservoir through the second turbine and transferring the first fluid from the second reservoir to the first reservoir through the first turbine; and
    wherein the first fluid is a liquid and the second fluid is a liquid.

* * * * *